(12) United States Patent
Siebel et al.

(10) Patent No.: US 11,954,112 B2
(45) Date of Patent: Apr. 9, 2024

(54) SYSTEMS AND METHODS FOR DATA PROCESSING AND ENTERPRISE AI APPLICATIONS

(71) Applicant: C3.ai, Inc., Redwood City, CA (US)

(72) Inventors: Thomas M. Siebel, Woodside, CA (US); Edward Y. Abbo, Woodside, CA (US); Houman Behzadi, San Francisco, CA (US); John Coker, Atherton, CA (US); Scott Kurinskas, San Mateo, CA (US); Thomas Rothwein, San Jose, CA (US); David Tchankotadze, Sunnyvale, CA (US)

(73) Assignee: C3.ai, Inc., Redwood City, CA (US)

( * ) Notice: Subject to any disclaimer, the term of this patent is extended or adjusted under 35 U.S.C. 154(b) by 0 days.

(21) Appl. No.: 17/062,445

(22) Filed: Oct. 2, 2020

(65) Prior Publication Data

US 2021/0263945 A1 Aug. 26, 2021

Related U.S. Application Data

(63) Continuation of application No. 15/890,867, filed on Feb. 7, 2018, now Pat. No. 10,824,634, which is a
(Continued)

(51) Int. Cl.
*G06Q 10/10* (2023.01)
*G06F 8/10* (2018.01)
(Continued)

(52) U.S. Cl.
CPC .............. *G06F 16/254* (2019.01); *G06F 8/10* (2013.01); *G06F 8/35* (2013.01); *G06F 8/77* (2013.01);
(Continued)

(58) Field of Classification Search
CPC . G06F 16/254; G06F 8/10; G06F 8/35; G06F 8/77; G06F 16/288; G06F 8/24;
(Continued)

(56) References Cited

U.S. PATENT DOCUMENTS 5,132,920 A 7/1992 Bellows et al.
5,524,253 A 6/1996 Pham et al.
(Continued)

FOREIGN PATENT DOCUMENTS

WO WO-2015066220 A2 5/2015
WO WO-2016118979 A2 7/2016

OTHER PUBLICATIONS

W3C Recommendation, OWL 2 Web Ontology Language Document Overview (Second Edition), Dec. 11, 2012 (Year: 2012).*
(Continued)

*Primary Examiner* — Shirley X Zhang
(74) *Attorney, Agent, or Firm* — Norton Rose Fulbright US LLP

(57) ABSTRACT

Systems, methods, and devices for a cyberphysical (IoT) software application development platform based upon a model driven architecture and derivative IoT SaaS applications are disclosed herein. The system may include concentrators to receive and forward time-series data from sensors or smart devices. The system may include message decoders to receive messages comprising the time-series data and storing the messages on message queues. The system may include a persistence component to store the time-series data in a key-value store and store the relational data in a relational database. The system may include a data services component to implement a type layer over data stores. The system may also include a processing component to access and process data in the data stores via the type layer, the
(Continued)

processing component comprising a batch processing component and an iterative processing component.

24 Claims, 34 Drawing Sheets

Related U.S. Application Data continuation of application No. 15/028,340, filed as application No. PCT/US2016/023850 on Mar. 23, 2016.

(60) Provisional application No. 62/172,012, filed on Jun. 5, 2015, provisional application No. 62/107,262, filed on Jan. 23, 2015.

(51) Int. Cl.

| | |
|---|---|
| G06F 8/35 | (2018.01) |
| G06F 8/77 | (2018.01) |
| G06F 9/54 | (2006.01) |
| G06F 16/25 | (2019.01) |
| G06F 16/28 | (2019.01) |
| G06F 40/284 | (2020.01) |
| G06N 20/00 | (2019.01) |
| H04L 51/00 | (2022.01) |
| H04L 67/10 | (2022.01) |
| H04L 67/565 | (2022.01) |
| H04L 67/5651 | (2022.01) |

(52) U.S. Cl.
CPC .............. *G06F 9/54* (2013.01); *G06F 16/283* (2019.01); *G06F 16/288* (2019.01); *G06N 20/00* (2019.01); *H04L 67/10* (2013.01); *H04L 67/565* (2022.05); *H04L 67/5651* (2022.05)

(58) Field of Classification Search
CPC ........ G06N 20/00; G06N 5/003; G06N 20/20; H04L 67/10; H04L 29/08783; H04L 29/08792; H04L 67/32; H04L 67/12; H04L 67/2833; H04L 67/322; H04L 69/16; G06Q 10/06; Y04S 40/18
See application file for complete search history.

(56) References Cited

U.S. PATENT DOCUMENTS

| | | | |
|---|---|---|---|
| 6,178,362 B1 | 1/2001 | Woolard et al. | |
| 6,961,148 B2 | 11/2005 | Simpson et al. | |
| 7,137,071 B2 | 11/2006 | Fuller et al. | |
| 7,159,208 B2 | 1/2007 | Keeley | |
| 7,200,529 B2 | 4/2007 | Cifra et al. | |
| 7,334,015 B1 | 2/2008 | Phillips | |
| 7,590,970 B2 | 9/2009 | Bromley | |
| 7,877,421 B2 | 1/2011 | Berger et al. | |
| 8,166,465 B2 | 4/2012 | Feblowitz et al. | |
| 8,180,872 B1 | 5/2012 | Marinelli et al. | |
| 8,190,555 B2 | 5/2012 | Venugopal et al. | |
| 8,442,917 B1 | 5/2013 | Burke | |
| 8,442,935 B2 | 5/2013 | Cottle et al. | |
| 8,577,823 B1* | 11/2013 | Gadir ................... | G06N 5/025 706/45 |
| 8,626,877 B2 | 1/2014 | Greene et al. | |
| 8,972,484 B2 | 3/2015 | Naphade et al. | |
| 9,069,737 B1 | 6/2015 | Kimotho et al. | |
| 9,116,985 B2* | 8/2015 | Mills .................... | G06F 16/35 |
| 9,148,669 B2 | 9/2015 | Huang et al. | |
| 9,268,815 B2 | 2/2016 | Chen et al. | |
| 9,281,995 B2 | 3/2016 | Baba et al. | |
| 9,734,221 B2 | 8/2017 | Sarferaz | |
| 9,799,017 B1 | 10/2017 | Vermeulen et al. | |
| 9,824,133 B1 | 11/2017 | Kalki et al. | |
| 9,886,483 B1 | 2/2018 | Harrison et al. | |
| 9,922,101 B1 | 3/2018 | Reiner et al. | |
| 10,114,367 B2 | 10/2018 | Bates et al. | |
| 10,157,347 B1* | 12/2018 | Kasturi ............... | G06F 16/3326 |
| 10,235,780 B2 | 3/2019 | Noon et al. | |
| 10,592,068 B1* | 3/2020 | Sedky ................. | G06F 9/50 |
| 10,817,530 B2 | 10/2020 | Siebel et al. | |
| 10,824,634 B2 | 11/2020 | Siebel et al. | |
| 10,884,039 B2 | 1/2021 | Siebel et al. | |
| 11,126,635 B2 | 9/2021 | Behzadi et al. | |
| 11,320,469 B2 | 5/2022 | Siebel et al. | |
| 2003/0034998 A1 | 2/2003 | Kodosky et al. | |
| 2003/0037322 A1 | 2/2003 | Kodosky et al. | |
| 2003/0041163 A1 | 2/2003 | Rhoades et al. | |
| 2003/0172368 A1 | 9/2003 | Alumbaugh et al. | |
| 2003/0177146 A1 | 9/2003 | Zimowski | |
| 2004/0224549 A1 | 11/2004 | Yu | |
| 2004/0225649 A1 | 11/2004 | Yeo et al. | |
| 2005/0050054 A1 | 3/2005 | Clark et al. | |
| 2005/0114369 A1 | 5/2005 | Gould et al. | |
| 2005/0177816 A1 | 8/2005 | Kudukoli et al. | |
| 2005/0228808 A1 | 10/2005 | Mamou et al. | |
| 2005/0234969 A1 | 10/2005 | Mamou et al. | |
| 2005/0240592 A1 | 10/2005 | Mamou et al. | |
| 2006/0010148 A1 | 1/2006 | Sattler et al. | |
| 2006/0259442 A1 | 11/2006 | Iqbal | |
| 2007/0022093 A1 | 1/2007 | Wyatt et al. | |
| 2007/0100790 A1* | 5/2007 | Cheyer ................. | G06N 7/01 |
| 2007/0112714 A1 | 5/2007 | Fairweather | |
| 2007/0214408 A1 | 9/2007 | Straub et al. | |
| 2009/0044179 A1 | 2/2009 | Luszczek et al. | |
| 2009/0044196 A1 | 2/2009 | Stefansson et al. | |
| 2009/0132867 A1 | 5/2009 | Stefansson et al. | |
| 2009/0228726 A1 | 9/2009 | Malik et al. | |
| 2010/0023546 A1 | 1/2010 | Silsby | |
| 2010/0070217 A1 | 3/2010 | Shimada et al. | |
| 2010/0094475 A1 | 4/2010 | Masters et al. | |
| 2010/0223296 A1 | 9/2010 | Angus et al. | |
| 2010/0262313 A1 | 10/2010 | Chambers et al. | |
| 2010/0274367 A1 | 10/2010 | Kaufman et al. | |
| 2010/0274602 A1 | 10/2010 | Kaufman et al. | |
| 2010/0286937 A1 | 11/2010 | Hedley et al. | |
| 2011/0010016 A1 | 1/2011 | Giroti | |
| 2011/0145657 A1 | 6/2011 | Bishop et al. | |
| 2011/0252426 A1 | 10/2011 | Antani et al. | |
| 2012/0002733 A1 | 1/2012 | Misra et al. | |
| 2012/0022910 A1 | 1/2012 | Chi et al. | |
| 2012/0054147 A1 | 3/2012 | Goetz et al. | |
| 2012/0102180 A1* | 4/2012 | Jaisinghani ........... | H04L 41/145 709/223 |
| 2012/0102451 A1* | 4/2012 | Kulkarni .................. | G06F 8/24 717/102 |
| 2012/0266129 A1 | 10/2012 | Massoudi et al. | |
| 2012/0271472 A1 | 10/2012 | Brunner et al. | |
| 2012/0310559 A1 | 12/2012 | Taft | |
| 2013/0124453 A1 | 5/2013 | Bhide et al. | |
| 2013/0144605 A1* | 6/2013 | Brager .................. | G06F 16/30 704/9 |
| 2013/0173322 A1 | 7/2013 | Gray et al. | |
| 2013/0211870 A1 | 8/2013 | Lawson et al. | |
| 2013/0212420 A1 | 8/2013 | Lawson et al. | |
| 2013/0238795 A1 | 9/2013 | Geffin et al. | |
| 2013/0332194 A1 | 12/2013 | D'Auria et al. | |
| 2013/0346422 A1 | 12/2013 | Jordahl | |
| 2014/0046956 A1 | 2/2014 | Zenger et al. | |
| 2014/0047107 A1 | 2/2014 | Maturana et al. | |
| 2014/0058572 A1 | 2/2014 | Stein et al. | |
| 2014/0074670 A1 | 3/2014 | Garrity et al. | |
| 2014/0156806 A1 | 6/2014 | Karpistsenko et al. | |
| 2014/0201642 A1* | 7/2014 | Vicat-Blanc ........ | H04L 67/1008 715/736 |
| 2014/0279824 A1 | 9/2014 | Tamayo | |
| 2014/0279837 A1 | 9/2014 | Guo et al. | |
| 2014/0279899 A1 | 9/2014 | Gu et al. | |
| 2014/0280142 A1 | 9/2014 | Wasson et al. | |
| 2014/0337429 A1 | 11/2014 | Asenjo et al. | |
| 2015/0019195 A1 | 1/2015 | Davis | |
| 2015/0058681 A1 | 2/2015 | Lingannapeta et al. | |
| 2015/0074037 A1 | 3/2015 | Sarferaz | |

(56) References Cited

U.S. PATENT DOCUMENTS

| | | | |
|---|---|---|---|
| 2015/0095303 A1 | 4/2015 | Sonmez et al. | |
| 2015/0120224 A1 | 4/2015 | Siebel et al. | |
| 2015/0134733 A1 | 5/2015 | Maturana et al. | |
| 2015/0233983 A1 | 8/2015 | Siebel et al. | |
| 2015/0339572 A1* | 11/2015 | Achin | G06N 20/00 706/46 |
| 2015/0370873 A1 | 12/2015 | Macugay et al. | |
| 2016/0078379 A1 | 3/2016 | Branch et al. | |
| 2017/0006135 A1 | 1/2017 | Siebel et al. | |
| 2017/0126741 A1 | 5/2017 | Lang et al. | |
| 2018/0107660 A1 | 4/2018 | Wang et al. | |
| 2018/0191867 A1 | 7/2018 | Siebel et al. | |
| 2019/0007517 A1 | 1/2019 | Jagannath et al. | |
| 2019/0065545 A1 | 2/2019 | Hazel et al. | |
| 2019/0265971 A1 | 8/2019 | Behzadi et al. | |
| 2020/0042627 A1 | 2/2020 | Siebel et al. | |
| 2022/0283208 A1 | 9/2022 | Siebel et al. | |

OTHER PUBLICATIONS

EP14857450.2 Extended Search Report and Search Opinion dated Apr. 5, 2017.
EP14857450.2 Summons to Attend Oral Proceedings dated Jul. 16, 2020.
EP16740923.4 Extended European Search Report dated Jan. 7, 2019.
International Search Report and Written Opinion for International Application No. PCT/US2014/062974 dated Feb. 19, 2015.
Lheureux et al. Predicts 2015: Digital Business and Internet of Things Add Formidable Integration Challenges. Gartner, Nov. 11, 2014.
McKinsey and Company. The Internet of Things, Mapping the Value Beyond the Hype. Jun. 2015.
Middleton, et al. Forecast: Internet of Things, Endpoints and Associated Services, Worldwide, 2014. Gartner, Feb. 16, 2015.
Office Action dated Jun. 16, 2017 for U.S. Appl. No. 14/495,827.
Office Action dated Dec. 12, 2017 for U.S. Appl. No. 14/495,827.
PCT/US2016/023850 International Search Report and Written Opinion dated Dec. 9, 2016.
Polamuri. Supervised and Unsupervised Learning (Sep. 19, 2014). Retrieved Oct. 25, 2019 from URL: <https://dataaspirant.com/2014/09/19/supervised-and-unsupervised-learning/>. 9 pages.
Porter, et al. How Smart, Connected Products are Transforming Competition, Harvard Business Review, Nov. 2014.
Soley et al. Model Driven Architecture. Object Management Group (OMG), White Paper, Draft 3.2 (Nov. 27, 2000). 12 pages. Retrieved from URL: https://www.omg.org/mda/mda_files/model_driven_architecture.htm.
UC Regents. Cyber-Physical systems. 2012.
U.S. Appl. No. 14/699,508 Office Action dated Mar. 7, 2019.
U.S. Appl. No. 14/699,508 Office Action dated Nov. 18, 2019.
U.S. Appl. No. 14/699,508 Office Action dated Sep. 7, 2018.
U.S. Appl. No. 15/028,340 Office Action dated Apr. 30, 2019.
U.S. Appl. No. 15/028,340 Office Action dated Jan. 16, 2020.
U.S. Appl. No. 15/028,340 Office Action dated Nov. 14, 2018.
U.S. Appl. No. 16/360,815 Office Action dated May 30, 2019.
U.S. Appl. No. 14/699,508 Office Action dated Apr. 2, 2020.
U.S. Appl. No. 14/699,508 Office Action dated Jan. 25, 2018.
U.S. Appl. No. 15/028,340 Notice of Allowance dated Aug. 26, 2020.
U.S. Serial No. 16/044, 199 Office Action dated Jun. 26, 2020.
U.S. Appl. No. 16/360,815 Office Action dated Apr. 16, 2020.
U.S. Appl. No. 16/360,815 Office Action dated Oct. 30, 2019.
Wikipedia—Batch processing. Sep. 30, 2013; available at https://en.wikipedia.org/w/index.php?title=Batch_processing&oldid=575104736.
Wikipedia—Stream processing. Sep. 22, 2013; Available at https://en.wikipedia.org/w/index.php?title=Stream_processing&oldid=574006420.
ZapThink. Understanding the Real Costs of Integration. 2002. Available at http://www.zapthink.com/2002/10/23/understanding-the-real-costs-of-integration. Accessed on Mar. 30, 2018.
U.S. Appl. No. 15/890,867 Office Action dated Nov. 13, 2018.
U.S. Appl. No. 15/890,867 Office Action dated Sep. 25, 2019.
U.S. Appl. No. 14/699,508 Notice of Allowance dated Nov. 13, 2020.
U.S. Appl. No. 15/028,340 Notice of Allowance dated Sep. 23, 2020.
U.S. Appl. No. 15/890,867 Notice of Allowance dated Aug. 27, 2020.
U.S. Appl. No. 15/890,867 Notice of Allowance dated Sep. 29, 2020.
U.S. Appl. No. 15/890,867 Office Action dated Apr. 1, 2019.
U.S. Appl. No. 15/890,867 Office Action dated Apr. 9, 2020.
U.S. Appl. No. 15/890,867 Office Action dated Mar. 27, 2020.
U.S. Appl. No. 16/044,199 Office Action dated Apr. 15, 2021.
U.S. Appl. No. 16/360,815 Office Action dated Nov. 25, 2020.
U.S. Appl. No. 16/360,815 Notice of Allowance dated Jun. 18, 2021.
Anonymous. Canonical Model. Wikipedia, Jan. 7, 2015. Retrieved Jan. 31, 2022 at URL: https://en.wikipedia.org/w/index.php?title=Canonical_modeloldid=641323894. 2 pages.
PCT/US2014/062974 International Preliminary Report on Patentability dated May 3, 2016.
PCT/US2016/023850 International Preliminary Report on Patentability dated Jul. 25, 2017.
U.S. Appl. No. 16/044,199 Notice of Allowance dated Dec. 30, 2021.
U.S. Appl. No. 15/890,867, filed Feb. 7, 2018, Siebel et al.
U.S. Appl. No. 16/044,199, filed Jul. 24, 2018, Siebel et al.
European Patent Office, Communication pursuant to Article 94(3) EPC issued for European patent application No. 16740923.4, dated Nov. 16, 2022, 6 pages.
Anonymous: "Data access layer—Wikipedia," Jan. 3, 2015 (Jan. 3, 2015), XP055978965, Retrieved from the Internet: URL :https://en.wikipedia.org/w/index.php?title=Data_access_layer&oldid=640735414 [retrieved on Nov. 8, 2022], 2 pages.
Jones, C. D. et al. "StorageHelpers: A Format Independent Storage Specification," Jan. 1, 2000 (Jan. 1, 2000), XP055979359, Retrieved from the Internet: URL: https://chep2000.pd.infn.it/paper/pap-c215.pdf [retrieved on Nov. 9, 2022], 4 pages.
Spooner, David L. et al. "Modeling mechanical CAD data with data abstraction and object-oriented techniques," 1986 IEEE Second International Conference on Data Engineering, Feb. 5-7, 1986, 9 pages.
Tabeling, P. et al. "Integrative Architecture Elicitation for Large Computer Based Systems," 12th IEEE International Conference and Workshops on the Engineering of Computer-Based Systems (ECBS'05), Apr. 4-7, 2005, 11 pages.
U.S. Appl. No. 17/705,094 Office Action dated Mar. 31, 2023.
Sakr, S. et al. "A Survey of Large Scale Data Management Approaches in Cloud Environments," IEEE Communications Surveys & Tutorials, vol. 13, No. 3, pp. 311-336, Third Quarter 2011, 26 pages.
Lohrmann, B. et al. "Processing Smart Meter Data Streams in the Cloud," 2nd IEEE PES International Conference and Exhibition on Innovative Smart Grid Technologies, Dec. 2011, 8 pages.
Moussa, R. "Benchmarking Data Warehouse Systems in the Cloud," ACS International Conference on Computer Systems and Applications (AICCSA), IEEE, May 2013, 8 pages.
U.S. Appl. No. 17/705,094 Office Action dated Oct. 26, 2023, 31 pages.

* cited by examiner

Indicates that one or more may be contained within

SYSTEMS AND METHODS FOR DATA PROCESSING AND ENTERPRISE AI APPLICATIONS

RELATED APPLICATION

This application is a continuation of U.S. patent application Ser. No. 15/890,867, filed on Feb. 7, 2018, which is a continuation application of U.S. patent application Ser. No. 15/028,340, filed on Apr. 8, 2016, which is a national stage entry of International Patent Application No. PCT/US2016/023850, filed on Mar. 23, 2016, which claims the benefit of U.S. Provisional Patent Application No. 62/107,262, filed Jan. 23, 2015 and U.S. Provisional Patent Application No. 62/172,012, filed Jun. 5, 2015, each of which is hereby incorporated by reference herein in their entirety.

TECHNICAL FIELD

The present disclosure relates to big data analytics, data integration, processing, machine learning, and more particularly relates to an enterprise Internet-of-Things (IoT) application development platform.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
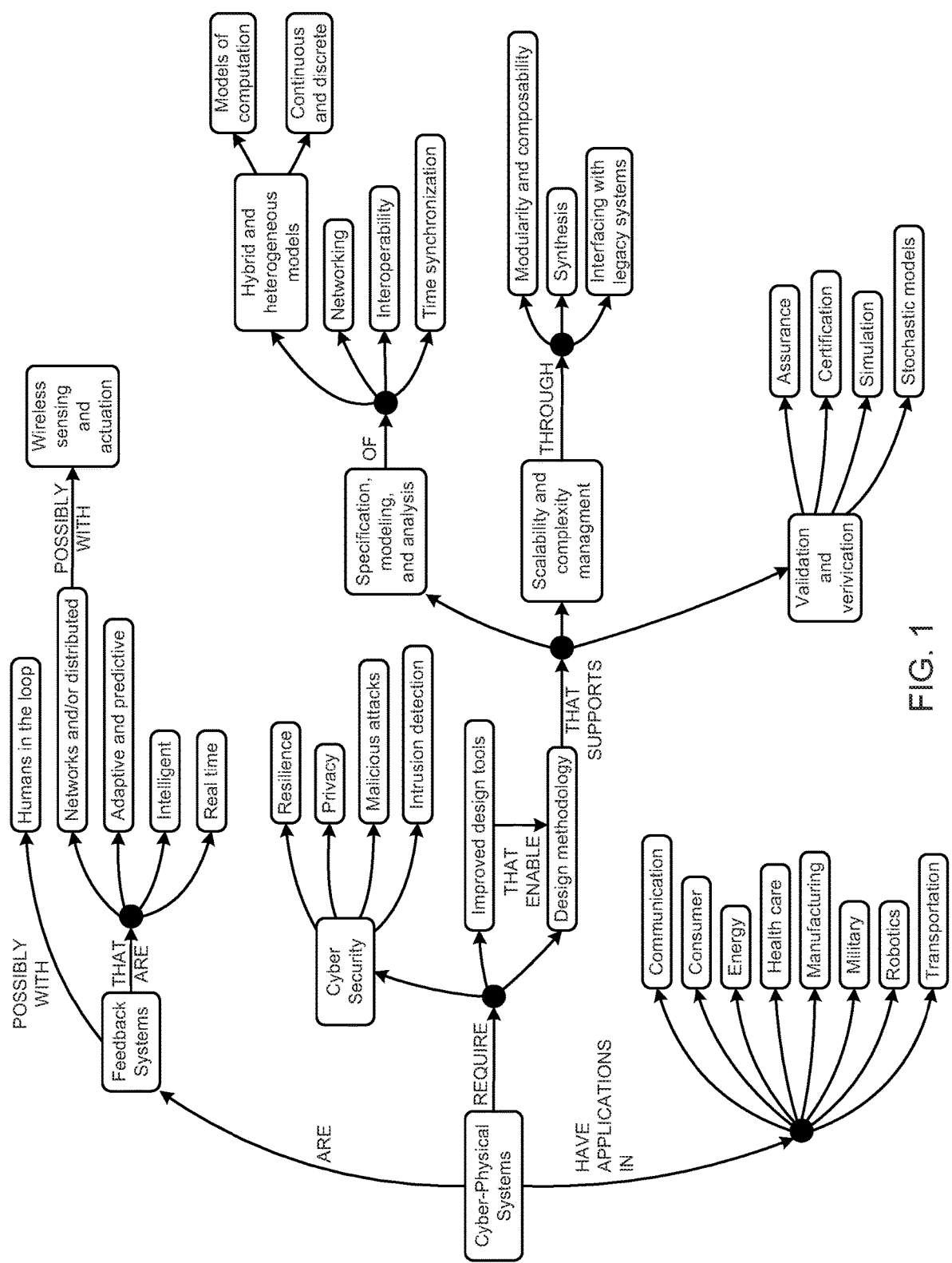
FIG. 1 is a schematic block diagram illustrating a concept map for a cyber-physical system.

The IoT Platform disclosed herein is a platform as a service (PaaS) for the design, development, deployment, and operation of next generation cyberphysical software applications and business processes. The applications apply advanced data aggregation methods, data persistence methods, data analytics, and machine learning methods, embedded in a unique model driven architecture type system embodiment to recommend actions based on real-time and near real-time analysis of petabyte-scale data sets, numerous enterprise and extraprise data sources, and telemetry data from millions to billions of endpoints.

The IoT Platform disclosed herein also provides a suite of pre-built, cross-industry applications, developed on its platform, that facilitate IoT business transformation for organizations in energy, manufacturing, aerospace, automotive, chemical, pharmaceutical, telecommunications, retail, insurance, healthcare, financial services, the public sector, and others.

Customers can also use the IoT Platform to build and deploy custom designed Internet-of-Things Applications.

IoT cross-industry applications are highly customizable and extensible. Prebuilt, applications are available for predictive maintenance, sensor health, enterprise energy management, capital asset planning, fraud detection, CRM, and supply network optimization.

To make sense of and act on an unprecedented volume, velocity, and variety of data in real time, the IoT Platform applies the sciences of big data, advanced analytics, machine learning, and cloud computing. Products themselves are being redesigned to accommodate connectivity and low-cost sensors, creating a market opportunity for adaptive systems, a new generation of smart applications, and a renaissance of business process reengineering. The new IoT IT paradigm will reshape the value chain by transforming product design, marketing, manufacturing, and after-sale services.

The McKinsey Global Institute estimates the potential economic impact of new IoT applications and products to be as much as US$3.9—$11.1 trillion by 2025. See McKinsey & Company, "The Internet of Things, Mapping the Value Beyond the Hype," June 2015. Other industry researchers project that 50 billion devices will connect to the Internet by 2020. The IoT Platform disclosed herein offers a new generation of smart, real-time applications, overcoming the development challenges that have blocked companies from realizing that potential. The IoT Platform disclosed herein is PaaS for the design, development, deployment, and operation of next-generation IoT applications and business processes.

Multiple technologies are converging to enable a new generation of smart business processes and applications—and ultimately replace the current enterprise software applications stack. The number of emerging processes addressed will likely exceed by at least an order of magnitude the number of business processes that have been automated to date in client-server enterprise software and modern software-as-a-service (SaaS) applications.

The component technologies include: Low cost and virtually unlimited compute capacity and storage in scale-out cloud environments such as AWS, Azure, Google, and AliCloud; Big data and real-time streaming; IoT devices with low-cost sensors; Smart connected devices; Mobile computing; and Data science: big-data analytics and machine learning to process the volume, velocity, and variety of big-data streams.

This new computing paradigm will enable capabilities and applications not previously possible, including precise predictive analytics, massively parallel computing at the edge of the network, and fully connected sensor networks at the core of the business value chain. The number of addressable business processes will grow exponentially and require a new platform for the design, development, deployment, and operation of new generation, real-time, smart and connected applications.

Data are strategic resources at the heart of the emerging digital enterprise. The new IoT infrastructure software stack will be the nerve center that connects and enables collaboration among previously separate business functions, including product development, market, sales, service support, manufacturing, finance, and human capital management.

The emerging market opportunity is broad. At one end are targeted applications that address the fragmented needs of specific micro-vertical markets—for example, applying machine learning to sensor data for predictive maintenance that reduces expensive unscheduled down time. At the other end are a new generation of core ERP, CRM, and human capital management (HCM) applications, and a new generation of current SaaS applications.

These smart and real-time applications will be adaptive, continually evolving based on knowledge gained from machine learning. The integration of big data from IoT sensors, operational machine learning, and analytics can be used in a closed loop to control the devices being monitored. Real-time streaming with in-line or operationalized analytics and machine learning will enhance business operations and enable near-real-time decision making not possible by applying traditional business intelligence against batch-oriented data warehouses.

Smart, connected products will disrupt and transform the value chain. They require a new class of enterprise applications that correlate, aggregate, and apply advanced machine learning to perform real-time analysis of data from the sensors, extraprise data (such as weather, traffic, and commodity prices), and all available operational and enterprise data across supplier networks, logistics, manufacturing, dealers, and customers.

These new IoT applications will deliver a step-function improvement in operational efficiencies and customer engagement, and enable new revenue-generation opportunities. IoT applications differ from traditional enterprise applications both by their use of real-time telemetry data from smart connected products and devices, but also by operating against all available data across a company's business value chain and applying machine learning to continuously deliver highly accurate and actionable predictions and optimizations. Think Google Now™ for the enterprise. The following are example use cases in various lines of business.

In the product development and manufacturing: "Industry 4.0" (aka Industrie 4.0) line of business, the use cases may include identifying and resolving product quality problems based on customer use data; and/or detecting and mitigating manufacturing equipment malfunctions.

In the supply networks and logistics line of business, the use case may include continuously tracking product components through supply and logistics networks; and/or predicting and mitigating unanticipated delivery delays due to internal or external factors.

In the marketing and sales lines of business, the use cases may include delivering personalized customer product and service offers and after-sale service offers through mobile applications and connected products; and/or developing, testing, and adjusting micro-segmented pricing; and/or delivering "product-as-a-service," such as "power-by-the-hour engine" and equipment maintenance.

In the after-sale service lines of business, the use case may include shifting from condition based maintenance to predictive maintenance; and/or increasing revenue with new value-added services—for example, extended warranties and comparative benchmarking across a customer's equipment, fleet, or industry.

In the next-generation CRM line of business, the use case may include extending CRM from sales to support, for a full customer lifecycle engagement system; and/or increasing use of data analysis in marketing and product development. This will include connecting all customer end points in an IoT system to aggregate information from the sensors, including smart phones, using those same end user devices as offering vehicles.

As demonstrated, these new IoT applications will deliver a step-function improvement in operational efficiencies and customer engagement, and enable new revenue-generation opportunities. These real-time, anticipatory, and adaptive-learning applications apply across industries, to predict heart attacks; tune insurance rates to customer behavior; anticipate the next crime location, terrorist attack, or civil unrest; anticipate customer churn or promote a customer-specific wireless data plan; or optimize distributed energy resources in smart grids, micro-grids, and buildings.

The IoT and related big data analytics have received much attention, with large enterprises making claims to stake out their market position—examples include Amazon™, Cisco™, GE™, Microsoft™, Salesforce™, and SAP™. Recognizing the importance of this business opportunity, investors have assigned outsized valuations to market entrants that promise solutions to take advantage of the IoT. Recent examples include Cloudera™, MapR™, Palantir™, Pivotal™, and Uptake™, each valued at well over $1 billion today. Large corporations also recognize the opportunity and have been investing heavily in development of IoT capabilities. In 2011 GE Digital™, for example, invested more than $1 billion to build a "Center of Excellence" in San Ramon, California, and has been spending order of $1 billion per year on development and marketing of an industrial internet IoT platform, Predix™.

The market growth and size projections for IoT applications and services are staggering. Many thought leaders, including Harvard Business School's Michael E. Porter, have concluded that IoT will require essentially an entire replacement market in global IT. See Michael E. Porter and James E. Hepplemann, "How Smart, Connected Products are Transforming Competition," Harvard Business Review, November 2014. However, virtually all IoT platform development efforts to date—internal development projects as well as industry-giant development projects such as GE's Predix™ and Pivotal™—are attempts to develop a solution from the many independent software components that are collectively known as the open-source Apache Hadoop™ stack. It is clear that these efforts are more difficult than they appear. The many market claims aside, a close examination suggests that there are few examples, if any, of enterprise production-scale, elastic cloud, big data, and machine learning IoT applications that have been successfully deployed in any vertical market except for applications addressed with the IoT Platform disclosed herein.

The remarkable lack of success results from the lack of a comprehensive and cohesive IoT application development platform. Companies typically look to the Apache Hadoop Open Source Foundation™ and are initially encouraged that they can install the Hadoop open-source software stack to establish a "data lake" and build from there. However, the investment and skill level required to deliver business value quickly escalates when developers face hundreds of disparate unique software components in various stages of maturity, designed and developed by over 350 different contributors, using a diversity of programming languages, and inconsistent data structures, while providing incompatible software application programming interfaces. A loose collection of independent, open source projects is not a true platform, but rather a set of independent technologies that need to be somehow integrated into a cohesive, coherent software application system and then maintained by developers.

Apache Hadoop repackagers, e.g., Cloudera™ and Hortonworks™, provide technical support, but have failed to integrate their Hadoop components into a cohesive software development environment.

To date, there is no successful large-scale enterprise IoT application deployments using the Apache Hadoop™ technology stack. Adoption is further hampered by complexity and a lack of qualified software engineers and data scientists.

Gartner Research concludes that Hadoop adoption remains low as firms struggle to realize Hadoop's business value and overcome a shortage of workers who have the skills to use it. A survey of 284 global IT and business leaders in May 2015 found that, "The lack of near-term plans for Hadoop adoption suggests that despite continuing enthusiasm for the big data phenomenon, specific demand for Hadoop is not accelerating." Further information is available in the Gartner report "Survey Analysis: Hadoop Adoption Drivers and Challenges." The report can be found at http://www.gartner.com/document/3051617.

Developing next-generation applications with measurable value to the business requires a scalable, real-time platform that works with traditional systems of record and augments them with sophisticated analytics and machine learning. But the risk of failure is high. You don't know what you don't know. IoT is new technology to most enterprise IT-oriented development organizations, and expertise may be difficult to acquire. Time to market is measured in many years. Costs are typically higher than anticipated, often hundreds of millions of dollars. The cost of GE Predix, for example, is measured in billions of dollars.

Next-generation IoT applications require a new enterprise software platform. Requirements extend well beyond relatively small-scale (by Internet standards) business-activity tracking application using transactional/relational databases, division-level process optimization using limited data and linear algorithms, and reporting using mostly offline data warehouses. Next-gen IoT applications manage dynamic, petabyte-size datasets requiring unified federated data images of all relevant data across a company's value chain, and apply sophisticated analytics and machine learning to make predictions in real time as those data change. These applications require cost-effective Internet/cloud-scale distributed computing architectures and infrastructures such as those from AWS™ Microsoft™, IBM™ and Google™. These public clouds are designed to scale horizontally—not vertically, like traditional computer infrastructures—by taking advantage of millions of fast, inexpensive commodity processors and data storage devices. Google™, for example, uses a distributed computing infrastructure to process over 26 PB per day at rates of one billion data points per second.

Distributed infrastructure requires new distributed software architectures and applications. Writing application software to take advantage of these distributed architectures is non-trivial. Without a cohesive application development platform, most enterprise caliber IT teams and system integrators do not have the qualifications or experience to succeed.

For an innovative company willing to invest in the development of a new generation of mission-critical enterprise applications, the first requirement is a comprehensive and integrated infrastructure stack. The goal is a Platform as a Service (PaaS): a modern scale-out architecture leveraging big data, open-source technologies, and data science.

Vendors of existing enterprise and SaaS applications face the risk that these disruptive IoT platform technologies will create a market discontinuity—a shift in market forces that undermines the market for existing systems. It should be anticipated that emerging SaaS vendors will indeed disrupt the market. However, there is also a high potential to address the emerging market opportunities with an architecture that can link the two platforms together—traditional systems and modern big data/scale-out architecture—in a complementary and non-disruptive fashion. Market incumbents, legacy application vendors, and SaaS vendors have an advantage because of their enterprise application development expertise, business process domain expertise, established customer base, and existing distribution channels. Application and SaaS vendors can increase the value of their systems of record by complementing them with a new IoT/big data and machine learning PaaS infrastructure stack, unifying the two stacks into a comprehensive and integrated platform for the development and deployment of next-generation business processes.

This approach extends existing applications at the same time it allows for the development of entirely new applications that are highly targeted and responsive to the explosion of new business process requirements.

Given the complexity of the platform for next-generation application design, development, provisioning, and operations, it's important to understand the effects of the build-versus-buy decision on costs and time to market.

Applicant has designed and developed the IoT Platform disclosed herein, a cohesive application development PaaS that enables IT teams to rapidly design, develop, and deploy enterprise-scale IoT applications. These applications exploit the capabilities of streaming analytics, IoT, elastic cloud computing, machine learning, and mobile computing—integrating dynamic, rapidly growing petabyte-scale data sets, scores of enterprise and extraprise data sources, and complex sensor networks with tens of millions of endpoints.

The IoT Platform disclosed herein can be deployed such that companies using the platform's SaaS applications can integrate and process highly dynamic petascale data sets, gigascale sensor networks, and enterprise and extraprise information systems. The IoT Platform disclosed herein monitors and manages millions to billions of sensors, such as smart meters for an electric utility grid operator, throughout the business value chain— from power generation to distribution to the home or building—applying machine learning to loop back and control devices in real time while integrating with legacy systems of record.

The IoT Platform disclosed herein has a broad focus that includes a range of next-generation applications for horizontal markets such as customer relationship management (CRM), predictive maintenance, sensor health, investment planning, supply network optimization, energy and greenhouse gas management, in addition to vertical market applications, including but not limited to manufacturing, oil and gas, retail, computer software, discrete manufacturing, aerospace, financial services, healthcare, pharmaceuticals, chemical and telecommunications.

Enterprises can also use the IoT Platform disclosed herein and its enhanced application tooling to build and deploy custom applications and business processes. Systems integrators can use the IoT Platform disclosed herein to build out a partner ecosystem and drive early network-effect benefits. New applications made possible by the IoT Platform disclosed herein and other big data sources will likely drive a renaissance of business process reengineering.

The Internet-of-Things and advanced data science are rewriting the rules of competition. The advantage goes to organizations that can convert petabytes of realtime and historical data to predictions—more quickly and more accurately than their competitors. Potential benefits and payoffs include better product and service design, promotion, and pricing; optimized supply chains that avoid delays and increase output; reduced customer churn; higher average revenue per customer; and predictive maintenance that avoids downtime for vehicle fleets and manufacturing systems while lowering service costs.

Capitalizing on the potential of the IoT requires a new kind of technology stack that can handle the volume, velocity, and variety of big data and apply operational machine learning at scale.

Existing attempts to build an IoT technology stack from open-source components have failed—frustrated by the complexity of integrating hundreds of software components, data sources, processes and user interface components developed with disparate programming languages and incompatible software interfaces.

The IoT Platform disclosed herein has successfully developed a comprehensive technology stack from scratch for the design, development, deployment, and operation of next-generation cyberphysical IoT applications and business processes. The IoT Platform disclosed herein may provide benefits that allow customers to report measurable ROI, including improved fraud detection, increased uptime as a result of predictive maintenance, lower maintenance costs, improved energy efficiency, and stronger customer engagement. Customers can use prebuilt IoT Applications adapt those applications using the platform's toolset, or build custom applications using the IoT platform as a service.

Conventional platform as a service (PaaS) companies and big data companies have become increasingly prominent in the high technology and information technology industries. The term "PaaS" refers generally to computing models where a provider delivers hardware and/or software tools to users as a service to be accessed remotely via communications networks, such as via the Internet. PaaS companies, including infrastructure companies, may provide a platform that empowers organizations to develop, manage, and run web applications. PaaS companies can provide these organizations with such capabilities without an attendant requirement that the organizations shoulder the complexity and burden of the infrastructure, development tools, or other systems required for the platform. Example PaaS solutions include offerings from Salesforce.com™, Cloudera™, Pivotal™, and GE Predix™.

Big data companies may provide technology that allows organizations to manage large amounts of data and related storage facilities. Big data companies, including database companies, can assist an organization with data capture, formatting, manipulation, storage, searching, and analysis to achieve insights about the organization and to otherwise improve operation of the organization. Examples of currently available Big Data solutions include Apache HDFS, Cloudera, and IBM Bluemix.

Infrastructure as a Service (IaaS) provide remote cloud based virtual compute and storage platforms. Examples of IaaS solutions include Amazon AWS™, Microsoft Azure™, AliCloud, IBM Cloud Services, and the GE Industrial Internet.

Applicants have recognized numerous deficiencies in currently available PaaS and IaaS solutions. For example, some IaaS and PaaS products and companies may offer a "platform" in that they equip developers with low-level systems, including hardware, to store, query, process, and manage data. However, these low-level systems and data management services do not provide integrated, cohesive platforms for application development, user interface (UI) tools, data analysis tools, the ability to manage complex data models, and system provisioning and administration. By way of example, data visualization and analysis products may offer visualization and exploration tools, which may be useful for an enterprise, but generally lack complex analytic design and customizability with regard to their data. For example, existing data exploration tools may be capable of processing or displaying snapshots of historical statistical data, but lack offerings that can trigger analytics on real-time or streaming events or deal with complex time-series calculations. As big data, PaaS, IaaS, and cyberphysical systems have application to all industries, the systems, methods, algorithms, and other solutions in the present disclosure are not limited to any specific industry, data type, or use case. Example embodiments disclosed herein are not limiting and, indeed, principles of the present disclosure will apply to all industries, data types, and use cases. For example, implementations involving energy utilities or the energy sector are illustrative only and may be applied to other industries such as health care, transportation, telecommunication, advertising, financial services, military and devices, retail, scientific and geological studies, and others.

Applicants have recognized that, what is needed is a solution to the big data problem, i.e., data sets that are so large or complex that traditional data processing applications are inadequate to process the data. What is needed are systems, methods, and devices that comprise an enterprise Internet-of-Things application development platform for big data analytics, integration, data processing and machine learning, such that data can be captured, analyzed, curated, searched, shared, stored, transferred, visualized, and queried in a meaningful manner for usage in enterprise or other systems.

Furthermore, the amount of available data is likely to expand exponentially with increased presence and usage of smart, connected products as well as cloud-based software solutions for enterprise data storage and processing. Such cyber-physical systems are often referred to as the Internet-of-things (IoT) and/or the Internet-of-everything (IoE). Generally speaking, the acronyms IoT and IoE refer to computing models where large numbers of devices, including devices that have not conventionally included communication or processing capabilities, are able to communicate over a network and/or perform calculation and processing to control device operation.

However, cyber-physical systems and IoT are not necessarily the same, as cyber-physical systems are integrations of computation, networking, and physical processes. FIG. 1, and the associated description below, provides one example definition and background information about cyber-physical systems based on information available on http://cyberpysicalsystems.org. "Cyber-Physical Systems (CPS) are integrations of computation, networking, and physical processes. Embedded computers and networks monitor and control the physical processes, with feedback loops where physical processes affect computations and vice versa. The economic and societal potential of such systems is vastly greater than what has been realized, and major investments are being made worldwide to develop the technology. The technology builds on the older (but still very young) discipline of embedded systems, computers and software embedded in devices whose principle mission is not computation, such as cars, toys, medical devices, and scientific instruments. CPS integrates the dynamics of the physical processes with those of the software and networking, providing abstractions and modeling, design, and analysis techniques for the integrated whole." See description of Cyber-Physical Systems from http://cyberphysicalsystems.org. Cyber-physical systems, machine learning platform systems, application development platform systems, and other systems discussed herein may include all or some of the attributes as displayed or discussed above in relation to FIG. 1. Some embodiments of cyber-physical systems disclosed herein are sometimes referred to herein as the C3 IoT Platform. However, the embodiments and disclosure presented herein may apply to other cyber-physical systems, PaaS solutions, or IoT solutions without limitation.

Applicants have recognized that next-generation IoT applications and/or cyber-physical applications require a new enterprise software platform. Requirements extend well beyond relatively small-scale (by Internet standards) business-activity tracking using transactional/relational databases (e.g. ERP, CRM, HRM) MRP applications, division-level process optimization using limited data and linear algorithms, and reporting using mostly offline data warehouses. Next-generation IoT and cyber-physical applications need to manage dynamic, petabyte-size datasets consisting of unified, federated data images of all relevant data across a company's value chain, and apply machine learning to make predictions in real-time as those data change. These applications require cost-effective Internet/cloud-scale distributed computing architectures and infrastructures. These public clouds may include those designed to scale out—not up, like traditional compute infrastructures—by taking advantage of millions of fast, inexpensive commodity processors and storage devices.

This distributed infrastructure will require new distributed software architectures and applications as disclosed herein. Writing application software to take advantage of these distributed architectures is non-trivial. Without a cohesive application development platform, most enterprise caliber information technology (IT) teams and system integrators do not have the qualifications or experience to succeed.

IoT platform development efforts to date are attempts to develop a solution from differing subsets of the many independent software components that are collectively known as the open-source Apache Hadoop™ stack. These components may include products such as: Cassandra™, CloudStack™, HDFS, Continuum™, Cordova™, Pivot™ Spark™, Storm™, and/or ZooKeeper™. It is clear that these efforts are more difficult than they appear. The many market claims aside, a close examination suggests that there are few examples, if any, of enterprise production-scale, elastic cloud, big data, and machine learning IoT applications that have been successfully deployed in any vertical market using these types of components.

Applicants have recognized that the use of a platform having a model driven architecture, rather than structured programming architecture, is required to address both big data needs and provide powerful and complete PaaS solutions that include application development tools, user interface (UI) tools, data analysis tools, and/or complex data models that can deal with the large amounts of IoT data.

Model driven architecture is a term for a software design approach that provides models as a set of guidelines for structuring specifications. Model-driven architecture may be understood as a kind of domain engineering and supports model-driven engineering. The model driven architecture may include a type system that may be used as a domain-specific language (DSL) within a platform that may be used by developers, applications, or UIs to access data. In one embodiment, the model driven architecture disclosed herein uses a type system as a domain specific language within the platform. The type system may be used to interact with data and perform processing or analytics based on one or more type or function definitions within the type system.

For IoT, structured programming paradigms dictate that a myriad of independently developed process modules, disparate data sources, sensored devices, and user interface modules are linked using programmatic Application Programming Interfaces (APIs). The complexity of the IoT problem using a structured programming model is a product of the number of process modules (M) (the Apache Open Source modules are examples of process modules), disparate enterprise and extraprise data sources(S), unique sensored devices (T), programmatic APIs (A), and user presentations or interfaces (U). In the IoT application case this is a very large number, sufficiently large that a programming team cannot comprehend the entirety of the problem, making the problem essentially intractable.

Applicants have recognized that, by using an abstraction layer provided by a type system discussed herein, the complexity of the IoT application problem is reduced by orders of magnitude to order of a few thousand types for any given IoT application that a programmer manipulates using Javascript, or other language, to achieve a desired result. Thus, all of the complexity of the underlying foundation (with an order of $M \times S \times T \times A \times U$ using structured programming paradigms) is abstracted and simplified for the programmer.

In light of the above, Applicant has developed, and herein presents, solutions for integrating data, processing data, abstracting data, and developing applications for addressing one or more of the needs or deficiencies discussed above. Some implementations may obtain, aggregate, store, manage, process, and/or expose extremely large volumes of data from various sources as well as provide powerful and integrated data management, analytic, machine learning, application development, and/or other tools. Some embodiments may include a model driven architectures that includes a type system. For example, the model driven architecture may implement abstraction of data using a type system to simplify or unify how the data is accessed, processed, or manipulated, reducing maintenance and development costs. In at least one implementation a PaaS platform is disclosed for the design, development, deployment, and operation of IoT applications and business processes.

Example technologies which may be included in one or more embodiments include: nearly free and unlimited compute capacity and storage in scale-out cloud environments, such as AWS; big data and real-time streaming; IoT devices with low-cost sensors; smart connected devices; mobile computing; and data science including big-data analytics and machine learning to process the volume, velocity, and variety of big-data streams.

One or more of the technologies of the computing platforms disclosed herein enable capabilities and applications not previously possible, including precise predictive analytics, massively parallel computing at the edge of a network, and fully connected sensor networks at the core of a business value chain. The number of addressable business processes will grow exponentially and require a new platform for the design, development, deployment, and operation of new generation, real-time, smart and connected applications. Data are strategic resources at the heart of the emerging digital enterprise. The IoT infrastructure software stack will be the nerve center that connects and enables collaboration among previously separate business functions, including product development, market, sales, service support, manufacturing, finance, and human capital management.

The implementations and new developments disclosed herein can provide a significant leap in productivity and reshape the business value chain, offering organizations a sustainable competitive advantage. At least some embodiments may represent or depend on an entirely new technology infrastructure or set of technology layers (i.e., a technology stack). This technology stack may include products with embedded microprocessors and communication capabilities, network communications, and a product cloud. Some embodiments may include a product cloud that includes software running on a hosted elastic cloud technology infrastructure that stores or processes product data, customer data, enterprise data, and Internet data. The product cloud may provide one or more of: a platform for building and processing software applications; massive data storage capacity; a data abstraction layer that implements a type system; a rules engine and analytics platform; a machine learning engine; smart product applications; and social human-computer interaction models. One or more of the layers or services may depend on the data abstraction layer for accessing stored or managed data, communicating data between layers or applications, or otherwise store, access, or communicate data.

At least some embodiments disclosed herein enable rapid product application development and operation powered by the collection, analysis, and sharing of potentially huge amounts of longitudinal data. The data may include data generated inside as well as outside of smart products or even the organization that were heretofore inaccessible and could not be processed. A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the disclosure.

Figure 2:
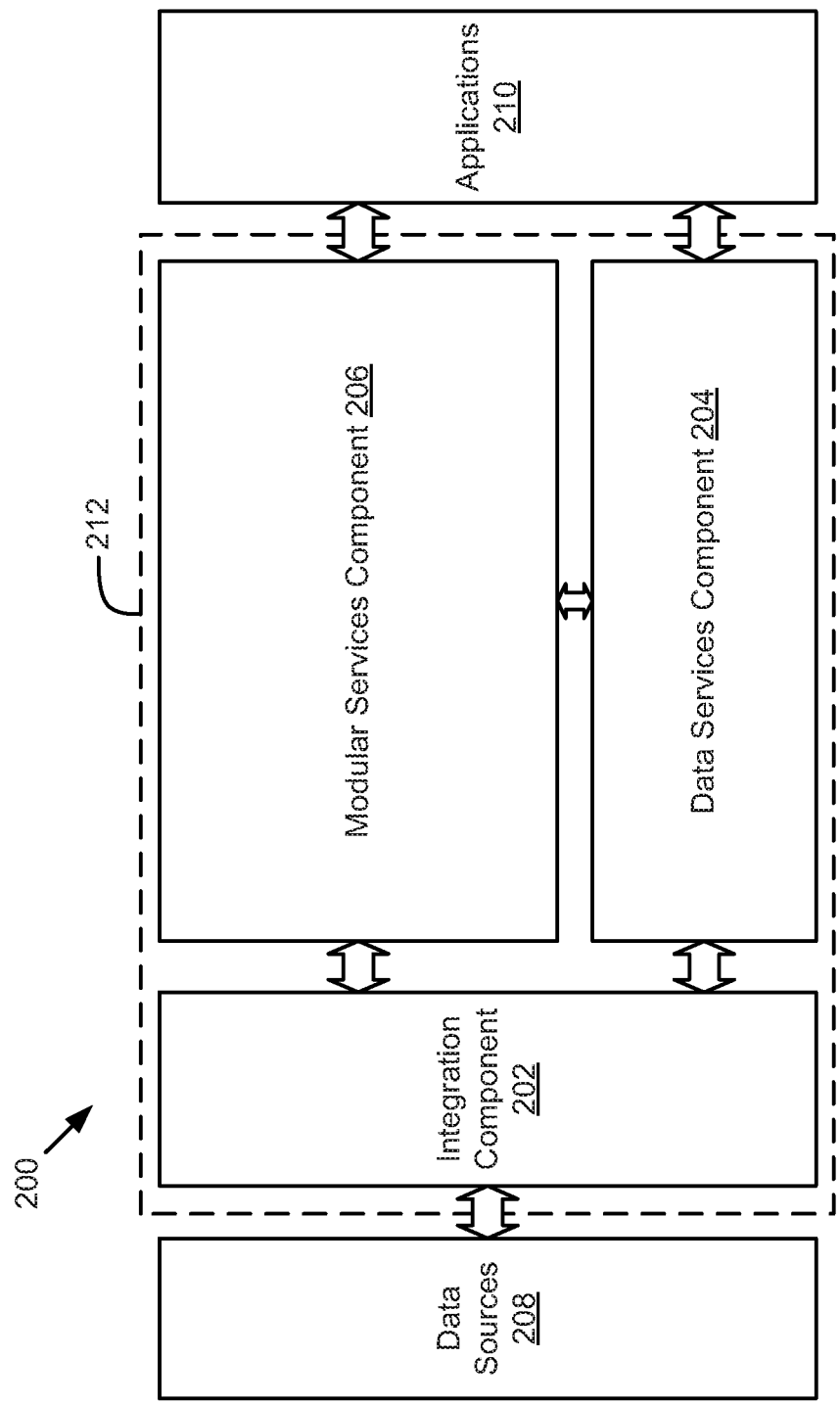
FIG. 2 is a schematic block diagram illustrating a system for integrating, processing, and abstracting data related to an enterprise Internet-of-Things application development platform, according to one embodiment.

FIG. 2 is a schematic block diagram illustrating a system 200 having a model driven architecture for integrating, processing, and abstracting data related to an enterprise Internet-of-Things application development platform. The system 200 may also include tools for machine learning, application development and deployment, data visualization, and/or other tools. The system 200 includes an integration component 202, a data services component 204, a modular services component 206, and application 210 which may be located on or behind an application layer.

The system 200 may operate as a comprehensive design, development, provisioning, and operating platform for industrial-scale applications in connected device industries, such as energy industries, health or wearable technology industries, sales and advertising industries, transportation industries, communication industries, scientific and geological study industries, military and defense industries, financial services industries, healthcare industries, manufacturing industries, retail, government organizations, and/or the like.

The system 200 may enable integration and processing of large and highly dynamic data sets from enormous sensor networks and large scale information systems. The system 200 further provides or enables rapid deployment of software for rigorous predictive analytics, data exploration, machine learning, and data visualization.

The dotted line 212 indicates a region where a type system is implemented such that that the integration component 202, data services component 204, and modular services component 206, in one embodiment, implement a model driven architecture. The model driven architecture may include or implement a domain-specific language or type system for distributed systems. The integration component 202, data services component 204, and modular services component 206 may store, transform, communicate, and process data based on the type system. In one embodiment, the data sources 208 and/or the applications 210 may also operate based on the type system. However, in one embodiment, the applications 210 may be configured to operate or interface with the components 202-206 based on the type system. For example, the applications 210 may include business logic written in code and/or accessing types defined by a type system to leverages services provided by the system 200.

In one embodiment, the model driven architecture uses a type system that provides type-relational mapping based on a plurality of defined types. For example, the type system may define types for use in the applications 210, such as a type for a customer, organization, sensor, smart device (such as a smart utility meter), or the like. During development of an application, an application developer may write code that accesses the type system to read or write data to the system, perform processing or business logic using defined functions, or otherwise access data or functions within defined types. In one embodiment, the model driven architecture enforces validation of data or type structure using annotations/keywords.

A user interface (UI) framework may also interact with the type system to obtain and display data. The types in the type system may include defined view configuration types used for rendering type data on a screen in a graphical, text, or other format. In one embodiment, a server, such as a server that implements a portion of the system 200 may implement mapping between data stored in one or more databases and a type in the type system, such as data that corresponds to a specific customer type or other type.

Type System

The following paragraphs provide a detailed explanation and illustrations of one embodiment of a type system. This type system is given by way of example only, is not limiting, and presents an example type system which may be used in various embodiments and in combination with any other teaching or disclosure of the present description.

In one embodiment, the fundamental concept in the type system is a "type," which is similar to a "class" in object-oriented programming languages. At least one difference between "class" in some languages and "type" in some embodiments of the type system disclosed herein is that the type system is not tied to any particular programming language. As discussed above, at least some embodiments disclosed herein include a model-driven architecture, where types are the models. Not only are types interfaces across different underlying technologies, they are also interfaces across different programming languages. In fact, the type system can be considered self-describing, so here we present an overview of the types that may define the type system itself.

Types

A type is the definition of a potentially complex object that the system understands. Types are the primary interface for all platform services and the primary way application logic is organized. Some types are defined by and built into the platform itself. These types provide a uniform model across a variety of underlying technologies. Platform types also provide convenient functionality and build up higher-level services on top of low-level technologies. Other types are defined by the developers using the platform. Once installed in the environment, they can be used in the same ways as the platform types. There is no sharp distinction between types provided by the platform and types developed using the platform.

Fields and Functions

Types may define data fields, each of which has a value type (see below). It also may define methods, which provide static functions that can be called on the type and member functions that can be called on instances:

type Point {
        x : !double
        y : !double
        magnitude : member function( ) : double
    }

In this example, there are two data fields, 'x' and 'y', both declared as primitive 'double' (numeric) values. Note that an exclamation point before the type may indicate that the values are required for these fields. There is also one member method (function) that calculates the point's magnitude and returns it as a double value.

Mixins

Types can "mix in" other types. This is like sub-classing in the Java or C++ languages, but unlike Java, in one embodiment, multiple types may be mixed in. Mixins may be parametric, which means they have unbound variables which are defined by types that mix them in (at any depth). For example, we might want to have the actual coordinate values in the example above be parametric:

type Point<V> {
        x : V
        y : V
    }
    type RealPoint mixes Point<double>
    type IntPoint mixes Point<int>

In the above example, "Point" is now a parametric type because it has the unbound parametric variable 'V'. The RealPoint and IntPoint types mix in Point and bind the variable in different ways. For instances of RealPoint, the fields are bound to 'double' values, which has the same effect as the explicit declaration in the first example. However, either type can be passed to a function that declares an argument of type Point.

Value Types

A ValueType (itself a Type) is the metadata for any individual piece of data the system understands. Value types can represent instances of specific Types, but can also represent primitive values, collections and functions. When talking about modeling, the number of "meta levels" may need to be clarified. Data values are meta level 0 (zero); the value 11 (eleven) is just a data value. Value types are the possible types of data values, and thus are meta level 1 (one).

The "double primitive" value type defines one category of values: real numbers representable by a double-precision floating-point format. So the value '11' might be stored in a field declared as a 'double' value type, and then naturally displayed as '11.0' (or maybe $1.1 \times 10^1$). It might also be stored in a field declared as an 'int' or even a 'string'. We are talking here about the meta level two: the metadata of metadata. Another way to say it is that we're talking about the shape of the data that describes the shape of actual data values, or that "ValueType" is the model used to define models.

Primitive Types

In one embodiment, the simplest value types are primitives. The values of primitives are generally simple values which have no further sub-structure exposed. Note that they may still have sub-structure, but it's not exposed through the type system itself. For example, a 'datetime' value can be thought of as having a set of rules for valid values and interpretation of values as calendar units, but the internal structure of datetime is not documented as value types. These primitive types may be arranged into a natural hierarchy, as shown below:

number
    integer
      int (32-bit signed integer)
      long int (64-bit signed integer)
      byte (8-bit signed integer)
    real
      double (IEEE double precision)
      float (IEEE single precision)
      decimal (exact representation using BCD)
  string (sequence of Unicode characters)
  char (single Unicode character)
  boolean (true/false)
  datetime (logical or physical date and time)
  binary (raw binary data block)
  json ([JavaScript Object Notation](http://json.org/))

Note that for storage purposes, there are variants of these basic types, but from a coding and display perspective this may be the complete set of primitive value type. Since primitive types have no sub-structure, the value types are simply themselves (such as singletons or an enumeration).

Collection Types

The next group of value types to consider is "collections." There are various shapes of collections for different purposes, but collections may share some common properties, such as: they contain zero or more elements; the elements have an ordering; and/or the have a value type for their elements. Note that collections are strongly typed, so they have sub-structure that is exposed in their value type. The collection types may include: array (an ordered collection of values); set (a unique ordered collection); map (a labelled collection of values); and/or stream (a read-once sequence of values). Collection types may always declare their element types and map types also declare their key type. We use the parametric type notation in our domain specific language (DSL) to represent this:

type Example {
    array :[boolean]
    set : set<string>
    map :map<string,double>
    produce : function( ) : stream<int>
  }

Note that map keys can be any primitive type (not just strings), although strings are the most common case. Sets behave nearly identically to arrays, but ignore insertion of duplicate elements.

Reference Types

Of course, fields can also be instances of types (see above). These may be called "reference types" because they appear as "pointers" to instances of other objects.

type Cluster {
    centroid : Point
    inputs :[Point]
    boundary : member function( ) : [Point]
  }

In the example above, Point is a reference to a Point type (or any type that mixes it in). References can appear directly or be used in collections or as function arguments or return values.

The above examples include several examples of method functions. Functions are declared on types in the same way as data fields. Methods can be "static" or "member" functions. Static functions are called on the type itself while member functions must be called on instances of the type.

type KMeans {
    cluster : function(points : ![Point], n : !int) : ![Cluster]
  }

In this example "cluster" is a static function on a "KMeans" type that takes two arguments and returns an array. Like everything else in this embodiment, function argument declaration is strongly typed and so "points : ![Point]" declares: that the argument name is "points"; that its type is an array (collection) of Point instances; and the exclamation point indicates that the argument is required. The return value may also be strongly typed: the function returns an array of Cluster instances and the exclamation point indicates that a value is always returned.

Lambdas

Note that the functions above may be called "methods" because they are defined on a per-type basis. The KMeans type above has exactly one implementation of cluster. (This is true for both static and member methods.) Sometimes a user may want the function implementation to be dynamic, in which case a "lambda" may be used. For example, a user may have multiple populations, each of which comes with a clustering algorithm. For some populations, one clustering technique might be more appropriate than another, or perhaps the parameters to the clustering technique might differ. Instead of hard-coding the clustering algorithm, for example, we could use a "lambda".

type Population {
    points : [Point]
    cluster : lambda(points : [Point]) : [Cluster]
  }

The declaration of the cluster variable looks somewhat like a method, but the 'lambda' keyword indicates that it is a data field. Data fields typically have different values for each instance of the type and lambda fields are no exception. For one population, we might determine that k-means with n=5 produces good clusters and for another OPTICS might produce better clusters with an appropriately tuned c and distance function:

[
    {
      points: pointSet1,
      cluster: function(points) {
        return KMeans.cluster(points, 5);
      }
    },
    {
      points: pointSet2,
      cluster: function(points) {
        return OPTICS.cluster(points, . . . );
      }
    }
  ]

Lambda values may also be passed to functions. Lambdas may be thought of as anonymous JavaScript functions, but with strongly typed argument and return values.

In light of the above description of an example type system, further illustrative examples and discussion are provided below. In one embodiment, the type system abstracts underlying storage details, including database type, database language, or storage format from the applications or other services. Abstraction of storage details can reduce the amount of code or knowledge required by a developer to develop powerful applications. Furthermore, with the abstraction of storage, type models, functions, or other details by the type system, customers or developers for a client of a PaaS system are insulated from any changes that are to be made over time. Rather, these changes may be made in the type system without any need for customers or developers to be made aware or any updates made to applications or associated business logic. In one embodiment, the type system, or types or functions defined by the type system, perform data manipulation language (DML) operations, such as structured query language (SQL) CREATE/UPDATE operations, for persisting types to a database in structured tables. The type system may also generate SQL for reading data from the database and materializing/returning results as types.

The type system may also be configured with defined functions for abstracting data conversion, calculating values or attributes, or performing any other function. For example, a type defined by the type system may include one or more defined methods or functions for that type. These methods or functions may be explicitly called within business logic or may be automatically triggered based on other requests or functions made by business logic via the type system. In one embodiment, types may depend on and include each other to implement a full type system that abstract details above the abstraction layer but also abstracts details between types. The specification of types, models, data reads and writes, functions, and modules within the type system may increase robustness of the system because changes may only need to be made in a single (or very small number of locations) and then are available to all other types, applications, or other components of a system.

A model driven architecture for distributed systems may provide significant benefits and utility to a cyber-physical system, such as system 200 of FIG. 2. For example, the type system may provide types, functions, and other services that are optimized for cyber-physical applications, such as analytics, machine learning algorithms, data ingestion, or the like. Additionally, as the system 200 is used and extended over time, continual support for new patterns/optimizations or other features useful for big data, IoT, and/or cyber-physical systems can be implemented to benefit a large number of types and/or applications. For example, if improvements to a machine learning algorithm have been made, these improvements will be immediately available to any other types or applications that utilize that algorithm, potentially without any changes needed to the other types or business logic for applications.

An additional benefit which may result from the model driven architecture includes abstraction of the platform that hides the details of the underlying operations. This improves not only the experience of customers or their application developers, but also maintenance of the system itself. For example, even developers of the type system or cyber-physical system may benefit from abstraction between types, functions, or modules within the type system.

In one embodiment, the type system may be defined by metadata or circuitry within the system 200. The type system may include a collection of modules and types. The modules may include a collection of types that are grouped based on related types or functionality. The types may include definitions for types, data, data shapes, application logic functions, validation constraints, machine learning classifiers and/or UI layouts. Further discussion regarding the model driven architecture is provided throughout the present disclosure, including in relation to the type metadata component 404 of FIG. 4. In one embodiment, for example, the type metadata component 404 defines type models for a type system for a distributed system.

The integration component 202 is configured to integrate disparate data from a wide range of data sources 208. IoT applications need a reliable, efficient, and simple interface to load customer, asset, sensor, billing, and/or other data into the storage in an accessible manner. In one embodiment, the integration component 202 provides the following features: a set of canonical types that act as the public interfaces to applications, analytic, or other solutions; support for operational data sources, such as customer billing and customer management systems, asset management systems, workforce management systems, distribution management systems, outage management systems, meter or sensor data management systems, and/or the like; support for external data sources, such as weather, property characteristics, tax, social media (i.e. Twitter and Facebook), and census data; notifications so users or administrators can accurately monitor data load processes; a set of canonical models that act as public interfaces to an enterprise Internet-of-Things application development platform (as an example, these canonical models may include energy and oil and gas industry data models to accelerate the development of new business applications); extensibility for the canonical data models to allow a business to adapt to unique business data and integration requirements; and transformation, as needed, for data from data sources 208 to a format defined by a common information model.

The integration component 202 may include one or more servers, nodes, or other computing resources that receive data provided by the data sources 208. The data sources 208 may include data from sensors or smart devices, such as appliances, smart meters, wearables, monitoring systems, data stores, customer systems, billing systems, financial systems, crowd source data, weather data, social networks, or any other sensor, enterprise system or data store. By incorporating data from a broad array of sources, the system 200 is capable of performing complex and detailed analyses, enabling greater business insights. According to one example, at least one type of data source may include a smart meter or sensor for a utility, such as a water, electric, gas, or other utility. Example smart meters or sensors may include meters or sensors located at a customer site or meters or sensors located between customers and a generation or source location. For example, customer meters, grid sensors, or any other sensors on an electrical grid may provide measurement data or other information to the integration component 202. It will be understood that data sources 208 may include sensors or databases for other industries and systems without limitation.

The integration component 202 may perform initial data validation. In one embodiment, the integration component 202 examines the structure of incoming data to ensure that required fields are present and that the data is of the right data type. It may recognize when the format of the provided data does not match the expected format (e.g., it recognizes when a number value is erroneously provided as text), prevents the mismatched data from being loaded, and logs the issue for review and investigation. In this way, the integration component 202 may serve as a first line of defense in ensuring that incoming data can be accurately analyzed.

The integration component 202 may provide a plurality of integration services, which serve as a second layer of data validation, ensuring that the data are error-free before they are loaded into any databases to be stored. The integration component 202 may monitor data as it flows in and performs a second round of data checks to eliminate duplicate data, and passes validated data to the data services component 204 to be stored. For example, the integration services may provide the following data management functions: duplicate handling, data validation, and data monitoring (see FIG. 6).

For duplicate handling, the integration component 202 may identify instances of duplicate data to ensure that analysis is accurately conducted on a singular data set. The integration services can be configured to process duplicates records according to the customer's business requirements (e.g., treating two duplicate records as the same or averaging duplicate records), conforming to utility standards for data handling.

For data validation, the integration component 202 may detect data gaps and data anomalies (such as statistical anomalies), identify outliers, and conduct referential integrity checks. Referential integrity checking ensures that data has the correct network of associations to enable analysis and aggregation, such as ensuring that loaded sensor data are associated with a facility or, conversely, that facilities have associated sensors. Integration services may resolve data validation issues according to the customer's business requirements. For example, if there are data gaps, linear interpolation can be used to fill in missing data or gaps can be left as is. For data monitoring, the integration component 202 provides end-to-end visibility throughout the entire data loading process. Users can monitor a data integration process as it progresses from duplicate detection through to data storage.

Figure 3:
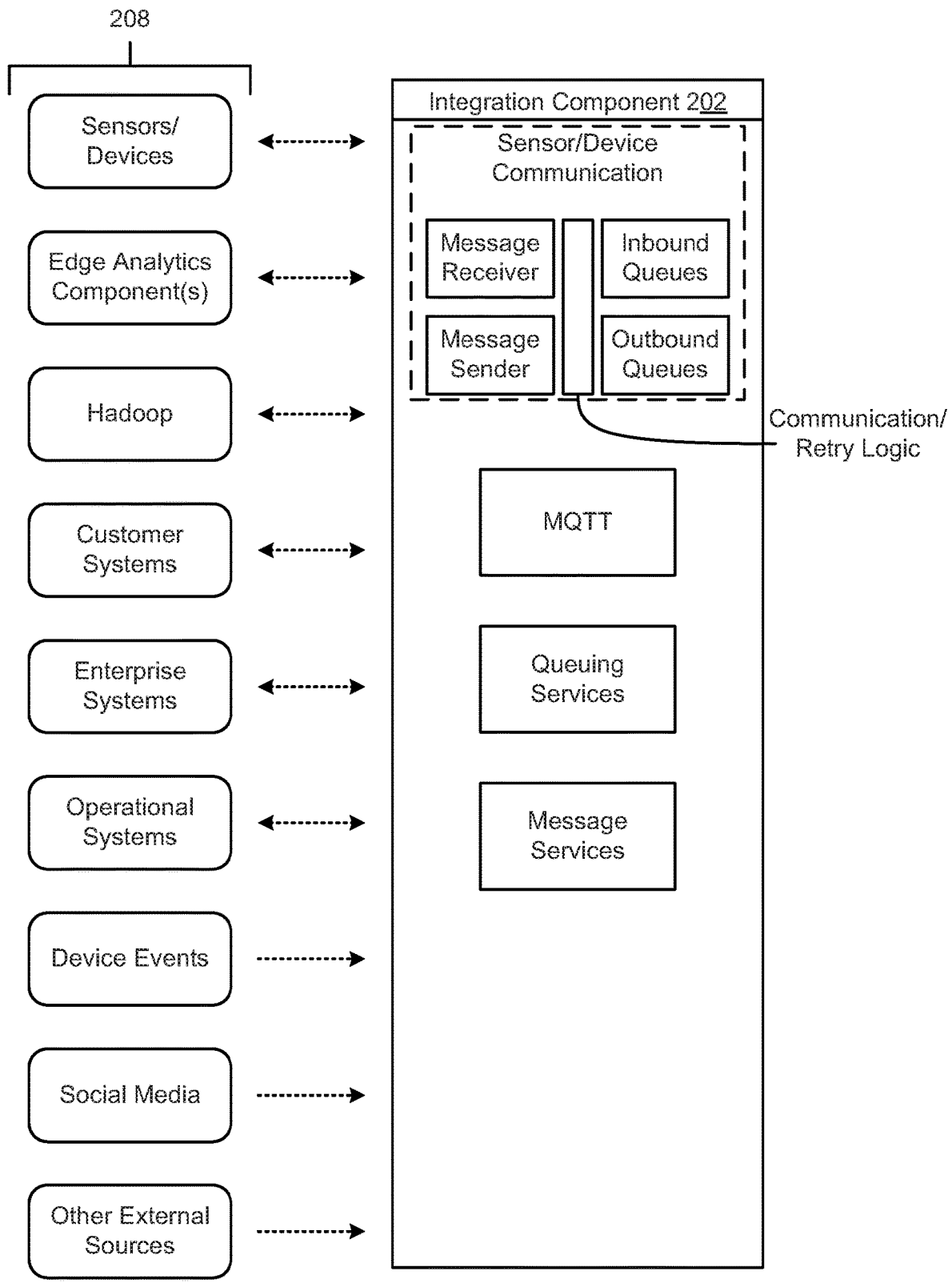
FIG. 3 is a schematic block diagram illustrating an integration component, according to one embodiment.

FIG. 3 is a block diagram illustrating greater detail about the integration component 202 and data sources 208, according to one embodiment. In one embodiment, the data sources 208 may include large sets of sensors, smart devices, or appliances for any type of industry. The data sources 208 may include systems, nodes, or devices in a computing network or other systems used by an enterprise, company, customer or client, or other entity. In one embodiment, the data sources 208 may include a database of customer or company information. The data sources 208 may include data stored in an unstructured database or format, such as a Hadoop distributed file system (HDFS). The data sources 208 may include data stored by a customer system, such as a customer information system (CIS), a customer relationship management (CRM) system, or a call center system. The data sources 208 may include data stored or managed by an enterprise system, such as a billing system, financial system, supply chain management (SCM) system, asset management system, and/or workforce management system. The data sources 208 may include data stored or managed by operational systems, such as a distributed resource management system (DRMS), document management system (DMS), content management system (CMS), energy management system (EMS), geographic information system (GIS), globalization management system (GMS), and/or supervisory control and data acquisition (SCADA) system. The data sources 208 may include data about device events. The device events may include, for example, device failure, reboot, outage, tamper, and the like. The data sources 208 may include social media data such as data from Facebook®, LinkedIn®, Twitter®, or other social network or social network database. The data sources may also include other external sources such as data from weather services or websites and/or data from online application program interfaces (APIs) such as those provided by Google®.

In one embodiment, the data sources 208 may include an edge analytics component for computing, evaluating, or performing analytics. An edge analytics component may be located within a sensor or smart device or within an intermediary device, such as a server, concentrator, or access point that conveys data from a sensor/device to the integration component. Performing analytics at the network edge may reduce processing requirements for the system 200. However, there may be limits on the type of processing that can be performed as not all data may be available. For example, only sensor data for one or a subset of all sensors may be available. Thus, analytics that require a large number or all of the sensor data, or require data from other data sources, may not be possible using the edge analytics component.

The integration component 202 may integrate data based on a robust data definition and mapping process that requires little or no coding for an end user to set up. The data definition and mapping process may allow disparate data from any source to be integrated for use by a connected device platform, such as the system 200 for processing and abstracting data related to an enterprise Internet-of-Things application development platform. The integration component 202 uses reproducible and robust data definitions and mapping processes that are executed on an elastic, scalable platform. The robust data definition, elasticity, and extensibility may allow enterprises to start with immediate business needs and flex and expand over time. For example, a utility operator (such as a gas, electric, water, or other utility provider) may start small and add additional data sources 208 as new requirements arise.

In one embodiment, the integration component 202 provides: data models for a specific type of data or industry; the ability to extend the data definitions to meet data requirements or unique business requirements; and robust data mapping and transformation from a source format into a format in accordance with the data models. In one embodiment, the data models may include utility and oil and gas industry data models to facilitate obtaining and integrating data for energy companies. Example utility data models include a common information model (CIM), open automatic data exchange (OpenADE), and/or open automated demand response (OpenADR). Example oil and gas data models include production markup language (PRODML) and wellsite information transfer standard markup language (WITSML). Electronic Data Interchange (EDI) may be used for supply chain applications. Health Level-7 (HL7) may be used for the healthcare industry. Canonical data models may provide a foundation for a company's data structure, using the XML data exchange standard for the relevant industry. The canonical models may define both the logical and physical elements needed to build a versatile, extensible, and fully integrated business application. Industry-specific canonical models may enable a company to leverage already available data to address new business opportunities and avoid traditional silo integrations, enabling information technology (IT) and business users to focus on broader application objectives. Although specific types of data models for energy industries have been mentioned above, industry specific canonical data models for any industry may be used, enabling any organization to leverage both data and business concepts using the an enterprise Internet-of-Things application development platform.

In one embodiment, the integration component 202 integrates data from the data sources 208 based on a canonical data model into a common format and/or into one or more data stores. In one embodiment, a canonical data model is a design pattern used to communicate and translate between different data formats. Use of canonical data models may reduce costs and standardize integration on agreed data definitions associated with business systems. In one embodiment, a canonical model is any model that is application agnostic (i.e., application independent) in nature, enabling all applications to communicate with each other in a common format. Canonical data models provide a common data dictionary enabling different applications to communicate with each other in this common format. With industry specific canonical data models, organization can leverage both data and business concepts to easily and efficiently integrate an enterprise Internet-of-Things application development platform with existing data and/or existing internal applications. If the internal format of an application changes, only transformation logic between the affected application and the canonical model may need to change, while all other applications and transformation logic remain unaffected.

Canonical data models may provide support for integrating and/or transforming data from any of the data sources 208 into a desired format. For example, the canonical data models may provide support for utility operational data sources such as customer billing and customer management systems, asset management systems, workforce management systems, distribution management systems, outage management systems and meter data management systems. As another example, the canonical data models may provide support for external data sources such as weather, property characteristics, tax, social media (e.g., from Twitter® or Facebook®), and census data. The available canonical data models may be extensible to allow utility operators (or operators in other industries) to integrate with new data sources as an enterprise Internet-of-Things application development platform deployment evolves and grows.

The integration component 202 provides sensor/device to communicate with the data sources 208, such as any devices or systems that include the sensors/devices. The integration component 202 includes a message receiver, inbound queues, communication/retry logic, a message sender, and outbound queues. The integration component 202 also includes components for: MQ telemetry transport (MQTT); queuing services; and message services. The message receiver may receive messages from one or more of the data sources 208. The messages may include data (such as sensor data, time-series data, relational data, or any other type of data that may be provided by the data sources 208) and metadata to identify the type of message. Based on the message type, the communication/retry logic may place a message into an inbound queue, wherein the message will await processing. When data or messages need to be sent to one or more of the data sources 208, messages may be placed in the outbound queues. When available, the communication/reply logic may provide a message to the message sender for communication to a destination data source 208. For example, messages to data sources 208 may include a message for acknowledging receipt of a message, updating information or software on a data source 208, or the like.

The integration component 202 may receive data from data sources 208 and integrate the received data into storage. In one embodiment, as data from the data sources 208 are received by the integration layer, they are placed in a canonical specific queue for downstream processing. For example, messages of different types or from different data sources 208 may be placed in queues according to the data source or message type to that they can be processed correctly. In one embodiment, messages may be received based on protocols, such as secure file transfer protocol (SFTP), hypertext transfer protocol secure (HTTPS), and/or java message service (JMS). Queues may also be used for all other integration processes as they may provide high availability as well as any necessary transaction semantics to guarantee processing.

Once the data are in the queue, a processing server may receive a message from a queue for processing. In one embodiment, a processing server may validate data in the message. For example, the server may identify data-related issues prior to transforming message contents based on type definitions in accordance with a canonical data model. The integration component 202 may perform a duplicate check to identify duplicate records based on user keys defined for each canonical interface. The integration component 202 may perform a data type validation check that validates that the data in the message adheres to expected data types, such as those defined in a canonical model or canonical type. The integration component 202 may perform a required field validation check to determine whether all rows have required fields. If an error is located during validation, the integration component 202 may flag the message to be omitted from storage, to be requested for retransmission, or to be processed (e.g., to be filled in with extrapolated values) before storage.

Figure 6:
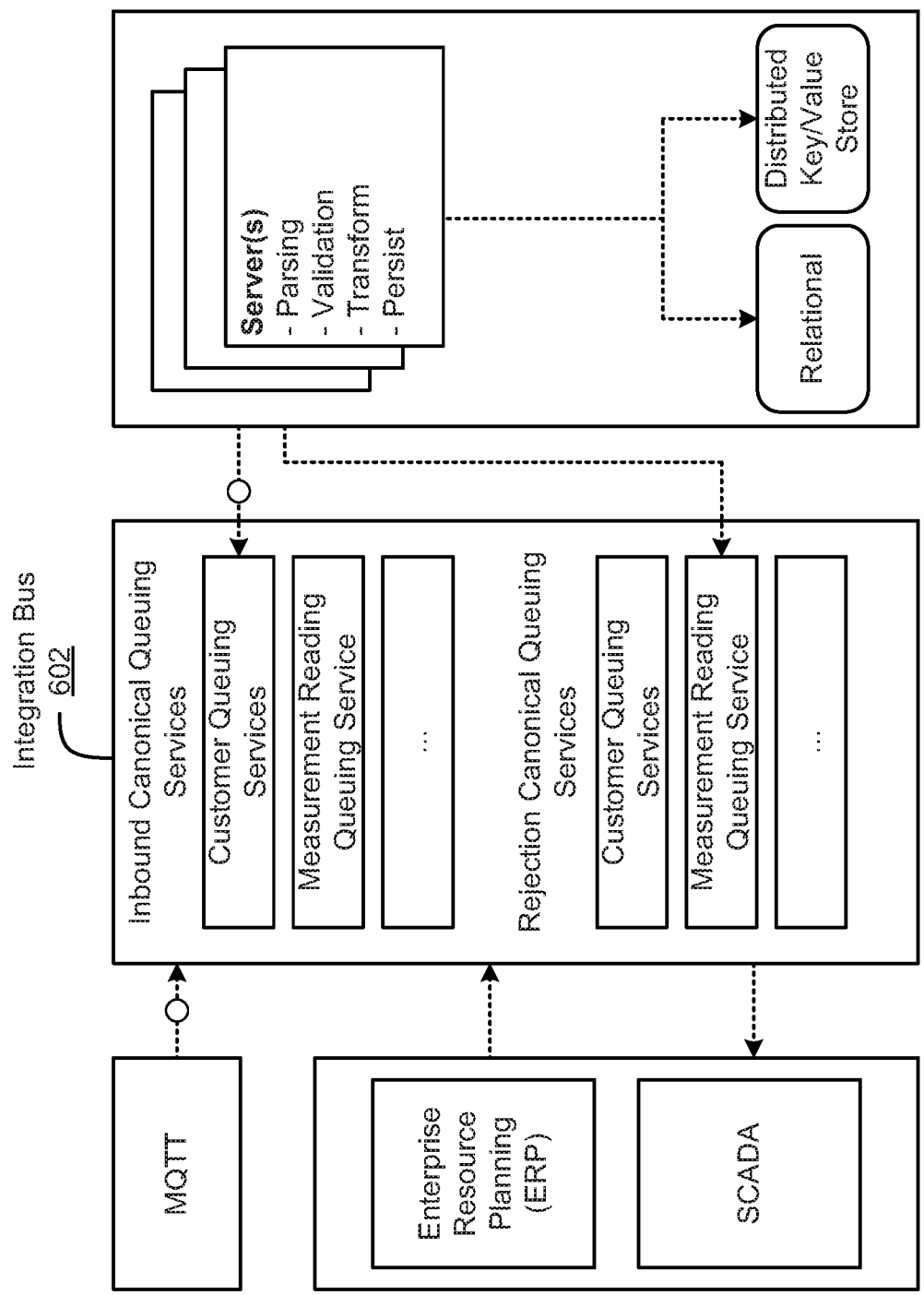
FIG. 6 is a schematic block diagram illustrating data flow on an integration bus, according to one embodiment.

Application administrators can post data to be integrated or stored using an integration bus over SFTP, HTTPS, MQTT, and/or JMS (see FIG. 6). Data can be provided in comma separated value (CSV), extensible markup language (XML), and/or JavaScript object notation (JSON) formats. As the data are processed, the platform monitors the state of the load to ensure administrators are kept informed about the status of the data load and errors or warning encountered. The integration component 202 tracks and stores the status of each processing step in a data load process and provides task-level status to enable application administrators to identify problems early and with sufficient detail to quickly fix any issues. Additionally, the integration component 202 supports email notification as the status of the data integration process changes. Thus, the integration layer provides recoverability, monitoring, extensibility, scalability, and security.

Returning to FIG. 2, the data services component 204 provides data services for the system 200 for processing and abstracting data related to an enterprise Internet-of-Things application development platform, including the integration component 202, modular services component 206, and one or more applications 210. In one embodiment, the data services component 204 is responsible for persisting and providing access to data produced or received by the integration component 202, modular services 206, and/or applications 210. In one embodiment, the data services component 204 provides a data abstraction layer over any databases, storage systems, and/or the stored data that has been stored or persisted by the data services component 204.

In one embodiment, the data services component 204 is responsible for persisting (storing) large volumes of data, while also making data readily available for analytical calculations. The data services component 204 may partition data into relational and non-relational (key/value store) databases and provides common database operations such as create, read, update, and delete. In one embodiment, by "partitioning" the data into two separate data stores, the data services component 204 ensures that applications can efficiently process and analyze the large volumes of sensor data originating from sensors. For example, the relational data store may be designed to manage structured data, such as organization and customer data. Furthermore, the key/value store may be designed to manage very large volumes of interval (or time-series) data from other types of sensors, monitoring systems, or devices. Relational databases are generally designed for random access updates, while key/value store databases are designed for large streams of "append only" data that are usually read in a particular order ("append only" means that new data is simply added to the end of the file). By using a dedicated key/value store for interval data, the data services component 204 ensures that this type of data is stored efficiently and can be accessed quickly.

As data volumes grow, the data services component 204 automatically adds storage nodes to a storage cluster to accommodate the new data. As nodes are added, the data may be automatically rebalanced and partitioned across the storage cluster, ensuring continued high performance and reliability.

Figure 4:
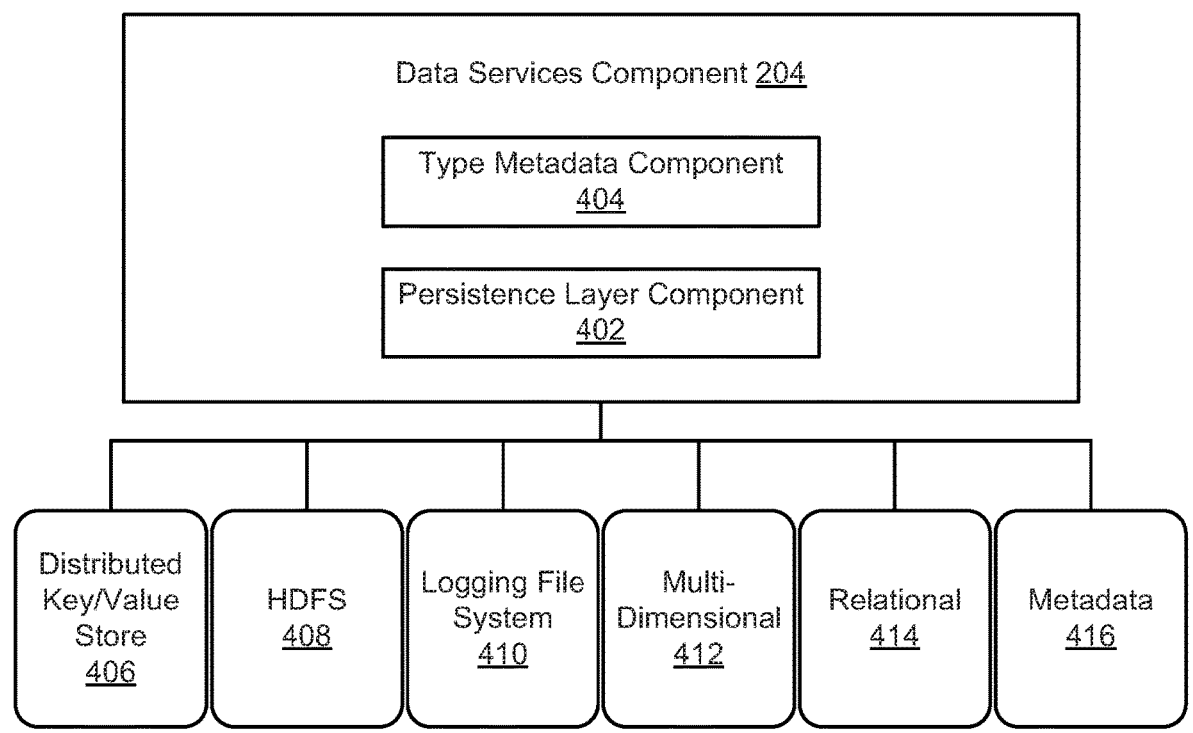
FIG. 4 is a schematic block diagram illustrating a data services component, according to one embodiment.

FIG. 4 is a schematic block diagram illustrating components of the data services component 204, according to one embodiment. The data services component 204 includes a persistence layer component 402 and a type metadata component 404. The persistence layer component 402 and type metadata component 404 may provide data storage and access services to any other component of an enterprise Internet-of-Things application development platform, such as the system 200 of FIG. 2. In one embodiment, the data services component 204 provides data services for a plurality of types of data stores such as a distributed key/value store 406, a HDFS data store 408, a logging file system 410, a multi-dimensional store 412, a relational data store 414, and/or a metadata store 416.

The persistence layer component 402 is configured to persist (store) large volumes of data, while also making data readily available for access and/or analytical calculations by any other services or components. In one embodiment, the persistence layer component 402 partitions data into relational, non-relational (key/value store), and online analytical processing (OLAP) databases and provides common database operations such as create, read, update, and delete. For example, as data is received and processed by the integration component 202, the persistence layer component 402 may determine which database the data should be stored in and stores the data in the correct database. The data services component 204 may use relational, key/value, and multi-dimensional data stores so that different needs for data flow or access can be provided. By "partitioning" the data into separate data stores, the persistence layer component 402 ensures that data large volumes of time-series or interval data (such as data originating from meters and grid sensors in an electrical distribution deployment) can be efficiently stored, processed, and analyzed.

The persistence layer component 402 may store data in a plurality of different data stores. The distributed key/value store 406 may store time-series data, such as data periodically measured or gathered by a sensor, meter, smart appliance, telemetry, or other device that periodically gathers and records data. One embodiment of a distributed key/value store 406 may include a NoSQL data store. For example, Apache Cassandra™ and Amazon DynamoDB™ are distributed NoSQL database management systems designed to handle large amounts of data across many commodity servers, providing high availability with no single point of failure. Cassandra™ and Amazon DynamoDB™ offer support for clusters spanning multiple datacenters, with asynchronous masterless replication allowing low latency operations for clients.

In one embodiment, the data services component 204, which may include storage nodes, is designed to run on cheap commodity hardware and handle high write throughput while not sacrificing read efficiency, helping drive down costs of ownership while greatly increasing the value of a business's big data environment. In one embodiment, the data services component 204 runs on top of an infrastructure of hundreds of nodes (possibly spread across different data centers in multiple geographic areas). At this scale, small and large components fail frequently. The data services component 204 manages a persistent state in the face of these failures and thereby provides reliability and scalability of the software systems relying on the data services component 204. Although the data services layer may share some similarities with existing database design and implementation strategies, the data services component 204 also provides client services or applications with a simple data model that supports dynamic control over data layout and format.

The HDFS data store 408 may provide storage for unstructured data. HDFS is a Java-based file system that provides scalable and reliable data storage, and it was designed to span large clusters of commodity servers. HDFS is published by the Apache Software Foundation®. The HDFS data store 408 may be beneficial for parallel processing algorithms such as Map reduce.

The logging file system 410 is configured to store data logs that reflect operation of the system 200, such as operations, errors, security, or other information about the integration component 202, data services component 204, modular services component 206, or applications 210.

The multi-dimensional data store 412 is configured to store data for business intelligence or reporting. For example, the multi-dimensional data store 412 may store data types or in data formats that correspond to one or more reports that will be run against any stored data. In one embodiment, the data services component 204 may detect changes to data within any of the other data stores 406-410 and 414-416 and update or recalculate data in the multi-dimensional data store 412 based on the changes. In one embodiment, the data services component 204 calculates data for the multi-dimensional data store 412 and/or keeps the value consistent with the distributed key-value store 406 and relational store 414 as it is updated by the integration component 202, applications 210, modular services component 206, or the like. In one embodiment, the multi-dimensional data store 412 stores aggregate data that has been aggregated based on information in one or more of the other data stores 406-410 and 414-416.

The relational data store 414 is used to store and query business types with complex entity relationships. According to one embodiment, during integration, the persistence layer component 402 is configured to store received data in the distributed key-value store 406 or the relational data store 414. For example, time-series data may be stored in the distributed key-value store 406 while other customer, facility, or other non-time-series data is stored in the relational data store 414.

In one embodiment, the relational data store 414 includes a fully integrated relational PostgreSQL database, a powerful, open source object-relational database management system. An enterprise class database, PostgreSQL boasts sophisticated features such as Multi-Version Concurrency Control (MVCC), point in time recovery, tablespaces, asynchronous replication, nested transactions (save points), online/hot backups, a sophisticated query planner/optimizer, and write ahead logging for fault tolerance. PostgreSQL supports international character sets, multi-byte character encodings, Unicode, and it is locale-aware for sorting, case-sensitivity, and formatting. PostgreSQL is highly scalable both in the sheer quantity of data it can manage and in the number of concurrent users it can accommodate. PostgreSQL also supports storage of binary large objects, including pictures, sounds, or video. PostgreSQL includes native programming interfaces for C/C++, Java, .Net, Perl, Python, Ruby, tool command language (Tcl), and open database connectivity (ODBC).

The metadata store 416 stores information about data stored in any of the other stores 406-414. In one embodiment, the metadata store 416 stores type definitions or other information used by the type metadata component 404 to provide abstract types, or an abstraction layer, over the data stores 406-416.

In one embodiment, the data services component 204 may also use a graph database. A graph database is a database that uses graph structures for semantic queries with nodes, edges, and properties to represent and store data. In one embodiment, every element contains a direct pointer to its adjacent elements and no index lookups are necessary. An example graph database includes a fully integrated graph database named The Associations and Objects (TAO), a project started by Facebook®.

The type metadata component 404 defines a plurality of types that are used to access data within one or more of the data stores 406-416. For example, the type metadata component 404 may define the type system discussed in varying embodiments herein. In one embodiment, the types form a type layer that provides a common abstraction layer of, or above, the data stores by presenting applications 210, modular services component 206, or developers with types abstracting the details of the data stores and/or data store access methods. The type layer may also be referenced herein as an object layer.

In one embodiment, a model driven architecture for a distributed system may include a type system that is logically separated into three or more distinct layers including an entity layer, an application layer, and a UI layer. The entity layer may include definitions for base data types such as devices, entities, customers, or the like. The entity layer type definitions may define validation parameters for the base data or entity types. The validation parameters may indicate requiredness properties for fields or other properties of the type, such as a data type, return value type for one or more functions, or the like. The validation parameters may also indicate how the type or value in the type may be updated, such as by system update only.

The application layer may include definitions for application logic functions as well as requiredness parameters for fields, return values, or the like of the functions. The application layer may also include enumerated values (enum values) that define values that should be checked to control operation of the application logic functions. The UI layer may define default view definitions for how specific types of data, types, or results of application logic functions should be displayed. Additionally, the UI layer may define specific view definitions which, if present, override any default view definitions. The UI layer may also define page definitions. The definitions in the UI layer may allow for drag and drop interface design and development by customers or developers.

In one embodiment, the type metadata component 404 causes the type system to merge definitions for different layers at runtime. For example, the type system may generate composite types that include metadata from all three layers of the type system. These composite types may then be used to construct or generate object instances for specific entities, functions etc. For example, a composite type may include an entity definition, an application logic function, and one or UI view definitions and may be filled out with data stored within one or more databases to create a specific instance of that type which can be used for processing by business logic.

In one embodiment, the type system (e.g., in a C3 IoT Platform) may group metadata for types or type definitions into customer specific partitions, which may be referred to herein as tenants. The customer specific partitions may be further divided into sub partitions called tags. For example, a system may include a general or root partition that includes one a system partition (system tenant). The system tenant may include one or more tags. The system tenant and/or the tags of the system tenant may include a master partition for system data and/or platform metadata. As another example, the system may include a customer partition with one or more customer specific partitions (tenant for specific customer) for respective customer's companies or organizations. The tenant for the specific customer may also include one or more tags (sub partitions for the tenant). As yet a further example, a customer partition may include one or more customer tenants and the customer tenants may include one or more tags. The tags or customer tenants may correspond to data partitions to keep data and metadata for different customers. For example, the tenants and tags (with their corresponding partitions) may be used to keep metadata or data for the system or different customers separate for security and/or for access control. In one embodiment, all requests for data or types or request to write data include an identifier that identifies a tenant and/or tag to specify the partition corresponding to the request.

In one embodiment, each tenant or tag can have separate versions of the same types. For example, database tables may be created and/or altered to include metadata or data for types specific to a tenant or tag. A database table may be shared across all tenants or tags within a same environment. The tables may include a union of all columns needed by all versions from all tenants/tags. In one embodiment, upon creation/addition of a type or function to a table within a tenant or tag, data operations immediately available upon provisioning for types and function are immediately callable.

In one embodiment, the type metadata component 404 may store and or manage entity definitions (e.g., for customer, organization, meter, or other entities) used in an application and their function and relationship to other types. Types may define meta models and may be virtual building blocks used by developers to create new types, extend existing types, or write business logic on a type to dictate how data in the type will function when called. In one embodiment, all logic in the platform is expressed in JavaScript, which may allow APIs to be used to program against any type in the system.

As discussed above, when data in multiple formats from multiple sources are imported into a management platform, they are loaded through a standard canonical format and imported into storage or a data services layer. Developers may then work directly with the types defined in the type layer to read and write data, to perform business logic using functions, and to enforce data validation for required fields and data formats. In one embodiment, a user interface framework provided by the system 200 of FIG. 2 also interacts directly with the types to support actions taken by an end user when they view data on a screen or create, update, or delete a record.

In one embodiment, entity types conceptually represent physical objects such as a customer, facility, meter, smart device, service point, wearable device, sensor, vehicle, computing system, mobile communication device, communication tower, or the like. Entity types are persisted as stored types in a database and consist of multiple fields that define or characterize the object. For example, a facility type may include fields that describe it, such as an address, square footage, year of construction, and/or the organization to which it belongs.

Entity type definitions may include a variety of information, structures or code. For example, entity type definitions may include fields to track named values such as customer name, address, or the last time a meter reading was recorded. Fields may include a data type, array, reference, or function. Entity type definitions may include a data shape to track whether the data type for a field is a string, integer, float, double, decimal, date-time, or Boolean value. Entity type definitions may include a schema to dictate a related table in a physical database schema where the data resides. Entity type definitions may include application logic to declare functions which can be called when executing business rules to process data. Entity type definitions may include data validation constraints to declare which fields are required, define a permissible list of values, and/or implement indexing to improve performance. Entity type definitions may include a user interface layout to define one or more user interface layouts that the type should be rendered in when displayed.

The following example shows persistable entities (coded here as type) constructed using basic syntax. Type definitions may use primitive fields, reference fields, and collection fields.

```
type Address {
    streetAddress : string
    city : string
    state : string
    postalCode: string
}
type Customer {
    lastName : string
    firstName : string
    address : Address
    accounts : [Account]
}
Type Account {
    accountNum : string
    openDate : datetime
}
```

Primitive fields contain basic data fields of specific data formats (int, decimal, datetime, float, double, boolean, and string). In the above example, all fields defined as string are primitive fields. Reference fields contain references to other types in the system. In the example above, the address field on the customer type is not defined by a primitive string, but rather it holds a reference to an address type. This means that if you are looking at a customer record and ask to see the address, all the address type fields will be shown for the selected customer record. Collection fields indicate a multi-value group where there is more than one instance of a type associated with that field. In the example, the accounts field on the Customer type is referencing the [Account] and it will return an array, or list, of account numbers in the event that the customer has more than one account on record.

In one embodiment, entity types are made persistable and stored in a database by mixing into them a transient type. The transient type may form the basis for persistable entity types. In one embodiment, all persistable entity types have the following fields: id, an identifier for the type; meta, an author/descriptor for the type; name, a recognizable type name; version, for comparison in version control, and/or versionEdits, for an audit trail as the version history changes, which makes reversion possible. In one embodiment, persistable entity types have a base group of functions that enable fetching, removing, updating, or inserting information into a database. The base group functions may allow developers to easily create persistable types and not have to know about actual changes or interactions with data stores. In fact, entity types, including persistable entity types, may include data from multiple different data stores without an application, service, or developer being aware of exactly where the data for the type is stored. The following illustrates the structure of persistable entity types, according to one embodiment:

```
type Persistable<T> mixin Obj {
    id :string
    version :int
    versionEdits :[VersionEdit]
    name :string
    meta :Meta
    create :function(T obj): T
    update :function(T obj, T srcObj, UpsertSpec spec): T
    upsert :function(T obj, T srcObj, UpsertSpec spec): T
    remove :function(T obj): boolean
}
type Meta {
    tenantTagId : int
    created :datetime
    createdBy: string
    updated : datetime
    updatedBy: string
}
```

The above definition defines system fields for all persisted types and defines common functions for all persisted types. The parameter <T> may be substituted with a concrete type. In one embodiment all entity types inherit from a persistable type.

In one embodiment, the data abstraction layer provided by the type metadata component 404 is a metadata based data mapping and persistence framework spanning relational, multi-dimensional, and NoSQL data stores. In metadata, developers define type definitions, including attributes and functions. The data abstraction layer allow developers to define extensible type models where new properties, relationships and functions can be added dynamically without requiring costly development cycles. The data abstraction layer provides a type-relational mapping layer that allows developers to describe how types map to relational or NoSQL data stores without writing code.

In one embodiment, a type is a lightweight persistence domain type. In one embodiment, a type or item of a type represents a table in a relational database or a column family in a NoSQL data store. Each type instance may correspond to a row in a table or column family. The persistent state of a type may be represented through an @db annotation. If the @db annotation is not specified, the type may be persisted in the relational database. Type metadata may describe the interface definition of the type, including attributes and functions of each type. An example of a type definition persisted to the relational database is shown below:

```
// A solar producing facility (household, office, retail store,
    etc.) and its estimated
// generation data.
entity type SolarProducerFacility {
// Facility equipped with a solar panel. This is an example
    of an attribute
// referencing a type (Facility).
facility : Facility
  //Solar panel associated with the facility. The solar
      panel type contains
  //characteristics that describe its size, panel type, gen-
      eration
  // characteristics, etc.
  // This is an example of an attribute referencing a type
      (Facility)
  solarPanel : SolarPanel
  //The feeder the solar panel is associated with
  feederNumber : int
  //Estimated generation forecast for the next 7 days
  next7DayForecast : double
  // Comparison of prior 7 day generation as compared to
      the prior forecast
  last7DayComparedToForecast : double
  //returns an array for solar producing facilities for a set
      of query criteria. The
  // function implementation resides in SolarProducer-
      Functions.js
  getSolarProducers: function(FetchSpec spec): [Solar-
      ProducerFacility]
    {@SolarProducerFunctions@} js server
}
```

The example above defines the SolarProducerFacility type. The SolarProducerFacility type persists estimated generation and past performance for facilities equipped with solar panels. The SolarProducerFacility type has a primitive data type attribute (i.e. last7DayComparedToForecast) and type reference attributes (i.e. solarPanel). In one embodiment, the data abstraction layer supports the following primitive data types: integer, float, double, string, decimal, datetime, and boolean. In one embodiment, a type reference is a traversable link from one type to another. Additionally, maps are used as base abstract data structure, also allowing arrays (a map with an integer key type).

The above example SolarProducerFacility type also contains a single function: getSolarProducers. The getSolarProducer function returns an array for solar producing facilities for a set of query criteria. A type function implements the behavior of types. A function is defined by a set of parameters, a return type and its implementation. A function parameter is the association of a type with a local name that the function will bind on invocation. Parameter types and return types can be of any value type or other type in scope. A function allows the specification of behavior, it is defined by a set of arguments, a return type and an implementation body.

Below is an example of a type definition persisting its results in a NoSQL datastore. Observe the use of the @db annotation with a datastore property of 'cassandra'. This annotation informs the data abstraction layer to persist the data in a Cassandra database ordered by start and end dates. Additional annotation properties are available to specify the partition key, duplicate handling, and id generation:

```
// Each entry represents a discrete measurement for a
    given interval (i.e. minute, 15-
// minute, hour, etc)
// As PV generation data is a time-series, the data are
    stored in Cassandra
// Duplicates should not be persisted and the data will be
    sorted based on the reading
start date
@db(compactType=true,
datastore='cassandra',
partitionKeyField='parent',
persistenceOrder='start,end',
persistDuplicates=false,
shortId=true,
shortIdReservationRange=100000)
// Type used to store PV generation data. This will be a
    time-series consisting of
// start, end, sensor, a quantity and optionally a unit of
    measure
entity      type      PVMeasurement       mixes
    TimeseriesDataPoint<PVMeasurement>, Quantity
```

The example above defines a type used to store solar production data. The PVMeasurement type is persisted in the NoSQL store as indicated by the 'datastore' property. The PVMeasurement type inherits attributes and functions of TimeSeriesDataPoint, the base type of sensor measurements, and Quantity, another base type that defines the measurement reading data type (double) and a placeholder for its corresponding unit of measurement.

The type metadata component 404 allows for extensibility of the abstraction layer and/or types in the abstraction layer. In one embodiment, types can inherit from other types. Inheritance describes how a derived (child) type inherits the characteristics of its parent. In one embodiment a developer may use the 'mixes' keyword to denote the type or types the child class inherits from. In the interface definition of a child type, a developer can override functions that have been defined in the parent class and add attributes that are not defined in the parent type. Below is a type that inherits from two s, MetricEvaluatable and WeatherAware. By inheriting from MetricEvaluatable and WeatherAware types, the FixedAsset type support weather related analytics and the ability to be the source type in analytic evaluation.

```
// A Fixed Asset represents an entity that consumes or
    produces energy
// As it is an energy consumer/producer, it will be a source
    type for analytic
//definitions (MetricEvaluatable)
// Additionally, users will frequently want to view weather
    data related to an asset, so
//it extends WeatherAware
extendable entity type FixedAsset mixes MetricEvalu-
    atable, WeatherAware {
// Asset description
description : string
// Asset number, typically used for internal tracking and an
    internal identifier (i.e.
// sensor number)
number : string
. . .
}
```

In one embodiment, modules or types may be remixed to extend provided definitions. For example types defined in remix modules may be merged with those in base modules. Use of mixing or remixing may allow for separation of base and mixed or remixed types to allow for independent upgrade to base or extended definitions. Below is an example of a remixed type definition that adds an ACCENTURE FIELD to an existing table.

```
module accentureCustomer remixes customer {
    entity type Customer {
        accentureField : string
    }
}
module customer {
    type Address {
        streetAddress : string
        city :string
        state :string
        postalCode :string
    }
    entity type Customer {
        lastName :string
        firstName :string
        address : Address
        accounts :[Account]
    }
    entity type Account {
        accountNum : string
        openDate :datetime
    }
}
```

In one embodiment, the type metadata component 404 may also define a plurality of canonical types, which may be used by the integration component 202 to receive and transform data from data sources 208 into a standard format. As with a standard type definition, a canonical type is declared in metadata using syntax similar to that used by types persisted in the relational or NoSQL data store. Unlike a standard type, canonical types are comprised of two parts, the canonical type definition and one or more transformation types. The canonical type definition defines the interface used for integration and the transformation type is responsible for transforming the canonical type to a corresponding type. Using the transformation types, the integration layer may transform a canonical type to the appropriate type (such as a type defined by a developer). The output of the data transformation step is one or more data messages, each of which corresponds to a specific type and the transformation results are persisted to the appropriate data store.

Similar to other types, a canonical type has attributes that define its interface. In one embodiment, unlike standard types, canonical types must inherit from a canonical type, such as a canonical type class. An example definition of a canonical type is shown below:

```
// A simple canonical type for the solar generation application CanonicalFacility
// contains basic information about a premise, such as location, size, roof
// elevation, pv area and the associated feeder
type CanonicalFacility mixes Canonical {
    facilityId: string
    lat: string
    lon: string
    bld_area: double
    roof_elev: double
    pv_area: double
    feeder_number: int
} By inheriting from the canonical type, the CanonicalFacility canonical type may be associated with multiple transformation types. In one embodiment, each transformation type is responsible for transforming the canonical type to a single standard type. Three transform canonical type examples are shown below.
// CanonicalFacility maps to several C3 IoT Platform-types. For each type we
// define a transformation that maps the canonical type to the C3 IoT Platform
// type. CanonicalFacilitytoLocation defines the mapping from CanonicalFacility to
// Location.
type CanonicalFacilitytoLocation mixes Location transforms CanonicalFacility {
    id: ~expression "md5(concat(facilityId, '_LOC'))"
    name: ~expression "concat(facilityId, '_LOC')"
    address: ~expression { geometry: { longitude: "lon", latitude: "lat" }}
    mode: ~expression "'Points'"
}
// CanonicalFacilityToFacility defines the mapping from CanonicalFacility to Facility type CanonicalFacilityToFacility mixes Facility transforms CanonicalFacility {
    id: ~expression "md5(facilityId)"
    name: ~expression "facilityId"
    grossFloorArea: ~expression {unit: {id: "'square foot'"}, value:"bld_area"}
    placedAt: ~expression {id:"md5(concat(facilityId, '_LOC'))"}
}
// CanonicalFacilityToSolarPanel defines the mapping from CanonicalFacility to
// SolarPanel. Note that this transformation should only be invoked if the pv_area
// attribute is not 0
@canonicalTransform(condition="pv_area !='0'")
type CanonicalFacilityToSolarPanel mixes SolarPanel transforms CanonicalFacility {
    id: ~expression "md5(concat(facilityId, '_SP'))"
    name: ~expression "concat(facilityId, '_SP')"
    area: ~expression "pv_area"
    facility: ~expression {id:"md5(facilityId)"}
    node: ~expression {id: "md5(concat(facilityId, '_NODE'))"}
}
```

As discussed before, the type system may not apply to entities or types that are used for energy industries but may apply to any industry or any entity or data type. The following types illustrate example type definitions for non-energy sectors such as for telecommunication and call center industries.

```
/*
* Represents a physical asset (mobile or other piece of equipment). Each Asset would have an equivalent Service Point.
*/
type CanonicalTelcoAsset mixes Canonical<CanonicalTelcoAsset> {
    assetId :!string
    assetName :!string
    typeIdent :!string
    assetType :string
    assetDescription :string
    servicePointId :string
    productId :string
    status :string
    serialNumber :string
    manufacturer :string
    dateInstalled :datetime
    activationDate :datetime
    deActivationDate :datetime
    modelNumber :string
```

```
modelVersion :string
MACAddress :string
IMEI :string
price :double
currency :string
}
/*
* Telco extension for Call Data Record.
*/
type        CanonicalCallDataRecord        mixes
    Canonical<CanonicalCallDataRecord>{
    servicePointId :!string
    secondaryTelephoneNumber :string
    direction :string
    duration :!double
    country :string
    roamingServiceProviderName :string
    longitude :double
    latitude :double
    toActiveCustomer :boolean
    networkQuality :integer
}
/*
Telco extension for Text Data Record.
*/
type        CanonicalTextDataRecord        mixes
    Canonical<CanonicalTextDataRecord>{
    servicePointId :!string
    secondaryTelephoneNumber :string
    direction :string
    country :string
    roamingServiceProviderName :string
    longitude :double
    latitude :double
}
/*
* Telco extension for Usage Data Record.
*/
type        CanonicalUsageDataRecord        mixes
    Canonical<CanonicalUsageDataRecord>{
    servicePointId :!string
    value :!double
    country :string
    roamingServiceProviderName :string
    longitude :double
    latitude :double
}
/*
* Telco extension for Actions.
*/
type        CanonicalAssignedAction        mixes
    Canonical<CanonicalAssignedAction>{
    assignedActionId :!string
    actionId :!string
    servicePointId :!string
    assignDate :datetime
    offerDate :datetime
    channelId :string
    riskScore :double
    accountValue :double
    acceptDate :datetime
    outcomeInMonth :string
}
/*
* Details of Call Center Calls and Actions taken
/
```

```
type        CanonicalCallCenterCall        mixes
    Canonical<CanonicalCallCenterCall> {
    callId :!string
    callDate :!datetime
    agentId :string
    ivrPath :string
    reason :string
    outcome :string
    accountId :string
    actionId :string
}
```

A summary of the type system, according to one embodiment is provided below and in relation to FIG. 5. An application architecture comprises thousands of types that define and process user interface components, business logic, application functions, data transformations and other actions that occur on the platform. Type definitions create a layer of abstraction over the database, which reduces the amount of work it takes to develop applications. Application developers interact with a consistent set of APIs provided by the system's metadata driven development environment. Developers can efficiently call APIs rather than write extensive lines of application code and are insulated from knowing whether data is slow moving and resides in the relational database or fast moving and resides in the key/value store.

Type definitions consist of properties, or characteristics of the implemented software construct. For example, the properties of a type that is persisted in a database table, such as a billing account, include its column name, data type, length, and so on. Similarly the properties of a logical function that performs a calculated expression include the input and output parameters of the expected result. Some types As new applications, analytics, and machine learning techniques are developed, a metadata development model means that the platform can be easily extended to support new data patterns and optimizations to meet the changing demands and modernizations of the energy marketplace and its information technology infrastructure. These benefits allow application development to efficiently scale and speeds the delivery of business insight to end users.

Application developers may use the platform to interact with types of the following categories: persistable entity types which are persisted in a database and represent either abstract (resource.ResourceMetric) or concrete (facilitymgt.Facility) entities; non-entity types are not persisted in a database and represent non-entities such as services.billinginfo or metadata.Meta; data flow event (DFE) types represent data flow events in the process of the integration of canonical format data with data structures; analytic types represent analytics (facilitymgt.FacilityAggregate) that answer questions by fetching and performing calculations on specified combinations of data; and MapReduce types represent MapReduce processes for efficiently reading and writing large volumes of data.

The model driven architecture for distributed system provides a tiered application architecture wherein application functionality, analytics, and data structures are implemented through type definitions. These types work in unison across multiple layers of a tiered application architecture to process data in response to UI component requests and to process analytic calculations triggered by batch and real-time data flowing into the system. These types function as a superstructure over the physical data stores. The architecture includes three layers: UI layer; analytics layer; and type layer.

Figure 5:
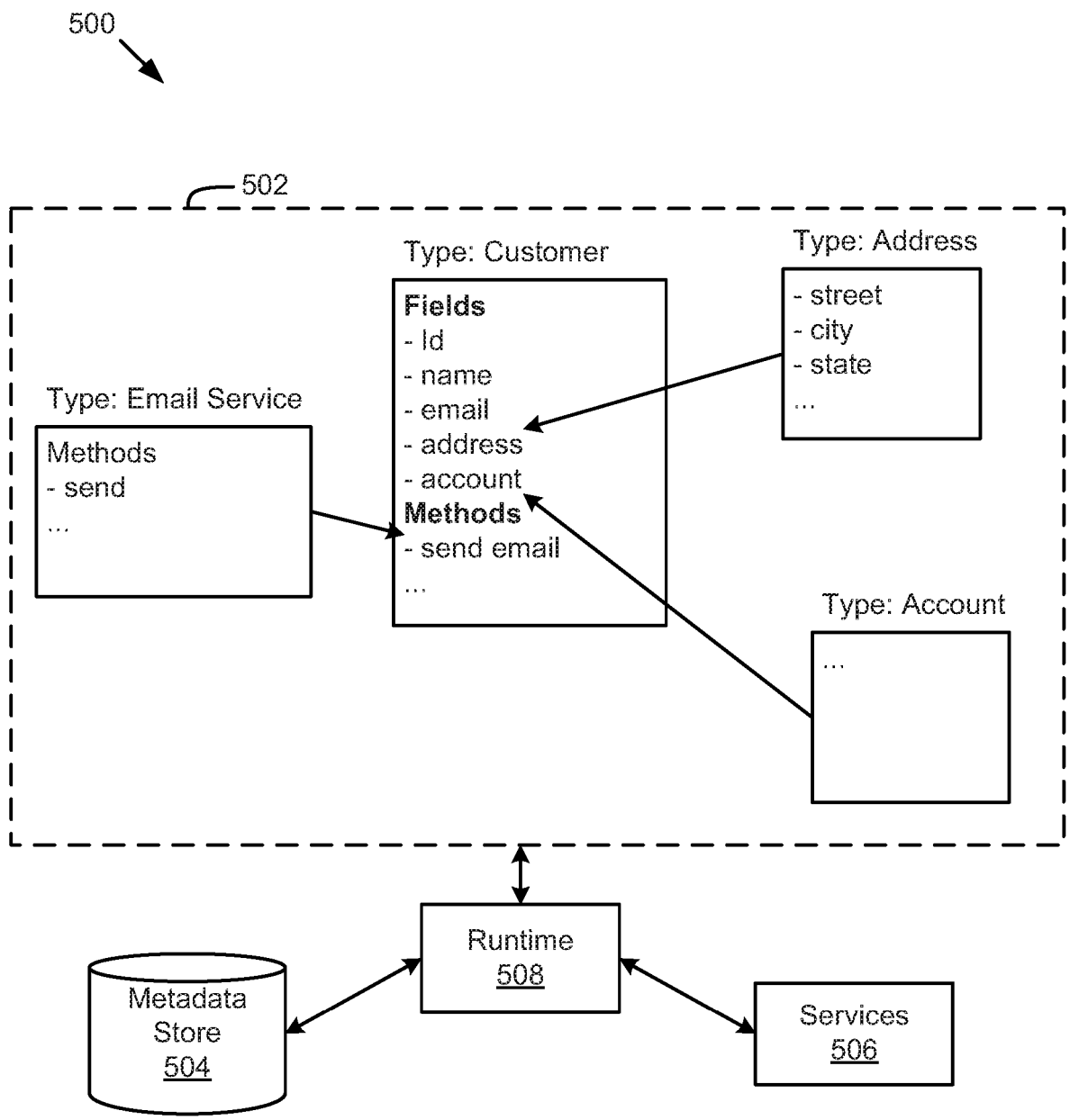
FIG. 5 is a schematic block diagram illustrating components of a type system for a distributed system, according to one embodiment.

FIG. 5 is a schematic block diagram illustrating components of a type system 500 for a model driven architecture, according to one embodiment. The type system 500 includes a plurality of type/type definitions 502, a metadata store 504, services 506, and a runtime engine 508. The plurality of type/type definitions 502 includes any type of type, service or other type definition discussed herein. Skeletons of example type definitions for an email service, customer type, address type, and/or account type are shown. The metadata stores 504 may store information about the type definitions and/or the specific instances of types or methods. The services 506 may include services that access and/or use the defined types. The services 506 may include development tools for referencing and/or accessing the types within other programming languages. For example, the services 506 may include a toolset for integrating the R programming language, development tools, a distributed file system, queuing services, and/or the like. The runtime engine 508 may combine metadata from the metadata store 504 into type instances and perform methods on the types based on defined methods. These types or results of methods may be provided or used by services 506 to provide applications, development, tools, or an interface to a customer or developer.

The type system 500 may provide a logical structure for data, processes, and/or services of a PaaS solution. The type system 500 may provide a consistent and unified programming model to facilitate ease in development and maintenance of the platform. In one embodiment, the type system 500 may be used to represent applications, procedures, or the like as interactions of types. The types are extensible and may define relationships between types or types, services or analytics to be performed in relation to a type or type, and/or an interface declaration for a type or type. The type system may provide a framework and an implementation independent runtime engine for constructing types, performing functions or analytics, and/or providing access to the type system by services or business logic.

Once the canonical types and canonical transformations are defined and deployed, the integration component 202 and data services component 204 support technologies and integration patterns that can be used to deliver data to the platform for loading into data sources. For example, the integration component 202 and/or the data services component 204 may support one or more of the following integration patterns: a REST API, a secure FTP, and java message service. REST APIs may provide programmatic access to read and write data to a platform, such as the system 200 of FIG. 2. In addition to invoking application functions, canonical messages can be integrated and transformed via REST calls. In order to import canonical messages into the system, a body of a message may be posted to a uniform resource locator (URL) for a canonical type.

For customers leveraging more traditional ETL processes, a secure FTP site may be used for data loading. In these scenarios, customers may upload their canonical messages to the secure FTP site on a periodic basis (hourly, daily, weekly, etc.). A scheduled data load job may process the file and place its contents into a message queue, prompting data load processes subscribing to that queue to process, transform, and load the resulting data into a proper data store. For scenarios involving an established integration service bus, the data services component 204 and/or integration layer can integrate the existing integration service bus to act as both a message consumer and/or message producer, depending on system requirements. For example, the integration service bus may be used as an integration service bus. When acting as a message consumer the system 200 of FIG. 2 can act as a durable subscriber to one or more topics (typically a topic per canonical type), pulling messages off the queue as they arrive. Should connectivity between the integration component 202 (or data services component 204) and the integration service bus be interrupted, messages may be queued until connectivity is restored. When acting as a message producer, the integration component 202 or data services component 204 may publish a message to a topic to ensure that it is delivered to all interested parties. In one embodiment, the integration component 202 or data services component 204 tracks and stores the status of each processing step in the data load process. It provides message-level insight, enabling application administrators the ability to identify problems early and sufficient detail to quickly resolve the issue.

The integration component 202 and data services component 204 provide significant benefits to companies and developers for storing, managing, and accessing large amounts of data. For example, the integration component 202 and data services component 204 reduce development time and cost by using a standardized persistence framework. This enables companies to develop high-performance and scalable applications using a rich set of performance and scalability features. Companies are also able to maintain data independence using a type-level API and type-level querying and access any database through a compliant Java database connectivity (JDBC) driver and access non-relational data sources. Additionally, the data services layer provides a common abstraction layer above the data stores. The abstraction layer presents application developers with types abstracting the details of the data stores and data store access methods. Abstraction of the data stores and their access methods reduces application complexity because these details don't need to be known by an application accessing the data. Furthermore, all applications can utilize the same abstraction layer, which reduces coding and maintenance costs because a reduced number of interfaces with the data are needed over point solutions.

FIG. 6 is a schematic block diagram illustrating data loading via an integration bus 602. The integration bus may include or replace an enterprise bus or enterprise service bus. In the depicted embodiment, data or messages may be posted to the integration bus 602 using MQTT or other message or communication protocol. This inbound information may be placed in an inbound canonical queue. For example, the data loading and other procedures performed by the integration component 202 and/or the data services component 204, as discussed herein, may be performed via the integration bus 602.

Figure 7:
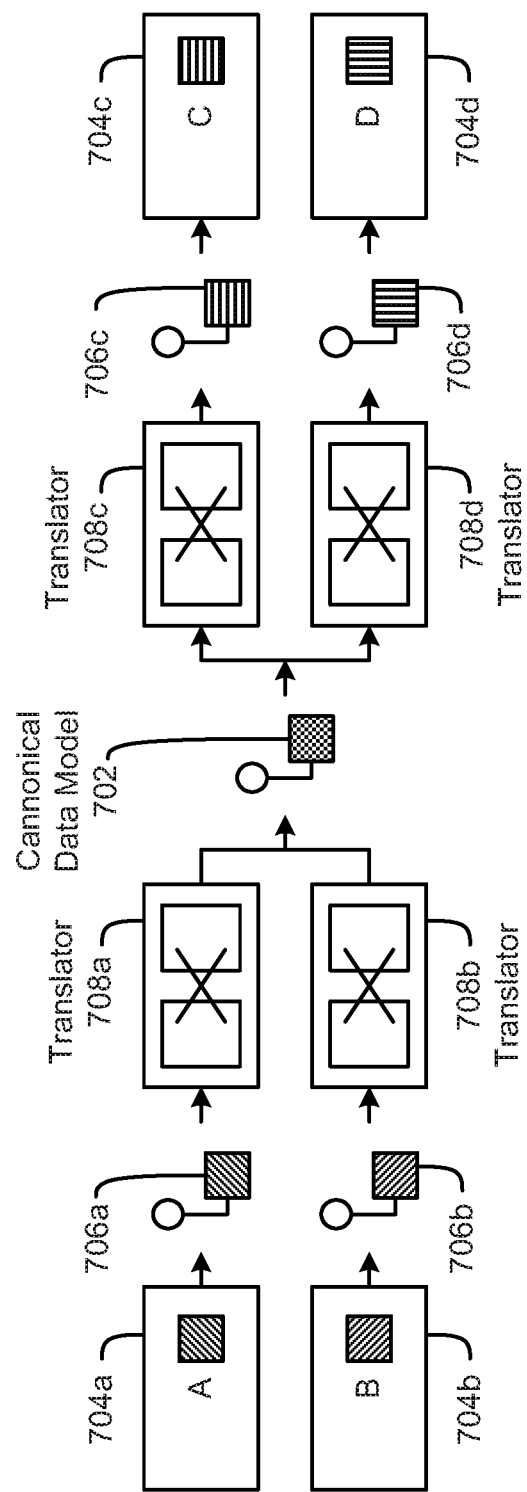
FIG. 7 is a schematic block diagram illustrating data transformations, according to one embodiment.

FIG. 7 illustrates how data can be transformed between different data formats based on data sources, canonical models, and/or applications. Data may be formatted or stored based on a canonical data model 702. A first data handler 704a, a second data handler 704b, a third data handler 704c, and a fourth data handler 704d may use or provide data corresponding to the canonical model 702, but may store, process, or provide the data in a format different than the canonical data model 702. A first data model 706a, a second data model 706b, a third data model 706c, and a fourth data model 706d represent data formats used by respective data handlers 704a-704d. A first transformation rule 708a defines how to transform data between the first data model 706a and the canonical data model 702. A second transformation rule 708b defines how to transform data between the second data model 706b and the canonical data model 702. A third transformation rule 708c defines how to transform data between the third data model 706c and the canonical data model 702. A fourth transformation rule 708d defines how to transform data between the fourth data model 706*d* and the canonical data model 702.

The data handlers 704*a*-704*d* may include one or more of data sources, applications, services, or other components that provide, process, or access data. Because each data handler 704*a*-704*d* has a corresponding transformation rule 706*a*-706*d*, no specific rules between data handlers are needed. For example, if a first application needs to provide data to a second application, the first application only needs to transform data according to the canonical data model and let the second application or a corresponding transformation place the data in the format needed for processing by the second application. As another example, each transformation rule 708*a*-708*d* may be defined by a transformation of a canonical type definition, discussed previously. The canonical data model 702 provides an additional level of indirection between application's individual data formats. If a new application is added to the integration solution only transformation between the canonical data model has to created, independent from the number of applications/data handlers that already participate.

Figure 8:
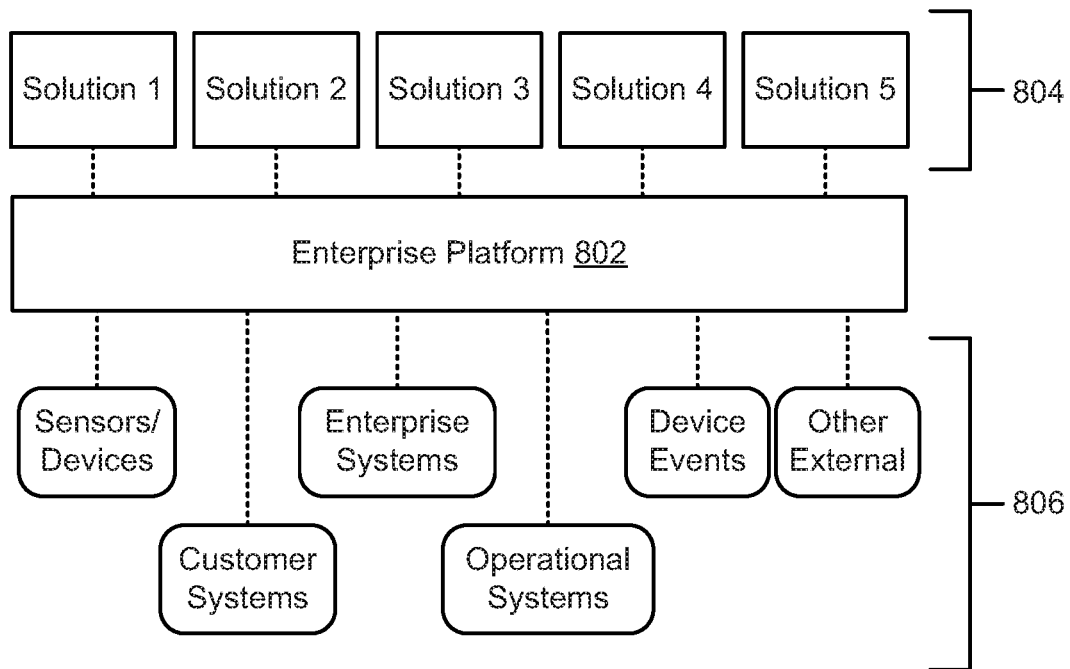
FIG. 8 is a schematic block diagram illustrating data integrations for an enterprise platform, according to one embodiment.

FIG. 8 illustrates one embodiment of data integrations between solutions 804, data sources 806, and an enterprise platform 802, such as the system 200 of FIG. 1. For example each of the solutions 804, such as Solution 1, Solution 2, Solution 3, Solution 4, and/or Solution 5, may represent different applications that utilize services or data from the enterprise platform 802, including any data acquired by the enterprise platform 802 from the data sources 806.

Figure 9:
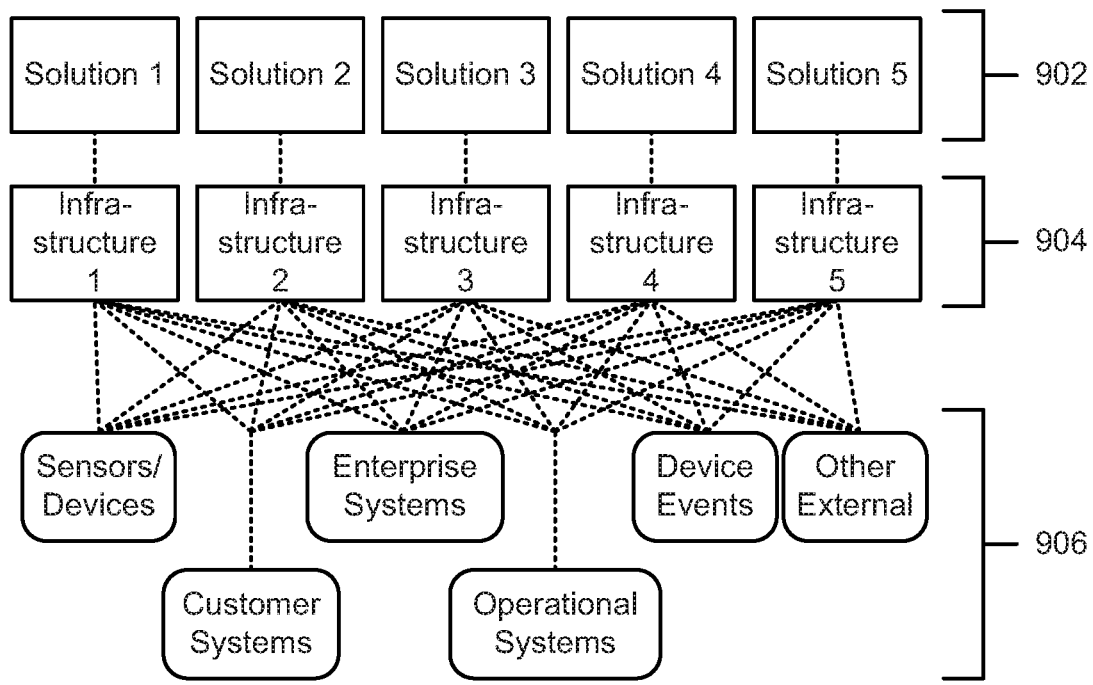
FIG. 9 is a schematic block diagram illustrating data integrations for individual point solutions, according to one embodiment.

FIG. 9 illustrates data integrations between point solutions 902, corresponding infrastructure 904, and data sources 906. For example, the point solutions 902 may correspond to the solutions 804 of FIG. 8, but may be implemented on top of their own distinct infrastructure 904. In one embodiment, the enterprise platform 802 of FIG. 8 may significantly reduce the number of data integrations over the point solutions 902 of FIG. 9.

The IoT is predicted to continue to expand and accelerate reaching an expected 25 billion connected devices by 2020. See Middleton, Peter et al., "Forecast: Internet of Things, Endpoints and Associated Services, Worldwide, 2014." Gartner, Feb. 16, 2015 (hereinafter "Middleton Reference"). As this happens, many businesses, such as utilities within the energy industry, will face an unprecedented volume of generated data. For example, utilities will have data generated from new digital equipment, systems, devices, and sensors on the grid and at their customers' premises. The proliferation of IoT will bring significant new application and data integration challenges as the number of new connections for IoT devices will exceed all other new connections for interoperability and integration combined. See Benoit J. Lheureux et al., "Predicts 2015: Digital Business and Internet of Things Add Formidable Integration Challenges." Gartner, Nov. 11, 2014 (hereinafter "Lheureux"). Historically, application and data integration costs—both first-time and those associated with ongoing maintenance—have been significant and frequently underestimated. See Schmelzer, Ronald. "Understanding the Real Costs of Integration," Zapthink, 2002. Accessed Dec. 18, 2014 at http://www.zapthink com/2002/10/23/understanding-the-real-costs-of-integration (hereinafter "Schmelzer"). The more differences there are in application architectures and in different approaches to integrating applications, the more costly the overall integration effort becomes. Both the proliferation of new data sources and the vastly increasing volumes of data being generated by IoT systems and devices further exacerbate the integration effort, causing these costs to rapidly escalate.

Data analytics solutions to integrate, aggregate, and process these data are critical. Utilities, for example, will need to closely evaluate the relative merits of taking a platform approach, such as that in FIG. 8, or deploying multiple point applications to analyze these large data sets, such as that in FIG. 9. With one embodiment of a platform approach, a utility my deploy an integrated family of cloud-based, smart grid analytics applications built on a common, enterprise data platform. Alternatively, utilities could use multiple, independent, on-premise or cloud-based, point applications to address individual, specific use cases.

However, taking an enterprise, cloud-based platform approach results in significant cost savings relative to deploying multiple independent on-premise point software applications. To estimate the magnitude of these savings, consider a large utility with 10 million customers and three different operating companies. In order to create a comprehensive smart grid analytics capability across the value chain, the utility might desire to procure and deploy five different analytics applications. Examples of five such applications disclosed below are: (1) revenue protection to detect electricity theft; (2) AMI operations to optimize smart meter deployment and network operation; (3) predictive maintenance to prevent asset failure and enhance operational and capital planning; (4) voltage optimization to reduce overall system voltage; and (5) outage management to enable faster response to and better recovery from system outages.

Analysis by Applicant indicates that the cost savings of deploying and maintaining an integrated family of applications built on a common, enterprise, cloud-based platform relative to deploying five independent on-premise point applications is very significant and may total hundreds of millions of dollars over just five years. These cost savings accrue from four areas: (1) data integration and implementation; (2) hardware and software infrastructure and services; (3) hardware and software maintenance, support, and operations; and (4) procurement of the solutions and support hardware and software.

In the coming years, companies will likely spend more on application integration than on new application systems. See Lheureux. A platform approach minimizes these integration costs. Deploying an integrated family of applications that share a common data architecture and cloud-based platform, as illustrated in FIG. 8, enables a utility to perform a single initial integration without having to repeat the work with the addition of new applications. A platform approach also provides the benefit of being able to flexibly deploy applications either at one time or sequentially over time with little to no incremental effort or cost.

By contrast, deploying independent point applications, as illustrated in FIG. 9, requires a repeated integration and implementation project for each application. Further compounding the complexity and expense is the need to build integrations between applications to enable cross-application data interactions. The cost of performing these integrations for point applications grows quickly simply because of the rapid growth of the number of separate integrations required. It also results in duplicative and error-prone additional effort. In summary, the integration cost associated with each additional platform application decreases as additional applications are added, whereas the integration cost of each point application increases as additional point applications are added.

Applicant's experience has shown that deploying a single smart grid analytics application, whether on a platform or not, requires approximately 25 data source extracts. Adding four more applications on a platform typically requires only an additional 25 data source extracts for a total of 50 for the enterprise platform 802 embodiment of FIG. 8. Many data sources are shared by different applications on the platform and all of the data are available to all applications deployed on the platform, which results in the minimal number of total extracts. By contrast, for independent point applications from different vendors, each application requires 25 separate data source extracts for a total of 125. In addition, applications typically must communicate with each other. On a platform, this communication occurs automatically. However, even a single integration point between each independent application requires an additional 10 (=4+3+2+1) integrations, for a total of 135 integrations (see FIG. 9). Therefore, the cost of integrating five independent point applications for the embodiment of FIG. 9 is nearly three times higher (135 integration) than that of integrating five applications on a common platform for the embodiment of FIG. 8 (50 integrations).

In addition, the platform approach may be delivered as Software-as-a-Service (SaaS) providing a single complete and fully functional hardware and software infrastructure at no additional cost. The infrastructure and services included in the SaaS model may encompass all necessary facilities, equipment, technologies, and administrative personnel needed to run the system, including security, data center, power, hardware, storage, backup, monitoring, maintenance, and support resources. By contrast, each independent point solution may require its own hardware and software infrastructure, whether deployed on premise or in the cloud. In a scenario in which multiple independent applications are deployed on premise, each utility operating company incurs the full infrastructure and service costs for purchasing, integrating, and maintaining multiple hardware (e.g., servers, routers, switches, storage) and software (database management systems, ETL software, etc.) infrastructures. These additional infrastructure and service costs are directly proportional to the number of applications deployed.

The SaaS platform approach also provides ongoing maintenance, support, and operations at no additional cost. The incremental internal utility information technology (IT) personnel requirements are minimal because the applications share the same infrastructure, data model, analytics platform, and user interface. By contrast, each of the individual on premise solutions incurs fees for hardware and software infrastructure maintenance and support (such as database license support and maintenance) as well as costs for internal IT personnel required to operate the systems. The vendor fees increase in proportion to the number of individual applications. Additional operations and maintenance expenditure is required, including vendor software upgrades, dealing with hardware issues, internal user requests, de-conflicting multiple incompatible versions, and vendor management. Because of the ever increasing complexity associated with adding additional point applications, as described in relation to FIGS. 8 and 9, the utility's internal IT operations costs increase faster as more applications are added.

Deploying an integrated family of cloud-based applications across multiple operating companies requires only a single procurement process for the platform. By contrast, a separate procurement process must be completed for each vendor providing a point application, as well as for each set of hardware and software infrastructure systems required to run these independent applications. The procurement costs can include writing requests for proposal (RFPs), assessing responses, negotiating pricing and contract terms, and professional service fees. The procurement cost is directly proportional to the number of applications. It can be conservatively assumed that multiple operating companies within a single corporate structure carry out centralized procurement processes.

The scaling factors may determine the degree of interdependency between individual point solutions, and therefore the extent to which data integration and ongoing maintenance costs grow as the number of applications grow. Mathematically, they determine the strength of the growth as a function of the square of the number of applications. Additional scaling factors may determine the degree of synergy between the applications within an integrated, cloud based, enterprise platform, and therefore the extent to which data integrated for one application can be used for another application. Mathematically, they determine how quickly the total cost of each additional application decreases relative to the previous application In summary, significant up-front and ongoing costs can be avoided by taking the platform approach of FIG. 8 instead of deploying multiple point applications of FIG. 9. These cost savings result from lower cost application and data integration costs; avoided hardware and software infrastructure costs; lower ongoing maintenance, support, and operations costs; and avoided procurement expenses.

Returning again to FIG. 2, the modular services component 206 may provide a complete and unified set of data processing, application development, and application deployment and management services for developers to build, deploy, and operate industrial scale cyber physical applications. These services enable developers, data scientists, and business analysts to deliver applications that are ready for immediate use and can scale to meet the data processing and machine learning requirements within the enterprise. With the integration component 202 and the data services component 204, the system 200 is designed to aggregate, federate, and normalize significant volumes of disparate, real-time operational data. Thus, the system 200 is able to manage exceptionally large data volumes and smart device network data delivered at high rates, while delivering high-performance levels. The modular services provided by the modular services component 206 provide powerful and scalable services to perform both stream and batch processing, giving users the ability to process federated data correlated with large datasets residing in both enterprise operational systems and extraprise data streams in near real-time. In one embodiment, federated data includes data stored across multiple data stores or databases but appears to client services or applications to be stored in a single data store or database.

Figure 10:
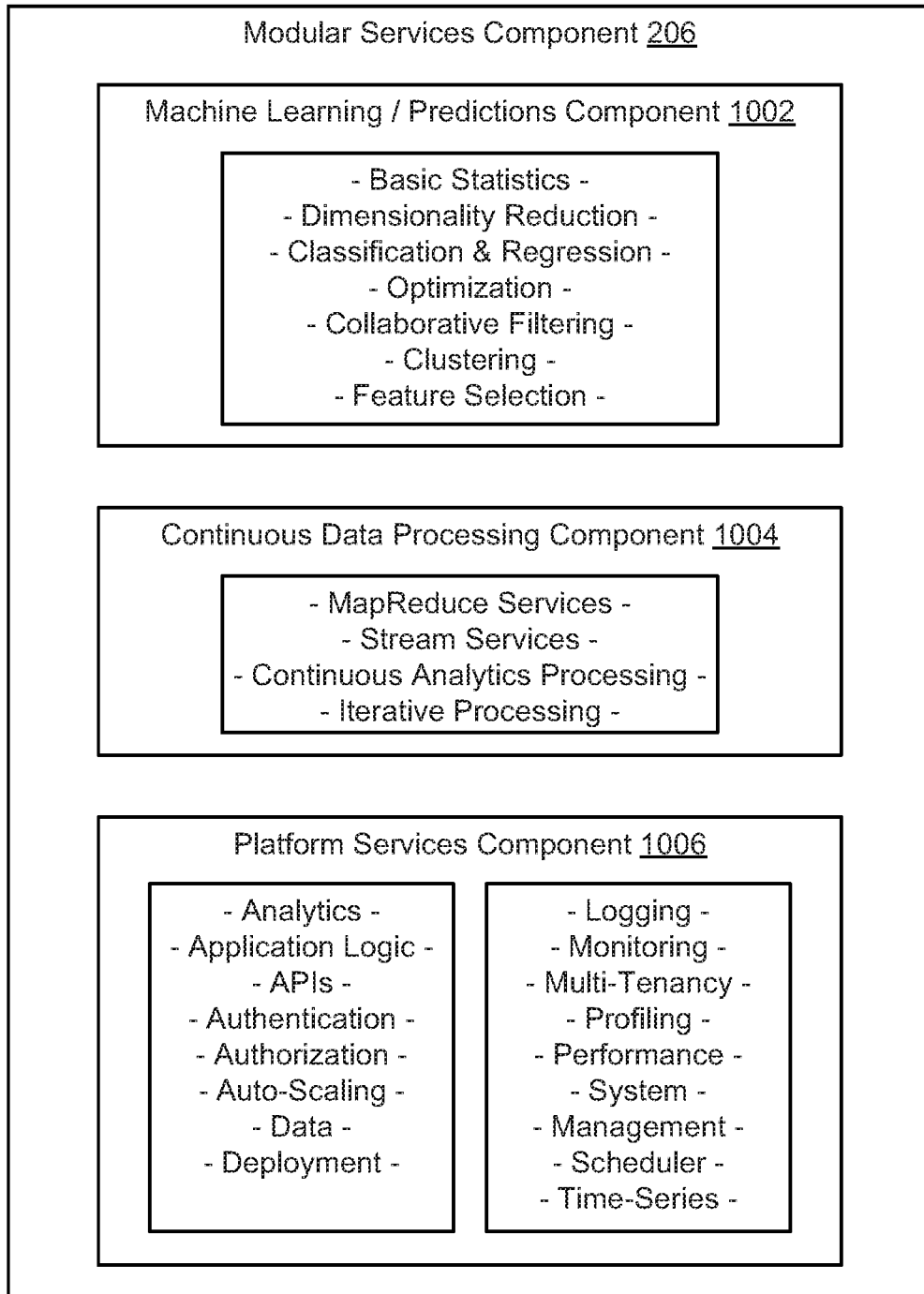
FIG. 10 is a schematic block diagram illustrating a modular services component, according to one embodiment.

FIG. 10 illustrates example components of the modular services component 206 including a machine learning/prediction component 1002, a continuous data processing component 1004, and a platform services component 1006. The machine learning/prediction component 1002 provides native predictive capabilities through the power of machine learning. A large-scale deployment of smart device networks, such as the system 200 of FIG. 2, may provide companies with unprecedented quantities of information about their operations and customers. Hidden in the interrelationships of these big data sets are insights that can improve the understanding of customer behavior, system operations, and ways to optimize the business value chain. Identifying these insights requires advanced tools that help data scientists and analysts to discover, analyze, and understand the relationships that exist in all the data across the entire enterprise value chain. One of these advanced tools is machine learning, enabling the development of self-learning algorithms and analytics. For example, the integration layer component 202, the data services component 204, and the modular services component 206 may leverage cloud technologies to aggregate process all of the enterprise, environmental, marketing partner and customer data into a unified, federated cloud image for analysis. Advanced machine learning techniques are employed to continuously improve analytic algorithms and generate increasingly accurate results.

The machine learning/prediction component 1002 is configured to provide a plurality of prediction and machine learning processing algorithms including basic statistics, dimensionality reduction, classification and regression, optimization, collaborative filtering, clustering, feature selection, and/or the like. The machine learning/prediction component 1002 integrates state-of-the-art methods in machine learning to allow the system 200 to learn directly from massive data sets. Machine learning broadly refers to a class of algorithms that make inferences and build prediction mechanisms directly from data. Whereas traditional analytics typically focuses on hand-coded program logic, machine learning takes a different, data-driven approach. Rather than manually specify analytics, machine learning algorithms look at a large amount of "raw" data signals and automatically learn how to combine these signals in the appropriate manner that captures this predictive ability in a much more direct and scalable manner.

In one embodiment, the machine learning/prediction component 1002 enables close integration of machine learning algorithms in two ways. First, the machine learning/prediction component 1002 closely integrates with industry-standard interactive data exploration environments such as IPython®, RStudio®, and other similar platforms. This allows practitioners to explore and understand their data directly inside the platform, without the need to export data from a separate system or operate only on a small subset of the available data. Second, the machine learning/prediction component 1002 contains a suite of state-of-the-art machine learning libraries, including public libraries such as those built upon the Apache Spark™, R®, and Python® systems. But the machine learning/prediction component 1002 also includes custom-built, highly optimized and parallelized implementations of many standard machine learning algorithms, such as generalized linear models, orthogonal matching pursuit, and latent variable clustering models. Together, these tools allow users to both use the tools they are familiar with in data science, and also use and deploy large-scale machine learning applications directly inside a platform system, such as the system 200 of FIG. 2.

Using these tools, companies, developers, or users can quickly apply machine learning algorithms to any data source contained within a platform. And by providing a single platform for data storage, processing, and machine learning, the platform enables users to easily deploy industry-leading predictive modeling applications. In one embodiment, the machine learning/prediction component 1002 is configured to perform at least some machine learning algorithms against data via types or an abstraction layer provided by the data services component 204. In one embodiment, machine learning algorithms may be performed using any processing paradigm provided by the continuous data processing component 1004, which will be discussed further below. For example, performing machine learning using the different available processing paradigms can lead to great flexibility based on the needs of a particular platform and may even improve machine learning speed and accuracy. Companies or developers may not need to get an understanding of the low level details of machine learning and can leverage these built-in tools for powerful and efficient tools.

The continuous data processing component 1004 is configured to provide processing services and algorithms to perform calculations and analytics against persisted or received data. For example, the continuous data processing component 1004 may analyze large data sets including current and historical data to create reports and new insights. In one embodiment, the continuous data processing component 1004 provides different processing services to process stored or streaming data according to different processing paradigms. In one embodiment, the continuous data processing component 1004 is configured to process data using one or more of Map reduce services, stream services, continuous analytics processing, and iterative processing. In one embodiment, at least some analytical calculations or operations may be performed at a network edge, such as within a sensor, smart device, or system located between a sensor/device and integration component 202.

In one embodiment, the continuous data processing component 1004 is configured to batch process data stored by the data services component 204, such as data in the one or more data stores 406-416 of FIG. 4. In at least one embodiment, batch analytics processing utilizes Map reduce, a best-practice programming model for improving the performance and reliability of processing-intensive tasks through parallelization, fault-tolerance, and load balancing. A Map reduce processing job splits a large data set into independent chunks and organizes them into key-value pairs for parallel processing. This parallel processing improves the speed and reliability of the cluster, returning solutions more quickly and with greater reliability. Map reduce processing utilizes a map function that divides the input based on the specified batch size and creates a map task for each batch. An input reader distributes those tasks to worker nodes to perform reduce functions. The output of each map task is partitioned into a group of key-value pairs for each reduce. The reduce function collects various results and combines them to answer the larger problem that the job needs to solve. Map output results are "shuffled," which means that the data set is rearranged so that the reduce workers can efficiently complete the calculation and quickly write results to storage via the data services component 204. Batch processing services, such as Map reduce, may be used on top of the types of a data abstraction layer provided by the data services component 204.

Map reduce is useful for batch processing on very large data sets, such as terabytes or petabytes of data stored in the data stores 406-416 of FIG. 4. Building Map reduce, or other batch processing services, into a platform provides simplicity for developers because they write Map reduce jobs in their language of choice, such as Java and/or JavaScript, and Map reduce jobs are easy to run. Built-in Map reduce provides scalability because it can be used to process very large data sets, such as petabytes of data, stored in one or more data stores 406-416. Map reduce provides parallel processing so that Map reduce can take problems that used to take days to solve and solve them in hours or minutes. Built-in Map reduce services provide for recovery because it efficiently and robustly also manage failures. For example, if a machine with one copy of data is unavailable, another machine will have the same data, which can be used to solve the same sub-task. One or more job tracker nodes may keep track of where the data is located to ensure that data recovery is easily performed.

Figure 11:
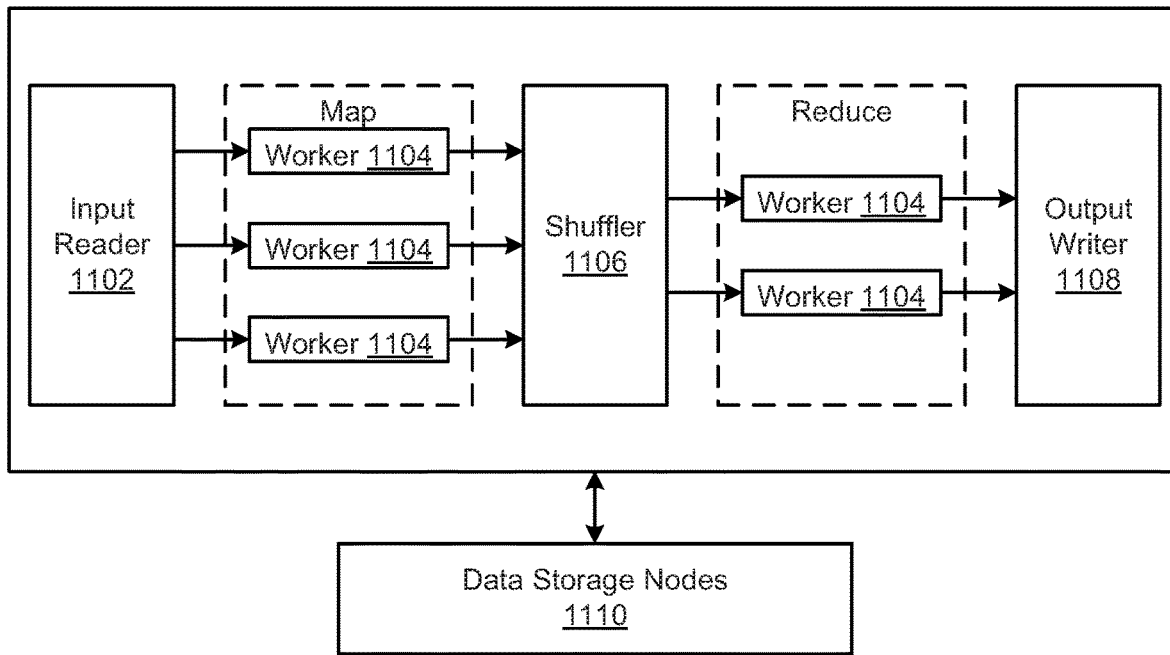
FIG. 11 is a schematic block diagram illustrating a Map reduce algorithm, according to one embodiment.

FIG. 11 is a schematic block diagram illustrating one embodiment of how Map reduce services may be used within a platform, such as the system 200 of FIG. 2. FIG. 11 includes an input reader 1102, a plurality of workers 1104, a shuffler 1106, an output writer 1108, and data storage nodes 1110. Generally speaking, a Map reduce job splits a large data set into independent chunks and organizes them into key-value pairs for parallel processing. This parallel processing improves the speed and reliability of the cluster, returning solutions more quickly and with greater reliability.

A Map reduce job may include a map function that divides input based on the specified batch size and creates a map task for each batch. The input reader 1102 distributes those tasks to corresponding worker 1104 nodes. The output of each map task is partitioned into a group of key-value pairs for each reduce. A reduce function collects the various results and combines them to answer the larger problem that the job needs to solve. Map output results (e.g., as performed by the workers 1104) are shuffled by the shuffler 1106, which means that the data set is rearranged so that the workers 1104 can perform a reduce function efficiently to complete the calculation. The output writer 1108 writes results to a data services layer. In one embodiment, retrieving or writing data to the data storage nodes may be done via one or more types of a type layer or abstraction layer provided by the data services component 204. The data for processing may be obtained from one or more data storage nodes and results of the calculation may be written to a service bus or stored in one or more data storage nodes 1110.

The following example illustrates one embodiment of code, which may be executed by a platform to perform a simple Map reduce job of counting a number of occurrences of each word in a given filed. To start, a definition of a simple type, name Text, is defined:

```
// Simple type definition for the wordcount example
entity type Text {
    // attribute that stores the text string to be processed
    text : clob
}
```

Next a Map reduce type, and any dependencies are declared. In this example, the type contains the word and the number of occurrences:

```
// Map-like type with a string key and an int value. This type will track occurrences of
// each word
type StrIntPair mixin Pair<string, int>
// Map reduce type definition. In this example, the code will be in-line rather than
// stored in a separate file
entity type WordCount mixin Map reduce<Text, string, int, StrIntPair>{
    // map function declaration. Since the map function is already declared by the map
    // reduce type, we do not need to redeclare input/output arguments. In this
    // example, the implementation resides in wordCount.js
    map :~{@ wordCount @} js server
    // reduce function declaration. Since the reduce function is already declared by the
    // Map reduce type, we do not need to redeclare input/output arguments. In this
    // example, the implementation resides in wordCount.js
    reduce :~{@ wordCount @} js server
}
```

With the foregoing type definitions, the following example JavaScript code may be used to count all words in the text field of every text type instance:

```
// returns a map with the key being the work, and the value the number of occurrences
function map(batch, objs, job) {
    var wordCounts={ };
    objs.eachRef(function(o) {
        if (o.text)
            o.text.split(" ").each(function(w) {
                var c=(wordCounts.get(w) ? wordCounts.get(w) : 0)
                wordCounts.set(w, c+1))
            }
    } )
    return wordCounts;
}
// collects the output across all workers for each word, and aggregates the count function reduce(outKey, interValues, job) {
    var count=0
    interValues.each(function(c) { count +=c } )
    return {fst:outKey, snd:count};
}
```

The foregoing word count example illustrates the power and simplicity provided by the built-in Map reduce services within a platform. One of skill in the art will recognize the significant reduction in coding represented by the above example, which is enabled by the embodiments disclosed herein and which may result in time and monetary savings based on the ability to access and use built-in Map reduce functionality within an enterprise platform.

Returning to FIG. 10, the continuous data processing component 1004 may stream process data, such as by processing a stream of data from one or more data sources 208. The continuous data processing component 1004 may provide stream processing services for large volumes of high-velocity data in real-time. Stream processing may be beneficial for scenarios requiring real-time analytics, machine learning, and continuous monitoring of operations. For example, stream processing may be used for real-time customer service management, data monetization, operational dashboards, or cyber security analytics and theft detection. In one embodiment, stream processing may occur after data has been received and before or after it has been loaded into a data store and/or abstracted by an abstraction layer. For example, stream processing may be performed at or within a head-end system that processes incoming messages from data sources. Initial processing, e.g., detecting whether a value is within a desired window, may be performed and warnings, notifications, or flags may be created based on whether the value is within the window. Thus, stream processing may provide extremely fast real-time processing of data as it is received, which may be helpful for IoT deployments where it may be undesirable or detrimental to wait until data has been fully integrated. In one embodiment, at least a portion of stream processing may be performed at or near an edge of a sensor/device network. For example, devices or systems that include an edge analytics component may perform some analytical operations or calculations to reduce a processing load on workers or servers of the system 200. In one embodiment, a concentrator, sensor, or smart device may detect whether a value is within a desired value window (e.g., range of values) and create warnings, notifications, or flags based on whether the value is within the window.

In one embodiment, the continuous data processing component 1004 may provide a plurality of features that are beneficial for real-time data processing workloads such as scalability, fault-tolerance, and reliability. The continuous data processing component 1004 may provide scalable stream processing by performing parallel calculations that run across a cluster of machines. The continuous data processing component 1004 may provide fault-tolerant operation by automatically restarting workers or worker nodes when they fail or die. The continuous data processing component 1004 may provide reliability by guaranteeing that each unit of data will be processed at least once or exactly once. In one embodiment, the continuous data processing component 1004 only replays messages when a failure occurs.

In one embodiment, stream services are powerful for scenarios requiring real-time analytics, machine learning, and/or continuous monitoring of operations. Examples applicable to at least some organizations include real-time customer service management, data monetization, operational dashboards, or cyber security analytics and theft detection. In one embodiment, the stream services provide scalability by using parallel calculations that run across a cluster of machines. The stream services may provide fault-tolerance by automatically starting workers services or nodes when they fail or die. The stream services may provide reliability by guaranteeing that that each unit of data will be processed at least once or exactly once. In one embodiment, the continuous data processing component 1004 may only replay messages when there are failures.

The continuous data processing component 1004 may use stream series that provide for the development and run-time environment of evaluating analytic functions in real-time. These analytics are expressed as functions with a loophole for accessing small amounts of data from the data services layer (such as account status). In many instances, a stream service will take one data stream as input and may produce another as output for downstream consumption. Thus, multiple processing layers for the input stream may enable sophisticated real-time analytics on streaming data.

Figure 12:
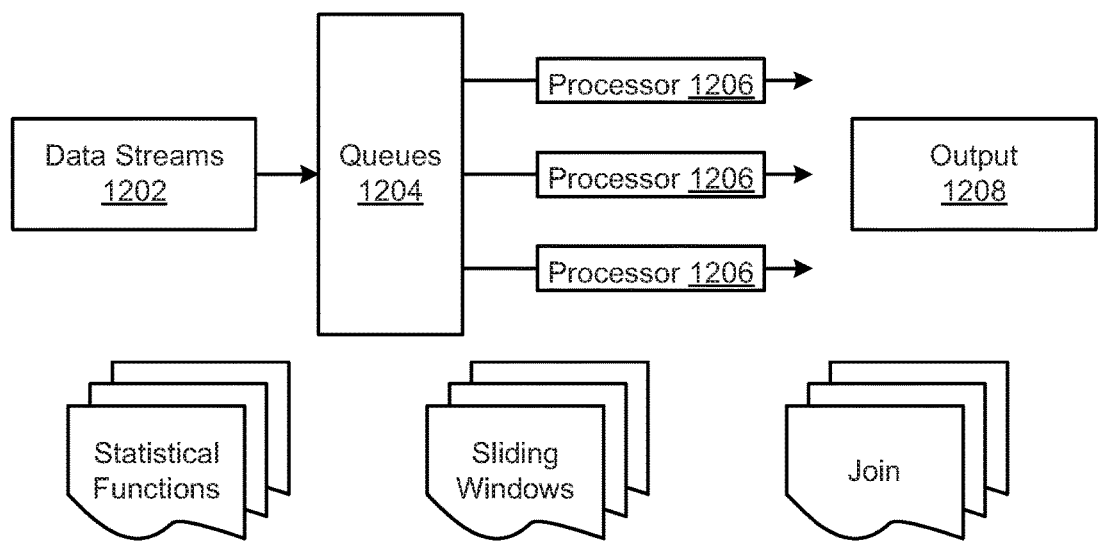
FIG. 12 is a schematic block diagram illustrating stream processing, according to one embodiment.

FIG. 12 is a schematic block diagram illustrating one embodiment of stream processing illustrating data streams 1202, queues 1204, processors 1206, and output 1208. For example, consumption of a stream processing analytic may be represented by messages of the data streams 1202 being fed and stored in one or more queues 1204. A plurality of processing nodes (processors 1206) may process the messages according to a processing analytic or requirement and produce output 1208, which may represent current trends or events identified in the data streams 1202. In one embodiment, each stream service is a function of a data flow event argument that encapsulates a stream of data coming from a sensor data or some other measurement device. A stream service may have an optional "category", which can be used to group them into related products (e.g., "AssetMgmt", "Outage"). Analytics may also pre-calculate values using a method or component that determine or loads a current context. Determining the current context may be performed once per analytic or source type and the value may be passed as an argument to a processor 1206 that is performing a function. This provides a way to optimize processing based on state across multiple different analytics executions for different time ranges.

In one embodiment, three members of a base analytic type are provided to be overridden by actual analytics: a category, such as category name string (may be optional); a load context, such as a state pre-loading function (may be optional); and a process identifier, which may identify a primary function (may be required). Example primary functions include statistical functions, sliding windows, and/or join operations. An example of a stream analytic defined within one platform embodiment is defined below.

```
// The DailyPeakDemandAnalytic is invoked as sensor
    data streams into the
// platform. If the demand value exceeds a user-defined
    threshold, an alert
// (DemandThresholdAlert) will be generated. In this
    example, loadContext and
// process implementations can be found in dailyMaxDe-
    mandAnalytic.js
type          DailyPeakDemandAnalytic          mixin
    Analytic<DailyMaxDemand, DemandThresholdAlert>
{
    category :~"ThresholdException"
    loadContext :~{@dailyMaxDemandAnalytic@}   js
        server
    process :~{@dailyMaxDemandAnalytic@} js server
}
```

In one embodiment, a data flow event is a combination of an analytic defining what is being measured, a period defining the period of a time-series to be analyzed, and an interval that defines a granular for aggregation. In addition, analytics may specify a completeness threshold for a data flow event that defines how much of the potential data for a period has been collected so far. For example, an analytic for examining daily maximum demand data at an hourly interval would specify an analytic for a metered electric peak demand, a period of one day, and an interval of one hour. An example definition for this type is listed below:

```
// Daily max demand data flow event. Will only be
    invoked if
// a days worth of hourly demand data is received.
@DFE(period="day",                        grain="DAY",
    metric="MeteredElectricityPeakDemand")
type          DailyMaxDemand                 mixin
    TSDataFlowEvent<FixedAsset>
```

Please note that in the example above, the data flow event may extend (or mix) a data flow event since it is based on an analytic with time-series data. Other base types may be used for non-time-series analytic data flow events.

An output analytic result may be another type declared through the parametrization of the analytic type. For example, a result may be an entity type that is automatically persisted, and referenced in the record of the analytic execution. The output of an analytic may be an alert, which is intended to represent a call to action for a human operator. For example, the DemandThresholdAlert in the above example may be used to keep a log of thresholds that were exceeded and the emails sent to notify operators of unusually high demand.

In one embodiment, the continuous data processing component 1004 is configured to perform continuous analytics processing. Stream processing may have some limitations because not all data, or only limited data, may be available for stream processing. For example, during stream processing, the streaming data may not yet have been stored by the data services component 204 and thus may not be in a correct format, may not be accessible via types in an abstraction layer provided by the type layer component 404, and/or may not be associated with relational data or other data that has been stored in one or more of the data stores 406-416. For these reasons, stream processing may be limited to certain processing operations that do not require the abstraction layer, relational data, or data that has already been placed in a data store.

Continuous analytics processing allows for real-time or near real-time processing based on all data and/or based on types abstracted by the type layer component 404. In one embodiment, the continuous data processing component 1004 is configured to detect changes, additions, or deletions of data in any of the data sources 208. For example, the continuous data processing component 1004 may monitor data corresponding to analytics for which continuous analytics processing should be performed and initiate processing of a corresponding analytic when that data changes. In one embodiment, the continuous analytics processing may recalculate a metric or analytic based on the changed data. The results of the recalculation may be stored in a data store, provided to a dashboard, included in a report, or sent to a user or an administrator as part of a notification. In one embodiment, the continuous analytics processing may use Map reduce, iterative processing, or any other processing paradigm to process the data when a change in data is detected. In one embodiment, continuous analytics processing may perform processing for only a sub-portion of an analytic. For example, some calculations may be updated based only on a changed or new value and, thus, not all calculations that go into an analytic need to be recalculated. Only those that are impacted by the change may be recalculated to save resources and time.

In one embodiment, the continuous data processing component 1004 is configured to perform iterative processing. Iterative processing can be used to perform processing or analytics that are not well addressed by either batch (e.g., Map reduce) or stream models. This class of workflows is referenced as iterative because the processing requires visiting data multiple times, frequently across a wide range of data types. Many machine learning techniques required to optimize operations, such as smart grid operations, fall into this category. As an example, the continuous data processing component 1004 may use a simple technique such as clustering, and iterating repeatedly through data, to predictively identify equipment within a system with high likelihood of failure. Batch processing does not provide a solution to this type of problem because the task cannot be easily broken down in sub-tasks and then merged together as is necessary for Map reduce.

Rather than horizontally scale the processing (matching it to the data), iterative processing both horizontally scales the processing and keeps the data in memory (or provides the appearance of keeping the data in memory) across a cluster. This makes techniques that require repeatedly iterating through vast amounts of data possible. The Apache Spark™ project is one example of an implementation of an iterative processing model. Spark™ provides for abstraction of an unlimited amount of memory over which processing can iterate. In one embodiment, Spark™ is implemented by the continuous data processing component 1004 on a service platform to allow ad-hoc processing and machine learning algorithms to run in a natural way. In one embodiment, the iterative processing services, such as an adapted Spark™ implementation, are adapted to run on top of abstracted models defined by the type component 404. Iterative processing on top of an abstraction layer provides a very powerful and easy to use tool for companies and/or developers.

Each of the different processing paradigms, batch, stream, continuous analytics, and/or iterative processing may be implemented on top of the types or abstraction layer provided by the data services component 204. Use of the abstraction layer removes the need of a developer to understand specific data formats, storage details, or the like while still obtaining results of processing according to time demands or other processing or business needs.

The platform services component 1006 provides a plurality of services built-in to an enterprise Internet-of-Things application development platform, such as the system 200 of FIG. 2. The services provided by the platform services component 1006 may include one or more of analytics, application logic, APIs, authentication, authorization, auto-scaling, data, deployment, logging, monitoring, multi-tenancy for smart grid or other applications, profiling, performance, system, management, scheduler, and/or other services, such as those discussed herein. These services may be used or accessed by other components of the system 200 and/or applications 210 built on top of the system 200. For example, applications may be developed and deployed more quickly and efficiently using services provided by the platform services component 1006 and other components of the system.

In one embodiment, developing application logic, or using already available logic, enables the development of complex applications and application logic that leverages other portions or services such as Map reduce, stream processing, batch updates, machine learning, or the like. In one embodiment, an application layer of the modular services component 206 of the system 200 of FIG. 2 leverages various libraries (including open libraries) as well as the type models in the type layer or data abstraction layer. These built-in features enable development using fewer lines of code, less debugging, and better performance so that companies and developers can make better applications in less time, leading to significantly reduced costs.

APIs provided by the platform services component 1006 may provide programmatic access to data and application functions. The APIs may include representational state transfer (REST) APIs. In one embodiment, with the REST APIs provided by the platform services component 1006, developers may: evaluate and analyze analytics against any source type; query for sensors, sensor data, or any type using sophisticated query criteria; create or update data for any type; invoke any platform or application function (for example, all platform and application functions may be published and available for external consumption and use); and obtain detailed information about types, such as a sensor or a custom type.

In one embodiment, the REST bindings provided by the platform services component 1006 enable the use of HTTP verbs (POST, GET, PUT, DELETE), extends the set of resources which may be targeted by a URL, and allows header-based selection of multiple representations of content, all of which serve to phrase the API in a more REST-friendly way. The API calls require a URL to specify the location from which the data will be accessed.

In one embodiment, the platform services component may enable developing applications that have a tiered application architecture. As discussed previously, some application functionality, analytics, and data structures may be implemented through type definitions. These types may work in unison across multiple layers of a tiered application architecture to process data in response to UI component requests and to process analytic calculations triggered by batch and real-time data flowing into the system. These types may function as a superstructure over the physical data stores. Applications that utilize the platform services component 1006 or other components of the system 200 of FIG. 2 may have an application architecture including a user interface layer, an analytics layer, and a type layer.

Figure 13:
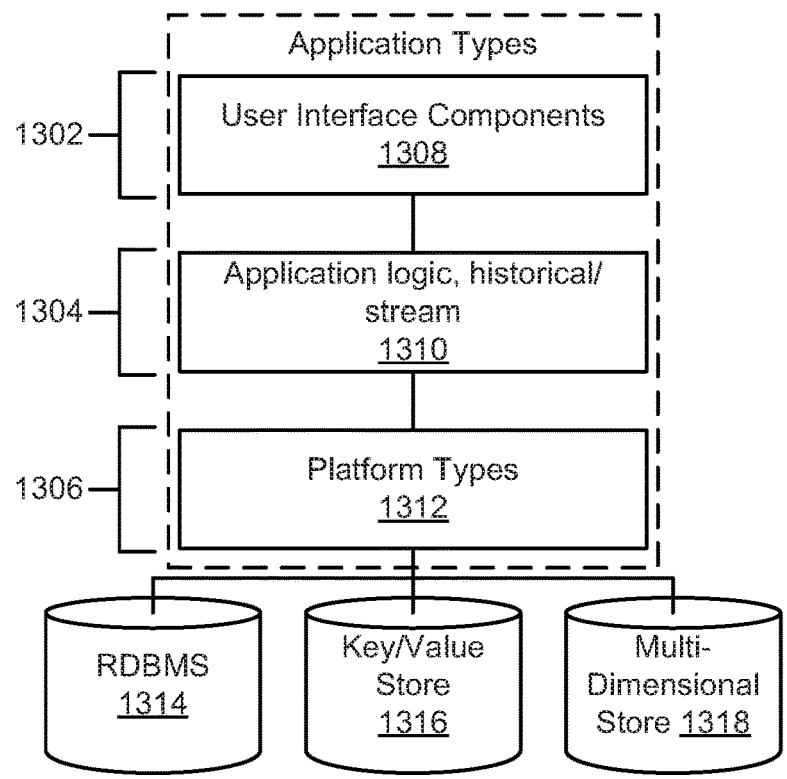
FIG. 13 is a schematic block diagram illustrating a tiered architecture of an application, according to one embodiment.

FIG. 13 illustrates one embodiment of the tiered architecture of one or more applications. An application may include components made of application types. The application types may include user interface components 1308, application logic, historical/stream 1310, and platform types 1312. A user interface layer 1302 may include graphical user interface type definitions or components 1308 that define the visual experience a user has in a web browser or on a mobile device. User interface types may hold the UI page layout and style for a variety of visual components such as grids, forms, pie charts, histograms, tabs, filters, and more. In an analytics layer 1304, application logic functions, historical batch analytics, and streaming analytics 1310 may be triggered by data flow events. The analytics layer 1304 may provide a connection between the user interface components 1308 and data types residing in the physical data stores. In one embodiment, application logic, calculated expressions, and analytic processing all occur and are manipulated in the analytics layer 1304.

A type layer 1306 may persist and manage all platform types 1312 built on top of a data model. The types may contain definitions that describe fields, data formats, and/or functions for an entity in the system. As discussed elsewhere, the types defined by the platform types 1312 may create a layer of abstraction over various data stores, such as relational database management systems 1314, key/value stores 1316, and multi-dimensional stores 1318 and provide a consistent set of APIs for a metadata driven development environment. The type layer 1306 may be optimized to meet the unique requirements imposed on how an application interacts with data of differing shapes, speed, and purpose.

Figure 14:
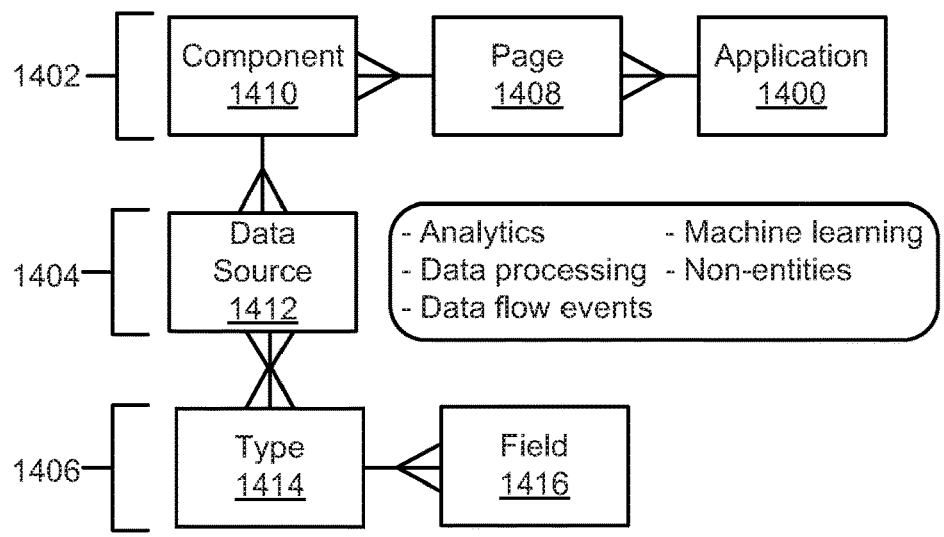
FIG. 14 is a schematic block diagram illustrating details for layers of an application, according to one embodiment.
Figure 14:
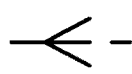

FIG. 14 illustrates additional details for layers of an application architecture hierarchy including a user interface layer 1402, an analytics layer 1404, and a type layer 1406. An application 1400 can contain many pages 1408 of many components 1410. Many data sources 1412, types 1414 with their fields 1416, and their associated application logic may interact to process data. The results of processing may be returned to the components 1410 of the application 1400. The layered application architecture processes UI and entity types at the top (user interface layer 1402) and bottom (type layer 1406) layers of the architecture. In the middle layer (analytics layer 1404), application logic may be based on functions and related analytics, data processing, data flow events, machine learning, non-entities, and the like.

In one embodiment, the user interface layer 1402 consists of user interface type definitions that determine the visual interface that the user sees and interacts with in a browser. Data from an application logic layer and data services layer are represented to the user for viewing and modification by means of user interface type definitions. Application logic functions implement application functionality such as data controls, editable scrolling list tables, or analytics visualizations. Other user interface types control toolbar and menu implementation and the visual grouping of application functionality. The user interface defines the visual elements with which users interact, such as the layout, navigation, and user interface controls like buttons and check boxes.

A view or page may present one or more functions together at one time in a predefined visual arrangement and logical data relationship. Views or pages may be named, and a specific view may be selected by name from a combination of menus or tabs. In one embodiment, a specific view or page is mapped to a single entity type, which determines the relationship between data displayed in two or more functions in the view.

The types for the UI layer, according to one embodiment, are listed below. In the following list, the "C3" identifier is used to access the types of a system. One of skill in the art will recognize that the names are illustrative only and may vary:

action.Action. Base class for all controller actions. Every time a controller detects an actionable component event, it creates a C3.action.action subclass instance and dispatches instructions to it. The base class provides a standardized set of asynchronous callback definitions along with convenience functions that make writing action subclasses that honor the conventions easier to write.

cache.LocalStorage. Used as a backend for storing any serializable key-value pair into localStorage. Internally, this is used to cache several types of data records or asynchronous JavaScript and XML (AJAX) responses. Sometimes entire file contents are cached. The cache tracks how much space it is currently using, exposing the total number of bytes currently used via the storageUsed config. The storageLimit config can be used to enforce a limit on this cache's total space allocation. If this limit is reached, the cache will start to flush items in the order of last recently accessed.

cache.Memory. Used as a backend for storing any serializable key-value pair into localStorage.

data.FetchSpec. Represents a type of query that can be run to load data. Typically the subclasses C3.data.FetchSpec and C3.data.EvaluateSpec are used to communicate with a c3server instance.

data.Filter. Represents a single filter defined on a data source. Filter types are typically standardized configuration types. See C3.data.Source.filters for more information on using filters in the context of a data source.

data.Loadable. A mixin that is applied to C3.data.Record and C3.data.Collection in order to allow them to load data—not to be used outside that context.

data.Query. Represents any request that can be made against the C3 data type system. Can be used as a local cache when idempotent is set to true. Usually created by connection, which is where Components should typically request data. This enables caching of responses inside the manager.

data.Record. Represents a single record, usually inside a C3.data.Source.

data.ResultSet. Represents a response to a C3.data.Query load event. C3.data.ResultSet is typically used as a data exchange type that provides a standard way to reason about data load responses. Before a C3.data.Query issues an AJAX request, it checks its own internal cache for previous identical requests. For these cases, it creates a C3.data.ResultSet type and passes it to the callback function that was passed to the Request load call. For this first C3.data.ResultSet, fromCache is set to true, data is set to the raw response text, and fetchedAt is set to the time when the previous request was made. Once the newly issued AJAX request comes back, a second C3.data.ResultSet type is created and passed to the same callback function. Now, fromCache is set to false, data is set to the newly acquired response text, and fetchedAt is set to the current time.

data.Source. Represents some data source from the c3server. Each Source takes a spec, which contains the c3module, c3type, c3function and c3arguments parameters that are passed to the c3server when you call load (or if autoLoad is set to true).

data.Type. Represents an object type.

history.Request. Represents a single request that is dispatched through a Router and its associated middleware.

history.Router. Wraps a Backbone.Router and provides the set of default route types accepted by a C3.view.Site.

middleware.Base. The base middleware from which others inherit.

network.Arguments. Represents a data-bindable set of arguments to be sent by a C3.network.Request.

network.Connection. Represents a connection that can be used to access data over the network. While this is usually the same as making an AJAX request, room is left in the architecture to upgrade to alternative transports like web sockets.

network.Request. Represents a request made over a C3.network.Connection.

network.Response. Represents a response made over a C3.network.Connection.

parser.Parser. Abstract base class for both the expression parser and the template parser. The base class just provides the AST caching mechanism and a unified interface to the parse method. Everything else is implemented in the Template and Expression parsers.

script.Binding.

script.Context. Provides a nested context stack for use by an evaluation.

script.Evaluation. Represents the result of evaluating some C3.script.Program.

script.Program. Represents the result of parsing a given source string with a given parser.

script.Traversal.

search.Engine. Simple search engine that returns results for text queries made by the user. Configured with an environment, the engine will search in all of the Environment's configured applications, pages, types and bookmarks.

view.Component. Base class for all Components. C3.view.Component is as much about convention as it is code; it just defines a simple lifecycle that Components should adhere to and provides functionality that is shared across all Components, like hiding and showing.

In one embodiment, the UI for an application includes files, templates, tags (such as those specific to the current platform or types), stylesheets, and other file-based metadata that control the layout of the user interface and source of the content. Examples of UI types are template files, cascading style sheets (CSS), or the like. In one embodiment, platform specific templates may include an HTML5-type file that defines the layout and formatting of elements of the user interface (such as views, functions, and controls). The templates may provide this layout information to a web server when rendering types in the repository to HTML5 files. The layout and style of HTML5 pages is dynamic, which allows simultaneous support for multiple device platforms (such as Android™, Windows™, OS X™, etc.) browser types (Chrome™, Safari™, Firefox™, etc.), and versions. In one embodiment, platform specific CSS (such as C3 IoT Cascading Style Sheets 3) may include external style sheet documents (of type text/CSS) to define how HTML or XML elements and their contents should appear on various devices, apps, and browsers. In one embodiment, platform specific CSS (such as CSS3) provide rules for resolving conflicts in HTML or XML.

In one embodiment, an application logic layer may include integrated application modules or components for continuous real-time stream and batch processing. Entity types may define the application logic functions used to process data. A single type may define over one hundred functions. A function is defined by a set of input parameter types, a return type, and an implementation body. A function parameter is the association of a type with a local name that the function binds on invocation. Parameter types and return types can be of any value type or other type that is in scope.

In one embodiment, the platform services component 1006 may provide for multi-thread processing. For example, the platform services component 1006 or the system 200 may include servers having central processing units designed to execute multiple threads and each server may have multiple cores. In order to fully utilize the capacity of each machine the system 200 may run multiple threads in order to parallelize software execution and processing. The use of multi-threading provides many advantages including: efficient utilization of computing resources; multi-threading allows for the machine or machines to share their cache, leading to better cache usage or synchronization on data processing; multi-threading minimizes chances for CPU being used above capacity, leading to the highest reliability and performance of the system; if a thread cannot use all the computing resources of the CPU, running another thread can avoid leaving these idle.

In one embodiment, the platform services component 1006 includes an application cluster manager configured to automatically manage distribution and scalability of workers. The cluster manager may run on one or all cluster nodes (in some instances running on multiple servers or clusters of servers). The cluster manager may work with a cluster management agent. The management agents run on each node of the cluster to manage and configure services. The workers may be initialized by executing appropriate command-lines in the cluster manager. In one embodiment, the cluster manager may dynamically adjusts the number of workers (e.g., available processing nodes or cores) up or down based on load. When a job fails the cluster manager may detect the node being down, identify an action failure in the node, and automatically process remediation steps. In addition, the operations user may be able to easily track a worker failure by running command-lines or using backend graphical user interface.

In one embodiment, the platform services component 1006 is configured to monitor and manage system and device health. In one embodiment, the platform services component 1006 may proactively monitor comprehensive system health measures, including service and hardware heartbeats, system function performance measures, and disk and computing resource utilization. The platform services component 1006 may use available open-source and commercial monitoring tools. If any potential issues are detected, automated system fortification measures are triggered to address the issues before end-users may be affected. These measures may include allocating additional application CPU capacity if CPU utilization is determined to be unacceptably high. This may ensure that applications continue to perform responsively when system usage spikes. The measures may include adding additional back-end and data-loading processing capacity based on the size of the job queue, thereby ensuring data processing and data load jobs are efficiently processed. The measures may also include activation of automated failover if a system component fails or suffers performance deterioration, thereby ensuring that a component failure will not negatively impact end-users.

In one embodiment, the platform services component 1006 is configured to provide real-time log analysis that allows users to securely search, analyze and visualize the massive streams of log data generated by a platform and technology infrastructure—physical, virtual, and in the cloud. Due to integrated access to processes and data, troubleshooting application problems and investigating security incidents may occur in minutes instead of hours or days, which can lead to avoiding service degradation or outages and delivering compliance at lower cost while gaining new business insights. Developers can find and fix application problems faster and reduce downtime and improve collaboration between development and operations personnel or divisions of a company. Furthermore, the monitoring and data tools complements business intelligence investments with real-time insights and analytics from machine data.

The monitoring tools also allow users to centrally manage applications, users, and access rules for their enterprise cloud and easily authenticate existing users from directory services. Detailed performance, security, and usage data on all applications is centrally and easily available. Every interaction throughout the system 200 may be tracked and accessible via an API, enabling users to visualize data in their app of choice. Additional key functionality that management services of the platform services component 1006 include: see who is accessing critical business data when, and from where; understanding which application features are being used; troubleshooting and optimize performance to improve end user experience; and increasing application adoption and understanding usage patterns.

In one embodiment, the platform services component 1006 provides tools for accessing data, creating types for a type layer or abstraction layer, application development tools, and/or a plurality of other tools. In one embodiment, the platform services component 1006 includes integrated family of development tools for developers, data scientists, and project managers. In one embodiment, the tools separate and abstract the logical type model, application user interface, analytic metrics, machine learning algorithms, and programming logic from the myriad of physical data streams, persistent data stores, and individual sensor behaviors, streamlining application development to allow companies and developers to bring IoT solutions to market quickly and reliably.

In one embodiment, the tools provided by the platform services component 1006 enable analysts and developers to instantiate and extend data types and canonical types, design metrics, develop streaming and iterative analytics, launch Map reduce jobs, configure and extend existing applications and/or develop new applications using a variety of popular programming languages. Example tools include a type designer, an integration designer, application logic, a data explorer, an analytics designer, a UI designer, a provisioner, and/or a business intelligence tool.

In one embodiment, the type designer enables efficient examination, extension, and creation of data type definitions (e.g., for a type or data abstraction layer). The type designer may provide an intuitive query function allows analysts and developers to easily search and sort data types to unlock additional business insights. The integration designer enables developers to rapidly build industry-specific canonical types by extending the platform's existing type system. The application logic may be used by developers and analysts to easily build custom functions such as adding custom business rules using JavaScript, implementing Map reduce jobs to handle the heaviest data processing workloads, and publishing other custom functions as REST-based web services.

The data explorer enables analysts and designers to quickly discover insights from large data sets. The tool provides a simple user interface to sort, filter, and explore data by using analytics and user-defined search expressions. The analytics designer enables analysts and developers to rapidly prototype and refine new analytics, implement stream analytics, and visualize analytics results. This capability provides a powerful design experience combined with a distributed in-memory, machine-learning environment. This tool provides techniques for data transformation, exploratory analysis, predictive analytics, and visualization. The UI designer enables users to quickly create new applications, configure existing applications, and design user experiences. This tool offers a comprehensive library of user interface components that can be seamlessly connected to custom data sets to create visually compelling applications. The provisioner tool enables secure, efficient, and seamless application deployment. Developers use the tool to deploy new applications or extensions to existing applications into the production environment of the platform. The business intelligence tool may be used to determine business insights based on data, machine learning methods, or other services for use by companies to make decisions and identify future business opportunities or opportunities to improve business profitability.

The tools and services provided by the modular services component 206 allow and facilitate extremely powerful built-in development, deployment, and management services. With the modular services component 206, a platform can provide a complete and unified set of application development, deployment, and management services for developers to build, deploy, and operate industrial scale cyber physical applications. These services enable developers, data scientists, and business analysts to deliver applications that are ready for immediate use and can scale to meet the data processing and machine learning requirements within the enterprise.

API services provides developers with an open-cloud platform that delivers a robust set of APIs, supporting comprehensive access to data and application functions. The APIs include standard REST APIs that application developers can use to invoke functions and access data from within applications. Application logic services allow developers to seamlessly implement complex application functions by adding custom business rules using JavaScript. Industry standard REST API's allow application developers to create code to read, write, and update data that resides in both internal and external applications and data stores. With application logic services, Map reduce jobs can be launched directly from the platform (such as the system 200 of FIG. 2) to handle heavy data processing workloads. Deployment services enables users to leverage the platform for application deployment. Deployment services supports the deployment of industrial-scale IoT software applications that may require exascale data sets, gigascale sensor networks, dynamic enterprise and extraprise-scale data integration combined with rigorous analytics, data exploration, and machine learning, complex data visualization, highly scalable elastic computation and storage architectures, transaction processing requirements that may exceed millions of transactions per second, and responsive human-computer interaction. The integrated and built-in nature of these tools leads to substantial cost savings and high efficiency.

Analytics services provide users with a rules execution engine and a comprehensive set of functions for querying, transforming, and analyzing time-series data. Data scientists can author analytics applications by using a declarative expression language and evaluate analytic expressions on demand or in near real time. Example features of analytics services enable users to: continuously invoke analytics as data streams into a platform; create new rules based on new observations or ideas at any time—all without redeploying the application; combine and link together analytics to create more complex and insightful compound analytics; and build a library of rules that capture the essential items that matter to their application.

The analytics service may be executed on top of an analytics engine that provides a software and/or hardware foundation that handles data management, multi-layered analysis, and data visualization capabilities for all applications. The analytics engine is designed to process and analyze significant volumes of frequently updated data while maintaining high performance levels. In one embodiment, the analytics engine architecture includes multiple services that each handle a specific data management or analysis capability. In one embodiment, all the services are modular, and architected specifically to execute their respective capabilities for large data volumes at high speed. In one embodiment, for example: every tier in the system 200 of FIG. 2 is configured to have additional processing resources added without service interruption; every tier is operated with a surplus standby processing capacity that is monitored; system performance is architected and validated to scale linearly with the addition of further resources; and additional computing resources are automatically scaled up when needed.

The data services layer (which may be provided by the data services component 204) is responsible for persisting (storing) large volumes of data, while also making data readily available for application and analytical calculations. The data services component 204 partitions data into relational and non-relational (key/value store) databases and provides common database operations such as create, read, update, and delete. The system 200 also provides open access to external file systems, databases (i.e. Hadoop, HDFS), message queues (i.e. WebSphere MQ Series™, TIBCO BusinessWorks™) and data warehouses, such as Teradata™ or SAP Hana™. Deployment services enables users to deploy applications on and from the platform.

Workflow services enable developers to manage workflows within an application. Workflow services enable developers to maintain application state, workflow executions and to log progress, hold and dispatch tasks, and control which tasks each of application host will be assigned to execute. Developers can also quickly configure new applications, extend existing applications, and design user experiences that address specific business process requirements. In one embodiment, the UI services provide a comprehensive library of existing HTML5 user interface components that enable energy companies to leverage the extensive data integration, analytics, and visualization capabilities across web and mobile devices.

The system 200 provides a proven platform for managing massive information sets and streams. In a recent test use case, an example system securely processed real-time simulated data from 35 million sensors aggregated through 380,000 data collection points. These data aggregation points managed two-way data communications to 35 million devices that take measurements every 15 minutes. The device data scalability requirements were able to handle 3.4 billion messages per day. This test use case involved reliably capturing messages from the data aggregation points, performing message decoding, placing them on a distributed message queue and persisting in a key-value store for further processing. In real time, the system simultaneously streamed, processed, and analyzed data to continuously monitor and visualize the health of the network, detect and flag anomalies, and generate alerts.

In one embodiment, the system 200 of FIG. 2 may be built on infrastructure provided by a third party. For example, some embodiments may use Amazon Web Services™ (AWS) or other infrastructure that provides a collection of remote computing services, also called web services, providing a highly scalable cloud-computing platform. These services may be based out of various geographical regions across the world. These types of infrastructure as service products can provide large computing capacity more quickly and cheaper than a client company building an actual physical server farm.

Returning again to FIG. 2, the system 200 may include or be utilized by a plurality of applications 210. The applications 210 may form an application layer that accesses one or more of the components 202-206 for data services, analytic services, machine learning services, or other tools or services. In one embodiment, the application layer uses JavaScript or other web languages, and leverages various open libraries as well as a data services layer provided by the data services component 204. For example, a server system may provide application code to a browser, which then accesses and uses the services of the system 200 to execute applications over the web. Using an abstraction layer of the data services component 204 and machine learning, analytics, or other services provided by the modular services component 206, significantly fewer lines of code, less debugging, and improved performance can be achieved.

In one embodiment, pre-built application services help organizations accelerate the deployment and realization of economic benefits associated with enterprise-scale cyber physical information systems. Example areas related to utilities or other systems may include market segmentation and targeting, predictive maintenance, sensor health, and loss detection. The system 200 provides useful tools for information systems that include smart, connected products with embedded sensors, coupled with processors, software, and product connectivity, and elastic cloud-based software in which product data, sensor data, enterprise data, and Internet data are aggregated, stored, and analyzed and applications run. These information systems, combined with new social-human computer interaction models, may drive future improvements in productivity.

Pre-built applications that are built into a system 200 may vary significantly. However, some example platform applications, which may be used by energy, manufacturing, or other companies, include a predictive maintenance application, sensor network health application, asset investment planning application, loss detection application, market segmentation and targeting application, and/or a customer insight application. Custom applications may include application developed specifically by a customer on top of the system 200. Example applications for the energy industry include connected home applications, connected building applications, smart city applications, smart water applications, and digital oil field applications. Further example applications and details are discussed further below.

In one embodiment, the system 200 provides an analytics engine that operates on distributed computing resources providing an elastically scalable solution. The distributed computing process executes jobs synchronously and asynchronously where a master (a hardware node or a virtual machine) coordinates jobs across workers (hardware nodes or virtual machines). In one embodiment, workers pull requests from job queues (or clients), and execute on the jobs until completion.

Figure 15:
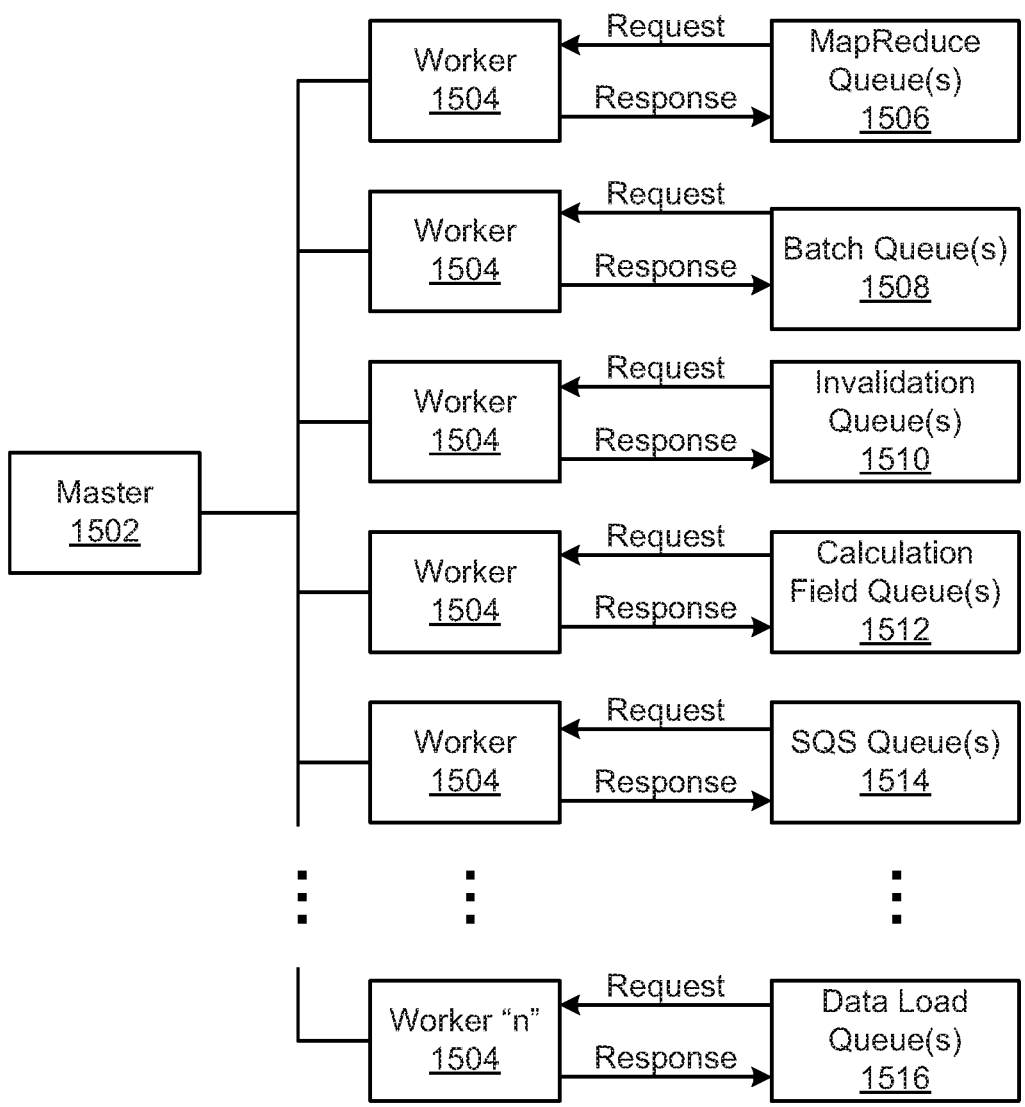
FIG. 15 is a schematic block diagram illustrating an elastic computing environment, according to one embodiment.

FIG. 15 illustrates a schematic diagram of one embodiment of an elastic distributed computing environment. The diagram illustrates a master 1502 and a plurality of workers 1504. The master 1502 and/or workers 1504 may represent separate hardware nodes and/or virtual machines. The workers 1504 may be configured to process messages in corresponding queues, which may include a Map reduce queue 1506, a batch queue 1508, an invalidation queue 1510, a calculation field queue 1512, a simple queue service (SQS) queue 1514, a data load queue 1516, and/or any other queues. Although FIG. 15 shows a single worker 1504 per queue, there may be more than one worker 1504 per queue or more than one queue per worker 1504 without departing from the scope of the disclosure. A master 1502 monitors a plurality of workers 1504, and manages the execution and completion of jobs. The master 1502 may also handle signals and notify workers 1504 to execute jobs. The master 1502 monitors logs for the workers 1504 and initiates and terminates workers 1504 based on a current computing or work load. The master 1502 may also handle reconfiguration and updates of the workers 1504. The workers 1504 may process processes client requests and handles connections for corresponding queues. The workers 1504 are configured to process commands from the master 1502 and may be configured by the master 1502.

In one embodiment, to ensure high availability of the system 200, redundancy and automatic failover for every component is provided. Furthermore, the system 200 may load-balance at every tier in the infrastructure, from the network to the database servers. In one embodiment, application server clusters are configured to ensure that individual servers can fail and be seamlessly switched out without interrupting the end-user experience. Database servers are similarly clustered for failover. Each device in the network has a failover backup to ensure maximum uptime. Dedicated routers and switches feature redundant power and Internet connections. In one embodiment, component failover is automatic and does not require any manual intervention. Moreover, as soon as a component failure is detected, staff may be alerted to diagnoses the failure and add additional component resources to maintain overall system redundancy.

In at least one embodiment, enterprise Internet-of-Things application development platforms disclosed herein are implemented as a PaaS solution hosted in the cloud. The enterprise Internet-of-Things application development platform may provide analytical applications for data management that are built on a robust architecture. The enterprise Internet-of-Things application development platform can be a comprehensive design, development, provisioning, and operating platform for deploying industrial-scale Internet-of-Things (IoT) PaaS applications. The enterprise Internet-of-Things application development platform can enable the rapid deployment of PaaS applications that process highly dynamic petascale data sets, gigascale sensor networks, enterprise and extraprise information system integration combined with rigorous predictive analytics, data exploration, machine learning, complex data visualization requiring responsive design. The enterprise Internet-of-Things application development platform can integrate production data from hundreds of independent data sources and tens of millions of sensors aggregated into petabyte scale data sets using highly scalable elastic computation and storage architectures to provide processing capabilities that, for example, exceed 1.5 million transactions per second. The enterprise Internet-of-Things application development platform can be utilized in any suitable industry or industries, such as energy (e.g., utilities, oil and gas, solar, etc.) healthcare, transportation (e.g., automotive, airline, etc.), etc. In various embodiments, the enterprise Internet-of-Things application development platform can be utilized for applications that relate to an industry or that span a combination of industries. Accordingly, while some examples discussed herein may expressly relate to certain referenced industries, the present technology can apply to many other industries not expressly specified without departing from the scope of the disclosure.

The enterprise Internet-of-Things application development platform can provide capabilities across myriad industries in a variety of situations. As just one example, the enterprise Internet-of-Things application development platform can predict failures to allow for proactive measures to avoid damage and injury. For instance, with respect to the oil and gas industry or sector, the enterprise Internet-of-Things application development platform can receive and analytically process surface and wellbore data, dynamometer data, maintenance records, well test data, equipment information, and well information in order to predict equipment failure before the equipment fails. In another instance, with respect to the automotive industry or sector, the enterprise Internet-of-Things application development platform can capture all of the sensor data in a car, car manufacturing data, external data, and use machine learning to predict a car failure before the car fails. Many other examples of the capabilities of the enterprise Internet-of-Things application development platform are possible.

The enterprise Internet-of-Things application development platform can be used for many critical functions and tasks. As just one example, with respect to the energy industry in particular, the enterprise Internet-of-Things application development platform can be used to develop application solutions including predictive maintenance, energy theft prevention, load forecasting, volt/var, capital asset allocation and planning, customer segmentation and targeting, customer insight, behavioral energy efficiency programs, generation analytics, well completion analytics and refinery optimization.

The enterprise Internet-of-Things application development platform in accordance with embodiments of the disclosure and technology provides a myriad of benefits. In an embodiment, as a PaaS implementation, users of the enterprise Internet-of-Things application development platform do not have to purchase and maintain hardware or purchase and integrate disparate software packages, reducing upfront costs and the upfront resources required from IT resources, such as an IT team or outside consultants. The enterprise Internet-of-Things application development platform can be delivered "out-of-the box," reducing the need to define and produce precise and detailed requirements. The enterprise Internet-of-Things application development platform may leverage industry best practices and leading capabilities for data integration, which reduces the time required to connect to required data sources. Software maintenance updates and software upgrades may be "pushed" to users of the enterprise Internet-of-Things application development platform automatically, thereby ensuring that software updates are available to users as quickly as possible.

The enterprise Internet-of-Things application development platform in accordance with embodiments of the disclosure and technology provides various capabilities and advantages for an enterprise. Smart sensor and meter investment can be leveraged to derive accurate predictive models of behavior, performance, or operations relating to the enterprise. Industry data can be compiled and aggregated into consolidated and consistent views. Industry data can be modeled and forecasted across various locations and scenarios. Industry data can be benchmarked against industry standards as well as internal benchmarks of the enterprise. The performance of one component or aspect of operations of an enterprise can be compared to identify outliers for potential responsive measures (e.g., improvements). The effectiveness of responsive measures can be tracked, measured, and quantified to identify those that provide the highest impact and greatest return on investment. The allocation of the costs and benefits of improvements among all stakeholders can be analyzed so that the enterprise, as well as broader constituents, can understand the return on its investments and to otherwise optimize enterprise operations.

Figure 16:
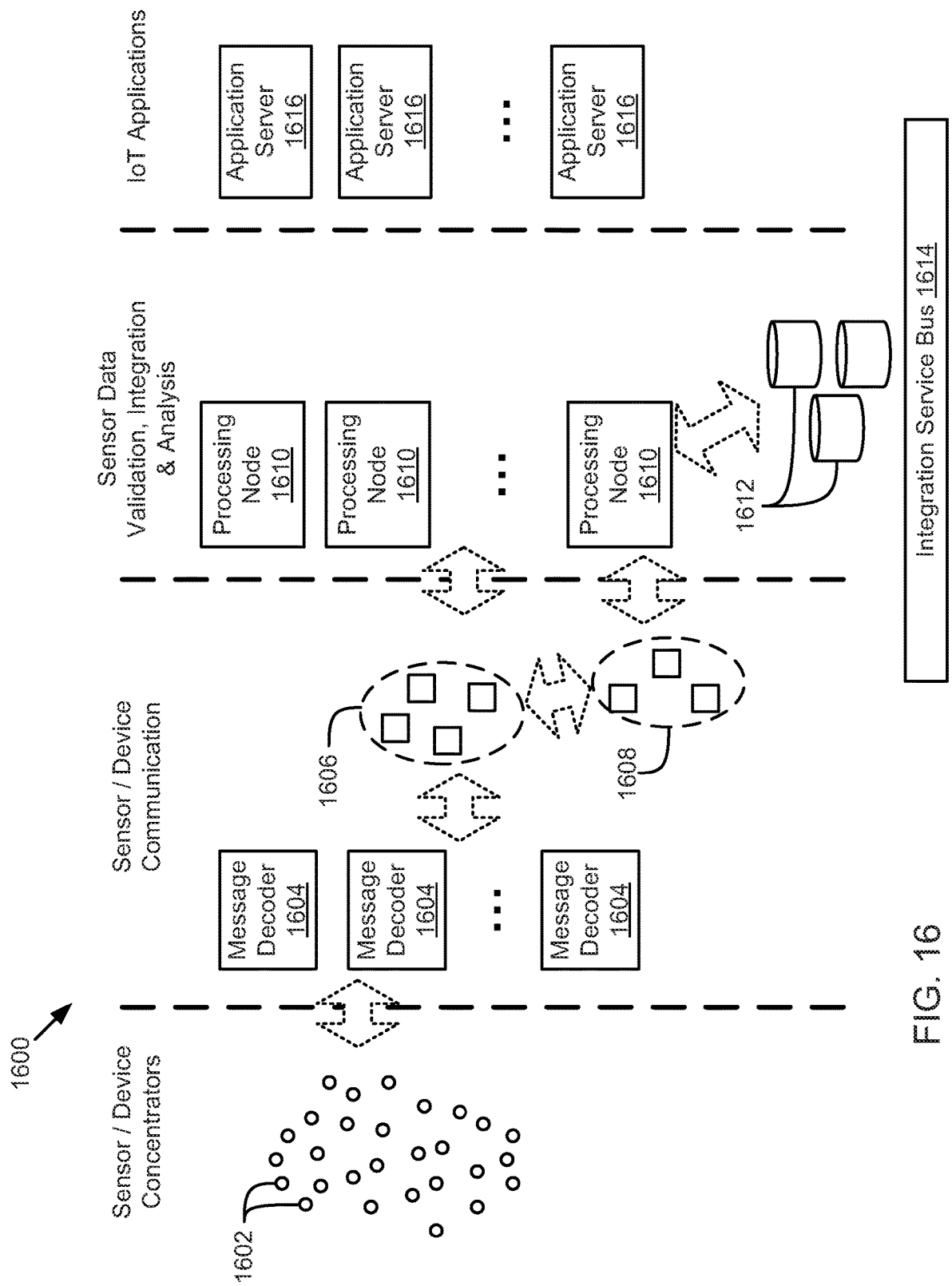
FIG. 16 is a schematic block diagram illustrating a sensor network for an enterprise Internet-of-Things platform system, according to one embodiment.

FIG. 16 is a schematic diagram illustrating one embodiment of hardware (which may include a sensor network) of a system 1600 for providing an enterprise Internet-of-Things application development platform. In one embodiment, the system 1600 may provide a platform for application development and/or machine learning for a device network including any type of sensor/device and for any type of industry or company, such as those discussed elsewhere herein. In one embodiment, the system 1600 may provide any of the functionality, services, or layers discussed in relation to FIGS. 2-15 such as data integration, data management, multi-tiered analysis of data, data abstraction, and data visualization services and capabilities. For example, the system 1600 may provide any of the functionality, components, or services discussed in relation to the integration component 202, data services component 204, and/or modular services component 206 of FIG. 2.

In one embodiment, the system 1600 can be split into four phases, including a sensor/device concentrator phase; a sensor/device communication phase; a sensor data validation, integration, and analysis phase; and an IoT application phase. These phases enable data storage and services, which may be accessed by a plurality of IoT applications. In one embodiment, the concentrators 1602 include a plurality of devices, computing nodes, or access points that receive time-series data from smart devices or sensors, such as intelligent appliances, wearable technology devices, vehicle sensors, communication devices on a mobile network, smart meters, or the like. One embodiment specific to smart meters is discussed in relation to FIGS. 19-29. Similar subsystems may be used for a wide variety of other types of sensors or IoT systems. In one embodiment, each sensor/device concentrator 1602 may receive time-series data (such as periodic sensor readings or other data) from a plurality of sensors or smart devices. For example, each sensor/device concentrator 1602 may receive data from any from hundreds to hundreds of thousands of smart devices or sensors. In one embodiment, the concentrators 1602 may provide two way communication between a system and any connected devices or sensors. Thus, the sensor/device concentrators 1602 may be used to change settings, provide instructions, or update any smart devices or sensors.

The sensor/device communication phase reliably captures messages from the sensor/device concentrators 1602, perform basic decoding of those messages, and places them on a distributed message queue. The sensor/device communication phase may utilize message decoders 1604, which may include light-weight, elastic multi-threaded listeners capable of processing high throughput messages from the concentrators 1602 and decoding/parsing the messages for placement in a proper queue. The message decoders 1604 may process the messages and place them in distributed queues 1606 awaiting further processing. The distributed queues 1606 may include redundant, scalable infrastructure for guaranteed message receipt and delivery. The distributed queues 1606 may provide concurrent access to messages and/or high reliability in sending and retrieving messages. The distributed queues 1606 may include multiple readers and writers so that there are multiple components of the system that are enabled to send and receive messages in real-time with no interruptions. The distributed queues 1606 may be interconnected and configured to provide a redundant, scalable infrastructure for guaranteed message recipient and delivery.

In one embodiment, stream processing nodes 1608 may be used to process messages within the distribute queues 1606. For example, the stream processing nodes 1608 may perform analysis or calculations discussed in relation to the stream processing services of the continuous data processing component 1004 of the modular services component 206. The stream processing performed by the stream processing nodes 1608 may detect events in real-time. In one embodiment, the stream processing nodes do not need to wait until data has been integrated, which speeds up detection of events. There may be some limits to stream processing, such as a limited window of data available and limited data from other sources systems (e.g., from data that has already been persisted or abstracted by a data services component 204). For example, there may be no context for meter data (such as customer classification, spend history, or the like). This context may require integration of data from other systems, which may occur subsequently in a downstream processing phase. The stream processing nodes 1608 may support asynchronous and distributed processing with autonomous distributed workers. In one embodiment, the distribute queues 1606 are configured to handle sequencing information in queuing messages and are configurable on a per queue basis. Per queue basis configuration settings enable operators to configure settings and easily modify queue parameters.

Returning to the message decoders 1604, message decoding may be performed across an elastic tier of servers to allow handling of the arrival and decoding of hundreds or thousands of simultaneous messages. The number of servers available to handle the arrival and decoding of messages can be configured as required, taking advantage of elastic cloud computing. This component of the system architecture may be designed to scale-out (like most other parts of the proposed architecture). Message decoding may be implemented by logic (i.e. java code) to interpret the content of a received message.

The distributed queues 1606 may operate as durable queues that retain a copy of messages. In one embodiment, a copy of the messages must be kept on the file system for an agreed upon period of time (e.g., up to about 5 years), for troubleshooting purposes and in case of disputes with customers or third parties. This backup may not be meant to be used by the system under normal circumstances.

In one embodiment, the sensor/device communication phase of the system 1600 may be used for outbound message delivery, for example, to the concentrators 1602 and any connected sensors or smart devices. In one embodiment, messages are delivered from a data persistence tier to the concentrators 1602 to acknowledge receipt and/or a validation state of a message. In one embodiment, durable subscription for outbound messages allows light transaction semantics for message processing; ensuring messages are only removed from the queue once confirmation of message deliver is acknowledged.

In addition to collecting time-series, sensor data, or smart device data, the head-end phase may also include a separate pipeline for gathering relational data or other non-time-series data that is available from other sources.

The sensor data validation, integration, and analysis phase may involve processing, persistence, and analysis of the data received from the concentrators 1602 by one or more processing nodes 1610. In the sensor data validation, integration, and analysis phase, one or more of the processing nodes 1610 persists the smart device or sensor data into storage 1612. In one embodiment, meter data or other time-series data may be stored in a storage 1612, including a high-throughput, distributed key-value data store. The distributed key/value store may provide reliability and scalability with an ability to store massive volumes of datasets and operate with high reliability. The key/value store may also be optimized with tight control over tradeoffs between availability, consistency, and cost-effectiveness. The data persistence process may be designed to take advantage of elastic computer nodes and scale-out should additional processing be required to keep up with the arrival rate of messages onto the distributed queues 1606.

The storage 1612 may include a wide variety of database types. For example, distributed key-value data stores may be ideal for handling time-series and other unstructured data. The key-value data stores may be designed to handle large amounts of data across many commodity servers and may provide high availability with no single point of failure. Support for clusters spanning multiple datacenters with asynchronous master-less replication allows for low latency operations for all clients, which may be deal for handling time-series and other unstructured data. Relational data store may be used to store and query business types with complex entity relationships. Multi-dimensional data stores may be used to store and access aggregates including aggregated data that is from a plurality of different data sources or data stores.

The processing nodes 1610 may perform validation, estimation, and editing or other operations on sensor or smart device data. In one embodiment, the data validation rules may be used to determine whether the data is complete (e.g., whether all fields are filled in or have proper data). If there is data missing, estimation may be used to fill in the missing fields. For example, interpolation, an average of historical data, or the like may be used to fill in missing data. Estimation is often very specific to a message type, smart device type, and/or sensor type. The processing nodes 1610 may also perform transformation on received data to ensure that it is stored and made available in accordance with a data model, such as a canonical data model. In one embodiment, the processing nodes 1610 may perform any of the operations discussed with regard to the integration component 202, data services component 204, and/or modular services component 206. For example, the processing nodes 1610 may perform stream, batch, iterative, or continuous analytics processing of the stored or received data. Additionally, the processing nodes 1610 may perform machine learning, monitoring, or any other processing or modular services discussed in the disclosure.

In one embodiment, the hardware of the sensor/device communication phase and/or the sensor data validation, integration, and analysis phase may be exposed and configured to communicate with an integration service bus 1614. The integration service bus 1614 may include or communicate with other systems, such as a customer system, enterprise system, operational system, a custom application, or the like. For example, data may be published to or accessible via the integration service bus 1614 so that data may be easily accessed or shared by any systems of an organization or enterprise.

The received data and/or the data stored in storage 1612 may be used in an IoT application phase for processing, analysis, or the like by one or more applications. Application servers 1616 may provide access to APIs for access to the data and/or to processing nodes 1610 to provide any data, processing, machine learning, or other services provided discussed in relation to the system 200 of FIG. 2. In one embodiment, the application servers 1616 may serve HTML5, JavaScript code, code for API calls, and/or the like to client web browsers to execute applications or provide interfaces for users to access applications.

The system 1600 provides a data access layer (e.g., such as a data services layer provided by the data services component 204) that enables an organization to develop against a unified type framework across all storage 1612. In one embodiment, the system 1600 also provides elastic, parallel batch processing. Elastic batch processing clusters may easily shrink or expand to match batch processing volumes based on data volume and business requirements. Parallel batch processing may enable multiple batch processing clusters while accessing the same or different data sets. Flexible input and output connectors for batch processing and data storage may be provided.

Figure 17:
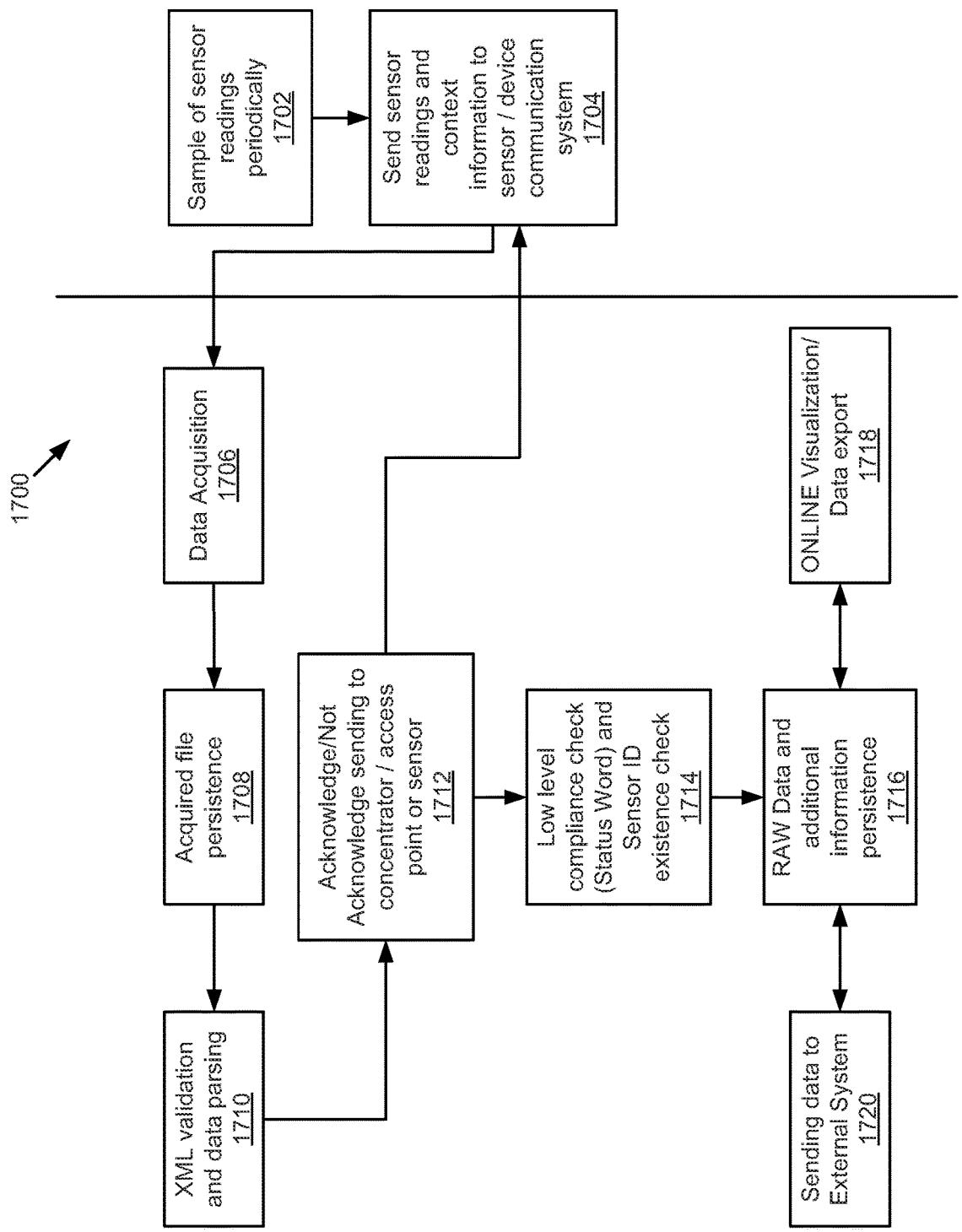
FIG. 17 is a schematic sequence diagram illustrating a usage scenario for data acquisition, according to one embodiment.

FIG. 17 illustrates one usage scenario 1700 for data acquisition from the sensor/device concentrators 1602 of the system 1600. In one embodiment, data may be acquired from the sensor/device concentrators 1602 on a periodic basis, such as every fifteen minutes, hourly, daily, or the like, event basis, or any other basis. At 1702, a sensor/device obtains a sensor or other reading on the periodic basis (e.g., every hour). At 1704 a sensor/device concentrator sends sensor readings and context information to a sensor/device communication system. Each concentrator, access point, or sensor may send one or more XML files to the sensor/device communication system (e.g., in the sensor/device communication phase of the system 1600 of FIG. 16).

At 1706, the sensor/device communication system acquires the data from the sensor/device concentrators. At 1708, the data is persisted in a file, such as within random access memory (RAM) or within long-term storage. In one embodiment, XML files are persisted as they come from the sensor/device concentrators in a file system for troubleshooting or other offline checks. In one embodiment, the sensor/device communication system receives the XML from all sensor/device concentrators installed in the field.

At 1710, the file or data is validated and parsed. At 1712 the sensor/device communication system sends an acknowledge (ACK) or not acknowledge (NACK) to the sensor/device concentrators to indicate whether the data was received. For example, once the message is received, validated, and parsed the sensor/device communication system may send an ACK to the concentrator in order to mark the data as received and not to apply retry logic. The ACK should only be sent if it is sure that the parsed message is not going to be lost at later stages of processing. If the message is not received correctly, a NACK is sent back to tell the concentrator to resend the message. At 1714, the sensor/device communication system performs a low level compliance check. For example, the sensor/device communication system may check a status word or may perform a sensor ID existence check.

At 1716, RAW data is persisted, such as in a corresponding database or data store (such as key-value store). At 1718, the data is available to applications and/or presented online in a visualization or data export. One embodiment may support hundreds of simultaneous users for read-only access (such as administrators or consumers). At 1720, the data is sent to an external system. For example, the data may be sent right after processing, at a scheduling time, and/or in response to a specific request. The data may be sent in raw or aggregated (or processed) format to an external or third party system.

Figure 18:
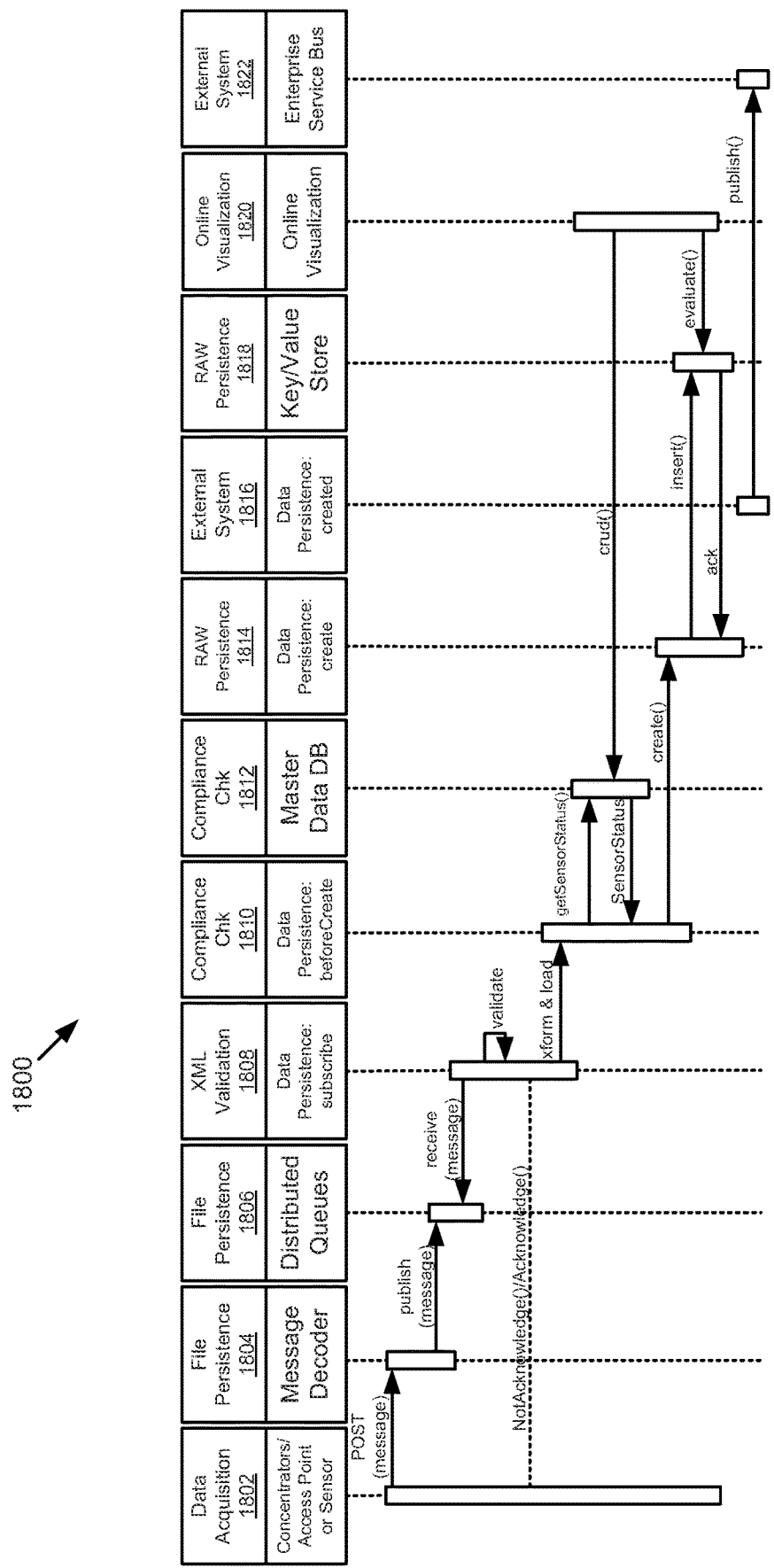
FIG. 18 is a schematic sequence diagram illustrating another usage scenario for data acquisition, according to one embodiment.

FIG. 18 is a sequence diagram illustrating a process 1800 for data acquisition from sensor/device concentrators. The process 1800 may be performed by the system 1600. The process 1800 may represent an alternate view of the usage scenario 1700 of FIG. 17.

At 1802, each sensor or device sends one or more XML documents to a concentrator, which in-turn sends the message, using a POST message, to the sensor/device communication system for storage and processing. At 1804, once the message has been received by the sensor/device communication system, a message decoder reliably captures the messages. At 1806, the message decoder places them, using a publish message, on a distributed message queue for downstream processing.

At 1808, a persistent process subscribes to the distributed queues in order to validate, transform and/or load data originating from sensor/device concentrators. Message validation may include of XML schema validation, ensuring that the structure of the message is compliant with schema and can properly transformed and/or loaded. If the message is valid, it may be transformed (xform) and persisted, at 1810, to the key-value store. An ACK message may be sent to a concentrator telling it to remove the message once the message has been successfully persisted in the queue. If the message is invalid, it may be placed on a queue for later analysis and a NACK may be sent back to tell the concentrator to resend the message. In one embodiment, durable queues may be used for all message processing. Most modern queue managers can configured to retain a copy of the message. A copy of the messages may be kept on a file system for an agreed upon period of time for troubleshooting purposes and in case of disputes with customers or third parties. This backup is not meant to be used by the system under normal circumstances.

At 1810, a data persistence node performs a compliance check and processes the data. At 1814, 1816, and 1818, the sensor/device data may be persisted in a high throughput distributed key-value data store. It is often necessary to perform various actions at different stages of a persistent type's lifecycle. Data persistence processes include a variety of callbacks methods for monitoring changes in the lifecycle of persistent types. These callbacks can be defined on the persistent classes themselves and on/or non-persistent listener classes. In one embodiment, each persistence event has a corresponding callback method. Application developers can register event handlers to persistent events through annotations to specify the classes and lifecycle events of interest. Before the message contents are persisted, the system may verify an ID of a sensor or device, or a status word. If the status word is not changed, it may not be present in acquired data. Hence the system must retrieve the sensor status word from a relational database (getSensorStatus( ) at 1810). The system may update the sensor readings (SensorStatus at 1812) as valid or invalid depending on the status word. At 1814 and 1818, the system persists valid and invalid sensor readings in the key/value store, including all additional information about processing and status word values.

At 1820, the data is published or made available for online visualization. In one embodiment, users have the ability search and view sensor data from relational and key/value stores. In one embodiment, optimized online visualization is accomplished by making the system 1600 service enabled, with key services available as REST endpoints. At 1816 and 1822, the data may be published (using a publish( ) message) to an integration service bus (ISB). For publishing in response to a specific request, the system 1600 architecture may provide robust support for unscheduled extraction and publishing jobs. Extraction jobs may be implemented using the Map reduce programming model or system defined actions whose responsibility is to extract data from the system 1600 and publish it to the integration service bus. Map reduce jobs may be implemented such that the input requests can be naturally parallelized and distributed to a set of worker nodes for execution. Each worker node may then publish their dataset to the integration service bus. Map reduce jobs may be implemented in Java, JavaScript, or other languages. Custom actions may be implemented in Java or JavaScript and can be implemented for requests that cannot be easily parallelized.

For publishing at scheduled times, scheduled delivery of data to the enterprise service can be enabled using a combination of an enterprise scheduler (i.e. CRON) and internal processing functions. The role of the scheduler is to periodically invoke extraction jobs in the platform that can publish data to the bus.

The data may be published to an external or third party system, or be capable of providing them upon request with response times compatible with interactive web applications. The system 1600 may provide a set of REST APIs that enable third party applications to query and access data by sensor, concentrator, time window, and data/measurement type. The REST API may support advanced modes or authentication such as OAuth 2.0 and token based authentication.

The embodiments of FIGS. 19-29 illustrate one example of adaption/usage of the system 200 or system 1600 for smart metering for an electrical utility company. One of skill in the art will understand that the teaching provided in relation to FIGS. 19-29 is illustrative only and may to apply or be modified to apply to sensor data networks of any type or for any industry.

Figure 19:
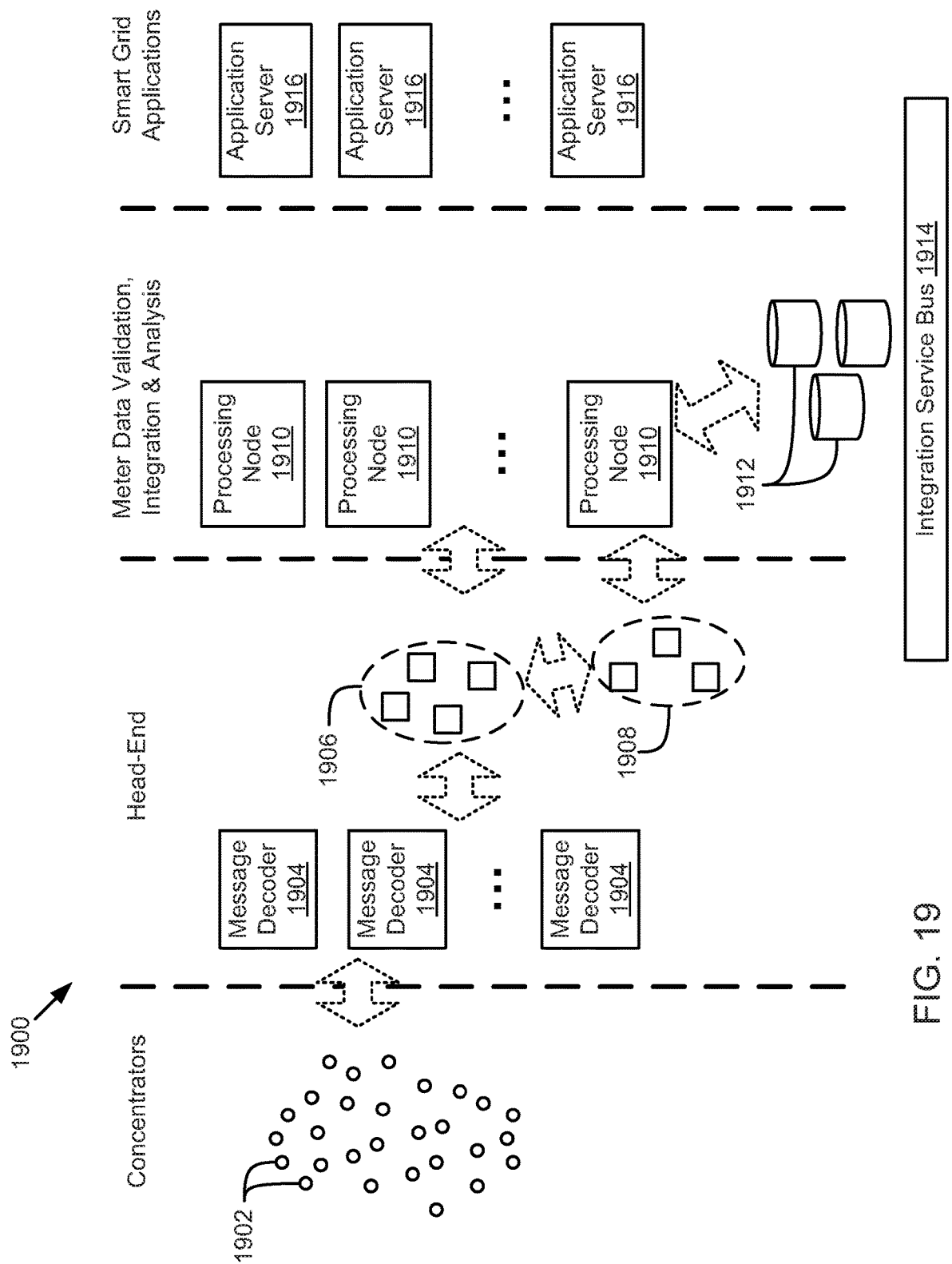
FIG. 19 is a schematic block diagram illustrating a sensor network for an enterprise Internet-of-Things platform system, according to one embodiment.

FIG. 19 is a schematic diagram illustrating one embodiment of hardware (which may include a sensor network) of a system 1900 for providing an enterprise Internet-of-Things application development platform for smart metering. In one embodiment, the enterprise Internet-of-Things application development platform for smart metering is for an energy company in the energy industry. In one embodiment, the system 1900 may provide any of the functionality, services, or layers discussed in relation to FIGS. 2-15 such as data integration, data management, multi-tiered analysis of data, data abstraction, and data visualization services and capabilities. For example, the system 1900 may provide any of the functionality, components, or services discussed in relation to the integration component 202, data services component 204, and/or modular services component 206 of FIG. 2.

In one embodiment, the system 1900 can be split into four phases, including a concentrator phase; a head-end phase; a meter data validation, integration, and analysis phase; and a smart grid application phase. These phases enable data storage and services, which may be accessed by a plurality of smart grid applications. In one embodiment, the concentrators 1902 include a plurality of devices or computing nodes that receive time-series data from smart devices or sensors. For example, the concentrators 1902 may include low voltage managers (LVMs) that are located in secondary substations of a grid or electric utility system. The concentrators 1902 may receive data from smart meters, such as electric, gas or other meters located with customers and forward it on to a plurality of message decoders 1904 for the head-end phase. Similar subsystems may be used for other types of sensors or IoT systems. In one embodiment, each concentrator 1902 may receive time-series data (such as periodic meter readings) from a plurality of smart meters. For example, each concentrator 1902 may receive data from any from hundreds to hundreds of thousands of smart devices or sensors. In one embodiment, the concentrators 1902 may provide two way communication between a system and any connected devices. For example, LVMs may provide two way communications between the system 200 of FIG. 2 and any connected smart meters. Thus, the concentrators 1902 may be used to change settings, provide instructions, or update any smart devices or sensors. In one test, a concentrator system was built and tested, which handled real-time data securely from 380,000 LVMs in secondary substations. Those LVMs managed two-way data communications to 35 million smart meters.

The head-end phase reliably captures messages from the concentrators 1902, perform basic decoding of those messages and place them on a distributed message queue. The head-end phase may utilize message decoders 1904, which include light-weight, elastic multi-threaded listeners capable of processing high throughput messages from the concentrators 1902 and decoding/parsing the messages for placement in a proper queue. The message decoders 1904 may process the messages and place them in distributed queues 1906 awaiting further processing. The distributed queues 1906 may in include redundant, scalable infrastructure for guaranteed message receipt and delivery. The distributed queues 1906 may provide concurrent access to messages, high reliability in sending and retrieving messages. The distributed queues 1906 may include multiple readers and writers so that there are multiple components of the system that are enabled to send and receive messages in real-time with no interruptions. The distributed queues 1906 may be interconnected and configured to provide a redundant, scalable infrastructure for guaranteed message recipient and delivery.

In one embodiment, stream processing nodes 1908 may be used to process messages within the distribute queues 1906. For example, the stream processing nodes 1908 may perform analysis or calculations discussed in relation to the stream processing services of the continuous data processing component 1004 of the modular services component 206. The stream processing performed by the stream processing nodes 1908 may detect events in real-time. In one embodiment, the stream processing nodes do not need to wait until data has been integrated, which speeds up detection of events. There may be some limits to stream processing, such as a limited window of data available and limited data from other sources systems (e.g., from data that has already been persisted or abstracted by a data services component 204). For example, there may be no context for meter data (such as customer classification, spend history, or the like). This context may require integration of data from other systems, which may occur subsequently in a downstream processing phase. The stream processing nodes 1908 may support asynchronous and distributed processing with autonomous distributed workers. A potential stream processing engine, which may be adapted for use in the head-end phase, includes Kinesis™, which can process real-time streaming data at massive scale and can collect and process hundreds of terabytes of data per hour from hundreds of thousands of sources. In one embodiment, the distribute queues 1906 are configured to handle sequencing information in queuing messages and are configurable on a per queue basis. Per queue basis configuration settings enable operators to configure settings and easily modify queue parameters.

Returning to the message decoders 1904, message decoding may be performed across an elastic tier of servers to allow handling of the arrival and decoding of hundreds or thousands simultaneous messages. The number of servers available to handle the arrival and decoding of messages can be configured as required, taking advantage of elastic cloud computing. This component of the system architecture is designed to scale-out (like most other parts of the proposed architecture). Message decoding may be implemented by logic (i.e. java code) to interpret the content of a received message. Listeners may capture messages from the concentrators 1902, which may be implemented as HTTP web servers (i.e., using Jetty™ or Weblogic™)

The distributed queues 1906 may operate as durable queues that retain a copy of messages. In one embodiment, a copy of the messages must be kept on the file system for an agreed upon period of time (e.g., up to about 5 years), for troubleshooting purposes and in case of disputes with customers or third parties. This backup is not meant to be used by the system under normal circumstances.

In one embodiment, the head-end phase of the system 1900 may be used for outbound message delivery, for example, to the concentrators 1902 and connected smart devices. In one embodiment, messages are delivered from a data persistence tier to the concentrators 1902 to acknowledge receipt and/or a validation state of a message. In one embodiment, durable subscription for outbound messages allows light transaction semantics for message processing; ensuring messages are only removed from the queue once confirmation of message deliver is acknowledged.

In addition to collecting time-series, sensor data, or smart device data, the head-end phase may also include a separate pipeline for gathering relational data or other non-time-series data that is available from other sources.

The meter data validation, integration, and analysis phase may involve processing, persistence, and analysis of the data received from the concentrators 1902 by one or more processing nodes 1910. In the meter data validation, integration, and analysis phase, one or more of the processing nodes 1910 persists the meter or sensor data into storage 1912. In one embodiment, meter data or other time-series data may be stored in a storage 1912, including a high-throughput, distributed key-value data store. The distributed key/value store may provide reliability and scalability with an ability to store massive volumes of datasets and operate with high reliability. The key/value store may also be optimized with tight control over tradeoffs between availability, consistency, and cost-effectiveness. The data persistence process is designed to take advantage of elastic computer nodes and scale-out should additional processing be required to keep up with the arrival rate of messages onto the distributed queues 1906. The storage 1912 may include a wide variety of database types. For example, distributed key-value data stores may be ideal for handling time-series and other unstructured data. The key-value data stores may be designed to handle large amounts of data across many commodity servers, may provide high availability with no single point of failure. Support for clusters spanning multiple datacenters with asynchronous master-less replication allows for low latency operations for all clients. Ideal for handling time-series and other unstructured data. Relational data store may be used to store and query business types with complex entity relationships. Multi-dimensional data stores may be used to store and access aggregates including aggregated data that is from a plurality of different data sources or data stores. Table 1, below maps data elements to data stores, according to one embodiment:

TABLE 1

| Example Data Elements | Data Store |
| --- | --- |
| Network Configuration/Topology | RDBMS |
| Meter issues log | RDBMS |
| Meter Measurements | Queueing |
| Meter Measurements Actual, Estimated Validated | Key-Value Store |
| Billing Determinants | Key-Value Store |
| Meter Assets | RDBMS |
| Operational Reports | Multi-Dimensional Data Store |
| Regional NTL Analysis | Multi-Dimensional Data Store |
| Fraud Leads | RDBMS |
| Predictive Maintenance Leads | RDBMS |
| Load Forecast (Time-series) | Key-Value Store |
| Work Orders | RDBMS |
| Customer Information | RDBMS |
| Asset Information | RDBMS |

The processing nodes 1910 may perform validation, estimation, and editing (VEE) of the meter data. In one embodiment, the meter data validation rules are typical of the rules traditionally applied by a meter data management system. These rules may include determining whether the data is complete (e.g., whether all fields are filled in or have proper data). If there is data missing, estimation may be used. For example, interpolation, an average of historical data, or the like may be used to fill in missing data. The processing nodes 1910 may also perform transformation on received data to ensure that it is stored and made available in accordance with a data model, such as a canonical data model. The processing nodes or other systems may correlate the meter data (or other time-series data) with data from other source systems (such as an of the other data sources 208 discussed herein) and subsequent analysis of the data. In one embodiment, the processing nodes 1910 may perform any of the operations discussed with regard to the integration component 202, data services component 204, or modular services component 206. For example, the processing nodes 1910 may provide stream, batch, iterative, or continuous analytics processing of the stored or receive data. Additionally, the processing nodes 1910 may perform machine learning, monitoring, or any other processing or modular services discussed in the disclosure.

In one embodiment, the hardware of the head-end phase and/or the meter data validation, integration, and analysis phase may be exposed and configured to communicate with an integration service bus 1914. The integration service bus 1914 may include or communicate with other systems, such as a customer system, enterprise system, operational system, a custom application, or the like. For example, integration with a workforce management system (WMS) may be required to initiate field work based on detected events or predictive maintenance analysis. For example, data may be published to or accessible via the integration service bus 1914 so that data may be easily accessed or shared by any systems of an organization or enterprise.

The received data and/or the data stored in storage 1912 may be used in a smart grid application phase for processing, analysis, or the like by one or more applications. Application servers 1916 may provide access to APIs for access the data and/or processing nodes 1910 to provide any data, processing, machine learning, or other services provided by the system 200 of FIG. 2. In one embodiment, the application servers 1916 may serve HTML5, JavaScript code, code for API calls, and/or the like to client web browsers to execute applications or provide interfaces for users to access applications.

Example smart grid applications include a customer engagement application, a real-time or near real-time billing application (e.g., energy use and spend up-to-date within 15 minutes), a non-technical loss application, an advance meter infrastructure (AMI) operation application, a VEE application, or any other custom or platform application. Other examples might include data analysis for meter malfunction, fraud, distribution energy balance, or customer energy use disaggregation, benchmarking, and energy efficiency recommendations.

The system 1900 provides a data access layer (e.g., such as a data services layer provided by the data services component 204) that enables an organization to develop against a unified type framework across all storage 1912. Commercial object-relational mapping data access frameworks such as Hibernate™ may be used to prepare the data access frameworks. There are, however, trade-offs to consider related to the level of control for data access performance optimization. Master data should be accessed and updated using service oriented architecture principles to expose features as services accessible over VPN. Aggregate data may be stored in the multi-dimensional database (rather than key-value store corresponding to meter readings or other time-series data). The multi-dimensional database used for business intelligence or reporting may be kept consistent with the key-value store and RDBMS as it is updated through the data access layer. Real-time requirements (i.e. control room dashboard) should be serviced directly from stream services, such as stream services provided in the head-end phase or meter data validation, integration, and analysis phase. Data can be processed using Map reduce frameworks or using stream processing or iterative processing.

With regard to general architecture considerations, processing of meter or other grid sensor time-series data poses systems scaling requirements that the elasticity of cloud services are uniquely positioned to address. Auto-scaling can be used to address high variability in data ingestion rates as a result of hard to anticipate meter and other sensor event data. The system 1900 also provides horizontal scalability by distributing system and application components across commodity compute nodes (as opposed to vertical scaling which requires investing in expensive more powerful computers to scale-up). The system 1900 may utilize elastic cloud infrastructure that enables the infrastructure to be closely aligned with the actual demand thereby reducing cost and increasing utilization. In one embodiment, the system 1900 provides a virtual private cloud that logically isolates sections of cloud infrastructures where an organization can launch virtual resources in a secure virtual network. Direct or virtual private network (VPN) connections can be established between the cloud infrastructure and a corporate data center.

In one embodiment, the system 1900 also provides elastic, parallel batch processing. Elastic batch processing clusters may easily shrink or expand to match batch processing volumes based on data volume and business requirements. Parallel batch processing may enable multiple batch processing clusters while accessing the same or different data sets. Flexible input and output connectors for batch processing and data storage may be provided.

Figure 20:
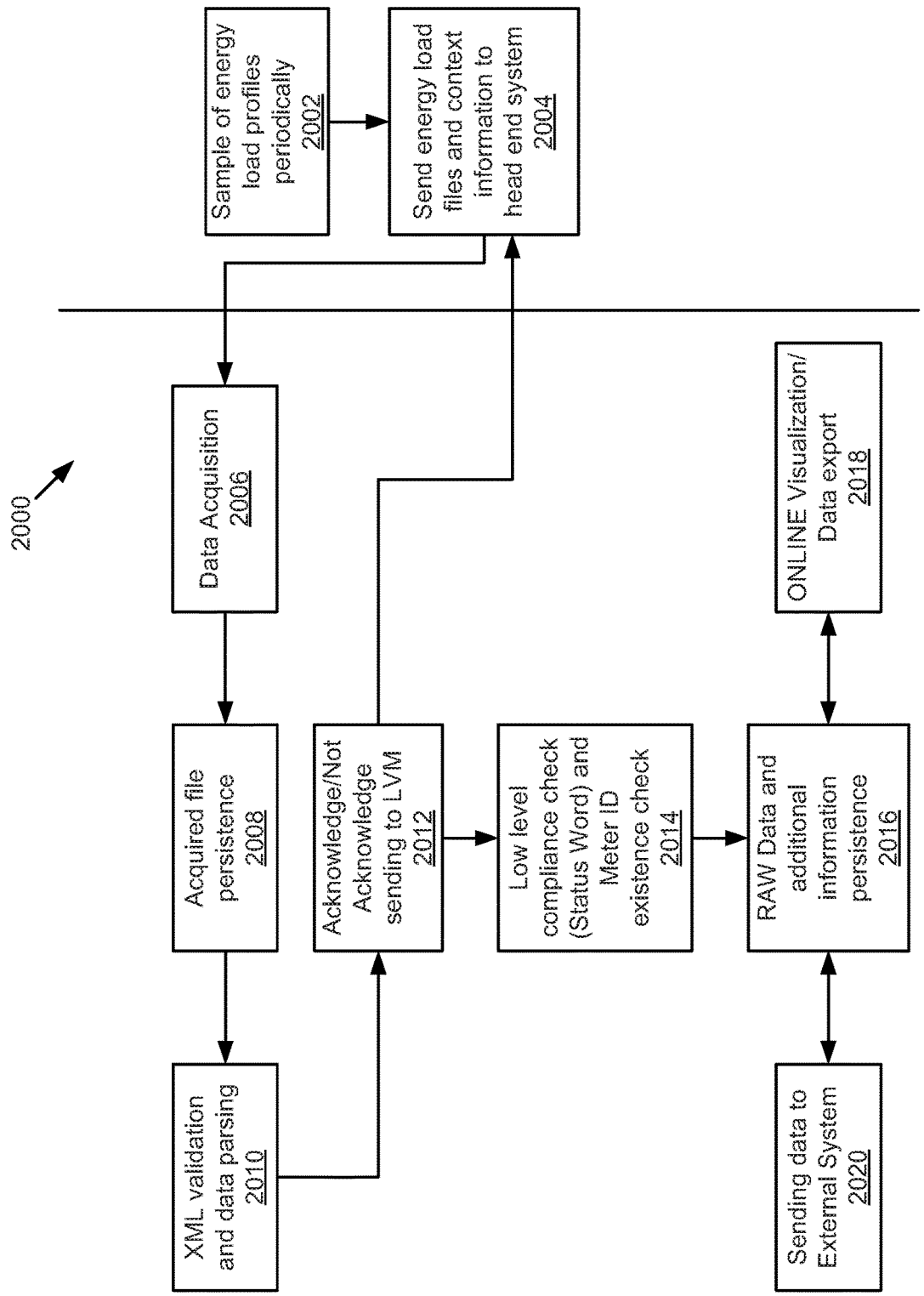
FIG. 20 is a schematic sequence diagram illustrating a usage scenario for data acquisition, according to one embodiment.

FIG. 20 illustrates one usage scenario 2000 for data acquisition from LVMs of the system 1900. In one embodiment, data may be acquired from the LVMs on a periodic bases, such as every fifteen minutes, hourly, daily, or the like. In one embodiment, a business requirement will be to have availability of real time energy consumption for all consumers. In order to meet this requirement, the system 1900 may acquire energy load profile and device status data every fifteen minutes from all meter installed on the field.

At 2002, a meter samples an energy load profile on the periodic basis (e.g., every fifteen minutes). At 2004 an LVM sends the energy load fails and context information to a head-end system. Each LVM may send one or more XML files to the head-end system with at least some of the following information for the associated meters: active imported/exported energy; reactive capacitive energy imported/exported; reactive inductive energy imported/exported (these data may be sent only for embodiments with bidirectional communications); meter ID; concentrator ID; timestamp; LVM and meter status word if changed; status word time stamp. In one embodiment, the value of energy load profiles samples not sent in previous messages will be collected at some point in the future, and will be included in subsequent messages from the LVM. In one embodiment, the LVM or concentrator initiates the communication using encrypted TCP/IP such as socket, FTP, REST, or the like. The channel may be encrypted with SSL IPSec, or the like and the physical transport may be done using UMTS, LTE, fiber optic, or the like.

At 2006, the head-end system acquires the data from the LVM. In one embodiment, the head-end system receives XML files with energy load profile, changed status word and timestamp. At 2008, the data is persisted in a file (e.g., within random access memory (RAM) or within long-term storage). In one embodiment, XML files are persisted as they come from the LVM in a file system for troubleshooting or other offline checks. In one embodiment, the head-end system receives the XML from all LVM installed in the field.

At 2010, the file or data is validated and parsed. At 2012 the head-end system sends an acknowledge (ACK) or not acknowledge (NACK) to the LVM to indicate whether the data was received. For example, once the message is received, validated, and parsed the head-end system may send an ACK to the concentrator in order to mark the data as received and not to apply retry logic. The ACK should only be sent if it is sure that the parsed message is not going to be lost at later stages of processing. If the message is not received correctly, a NACK is sent back to tell the concentrator to resend the message. At 2014, the head-end system performs a low level compliance check. For example, the head-end system may check a status word or may perform a meter ID existence check.

At 2016, RAW data is persisted, such as in a corresponding database or data store (such as key-value store).

At 2018, the data is available and/or presented online in a visualization or data export. One embodiment may support hundreds of simultaneous users for read-only access (such as administrators or consumers). In one embodiment, the user may search and select one or more meters or users and specify a time period to be represented in the visualization or export. In one embodiment, the analyzed period could start from the first sampled acquired to the last one. The data may be visualized in graphical and/or tabular format. The user may also be able to export the data into a standard format (e.g., spreadsheet, csv, etc.).

At 2020, the data is sent to an external system. For example, the data may be sent right after processing, at a scheduling time, and/or in response to a specific request. The data may be sent in raw or aggregated (or processed) format to an external or third party system. A request from an external system may include a meter ID or concentrator ID, time window, and/or measurement type.

Figure 21:
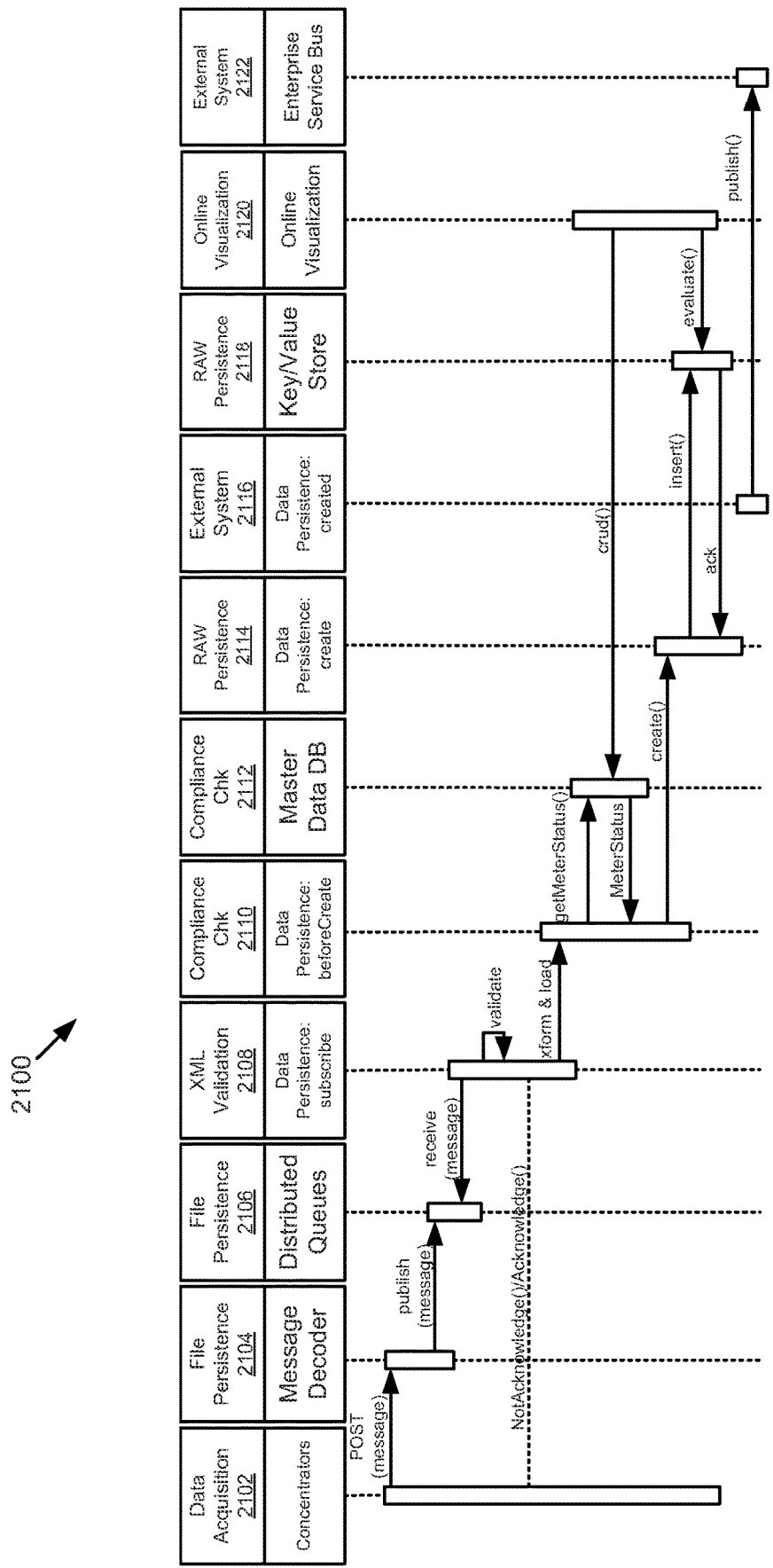
FIG. 21 is a schematic sequence diagram illustrating another usage scenario for data acquisition, according to one embodiment.

FIG. 21 is a sequence diagram illustrating a process 2100 for data acquisition from LVMs. The process 2100 may be performed by the system 1900. The process 2100 may represent an alternate view of the usage scenario 2000 of FIG. 20.

At 2102, each meter sends one or more XML documents to a concentrator (e.g., an LVM), which in-turn sends the message, using a POST message, to the head-end system for storage and processing. At 2104, once the message has been received by the head-end system, a message decoder reliably captures the messages. At 2106, the message decoder places them, using a publish message, on a distributed message queue for downstream processing. In one embodiment, message decoder processes must be able to process up to 150 million messages every 15 minutes.

At 2108, a persistent process subscribes to the distributed queues in order to validate, transform and load data originating from low voltage meters. Message processing is performed across an elastic tier of servers to allow handling of the arrival and processing of hundreds of thousands of simultaneous messages. The number of servers available to handle the arrival and decoding of messages can be configured as required taking advantage of elastic cloud computing. This component of the system architecture is designed to scale-out. Message validation will consist of XML schema validation, ensuring that the structure of the message is compliant with schema and can properly transformed and loaded. If the message is valid, it should be transformed (xform) to the correct loading format and persisted, at 2110, to the key-value store. An ACK message may be sent to the concentrator telling it to remove the message once the message has been successfully persisted in the queue. If the message is invalid, it should be placed on a dead letter queue for later analysis and a NACK is sent back to tell the concentrator to resend the message.

In one embodiment, durable queues are used for all message processing. Most modern queue managers can configured to retain a copy of the message. A copy of the messages may be kept on a file system for an agreed upon period of time for troubleshooting purposes and in case of disputes with customers or third parties. This backup is not meant to be used by the system under normal circumstances.

At 2110, a data persistence node performs a compliance check and processes the data. At 2114, 2116, and 2118, the meter data may be persisted in a high throughput distributed key-value data store. It is often necessary to perform various actions at different stages of a persistent type's lifecycle. Data persistence processes include a variety of callbacks methods for monitoring changes in the lifecycle of persistent types. These callbacks can be defined on the persistent classes themselves and on/or non-persistent listener classes. In one embodiment, each persistence event has a corresponding callback method. Application developers can register event handlers to persistent events through annotations to specify the classes and lifecycle events of interest. Before the message contents are persisted, the system may verify the meter status word. If the status word is not changed, it may not be present in acquired data. Hence the system must retrieve the meter status word from a relational database (getMeterStatus( ) at 2110). The system may update the meter readings (MeterStatus at 2112) as valid or invalid depending on the status word. At 2114 and 2118, the system persists valid and invalid meter readings in the key/value store, including all additional information about processing and status word values.

At 2120, the data is published or made available for online visualization. In one embodiment, users have the ability search and view customer and meter data from relational and key/value stores. The user experience should provide an optimal viewing experience, easy reading and navigation with a minimum of resizing, panning, and scrolling, across a wide range of devices (from mobile phones to desktop computer monitors). To enable this experience, modern UI frameworks may be used, such as Twitter Bootstrap™ or Foundation5™ may be used. In one embodiment, optimized online visualization is accomplished by making the system 1900 service enabled, with key services available as REST endpoints. Support for REST endpoints allow queries to access data by meter, concentrator, time window, and measurement type. Use of charting libraries such as Stockcharts™ and D3™ may be used to visualize time-series data.

At 2116 and 2122, the data may be published (using a publish( ) message) to an integration service bus (ESB). An ESB may include a software architecture model used for designing and implementing communication between mutually interacting software applications in a service-oriented architecture (SOA). As a software architectural model for distributed computing, it may be a specialty variant of more general client server model and promotes agility and flexibility with regards to communication between applications. The ESB may be used in enterprise application integration (EAI) of heterogeneous and complex landscapes. Some example, enterprise class ESB implementations may be available from TIBCO™ and a variety of other vendors. At least some enterprise ESB implementations use JMS or a publish/subscribe messaging platform to securely and reliably exchange data from source systems.

In one embodiment, the system 1900 supports several approaches for publishing to the ESB. These include right after data processing, any time after a specific request, and/or at scheduled times. For publishing right after data processing, publishing the data to an integration service bus can be enabled using the asynchronous callbacks. Using asynchronous callbacks, the system architecture can publish individual messages or batches of messages to the integration service bus as write operations complete.

For publishing in response to a specific request, the system 1900 architecture may provide robust support for unscheduled extraction and publishing jobs. Extraction jobs may be implemented using the Map reduce programming model or system defined actions whose responsibility is to extract data from the system 1900 and publish it to the integration service bus. Map reduce jobs may be implemented such that the input requests can be naturally parallelized and distributed to a set of worker nodes for execution. Each worker node may then then publish their dataset to the integration service bus. Map reduce jobs may be implemented in Java, JavaScript, or other languages. Custom actions may be implemented in Java or JavaScript and can be implemented for requests that cannot be easily parallelized.

For publishing at scheduled times, scheduled delivery of data to the enterprise service can be enabled using a combination of an enterprise scheduler (i.e. CRON) and internal processing functions. The role of the scheduler is to periodically invoke extraction jobs in the platform that can publish data to the bus.

The data may be published to an external or third party system, or be capable of providing them upon request with response times compatible with interactive web applications. The system 1900 may provide a set of REST APIs that enable third party applications to query and access data by meter, concentrator, time window, and measurement type. The REST API may support advanced modes or authentication such as OAuth 2.0 and token based authentication.

Figure 22:
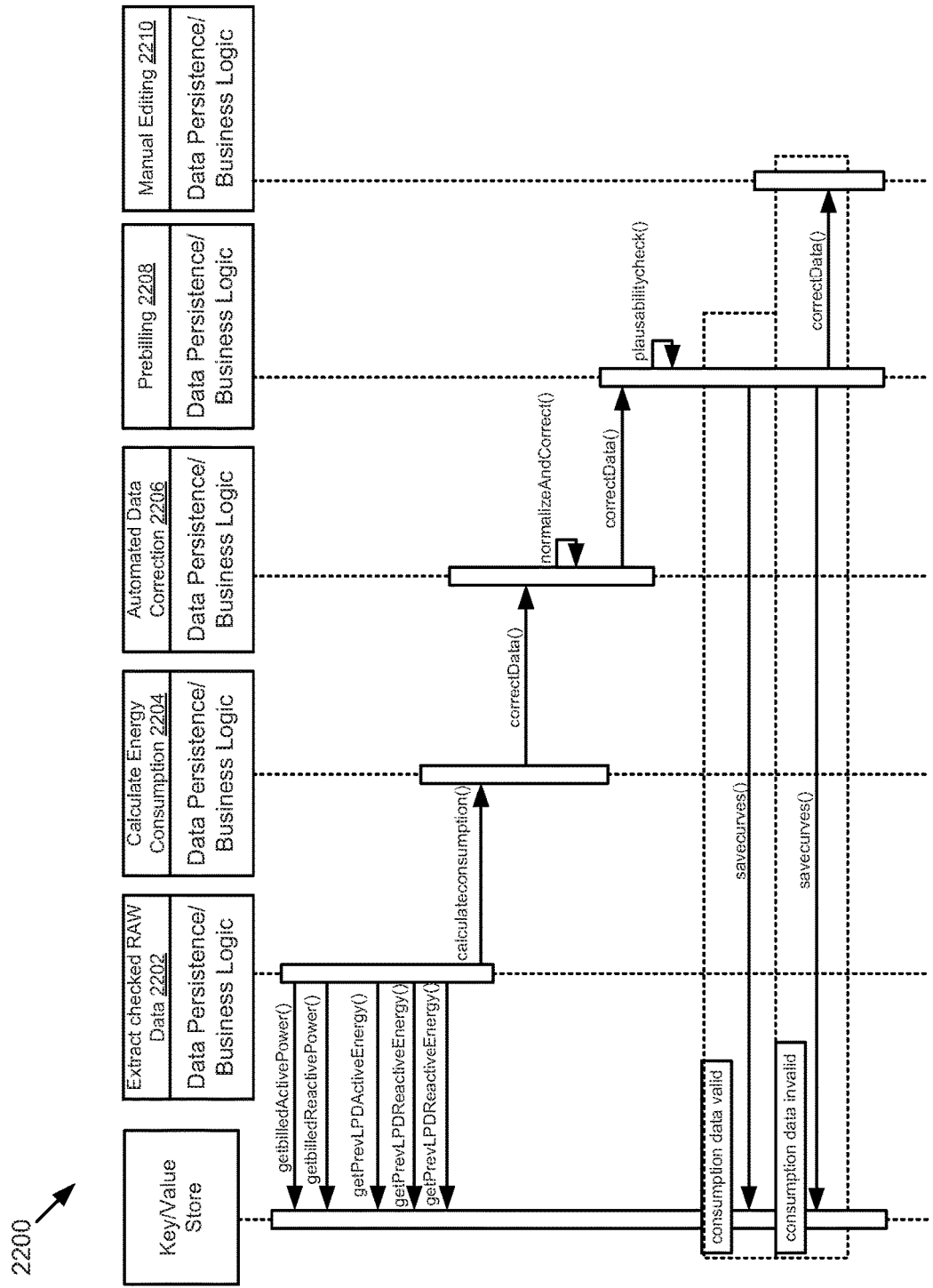
FIG. 22 is a schematic sequence diagram illustrating a usage scenario for a billing cycle, according to one embodiment.
Figure 23:
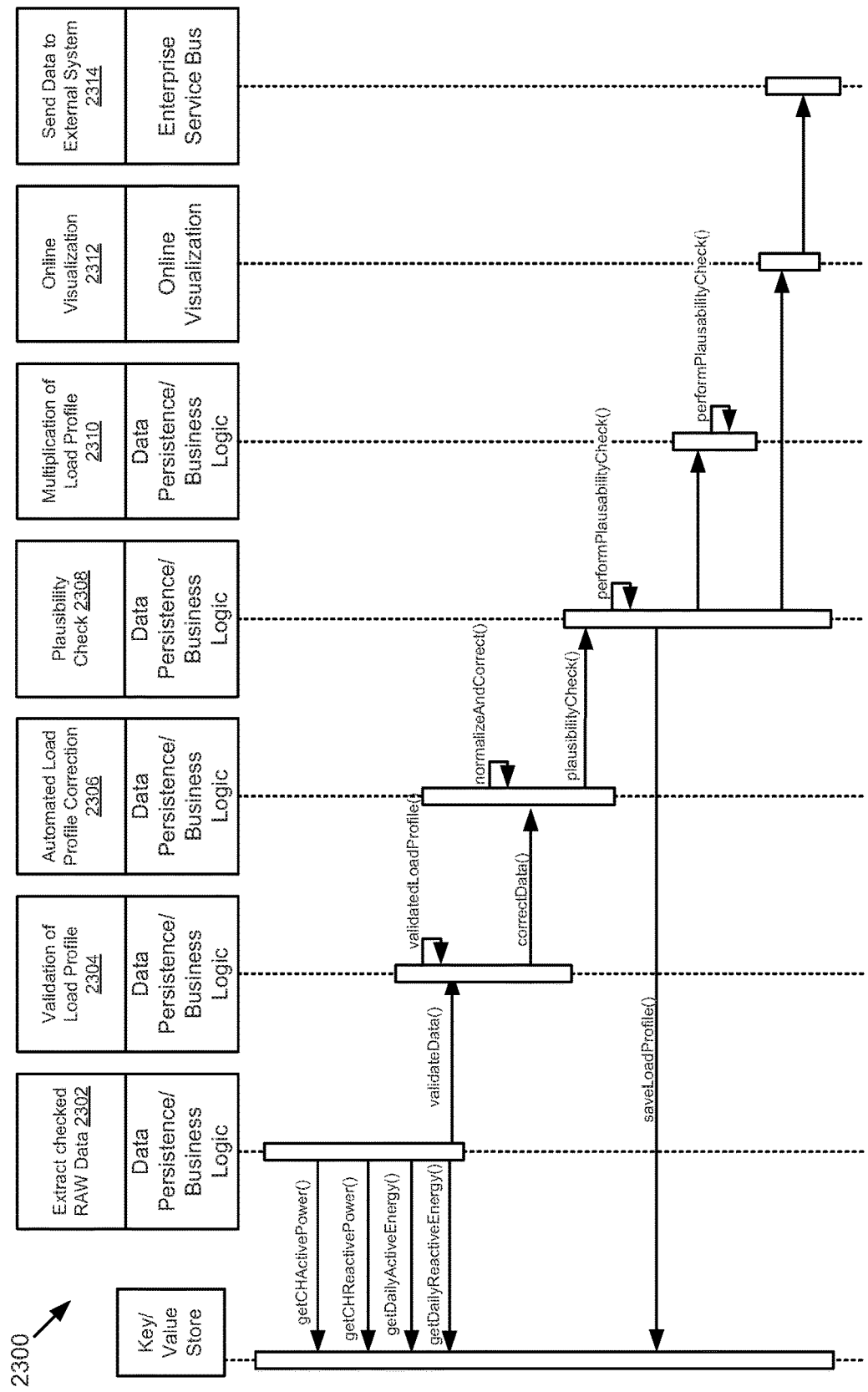
FIG. 23 is a schematic sequence diagram illustrating a usage scenario for daily data processing, according to one embodiment.

FIG. 22 is a schematic diagram illustrating one embodiment of a process 2200 for a monthly billing cycle. The process 2200 may be performed by the system 1900. At 2202, the system 1900 collects from the LVM a "frozen energy register" (Billing Data) for every meter. The frozen energy register is the value of energy consumption until the end of previous month. The system 1900 may collect the data at the beginning of every month. Data which may be acquire includes: RAW billing data (daily data); active power (imported and exported); reactive power (capacitive and inductive, imported and exported); pre-validated load profile data (quarter hourly data) including active energy and reactive energy. In one embodiment, these data sets are a result of a daily data acquisition and/or pre-validated curve process.

To efficiently collect billing and load profile data for each meter, a Map reduce processing infrastructure may be used to parallelize the collection and processing of meter and billing data for the billing cycle process. Work (such as VEE for a single meter) may be distributed across multiple nodes, with each node processing multiple batches of meters concurrently via "worker" processes. In one embodiment, each Map reduce worker will be responsible for: retrieving billing and pre-validated load profile data from the key/value store; calculation of energy consumption; automatic data correction; and/or a load profile plausibility check. With respect to data access, an interface to the key/value store should allow a worker to fetch interval data for a specific meter or collection of meters, for a given period of time. Based on experience, retrieving interval data by key (e.g. meter) can be very efficient with very low latency.

At 2204, energy consumption is calculated. The system 1900 may calculate the energy consumption of the billing period by subtracting the acquired registers in the previous month and in the current month for each meter. In other procedures within the scope of the present disclosure, this calculation and resulting data storage may be replaced with a service that performs analytic calculations in real-time. Downstream systems that require access to billed energy consumption data will make an API call to the analytic engine of the system (e.g., processing nodes 1910). The analytic engine will be responsible for fetching the data from the key/value store. The analytic engine must be able to operate on multiple time-series data streams in order to perform operations on multiple time-series. The analytic engine may also: apply the specified math function to the time-series data; provide support for calculating a rolling difference between energy reads; and/or return the resulting billed consumption value to the requestor. An analytics engine may perform simple or advanced math operations on time-series data so that a significant reduction in data storage requirements can be achieved, as only a single version of the data would need to be stored. For example, the requested data may be calculated in real-time rather than computed and stored in advanced. Additionally, it is anticipated that at least some functions can be expressed as rules, reducing the amount of code required and the opportunity to building up a library of analytics that the system 1900 can apply to time-series data.

At 2206, the system 1900 analyzes a status word of each sample of load profile and the respective energy consumption in order to understand the type of correction to apply. Normalization and automatic correction processes reconstruct load profiles taking into account the data status, the event, and the duration of the event. In one embodiment, the component that performs normalization is configured to: normalize the data by time grain (for example, normalize the data to a quarter-hour interval); identify gaps in the raw data; compute and mark estimated or interpolated values with a quality score; and/or provide support for configurable and replaceable normalization algorithms. For example, some applications may require simple linear interpolation for small gaps. For longer gaps, machine learning techniques such as weather normalized regressions may be required.

At 2208, the system 1900 performs a load profile and consumption plausibility check. This check may include analyzing the data to determine an acceptability of the load profile and energy consumption values using a variety of plausibility checks. To determine if the data is acceptable, the check may analyze master data, status word, billing schedule, and additional information to determine if the data is acceptable. In one embodiment, after the check, validated load curves are provided to the key/value store. In one embodiment, if the data are valid, additional processing (e.g. multiplication of load profile samples by a constant) may be required. If the data are not valid, manual editing of load profile data may be required.

At 2210, user edits from a manual editing of load profile data is received. Users may have the ability to view, edit and save load profile data via a web user interface. Modified records may be stored as a new version, or an audit history of the record may be created to ensure a record of all changes is available. Users must have the ability search and view customer and meter data from relational and key/value stores. The user experience may provide an optimal viewing experience, easy reading and navigation with a minimum of resizing, panning, and scrolling, across a wide range of devices (from mobile phones to desktop computer monitors).

FIG. 20 is a schematic diagram illustrating one embodiment of a process 2000 for daily data processing. The process 2000 may be performed by the system 1900. At 2002, the system extracts checked RAW data. For example, at the beginning of each day, the system may collect the raw (quarter hourly) load profile data and raw (daily) energy register reads for each meter. Data extracted in this step may include: RAW load profile data (quarter hourly data); active power (imported and exported); reactive power (capacitive and inductive, imported and exported); RAW daily register reads (daily data); active energy; and reactive energy. These data may be the result of a RAW data persistence procedure (such as at 2016 of FIG. 20).

In one embodiment, to efficiently collect raw load profile and daily register reads for each meter, a Map reduce processing infrastructure may be used to parallelize the collection and processing of load profile and daily register reads. Work (i.e., data extraction and correction) may be distributed across multiple nodes (servers). Each node (server) may process multiple batches of meters concurrently via worker threads. In one embodiment, each Map reduce worker will be responsible for: extraction of checked RAW data (see 2002); validation of the load profile, at 2004; automatic load profile correction, at 2006; load profile plausibility check, at 2008; persistence of pre-validated load profiles; and multiplication and persistence of load profile samples, at 2010.

At 2004, the system 1900 validates a load profile. The system 1900 may analyze the samples acquired and the status word of each sample of load profile in order to normalize, validate the data and to correct values when needed. Examples of validation rules include: verify if all the quarter hour of the day is filled and verify the timestamp of every sample; verify the status word of every sample; and verify if the sum of the energy value of the samples is equal to the energy of the day register. The validation logic may be rules based and implemented in a language such as Java for efficiency and flexibility. Validation rules may be defined in metadata. In one embodiment, externalizing the validation rules will provide greater business agility, as changing business requirements require an update to metadata rather than code.

At 2006, the system 1900 performs automatic load profile correction. Normalization and automatic correction process reconstruct load profiles taking into account the data status, the event and the duration of the event. In one embodiment, the system 1900 is configured to: normalize the data by time grain (for example, normalize the data to a quarter-hour interval if required); identify gaps in the raw data; compute and mark estimated or interpolated values with a quality score; and provide support for configurable and replaceable normalization algorithms.

At 2008, the system 1900 performs a load profile plausibility check. The system 1900 analyzes the data acceptability of load profile and energy consumption values using a variety of plausibility checks. To determine if the data is acceptable, the system 1900 may analyze master data, status word, billing schedule, and additional information to determine if the data is acceptable. The system 1900 may send the validated load curves to the key/value store. The system 1900 also stores the validated load profile to the key-value store (see the saveLoadPofile( ) message at 2008.

At 2010, the system 1900 multiplies the load profiles by an energy constant and persists the data in a key-value store. In one embodiment, the resulting data storage may be replaced with a service that performs analytic calculations in real-time. Downstream systems that require access to the multiplied load profile may make an API call to an analytic engine which then: fetches data from the key/value store; applies a function to the time-series data; and returns the resulting multiplied load profile to the requestor. As discussed previously, an analytic engine that performs simple or advanced math operations on time-series data can significantly reduce data storage requirements, as only a single version of the data needs to be stored. Additionally, it is anticipated that many functions can be expressed as rules, reducing the amount of code required, and the opportunity to build up a library of analytics that apply to time-series data.

At 2012, the data is presented or made available for online visualization or export. At 2014, the system may publish the data to an external system, such as via an ESB.

Returning to FIG. 19, the system 1900 may integrate with or communicate with a work order management system. For example, the system 1900 may communicate with the work order management system via the service bus 1914. In one embodiment, a work order management system for energy companies, such as an electric or gas utility company, is a complex, cross organization and cross system business process. Work management may be at the core of all maintenance operations. It may be used for creation and planning of resources including labor, material, and equipment needed to address equipment failure, or complete preventative maintenance to ensure optimal equipment functioning.

The architecture of the system 1900 enables integration with work order management processes through a robust set of APIs and integration technologies to enable access to customer data, meter data and analytic results. The integration technologies part may accept data from all relevant grid operational systems, such as meter data management, a head-end system, work order management, as well as third-party data sources such as weather data, third-party property management systems, and external benchmark databases.

In one embodiment an integration framework may be based on emerging utility industry standards, such as the CIM, OpenADE, SWIFT (an emerging data model for financial services), or other models discussed herein, ensuring that a broad range of utility data sources are able to connect easily to the architecture of the system. Once the data are received, the integration framework transforms and loads the data into the system 1900 for additional processing and analytics.

Should the work order management system need to access or update data in the system 1900, the work order management system may: call the REST API to query or update data; post a message on a JMS queue to create or update data; and/or if transfer of large volumes of data are required, use the batch APIs to efficiently process and load data. If the system 1900 needs to post a message to the work order management system, similar technologies as described above can be used. Furthermore, application developers may register event handlers to perform asynchronous actions when events in system 1900 occur. Such an event driven architecture enables the work order management system to be continually notified of relevant events in the system 1900 as they occur.

In one embodiment, the system 1900 may acquire, validate, and/or integrate data from LVMS on a daily basis. For example, the system 1900 may perform a method similar to the process 2000 of FIG. 20 on a daily basis. Thus, the amount of data may be different or different types of data may be retrieved. In one embodiment, each concentrator 1902 sends one or more XML to a head-end system with the following information for the associated meters: voltage per phase/current per phase; power factor per phase; active power per phase (imported and exported); reactive power per phase (capacitive and inductive, imported and exported); frequency per phase; temperature; strength of UMTS/LTE signal; min, max, and total values and related timestamps for each time-of use (TOU) pricing tariff; quality of service values; and/or meter and concentrator status (e.g., LVM status word). If collected on a daily basis from a system with 380,000 concentrators and 35 million meters, the rough data volume may include about 1000 values per meter per day (on monophase, mono-directional meters) and 200 values per concentrator per day, the amount is around 50 billion values per day (taking into account three phase and bidirectional meters). Some or all values may be collected for some or all meters, so elasticity and scalability are mandatory requirements.

The following paragraphs provide further descriptions of features, applications, and implementations.

Technical Assessment Benchmark Performance and Scalability Test Configurations

The present section details the benchmark performance and set up for a configuration illustrated in FIG. 19. The energy benchmark platform provided the foundation for smart grid analytics applications including AMI, head-end system, and smart meter data applications that capture, validate, process, and analyze large volumes of data from numerous sources including interval meter data and SCADA and meter events. The system architecture was designed as a highly distributed system to process real-time data with high throughput, and high reliability. The system securely processed real-time data from 380,000 concentrators in secondary substations. These concentrators manage bidirectional data communications with 35 million smart meters, collecting customer energy use profiles every 15 minutes. The smart meter data scalability requirements were to handle 3.4 billion messages per day.

The benchmark required capturing messages from the concentrators, performing message decoding, placing them on a distributed message queue and persisting in a key-value store for further processing. In real-time, data are simultaneously being analyzed through a stream-processing engine to continuously monitor and visualize the health of the grid, detect and flag anomalies, and generate alerts.

The system demonstrated robust performance, scalability, and reliability characteristics: concentrators manage reliable two-way data communication between the head-end systems and smart meters and other distribution grid devices; data from the concentrators are transferred to the head-end system and processed using lightweight, elastic multi-threaded listeners capable of processing high throughput message decoding/parsing; a distributed queue is used to ensure guaranteed message receipt and persistence to a distributed key-value data store for subsequent processing by the meter data management and analytics systems; data are analyzed in real-time to detect meter and grid events.

The benchmark demonstrated cost effective linear scaling to meet the performance requirements of a next generation enterprise system: processed 615,000 transactions per second at steady state and 815,000 transactions per second at peak; achieved 1.5 million writes per second; scaled 500 virtual compute nodes within 90 minutes across two continents; automatically scaled compute nodes to meet demand; demonstrated ability to take down 5% of the nodes to simulate processing spike conditions while maintaining steady state processing rates.

The benchmark tests were conducted using a custom benchmark energy platform hosted on Amazon Web Services (AWS). The components and configurations of the benchmark platform architecture are included in Table 2 below.

TABLE 2

Benchmark Platform Architecture

Message Generation
C3 IoT simulated transactions generated from 35M meters and 380,000 concentrators at a 1-minute interval.
    Server Nodes: 100
    Virtual Cores: 1,500

TABLE 2-continued

Benchmark Platform Architecture

Memory: 3 TB
    Amazon Instance Type: C3.4xlarge
    Each concentrator message contained messages from
    approximately 100 meters; each meter message has a
    35-byte xml message and results in 84 bytes per
    message in Cassandra ™.
Message Traffic Prioritization
The head-end system accepted transactions and handled message traffic
prioritization logic.
    Server Nodes: 100
    Virtual Cores: 1,500
    Memory: 3 TB
    Amazon Instance Type: c3.4xlarge
Scalable and Reliable Message Queue
The benchmark platform integrated Amazon Simple Queue Service (SQS)
to deliver reliable message handling.
Stream Processing
The benchmark platform integrated Kinesis ™ for real-time processing of
stream data.
Continuous Data Processing
Validated, estimated, and edited (VEE) meter interval data and generated
meter work orders.
    Server Nodes: 100
    Virtual Cores: 1,500
    Memory: 3 TB
    Amazon Instance Type: c3.4xlarge
Distributed Key/Value Store
The Cassandra cluster managed interval (time-series) data, such as meter
readings and other grid sensor data.
    Server Nodes: 300
    Virtual Cores: 2,400
    Memory: 18.3 TB
    Storage: 480 TB
    Amazon Instance Type: i2.2xlarge
Relational Database
The relational database managed structured data, such as customer,
meter, and grid network topology data.
    Server Nodes: 1
    Virtual Cores: 32
    Memory: 244 GB
    Storage: 3 TB
    Amazon Instance Type: r3.8xlarge The benchmark simulated the operation of an advanced metering infrastructure, head-end system, and meter data processing system for 35 million smart meters. The platform proved the ability to process profile data from 35 million meters every minute, attaining a new industry record in transaction processing rates.

The PaaS benchmark system performance was as follows: 615,000 transactions per second in steady state; 810,000 transactions per second at peak; infrastructure-as-a-service cost of $0.10 per meter per year; throughput results achieved are an order of magnitude faster than the fastest published meter data management benchmark on hardware-optimized systems; computer hardware and system costs were one twentieth of those in previously published industry benchmarks.

Furthermore, the benchmark showed significant cost and time savings in relation to conventional systems and platforms. The following code illustrates an implementation of queue integration written in Java:

```
/**
 * Send message to SQS
 */
BasicAWSCredentials awsCreds = new BasicAWSCredentials("...","...");
AmazonSQSClient sqsClient = new AmazonSQSClient(awsCreds);
String queueName = "C3-SQS-Test";
ListQueuesResult lqr = sqsClient.listQueues(queueName);
If (lqr == null ||
    lqr.getQueueUrls( ) == null ||
    lqr.getQueueUrls( ).isEmpty( ) ) {
    throw new RuntimeException("Queue " + queueName +
    " doesn't exists");
}
String queueUrl = lqr.getQueueUrls( ).get(0);
SendMessageRequest sendMessageRequest =
    New SendMessageRequest (queueUrl, messageBody);
sqsClient.sendMessage(sendMessageRequest);
/**
 * Receive and process message from SQS
 */
int numThreads = 8;
ExecutorService executor =
Executors.newFixedThreadPool(numThreads);
for (int I = 0; i<numThreads; i++) {
    executor.execute(new Runnable( ) {
        private Boolean done = false;
        @Override
        public void run( ) {
            while (!done) {
                try {
                    ReceiveMesssageResult res =
                        sqsClient.receiveMessage(queueUrl);
                    if (res != null && res.getMessages( ) != null) {
                        for (Message = : res.getMessages( ) ) {
                            try {
                                // do something useful with the message
                                sqsClient.deleteMessage{
                                    queueUrl,
                                    m.getReceiptHandle( ) );
                            } catch (Throwable e) {
                                Log.error(
                                    "failed to process the SQS message", e);
                            }
                        }
                    } else {
                        Thread.sleep(100);
                    }
                } catch (Throwable e) {
                    log.error("Error receiving SQS message", e);
```

The above code implementation requires 36 lines of code. The following code illustrates an implantation of queue integration using the benchmark platform:

```
/**
 * Queue for receiving interval reads from HES
 */
@queue(name"MeterData")
Type    LvmIntervalReadingInboundQueue    mixes
    QueueInboundMessage,XmlMsg. (
    Receive :~{LvmIntervalReadingInboundQueue@) is
        server
)
/**
 * Queue for sending interval reads
 */
@queue(name="MeterData")
type    LvmIntervalReadingOutboundQueue    mixes
    QueueOutboundMsg<XmlMsg>
* JavaScript to send xml message to queue
*/
LvmIntervalReadingOutboundQueue.send(XmlMsg-
    .make((xml:xml)));
Function receive(msg) {
    // Do something with the msg; E.g. use C3 platform
    // provided function to deserialize xml message:
    //
    // var m=LvmIntervalReadingMessage.fromXml(msg
        xml);
}
```

The above implantation required only 7 lines of code. The significant code reduction can lead to significantly reduced development and maintenance costs over conventional systems or methods.

Machine Learning

The systems 200 and 1900 discussed herein allow users to develop and apply state-of-the-art machine learning algorithms to build predictive analytic applications. Broadly speaking, machine learning refers to a large set of algorithms that provide a data driven approach to building predictive models. This contrasts with the traditional approach to writing software or data analytics, where a developer manually specifies how a program will analyze or predict a specific data stream. Machine learning turns this paradigm on its head: instead of having a developer tell the program how it should be analyzing the data, machine learning algorithms use the "raw" data itself to build a predictive model. Instead of specifying how a program should accomplish a given task, machine learning approaches only require that the designer specify what the desired behavior looks like, and the algorithm itself is able to learn the best way to produce this result.

An overall strategy for machine learning using systems, devices, and methods disclosed herein may be understood based on the following simplified discussion of a revenue protection product. In this revenue protection embodiment, the goal is to determine whether a given customer is stealing electricity from his or her electric utility. This application serves to illustrate the power and scope of machine learning algorithms. In this setting, a sequence of readings from the customer's smart meter (a device that provides hourly, or other periodic, readings of electricity consumption over time) are readily available, as well as general billing and work order history from the utility.

Detecting electricity theft is a highly non-trivial task, and there are many separate features that may increase or decrease the likelihood that a particular meter is exhibiting the signs of a user stealing energy. Although it is most likely impossible to come up with a single feature that is perfectly predictive of electricity theft, there are many features that one can devise that seem likely to have some predictive power on this task. For instance, if a yearly consumption drop metric is considered that looks at the average electricity consumption in this month versus the same month in the past year, then this feature would likely have a high value in the year that a customer starts stealing energy. Similarly, many meters are equipped with tamper detection mechanisms, and the presence of tampering events may also indicate that a user has been attempting to interfere with the normal functionality of the meter. However, it is also important to note that neither of these feature are perfectly predictive: a high consumption drop could be due to improving energy efficiency in the home, or meter tamper events may be caused by an improperly installed meter. And it is difficult to determine, a priori, how to weight the relative importance of these two features. However, if a set of known meters (that is, meters that the utility has already investigated and found to be either cases of theft or normal operation) were plotted on a two-dimensional axis, then a graph similar to that shown in FIG. 24 may be seen.

Figures 24, 25:
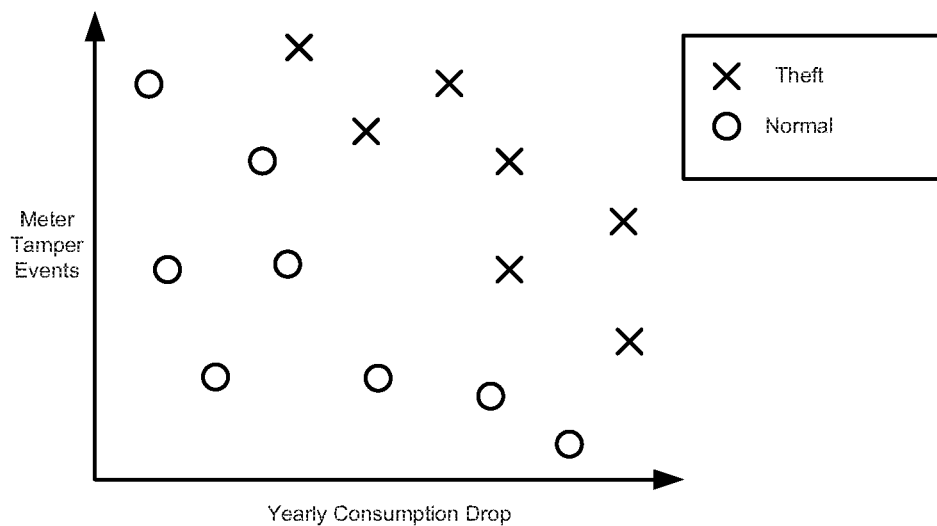
FIGS. 24-28 illustrate graphical diagrams for an illustrative machine learning example.

FIG. 24 illustrates meters where thefts occurred (shown with an X) and meters where no theft occurred (shown with circles) graphed according to meter tamper events with respect to yearly consumption drop. In the situation for FIG. 24, one could draw a straight line that would separate the positive (theft) from the negative (normal) meters. This is a very simple example of a machine learning model. This specific separation may be used to fit the observed data, and to make predictions about new meters: depending upon which side of a line a new meters falls on, then it could be predicted to be an instance of theft or non-theft.

However, use cases are frequently more complex. Just like there is no one perfect feature that can accurately predict theft, there are no two or three perfect features either. So, additional features may be used to improve accuracy. For example, it may be helpful to look at a weather-normalized consumption, at the comparison of this customer to other customers in a similar group, or many other possibilities. Real-world machine learning approaches may collect hundreds, or thousands (or even more) features that may affect the likelihood of a given meter exhibiting electricity theft. Each meter can then be viewed as a point lying in "n-dimensional" space, as illustrated in FIG. 25 (the axes are number as A1, A2, . . . , A1000, etc., but each axis corresponds to the value of a specific feature or measurement).

It is not possible for a human to visualize such a high dimensional feature space, but computer algorithms have no such limitation. And the goal of a machine learning algorithm is to carve out regions in n-dimensional space that separates the positive from the negative examples. In fact, every machine learning algorithm (or more specifically, those belonging to a class known as supervised learning algorithms) accomplishes this exact same thing, and they only differ in the way in which they are able to carve up this high dimensional space. For instance, so-called linear classification algorithms try to separate positive and negative examples using a hyperplane, the multi-dimensional analog of a straight line; non-linear classification algorithms, on the other hand, can attempt to use curved surfaces or disjoint regions to separate these regions of space.

Figure 26:
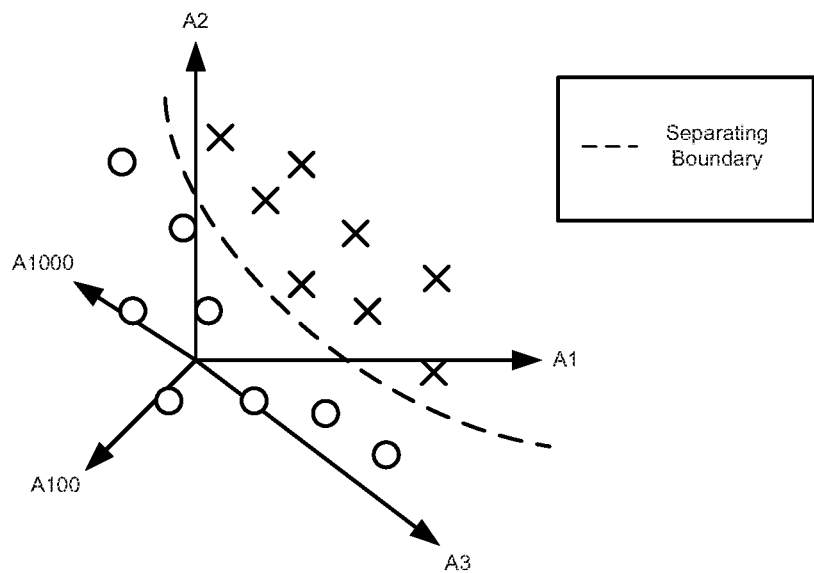

FIG. 26 illustrates a curved line, which may also be understood to represent a curved surface or other high dimensional boundary. After the space has been divided into regions as illustrated in FIG. 26, a model is built of which features (and which values of these features) are indicative of either theft or normal meter operation. If one wants to determine the most likely class of a new meter, then the many features can be computed for this new meter, see which region of the space this point falls in, and classify the meter accordingly. But importantly, these regions were created automatically by the machine learning algorithm: a developer did not have to think about the logic of precisely how to distinguish theft from non-theft meters. Instead, the developer simply specified a very large collection of potentially useful features, and the algorithm automatically determined how to best use these features to capture predictive logic.

The real advantage of this data-driven approach is evident as the model starts to collect more data over time. When a utility starts to investigate meters based upon the system, they will automatically be collecting additional training data for the system. For example, suppose that the machine learning algorithm predicts that a new meter is theft. The utility may then send out a field investigation unit to determine whether the meter is in fact theft. If the meter turns out to not have any theft occurring, this new data point can serve as an additional training example for the machine learning algorithm, and it will update its model accordingly. Thus, as more data is collected from the operational system, the machine learning algorithm continually improves its predictions, learning better and better how to distinguish between theft and normal meters.

Figure 27:
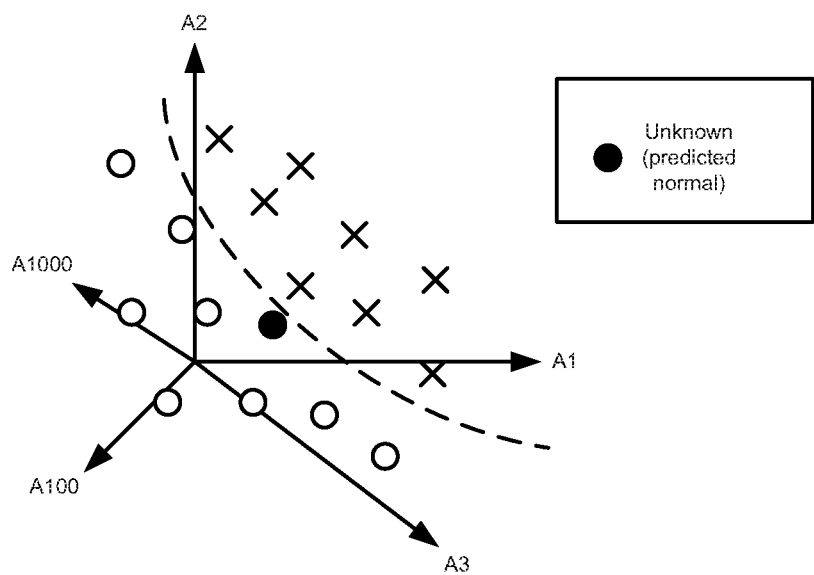
Figure 28:
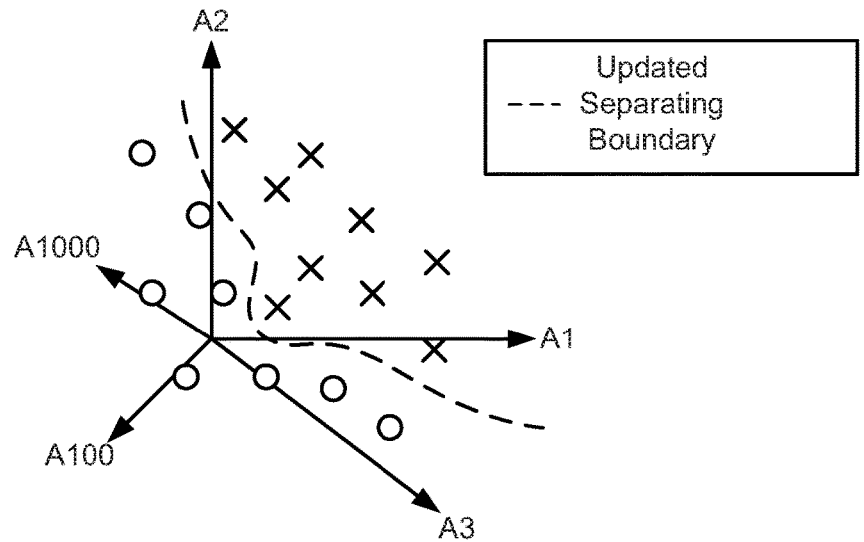
Figure 29:
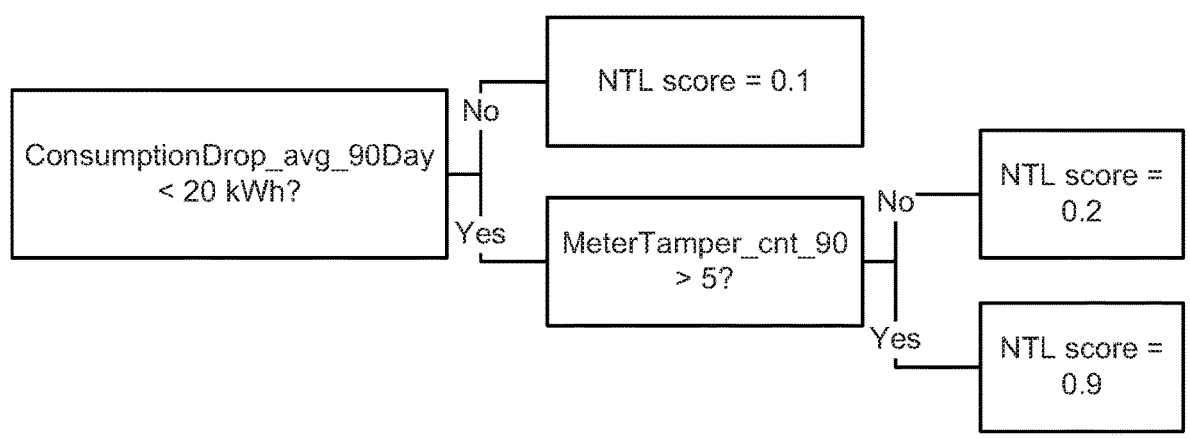
FIG. 29 is a schematic block diagram illustrating an example tree classifier, according to one embodiment.

This is further illustrated in relation to FIG. 27. For example, FIG. 27 includes a new meter event depicted by the solid circle. Based on an existing algorithm, the new meter event is predicted to not be theft. However, it turns out that there was theft occurring at the meter. The algorithm may be modified as shown in FIG. 28 so that the meter (and corresponding events) will be correctly identified as theft.

Applicant has developed state-of-the-art machine learning capability at the heart of the platforms of FIGS. 2-23 that enables highly accurate predictive analytics for fraud detection, predictive maintenance, capital investment planning, customer insight and engagement, sensor network health, supply network optimization and other applications. To continue on the above example of machine learning, in a fraud detection application, machine learning may be used to assign a non-technical loss (NTL) score to each sensor. This score may be calculated using a NTL classifier. The NTL classifier can be thought of as a routine that performs a set of mathematical operations on the data signals corresponding to a meter at a given time. The classifier computes analytic features that describe different characteristics of these signals, and then processes them in aggregate to calculate a numerical NTL score. The NTL score is a number between 0 and 1 that provides an estimate of the probability that the meter is experiencing NTL at the point in time being investigated.

A smart application built on the platforms or systems disclosed herein may build the NTL classifier in three steps. First, the "raw" meter data signals are used to create an expanded set of features that describe meter quantities at a given date that are correlated with NTL or non-NTL events. Second, a training set from known NTL cases (theft or anomalies that have been verified), non-NTL cases (meters that have been verified as not having NTL present), and a random sample of unknown cases that are treated for building the classifier as non-NTL cases is formed. Finally, a machine learning classifier that learns to distinguish between the positive and negative examples is built and/or trained. The classifier works by plotting the features corresponding to each input case as a point in n-dimensional space, and it learns to separate the regions of this space corresponding to positive and negative examples.

In one embodiment, applying machine learning to the NTL prediction problem may include creating numerical features that describe the state of the meter at any given point in time. These features may contain information that correlates with either NTL or non-NTL cases. The term "feature" is often used synonymously with "analytic," but the term will be used here specifically to refer to a single, real-valued number that describes some element of a meter at a given point in time. Example features include the maximum consumption drop over 90 days, a count of meter tamper events in the past 90 days, and the current disconnected status of a meter.

The "raw" input to the machine learning process of revenue protection may, according to one embodiment, consist of 38 separate meter signals, including electricity consumption, meter events, work order history, anomalies, etc. In some cases, historical or recent average values of the signals may be computed, because the instantaneous value may not contain sufficient information to accurately classify the state of a meter at that point in time. For example, the instantaneous work order status of a meter is not very meaningful: what is important is the most recent work order of a given type, or the history of work orders within the past 90 days. Then, the used meter signals are expanded from 38 meter signals to 756 features by applying a set of transformations to the raw data. The precise type of transformation depends on the nature of the underlying signal. These signals may include consumption signals, such as zero value detections, minimum-maximum spread (90-, 180-, 365-day windows), drop over 2 consecutive windows (90-, 180-, 365-day windows), monthly drop year over year, and/or variance (180-, 365-day reference). The signals may include event and work order signals, such as days since last event/work order. The signals may include both types of signals such as: average value over 90, 180, 365 days; maximum value over 90, 180, 365 days; minimum value over 90, 180, 365 days; and count of events/work orders over 90, 180, 365 days.

As will be understood by one of skill in the art, the precise number of 756 features is not critical. One benefit of the machine learning methodology employed is that it is not sensitive to irrelevant features. If the feature is not sufficiently informative then it will receive very little or no weight in the final calculation. It has been found that the 756 features to be sufficient to capture the relevant properties for which there is awareness in 38 base signals currently being acquired and analyzed, and it has been found that adding additional features that have been designed thus far do not substantially improve classifier performance. However, as discussed below, this does not preclude the existence of additional features. Machine learning requires some level of expert input to develop additional features that improve the classifier performance.

To evaluate the performance of the classifier before applying it to new data, "cross validation error" is evaluated while training the system. In this process, a small portion of the training set is removed from the input to the machine learning algorithm and the classifier is trained using only this reduced set; then evaluate the performance of the classifier on the held-out data. While this is not a perfect evaluation of the classifier as it will perform in the field (the process described below is a more faithful representation of how the classifier will be actually used in practice), it can be used as a first basis to test how well the NTL scores translate to data that the system was not trained on. This cross validation error, for instance, is used to determine which 756 features to use in the classifier and to pick the number and depth of decision trees. In both cases evaluated, cross validation errors for increasing numbers of features and trees and found that performance did not improve substantially beyond 756 features (using an existing process for generating these features), or beyond 70 trees.

Once there is a generated set of features to describe characteristics of any given meter at any point in time, the next step of the machine learning process is to create a training set of known positive and negative examples. Depending on the meter types, a separate classifier may be built for each meter type. A training set consists of a quantity of training cases, some of which are known NTL cases, some of which are known non-NTL cases, and some of which are unknown cases sampled randomly. Each training example may consist of the 756 feature values for that meter, calculated ten days before the inspection in the case of known NTL or non-NTL cases, and calculated at a random point in time for the unknown examples.

For the purposes of training the NTL classifier, the unknown cases are treated as negative examples (the same as the non-NTL cases). Including such data points is necessary because the classifier must be trained using cases that capture "typical" behavior of meters in addition to the behavior of meters that have been investigated (which often exhibit some type of unusual behavior to trigger an investigation in the first place). Since most meters do not exhibit NTL, the unknown cases for the purpose of training only can be considered negative examples. The few unknown examples that are included in training will introduce some "noise" into the system, but the machine learning algorithms used are capable of handling this level of mislabeling in the training set, as long as the majority of the training data is correctly labeled.

After computing the features and building a training set, a machine learning algorithm is used to distinguish between positive and negative examples. The classifier treats the features for each case in the training set as a point in a 756-dimensional space, and partitions this space into regions corresponding to the positive (NTL) and negative (non-NTL) cases. When a new meter is classified, its 756 features are computed and this point is plotted in either the NTL or non-NTL region. The classifier is able to determine how far into the positive or negative region this new case is, and thereby assign a probability score that describes the extent to which the meter is exhibiting signs of NTL at this point.

The specific algorithm used for dividing the feature space into positive and negative regions is known as a gradient boosted regression tree. While the details of this process are fairly complex, at its foundation is a concept known as a decision tree. This algorithm distinguishes the positive and negative examples by looking at individual features, determining if their value is higher than some threshold or not, and then proceeds to one of two sub-trees; at the "leaves" of the tree, the classifier makes a prediction about whether the example contains NTL or not. A simple example of a tree classifier for NTL might be similar to that shown in FIG. 29.

The actual classifier produced by the gradient boosted regression tree algorithm is substantially more complex, and includes a weighted combination of 70 trees, each with a maximum depth of 5 nodes. The resulting classifier is able to accurately separate the space of positive and negative examples, and thus can assign accurate NTL scores to meters in the training set and to new meters. As with the exact count of 756 features, the precise quantities of 70 trees and a depth of 5 per tree are not critical here: the performance of the gradient boosted regression tree algorithm typically reaches a point where adding additional branches does not improve performance. Testing has found that 70 depth-5 trees reaches a level that is not improved upon with larger depth or more trees, yet is not overly taxing computationally.

The state-of-the-art machine learning capability at the heart of the platform architecture enables highly accurate predictive analytics for fraud detection, predictive maintenance, capital investment planning, customer insight and engagement, sensor network health, supply network optimization and other applications. The built-in nature of the machine learning significantly reduces development costs and enables quick and easy discovery of features that will improve applications or machine learning performance.

Data Exploration and Model Development Tools

The systems and platforms disclosed herein may allow users to directly develop a wide range of machine learning models and tools directly from within the platform. The system may be used by any developer ranging from casual user to an expert data scientist. It accomplishes this by providing a number of different interfaces to machine learning systems. For user without a data science background, the visual analytics designer provides an intuitive graphical interface for building simple predictive analytics applications based upon well-established machine learning algorithms (this element is described more fully in a separate section). For more intermediate and advanced data scientists, the platform provides built-in integration with two well-established and state-of-the-art interactive workbenches for data science: the IPython Notebook™ platform, and RStudio™. Furthermore, because the APIs for data access from the platform are fully open, the platform can also integrate easily with additional front ends if desired. The provided IPython™ and RStudio™ interfaces includes standard machine learning libraries such as the scikit learn package for Python™, glm and gbm packages for R, interfaces to the Spark-based MLLIB™ libraries from both, and a set of proprietary distributed learning algorithm implemented directly within the platform. Together, these allow data scientists to quickly apply state-of-the-art algorithms on data sets directly in the platform using tools with which they are already familiar. Finally, for advanced data scientists, there is provided direct access to Spark™ and IPython™ parallel executions engines, allowing users to develop their own distributed and scalable machine learning algorithms.

The IPython Notebook™ and RStudio™ tools are two industry-standard development environments for data science work. These tools each provide a live interface for extracting data from numerous sources, plotting and visualizing the raw data as well as features of the data, and running machine learning algorithms. The tools use a web-based workbench interface, where users can easily query data from the platform into a native format for the environment (for example, loading the data as a Pandas™ dataframe in the IPython notebook™, or as an R dataframe in RStudio™), then perform arbitrary manipulation or modeling using the Python™ or R languages. These platforms each offer a full Python™ or R shell as well as the ability to write arbitrary addition modules in Python™ and R, and thus allow users to quickly develop highly involved data science applications. They also allow for easy visualization using included libraries such as matplotlib and ggplot. In both cases the interfaces are provided directly within the platform, allowing for the ability to very quickly query and manipulate entire collections of data within the platform.

Also included with each is a complete set of industry-standard off-the-shelf machine learning algorithms, plus the ability for users to install their own. For example, IPython Notebook™ instances are pre-installed with the scikit-learn machine learning library, RStudio instances have the generalized linear model and gradient boosting machine packaged pre-installed, plus they allow for users to install any desired IPython or R package. This allows users to apply algorithms and models that are already familiar to them. However, because these libraries are typically geared toward smaller data sets than what is common in big data platforms, there is also included a separate set of machine learning algorithms specifically geared towards big-data applications. This includes built-in integration with the Spark™ and MLLIB™ libraries (a big data parallel execution engine and machine learning library built upon this execution engine), plus a proprietary distributed machine learning algorithm developed for the platform. This custom propriety library includes highly optimized and distributed versions of linear and logistic regression, non-linear feature generation, orthogonal matching pursuit, and the k-means++ algorithms. Finally, because the IPython Notebook™ and RStudio™ libraries also allow for custom code and libraries, advanced data scientists are able to implement their own machine learning algorithms. These can be either smaller-scale algorithm implemented for single-core processes, or distributed algorithms implemented on top of the Spark or IPython Parallel engines.

Analytics

In one embodiment, platforms automatically analyze data from meters, sensors, and other smart devices to identify issues, patterns, faults and opportunities for operational improvements and cost reduction. In one embodiment, the systems provide a comprehensive set of functions for manipulating and analyzing data. Developers can leverage dozens of standard analytic functions to implement expressions that are appropriate for the specific characteristics and needs of their facilities, equipment, processes and project scope. Define an expression once and the system will automatically find the issue in new and historical data. Create new rules based on new observations or ideas at any time without affecting one's underlying applications. The value of the library increases with every new analytic.

An analytic represents an individual measurable property of a phenomenon being observed. Analytics can utilize data coming from a sensors, such as an electrical meter, or they can be based on data originating from multiple sources, for example consumption on an inactive meter or consumption per square foot. Each analytic is comprised of one or more expressions that specify the logic of an analytic.

In one embodiment, there are two types of analytics: simple and compound. A simple analytic represents a single, simple concept such as "energy consumption," "number of employees," or "is the meter on a TOU (time of use) rate?". In general analytics are measured over time and are presented as a time-series to the user. Compound analytics represent more advanced concepts such as "electricity consumption per square foot," "units produced per employee," or "energy consumption above a capacity reservation level." Compound analytics enable developers to combine simple analytics with advanced mathematical, statistical, and time-series aggregation functions to gain deeper insight into the data.

A simple analytic represents a single, simple concept such as "energy consumption" or "number of employees." The scope of a simple analytic is a single object type. For example, the "electricity consumption" analytic is defined once for a fixedAsset and again for an organization. The same analytic concept can be applied to multiple object types (i.e. electricity consumption). The difference between each analytic definition is the source object type and the path to the measurements. It is recommended that simple analytics of the same concept for different types have the same name (i.e., electricity consumption) with different identifiers (ElectricityConsumption FixedAsset, ElectricityConsumption Organization).

An example of a simple analytic is shown below.
{
  "id": "MeteredElectricityConsumption FixedAsset",
  "name": "MeteredElectricityConsumption",
  "srcType: {
  "moduleName": "structure",
  "typeName": "FixedAsset"
  },
  "expression": "sum(sum(normalized.data.quantity))",
  "path": "servicePoints.device.measurements",
  "description": "Metered electricity consumption of all meters placed at a facility"
}

Compound analytics represent more advanced concepts such as "electricity consumption per square foot," "units produced per employee," or "energy consumption above capacity reservation." Compound analytics enable developers to combine simple or compound analytics with advanced mathematical, statistical, and time-series functions to gain deeper insight into the data. For example, a moderately complex compound analytic may be electricity consumption above capacity reservation. The electricity consumption above capacity reservation measures electricity consumption above a customer specific threshold on a demand response day. The analytic is comprised of the following simple and complex analytics: ElectricityConsumption—simple analytic measuring energy consumption; ElectricityCapacityReservationConsumption—simple analytic measuring the customers agreed to capacity reservation consumption; and DemandResponse—compound analytic determining measuring if the customer participates in a demand response event. The compound metric definition is the following:
{
  "id": "ElectricityConsumptionAboveCapacityReservation",
  "name": "ElectricityConsumptionAboveCapacityReservation",
  "expression": "sum(sum(DemandResponse*(ElectricityConsumption−ElectricityCapacityReservationConsumption)))"
}

In one embodiment, platforms may have large libraries of mathematical, transformation, and time-series functions that can be used in analytic expressions. Functions in conjunction with analytics can be used by an analytic engine to create time-series, calculate new time-series, transform time-series, and perform conditional processing. The functions can be divided into the following groups: aggregation functions—mathematical operations to perform interval aggregation (i.e., Sum quarter hour readings to the hour) and multi-time-series aggregation; transformation functions—dozens of built in functions are available to perform time-series transformation and inspection; arithmetic functions—apply common arithmetic functions to ceiling, floor, round, absolute value, etc. to analytic results; and conditional operators—apply conditional statements to evaluate analytics if conditions are right. Ternary operators, and, or and other functions are available.

With embodiments disclosed herein a company is not limited to a predefined set of analytic functions. At the same time, they don't have to start from scratch. The rich library of functions needed to perform data analytics may be provided. With systems and platform disclosed herein, developers have the tools require to convert domain knowledge into analytic expression that run continuously and automatically against the data.

Security

Due to the importance of security and privacy, the system architectures disclosed herein may be built according to a multi-layered security model stretching from the physical computing environment through the network and the application stack. Industry best practices are recommended to ensure the absolutely highest level of security possible. The system should be housed within a SAS70 Level II data center, and monitored 24/7 both internally and externally to ensure the highest level of security is maintained at all times. In one embodiment, the systems employ a role based access control (RBAC) security model to enable administration personnel to configure appropriate access to their data. Roles define the functionality that a user may access while a person's group typically defines what level of data they may see. Users have the ability to share content within the organization and delegate responsibility to other individuals.

The system architecture also may provide extensive logging and audit control capabilities to meet relevant security and compliance regulations.

Communications by or between smart devices, head-end systems, processing nodes, storage nodes, applications, a service bus, or any other system may be encrypted. For example, secured data communications may utilize robust and configurable security protocols such as SSL, IPsec or any other secure communications. Furthermore access control, based on authorized credentials may provide an ability to set different access controls across the enterprise operators Tools As discussed previously, a plurality of built in tools are included in the systems 200 or 1900, in one embodiment.

A deployment services tool may enable users to leverage a platform for application deployment. The deployment services supports the deployment of industrial-scale IoT software applications that may require exa-scale data sets, giga-scale sensor networks, dynamic enterprise and extraprise-scale data integration combined with rigorous analytics, data exploration, and machine learning, complex data visualization, highly scalable elastic computation and storage architectures, transaction processing requirements that may exceed millions of transactions per second, and responsive human-computer interaction.

The deployment services tool may enable an organization to understand the current version of applications deployed on an environment, deploy code to the environments, manage users, roles, and responsibilities for applications, and/or view deployment activity.

A monitoring and management tool proactively monitors comprehensive system health measures, including service and hardware heartbeats (such as sensor network heartbeats), system function performance measures, and disk and computing resource utilization. If any potential issues are detected, automated system fortification measures are triggered to address the issues before end-users may be affected. For example, additional application CPU capacity may be automatically scaled up if CPU utilization is determined to be unacceptably high. This ensures that applications continue to perform responsively when system usage spikes. Additional back-end and data-loading processing capacity may be automatically added based on the size of the job queue, thereby ensuring data processing and data load jobs are efficiently processed. Automated failover may activate if a system component fails or suffers performance deterioration, thereby ensuring that a component failure will not negatively impact end-users.

The monitoring and management tool allows a user to search, monitor and analyze the state and performance characteristics of the system from one place, in real time. Users can troubleshoot problems and investigate performance incidents in minutes instead of hours or days. They gain operational intelligence with real-time visibility and critical insights into customer experience, transactions and other key performance metrics.

The monitoring and management tool may also provide APIs that enables an organization to: monitor activity of an environment; create alerts across any component; view logs for the environment; modify logging levels for the environment; understand the versions of software on the environment; and/or perform a health status check.

A workflow tool enables developers to manage workflows within applications. The workflow tool may act as the coordination hub for all of the different components of one's application maintaining application state, tracking workflow executions and logging their progress, holding and dispatching tasks, and controlling which tasks each of one's application hosts will be assigned to execute.

The workflow tool may makes it easy to build applications that coordinate work across distributed components. In the workflow tool, a task may represent a logical unit of work that is performed by a component of an application. Coordinating tasks across the application involves managing inter task dependencies, scheduling, and concurrency in accordance with the logical flow of the application. The workflow tool gives full control over implementing tasks and coordinating them without worrying about underlying complexities such as tracking their progress and maintaining their state.

When using the workflow tool, a user may implement workers to perform tasks. You can create tasks that are long running, or that may fail, time out, or require restarts—or that may complete with varying throughput and latency. The workflow tool stores tasks and assigns them to workers when they are ready, tracks their progress, and maintains their state, including details on their completion. To coordinate tasks, a developer may write a program that gets the latest state of each task from the workflow tool and uses it to initiate subsequent tasks. The workflow tool maintains an application's execution state durably so that the application is resilient to failures in individual components. With the workflow tool, developers can implement, deploy, scale, and modify these application components independently.

A UI designer tool enables users to quickly create new applications, configure existing applications, and design compelling user experiences. This UI designer tool offers a comprehensive library of user interface components that can be seamlessly connected to custom data sets to create visually compelling applications. The UI designer tool provides the following features: leverage responsive design to create multi-device applications without extra effort; harness the power of HTML5 and CSS3 without hand coding (e.g., using selection or drag and drop of visual elements); comprehensive collection of pre-built visualizations supporting everything from grids and charts to tab panels and maps.

A type explorer tool enables the efficient examination, extension, and creation of data type definitions while also mapping the type relationships and results. The data types may be sorted and searched to unlock additional business insights.

A data explorer tool provides data discovery, navigation and search across data managed by a system to help users of all kinds find and share information more easily. A user may query and/or select analytic evaluation functions to easily search and sort data types to unlock additional business insights. The data explorer tool provides the following features: filtering (find a subset of data quickly); sorting (order any column, ascending and descending); analytic Evaluation (evaluate one or more analytics in the context of filtered data); and/or aggregate functions (perform a calculation on a set of values and return a single value).

A report writing tool provides reporting, dashboard creation, and ad-hoc data analysis capabilities for platform solutions. Using a web-based interface, the report writing tool empowers organizations to discover insights from their data using compelling visualizations. Quickly and easily explore data managed by a system. Create multiple visualizations to get additional insights and perspectives that enhance data comprehension. Combine findings into a dashboard you can save and share with colleagues.

The report writing tool provides interactive analysis. For example, the report writing tool may provide a web-based interface to define pixel perfect reports, ad-hoc reports, and custom dashboards and scorecards. Suitable for all levels of user sophistication from beginner to advanced, the report writing tool provides support for report and dashboard viewing, formatting, exporting, pivoting, sorting, drilling, ad hoc querying and what you see is what you get (WYSI-WYG) report design and creation. Using advanced web technology including xHTML, CSS, AJAX, and JavaScript, the report writing tool delivers a highly interactive user experience to allow a business analyst to develop custom dashboards and reports.

Business intelligence reports, dashboards, and analyses provide the foundation for effective, data-driven decision making. The report writing tool provides pixel-perfect, print-perfect, and page-perfect dashboard, visual analysis, and report design and distribution of reports and dashboards via the web and email. The report writing tool provides support for the following report and data analysis tasks: dashboards and scorecards—interactive displays that provide "at-a-glance" view of the enterprise using gauges, dials, KPIs, and visualizations; visual Insight—visual exploration of data with a large library of interchangeable visualizations and data filtering capabilities to help identify outliers and anomalies in the data; enterprise reports—print-perfect report design and layout with data organized and aggregated into hierarchies or bands of increasing finer detail; and ad-hoc reports—create reports that combine graphs, detail data, and explanatory text to describe and analyze business performance.

The report writing tool places the control of information distribution into the hands of the business user. Business users can subscribe themselves or others to receive reports and/or dashboards on a schedule, on an event, or on an alert basis, all without any assistance from IT administrators. Proactively deliver personalized reports and alerts via e-mail based on one or more of the following: a time schedule such as every Monday morning at 8 a.m.; an event such as a completed database load; and/or a trigger such as business metric tracking outside an acceptable range. Business users can also specify their preferred delivery format. Supported deliver formats including: interactive dashboards in Flash™; reports in various formats such as PDF, HTML, or a spreadsheet; datasets in CSV format.

In addition to providing native support for relational and NoSQL data persistence, developers can structure, extend, and persist data seamlessly across relational, NoSQL, Cassandra, Redshift, and HDFS data stores. In one embodiment, an open service oriented architecture enables any external data source or sensor network to be tightly integrated into the IoT system. In one embodiment, a system includes a repository of pre-defined types specifically designed in collaboration with industry partners. Types, attributes, relationships, application logic, and learning algorithms are all extensible. Developers and data scientists can also define new types, behaviors, and analytics to create entirely new applications for operating, visualizing, monitoring, and analyzing customer systems.

A system may be configured to use a type model, an interface definition language (IDL) for defining and extending type definitions and methods, and a set of APIs for accessing the type model using Javascript, Java, and Python. The type model defines the meta-data for how data is represented, related, and persisted. The APIs allow programmers to reference and manipulate the type model from application and machine learning code.

Type definitions are created and modified using a type designer tool or more directly using the IDL. The IDL supports familiar programming constructs to create and extend type definitions, including: generics; mixins (extension or implementation in other languages) dynamic types; method overrides. Because systems may abstract the type model and its relationships from physical data stores, developers can use SQL, multi-dimensional (STAR schema) data warehouse, and NoSQL databases seamlessly within the same application. Based on the characteristics of the data, a developer may choose the data store that is best for a specific data type or attribute. The data services component 204 may automatically manage the translation of read and update commands to the appropriate database instance, and provides the unified results back to the application. In one embodiment, a system may automatically handle the physical database schema updates and data persistence for any changes to type definitions. The type model can also be extended to reference existing external data sources in addition to persisting new data within databases.

In addition to using the native capabilities of the above tools, engineers can develop application logic and responsive user experience designs using a plurality of languages or APIs. Large scale IoT and machine learning projects frequently involve multiple development teams encompassing diverse skill sets. Developers often specialize in different application components or data pipelines, and may use different languages for different use cases. Finding developers with the right skill sets to extend existing applications or build new ones can be challenging. Embodiments disclosed herein provide language options to appeal to the broadest set of technical talent available. Developers and data scientists can choose from a variety of the most popular programming languages to create custom application logic and machine-learning algorithms.

Application developers may choose from a variety of languages to implement new methods on types. These scripts may be provisioned and automatically integrated into the run-time environment, providing access to the entirety of the type model and seamlessly integrating with the data feed and event notification services. Data scientists can design custom machine learning algorithms and implement data processing pipelines using a variety of languages. The systems may provide a provisioning environment that allows data scientists to use their own Python libraries and packages as necessary for highly specialized work.

Developers building large scale IoT applications with millions of sensors face the challenge of detecting valuable events from within fast, real-time, high bandwidth, heterogeneous data streams. The challenge is magnified by the need to respond to specific events with automated actions in a contextually appropriate way, with varying response time requirements depending on both the event type and its context. Some embodiments provide developers with the capability to automatically monitor data feeds and type state changes at scale, trigger events based on user defined rules, and manage action response times to meet workflow processing timing requirements. The events can trigger commands to custom code or type methods via the REST API, as well as post events via secure HTTP calls to external systems or message queues. Event definitions can reference a large variety of configurable metrics or feature definitions, based on the types, attributes, and methods registered in the type model.

Systems may handle constant streams of real-time events, sensor readings, user interactions, and application data produced by massive numbers of connected sensor devices and operational systems. Developers can configure and log virtually any application or device event that occurs in the platform.

At least some system embodiments include a scalable and versatile platform for monitoring and analyzing machine data. This integration allows developers to instrument their code, and application administrators of applications, and custom applications to organize, monitor, and review a wide variety of pre-defined and custom events, including the following categories: device/sensor a, such as availability, data feeds, metrics, KPI's, at group, concentrator, and individual device level detail; application, availability, event triggers, actions, action throughput, REST API calls, threshold alerts; application components, queues, data feeds, data transforms, map-reduce jobs, machine learning jobs, active AWS AMIs and other cost-incurring 3rd-party components; system availability, application services, data stores, data feeds; usage, user logins, session time, duration, and IP, OS, access type, and application usage; application performance, availability, response time, data feed throughput, concurrent users, concurrent data feeds, etc.; software provisioning and deployment, monitor and log migration of packages and modules from test to production, versions, dates, times; and automated alerts for immediate notification of warning thresholds or application malfunction.

Some implementations come with predefined charts and tables for visual inspection across various time ranges, and these can be extended, modified, and augmented to support project-specific monitoring for both C3 and custom applications.

Applications

Examples of applications utilizing features of the system and platform embodiments disclosed herein are discussed further below.

In one embodiment, the systems and platforms disclosed herein provide pre-built application services to help organizations accelerate the deployment and realization of economic benefits associated with enterprise-scale cyber physical information systems around the areas of market segmentation and targeting, predictive maintenance, sensor health, and loss detection.

Market Segmentation and Targeting

In one embodiment, a market segmentation and targeting application integrates the full functionality of the market-leading Marketo™ marketing automation product suite. This capability combines a real-time overview of the entire enterprise value chain with powerful capability for highly targeted customer engagement, web and mobile personalization, account-based marketing, account analytics, email and direct mail campaign management. Using the market segmentation and targeting application, marketers are empowered to build automated campaigns that create long-term, personal relationships with consumers and business customers across channels. Marketers can respond to a wide variety of individual behaviors in real-time with personalized content, dramatically increasing click-through rates, engagement, revenue and ROI. Multi-channel support is provided for email, web, social, mobile, and direct mail.

Using the market segmentation and targeting application, marketing professionals are able to design highly personalized digital campaigns, target high-value customers, create compelling offers, and measure real-time performance to optimize programs in mid-course. In a single solution, marketing professionals can design a full customer campaign cycle from creation to multi-channel execution to reporting, thereby lowering marketing costs and ensuring that business goals are met.

Marketing professionals may use the market segmentation and targeting application to design compelling, personalized campaigns by customizing pre-loaded campaign templates that are optimized for the complete customer marketing lifecycle. These campaigns can be used for: acquisition, such as recruiting customers for new programs, offers, and products; nurture, engaging customers with timely, action-oriented program communications; up-selling and cross-selling, promote additional products and offers to program participants; rewards, offer special products, rebates, or incentives to high-value customers; retention, renew customers for programs, offers, and products; deploy personalized communications through any combination of digital channels. Digital channels may include email, web, social networks, secure message service (SMS), etc. Professionals can measure performance to refine campaigns with powerful visualization tools that show key marketing metrics, such as bounce rates, open rates, and real-time response rates. Modify and optimize campaigns in mid-stream for higher performance. Professionals can automate high-performing, targeted campaigns to run automatically on daily, weekly, or monthly schedules. Configure campaigns to deploy automatically when a trigger event occurs, such as when a customer updates certain profile attributes, becomes eligible for a new product or offer, or takes a specific action such as visiting an offer web page.

Predictive Maintenance

A predictive maintenance application includes a comprehensive set of diagnostic and planning tools to help operators of complex, cyber-physical systems predict equipment or system failures before they occur. Often, maintenance activities on cyber-physical systems tend to occur on either a scheduled basis, or on a reactive basis after failures have occurred. The costs of operating and maintaining complex cyber-physical systems can be significantly reduced through the application of predictive maintenance practices.

Using the predictive maintenance application, operators are able to prioritize maintenance on equipment or systems based on their risk of failure. The predictive maintenance application estimates the risk score for any equipment or system as a combination of its probability of failure as well as the consequence of failure. The probability of failure is determined based on the application of complex analytics as well as machine learning algorithms to all of the relevant equipment or system data. In order to do this, the predictive maintenance application analyzes all available equipment or system data, e.g., from sensors, SCADA systems, asset databases, geospatial data, maintenance logs, as well as external datasets such as weather or terrain data. The consequence of failure is typically a configurable score for each equipment or system type based on multiple criteria, including the economic, environmental, and social impact of a potential failure.

Typical users of the predictive maintenance application will include maintenance planners, engineers, field technicians, and managers. The predictive maintenance application may be used to support day-to-day maintenance planning functions, field inspections or audits, as well as periodic analyses of maintenance effectiveness. Using the predictive maintenance application, planning and operations teams benefit from access to uniform and granular information to support decisions on maintenance priorities.

The predictive maintenance application is designed to continuously apply advanced machine learning techniques to update risk scores in real time. Operators are able to seamlessly analyze risk across millions of different, distributed equipment or systems. Operators are also enabled to make more informed maintenance decisions by assessing risk at different levels of equipment, systems, geospatial, or organizational hierarchy. The predictive maintenance application provides a comprehensive set of visualization, diagnostic, machine learning, and planning tools to clarify, simplify, and optimize network asset maintenance and management decisions.

Maintenance engineers and asset management teams may use predictive maintenance application to analyze failure risk across a large number of equipment or systems through the application of advanced machine learning techniques. Maintenance engineers and asset management teams may use predictive maintenance application to proactively assess real-time equipment or system risk, along with maintenance projections, reducing capital expenditures. Maintenance engineers and asset management teams may use predictive maintenance application to monitor real time asset risk to improve the detection of equipment or system issues, and allow for more efficient maintenance crew management, resulting in lower operating costs. Maintenance engineers and asset management teams may use predictive maintenance application to identify vulnerabilities earlier, decreasing the likelihood of preventable failures. Maintenance engineers and asset management teams may use predictive maintenance application to analyze current, monthly, and year-over-year risk trends. Maintenance engineers and asset management teams may use predictive maintenance application to analyze assets by class at granular levels across systems or geographic hierarchy, in a list, on a chart, in a report, or in a detailed, geospatial view. Maintenance engineers and asset management teams may use predictive maintenance application to understand the consequence of failure of high-risk assets and systems, and create maintenance work orders to mitigate the chance of an unplanned outage. Maintenance engineers and asset management teams may use predictive maintenance application to benchmark equipment or systems to identify areas that are at highest risk of failure.

The predictive maintenance application includes features including: next-generation risk calculation—risk assessment brought to an enhanced level of consistency and confidence across equipment or systems, based on detailed and granular data on actual operating conditions, equipment or system performance, and advanced machine learning algorithms; prioritized lists of equipment or systems to inspect and maintain, based on risk predictions; ability for operators to sort lists based the probability of failure as well as failure consequence factors; detailed asset-level diagnostics and views of risk factors, history, and projections—information enabling operators, planners, and teams to identify and diagnose conditions affecting equipment or systems; visualization of risk indices across multiple user selectable dimensions—fully customizable views of asset risk, across critical business and operating dimensions; project-level aggregation of selected asset types by risk priority for maintenance jobs—simple tools to help operators create work plans and maintenance strategies, based on detailed and granular supporting information at the individual equipment level.

Sensor Network Health

A sensor and network health application includes a comprehensive set of diagnostic and prioritization tools to help operators of cyber-physical systems monitor the deployment and ongoing health of sensors on their system. Across industries, efforts are underway to deploy extensive sensor networks to improve observability of the network of managed assets and to enable collection of data that can be processed to generate insights to unlock economic value at scale. Operators of cyber-physical systems need to maintain near real-time situational awareness of the expansive set of sensors and the communication network that supports these sensors. The sensor and network health application can improve the reliability of the sensor network and reduce operations and maintenance costs through the application of advanced analytics and machine learning techniques.

Using the sensor and network health application, operators are able to reconcile deployment issues, prioritize remediation efforts, and enable the effective management of third-party vendors. By analyzing data from multiple systems, the sensor and network health application ensures the rapid resolution and reduction of installation errors. During the ongoing lifespan of the sensor network, the sensor and network health application manages asset health by identifying sensor and network health issues, predicting potential sensor failures, sending messages and updates to sensors, and ensuring the efficient allocation of maintenance resources.

The sensor and network health application analyzes data from communication logs between sensors, network traffic logs, sensor and network hardware specifications from the asset management system, geographic information system (GIS), weather and terrain parameters and real-time event logs from the SCADA system to quickly identify anomalies at the both the individual sensor level as well as for clusters of sensors. In order to do this, the sensor and network health application uses a combination of expert rule based analytics and machine learning algorithms to assign a health index to each sensor and network asset on the system. Users of the application are able to prioritize a comprehensive list of all sensor and network assets based on their individual health index and determine the appropriate course of remedial action.

Typical users of the sensor and network health application may include system operators, engineers, maintenance planners, field technicians, and managers. The application is used to support day-to-day operations, including remote configuration changes, field inspections or audits, and periodic analyses of overall system performance.

The sensor and network health application is designed to continuously apply advanced machine learning techniques to update the health index score for assets in real time. Operators are able to seamlessly prioritize operational issues across millions of different, distributed assets and make more informed maintenance decisions by assessing risk at different levels of equipment, systems, geospatial, or organizational hierarchy. System operators and engineers may use the sensor and network health application to: prioritize operational issues across millions of different, distributed assets and make more informed maintenance decisions; remotely reconcile deployment issues and effectively manage third-party installation vendors; recognize patterns and trends of asset failure to support effective management of maintenance resources; remotely update asset configuration at the individual asset level or for a cluster of assets using the bulk action functionality; visualize sensor and network asset health in an interactive, geospatial view that intuitively supports prioritization of issues at the system level; create a single, continuously updated, and prioritized work queue of installation and maintenance work orders, increasing field team efficiency and effectiveness.

The sensor and network health application may perform a health index calculation powered by enhanced machine learning algorithms—enhanced level of consistency and confidence across equipment or systems, based on detailed and granular data on actual operating conditions, equipment or system performance. The sensor and network health application may perform closed loop field inspection feedback integration to support online, continuous training and improvement of machine learning algorithms. The sensor and network health application may store prioritized lists of sensor and network assets to inspect and maintain, based on near real-time assessment of asset health through the health index. The sensor and network health application may provide visualization of health indices across multiple user-defined dimensions—support for heat maps at the system level to enable effective prioritization. The sensor and network health application may provide fully integrated asset health report and monitoring—supports pre-built reports and dashboards, ad hoc reporting tools for asset health report at different levels of aggregation, and business intelligence reports to quantify performance trends over time. The sensor and network health application may improve the reliability of the sensor network and reduce operations and maintenance costs through the application of advanced analytics and predictive maintenance techniques Loss Detection A loss detection application identifies, quantifies, and prioritizes potential instances of commodity or materials loss. The loss detection application identifies commodity or material losses or leaks in complex, interconnected cyber-physical systems. In order to do this, the loss detection application uses a broad range of analytic features, and empirical machine learning models to prioritize investigation areas, so that operators can quickly find losses, fix malfunctioning equipment or unsafe conditions, and capture additional revenues. The loss detection application may have applicability in oil and gas pipeline networks, electricity networks, water networks, wastewater systems, or other complex chemical or facility infrastructures.

In order to identify losses, the loss detection application integrates data from a broad range of different sources that may signal an issue, including a distributed network of sensors, asset management systems, work orders, field investigations, and customer billing systems. Analytics based on the data from these systems provide weak signals that are indicative of loss. Examples of these signals include sensor data indicating a reduction in the flow of a commodity, sensor data signaling abnormal events or alarms, fluctuations in bills, or abnormal work orders to fix or replace equipment. The loss detection application may apply hundreds of analytics that are indicators of anomalous patterns. These analytics are then fed as inputs into complex machine learning algorithms that are able to learn from prior known instances of loss, to identify the likelihood of loss.

With the loss detection application, operators are able to act upon a single, unified, and prioritized set of loss cases. Operators are also readily able to access all the additional detail required in order to enable targeted resolution. Cases can be tracked and managed through the entire life cycle of investigation, confirmation, and closure. The progress of resolved cases can be tracked against annual goals. As more cases are resolved, the machine learning algorithm uses feedback from previous investigations to increase the accuracy of predicted instances of loss over time.

Using the loss detection application, investigators have a quantitative, consistent, and prioritized approach to pinpoint and address losses, capture economic value, lower investigation costs, and accelerate the resolution of instances of fraud or equipment malfunction.

The operators are able to use the loss detection application to: quickly identify instances of abnormal losses by using dashboards showing the location, details, likelihood and value of likely cases of loss; increase the success rate of investigations by providing analysts with access to results of advanced loss detection algorithms, along with updated, integrated sensor data, work order history, network issues, billing and payment history, and equipment service status; recognize patterns and trends of fraud or malfunction to assist with long-term fraud and malfunction prevention; directly assign prioritized leads to field investigation teams to confirm and address cases of loss; use validated field investigation results to improve machine learning models, increasing the accuracy with which leads are prioritized and making data analysts more effective; identify and track new modes of fraud or asset malfunction through the use of machine learning models that detect unusual patterns of behavior; automatically increase the long-term accuracy of loss detection with detection algorithms that use machine learning to incorporate verified results into future opportunity identification; forecast and confirm the financial impact of investigation efforts through detailed information regarding the benefits of identified and verified opportunities.

The loss detection application may perform loss detection analytics to pinpoint losses due to fraud or asset malfunction. Unusual flow patterns are correlated with equipment diagnostic and operational data, based on a library of analytics that codify business rules for loss detection. The loss detection application may provide advanced pipeline management to identify and prioritizes high value and high likelihood leads, using machine learning algorithms and leveraging historical, confirmed instances of fraud or malfunction. The loss detection application may provide investigation management and feedback that automatically tracks identified loss cases, work orders, resolution confirmations, and investigation results. The loss detection application may provide revenue reporting and monitoring that delivers pre-built reports and dashboards, provides ad hoc reporting tools for opportunity reporting and monitoring, analysis of revenue recovery performance against targets (historical and forecasted), revenue tracking, and investigation results.

In addition to the pre-built application services defined above, the loss detection application provides other application services in the areas of utilities and oil & gas, including: meter management; work order management and verification; network management; workforce management; energy balance; operations center monitoring and alerting; real time billing; well placement and completion analytics; production optimization; asset investment planning; hydrocarbon loss accounting; and demand forecasting.

Many of the above embodiments disclose applications apply to energy or utility industries. However, systems and applications for other industries, including any enterprise Internet-of-Things application development, IoT, or big data systems are also contemplated within the scope of the present disclosure. An example applications for other industries include prediction of medical conditions, such as predicting heart attacks based on input from wearable technologies or implanted sensors. Further machine learning IoT examples, which may utilize any of the teaching disclosed herein, are discussed further below.

Connected Home Analytics

The U.S. home services industry, with an estimated $400 billion in annual revenues, is ripe for disruption. With only 2% of home services contracted online, from the repair of a hot water heater to the installation of a solar panel, there is a large opportunity to make home operation increasingly cost-effective, safer, and more efficient for homeowners. Home maintenance today is largely reactive: homeowners seek home safety and security services only after a significant event occurs (e.g., water pipes freeze and burst, hot water heaters or air conditioners fail), driving up maintenance costs and impacting comfort and experience. At the same time, there are an expanding number of smart, connected devices available in the home—an estimated 26 billion devices available by 2020. These smart connected appliances, including thermostats, HVAC systems, dishwashers, and refrigerators, provide increasingly precise data about home operation, from the variation in indoor air temperature to the measured efficiency of the hot water heater. By integrating and analyzing these data, home service providers, including landlords, appliance manufacturers, home insurance companies, security and safety providers, and home maintenance companies, will enable the predictive and proactive mitigation of home system failures before they impact a customer's safety, comfort, or home maintenance costs.

In one embodiment, connected home analytics may be provided by a machine learning IoT system, such as the system of FIG. 2 to enable home service providers to analyze real and near real-time data from connected home devices, home characteristic data, and dynamic weather data to identify high-risk home assets. By applying advanced analytics and machine learning to these data, connected home analytics enables home service providers to prioritize high-risk home infrastructure components (e.g., building envelope, HVAC systems, water piping) and connected appliances (e.g., refrigerators, washer/dryers, solar panels) for maintenance across their residential customer base. Home service providers will be able leverage these insights to inform a range of customer engagement decisions. For example, insurance providers will be able to analyze cold weather data, building infrastructure data, and thermostat data to identify homes that have a high risk of pipes freezing, and use these insights to proactively engage customers to encourage them to take action, reducing insurance claim reimbursement costs. Similarly, home maintenance providers will be able to manage residential HVAC maintenance across multiple customers, and use the prioritized ranking of highest-risk HVAC assets across homes to more efficiently allocate their customer maintenance budgets.

In one embodiment, connected home analytics may provide home asset failure prediction. For example, a system may predict and prioritize high-impact home events (e.g., failure of a refrigerator) across all residential customers based on machine learning analysis of historical event data and near real-time signals. In one embodiment, connected home analytics may provide lead generation for value-added services profile. For example, a system may target, and prioritize customers for value-added services based on the unique home asset risk profile, like the sale of a more efficient hot water heater to customers whose existing hot water heaters are likely to fail.

In one embodiment, connected home analytics may provide customer engagement performance tracking. For example a system may track engagement with home residents across a range of key performance indicators. For example, home insurance companies will be able to immediately calculate customers at risk of a high-impact event, contact customers about the potential event, and avoid claims costs from proactive customer engagement.

The benefits of connected home analytics for home service providers as provided by an machine learning IoT system built according to the embodiments disclosed herein provides significant benefits. These benefits include: data-driven customer engagement by providing home residents personalized insights about home asset performance; improved customer prioritization by ranking home residents with a relative at-risk score for a high-impact event with associated costs to the company (e.g., claim reimbursement costs for insurance companies, device replacement costs for appliance manufacturers); increased revenue from upsell of value-added services that solve actual customer problems (e.g., poorly insulated home that requires building envelope upgrades); reduced portfolio risk for insurance companies by proactively identifying and mitigating high-impact events (e.g., roof leakages resulting from extreme weather conditions); bi-directional integration with customer relationship management systems to track customer engagement metrics resulting from predictive insights (e.g., number of customers contacted for upsell of an additional service); and improved customer satisfaction and loyalty from more meaningful communication with customers, based on personalized service and device offers and mitigation of issues before they impact the customer experience.

The connected home analytics draws on available home resident connected devices, home characteristics, and weather data. Using comprehensive sets of real-time connected device and historical event data, the connected home analytics executes machine learning algorithms that accumulate knowledge about asset performance and identify under-performing or high-risk home infrastructure or appliance assets likely to fail. The data used by the connected home analytics may include: connected device data, such as high-frequency measurements, events, alarms, and/or setpoints from smart meters, smart thermostats, smoke detectors, dishwashers, refrigerators, and other appliances; connected network data, such as from home security monitoring and fire safety systems; building infrastructure data, such as from HVAC, distributed energy (e.g., PV), and lighting controls systems; customer service contract data, such as service contract type, account history, claim history, claims costs for event types; granular customer building characteristic data, such as building age, size, type, envelope characteristics; weather data, such as historical and 10-day forecasts of temperature, humidity, wind chill, and precipitation; historical event data, such as about historical events and related customer characteristics (e.g., home water pipe freezing); and customer behavior data, such as number of home occupants, occupancy rates at the daily, weekly, and seasonal level (e.g., vacation home).

In one embodiment, connected home analytics serves as a unique platform to enable home service providers, including landlords, maintenance providers, appliance manufacturers, and home insurance companies to capture additional value from their customers. Revenue-generating and cost-saving opportunities for landlords include comprehensive predictive maintenance across rental properties to reduce operational costs and minimize high-cost, high-impact events for home renters, increasing customer satisfaction. Revenue-generating and cost-saving opportunities for home insurance companies include reducing claims costs by predicting high-impact events (e.g., roof leakage) and proactively warning customers and offering targeted solutions and/or incentives to mitigate event (e.g., recommendations for vendors). Revenue-generating and cost-saving opportunities for appliance manufacturers include offering stronger warranty and maintenance offerings by remotely monitoring appliance (e.g., refrigerators) performance and proactively identifying and mitigating impending failures before they impact the customer.

Enterprise Energy Management

In one embodiment, enterprise energy management analytics may be provided by a machine learning IoT system, such as the system of FIG. 2 to provide an advanced analytics software solution that helps large commercial and industrial (LCI) energy managers to use a systematic, data-driven approach to better understand and manage energy. Customers can explore the drivers of their energy performance, evaluate relevant energy conservation measures, and track and measure energy savings results over time. With energy management analytics embodiments disclosed herein, energy and facility managers have the tools and information necessary to monitor and manage their energy expenditure and to achieve other energy-related goals (e.g., demand reduction, carbon reduction, etc.).

With energy management, customers optimize the effectiveness of energy efficiency measures and demand management activities. Leveraging big data analytics, energy management analytics provide the energy analysis, energy modeling, and reporting required to prioritize, select, and implement demand-side energy reduction initiatives. Energy management analytics integrates data from a variety of data sources such as property management systems, utility meter and billing data, and weather data to provide users with a comprehensive view of their energy usage across their portfolio of facilities. With energy management analytics, operators are able to quickly and systematically make energy management decisions based on a detailed analysis of the energy consumption at their facilities, understanding of the relevant energy conservation measure options, and alignment with their business goals.

In one embodiment, energy management analytics may provide whole building analytics including an energy baseline that can be viewed at the sub-meter (below a utility or power meter, such as within a home, facility, or portion of a system behind a meter), meter, facility, region, or organizational level. The energy management analytics may provide energy analyzer services, such as high-level and fine-grained insight into energy usage, spend, demand, and other facility resources. The energy management analytics may be used to manage facilities, such as by providing a searchable catalog of customer facilities in which users track the details of each facility, including facility type, construction year, gross floor area, Energy Star™ rating, and energy conservation measures. The energy management analytics may provide benchmark services, such as by providing a comparison of facilities against industry standard benchmarks or against each other based on a range of performance indicators including energy usage, energy expenditure, and carbon emissions. The energy management analytics may provide project analyzer services, such as by providing dynamic analysis of energy efficiency and demand management initiatives for potential demand reductions, cost savings, projected costs, payback, and net present value (NPV). The energy management analytics may provide plan optimization, including detailed economic analysis of a portfolio of energy efficiency and demand management projects, identifying those measures that best meet financial objectives, such as highest NPV or fastest payback period. The energy management analytics may track and measure energy savings. For example, the energy management analytics may track and report energy savings resulting from interventions. Cumulative energy savings and any associated payments can be calculated over selected time periods, including multiple years. The energy management analytics may provide facility and portfolio performance reporting including comprehensive reports for any single facility or portfolio of facilities.

The energy management analytics may provide significant benefits to organizations including: visibility and tracking of energy spend through uniform data visualization, benchmarking, and metrics across all facilities; identification of demand reduction opportunities by meter, facility, or region using analytic-based benchmarking, energy use analytics, and energy conservation measures; better achievement of energy efficiency targets by identifying and increasing the number of facilities participating in energy efficiency and other demand-side management programs; and streamlined and detailed reporting tools for quarterly/yearly reviews and financial audits.

Health Care Analytics

The $2.7 trillion U.S. healthcare market suffers from significant inefficiencies: as much as $800 billion of healthcare spending each year is wasteful or redundant. With increasing pressure to reduce costs, the healthcare industry is turning to the wealth of newly digitized and standardized data becoming increasingly available: clinical data (electronic medical records, medical images), claims and cost data (care utilization and cost estimates), pharmaceutical data (pharmaceutical trials), patient demographic data (patient behaviors and preferences), and sensor data from wearable devices and smart phones. The volume of healthcare data is expected to swell to 2,314 exabytes by 2020, more than the projected annual global IP traffic in 2019. By correlating and performing advanced analytics and machine learning on these diverse data sets, both payers (insurance companies) and healthcare providers (hospitals and physicians) will be able to reduce the cost of care, improve outcomes, and promote patient engagement.

Health care analytics offered by a system, such as the system of FIG. 2, offers a next-generation approach to reducing costs, driving efficiencies, and mitigating risks in the healthcare industry by analyzing disparate sets of healthcare management and sensor data. Health care analytics applies advanced machine learning algorithms to cost and claims data, clinical diagnostic data, hospital admissions data, and electronic medical record data to clarify and optimize decisions about how best to care for patients and reduce the overall cost of care. With health care analytics, providers and payers are able to: track the efficacy of care management at the individual patient and aggregate portfolio level; identify high-risk patients; and prioritize remediation efforts to deliver tailored patient care plans or incentives to promote long-term health.

Health care analytics may include a suite of applications built on top of a data storage and abstraction system or layer and that predict addressable risk across multiple facets of the patient care lifecycle. The health care analytics may calculate readmission risk to enable healthcare providers to predict hospital readmissions, both for current patients and discharged patients, by applying machine learning analysis to individual electronic medical record data and historical trends to calculate the probability that a patient will be readmitted to the hospital. The health care analytics may calculate plan adherence risk based on patient demographic, behavioral, and electronic medical record data to predict and prioritize patients that may deviate from their care management plans, a behavior that contributes to increased healthcare costs. The health care analytics may calculate high-cost risk by analyzing electronic health record and claims data to predict patients that may have higher healthcare costs that can be reduced with better care management. The ranking of high-risk patients in these three applications will enable healthcare providers and payers to prioritize customers for targeted care management or incentive plans, in order to encourage patients to adhere to a more efficient care management plan. By generating and prioritizing key actions to manage patient health, health care analytics enables healthcare payers and providers to improve patient care over time, minimize unnecessary healthcare costs, and drive efficiency across a patient's healthcare lifecycle.

In one embodiment, the health care analytics may provide propensity scoring Propensity scoring may include identifying and prioritizing patients likely to deviate from care management plans and to have higher healthcare costs that could be mitigated (e.g., prioritize patients for cost-effective home healthcare after discharge from hospital). In one embodiment, the health care analytics may provide predictive analytics to anticipate broad risks across patient portfolio and track these risks against internal key performance indicators to develop targeted risk remediation plans, like risk of readmission. For example, the health care analytics may predict an occurrence of a health condition, such as a heart attack, development of a disease, or any other condition or health event based on treatment information, health care records for the individual, and/or sensor data from wearable or implanted technologies. In one embodiment, the health care analytics may display a detailed patient view and actions to allow providers or a patient to understand detailed patient care or provider care history and identify lower-cost care channels to mitigate unnecessary healthcare costs. In one embodiment, the health care analytics may provide reporting and ad-hoc analysis to generate pre-built, automated reports on progress towards goals. For example, the health care analytics may perform ad-hoc analysis on individual patients or groups of patients.

The health care analytics may provide benefits including: proactively predicting patient health and care management risks, including hospital readmissions risk, care plan adherence risk, and high-cost healthcare incident risk; prioritizing targeted, preventative measures and care coordination for at-risk patients before they incur additional costs or require more intensive treatment; delivering the right intervention at the right time based on the latest available data, including care plan adherence data, hospital admissions data, electronic medical record data, and health monitoring sensor data; reducing overall care management costs by mitigating emergency high costs before they occur and identifying the most cost-effective care pathway, like incentivizing a patient to adhere to a care plan instead of paying for that patient's emergency hospital visit; and benchmarking performance against care management goals and track ability to reduce patient risks across patient portfolio.

In one embodiment, the health care analytics may draw on available patient, provider, and payer data to improve machine learning and analytics results as additional data become available, both for a single patient and across a patient portfolio. The data used by the health care analytics may include: claims and cost records, such as care utilization, services provided, reimbursement rates, diagnosis codes; clinical data, such as electronic medical records, test results, medical images, clinical trial results; sensor data, such as data from healthcare wearables, smart phones, and other devices to track patient behavior, pharmaceutical drug usage, and biometric parameters; hospital data, such as admissions data and discharge data; patient health behavior data, such as activity and health monitor data from wearables, care plan adherence tracking; genetic data, such as phenotypic characteristics and genetic test results; and/or demographic data, such as socioeconomic status, race, age, credit care, zip code, etc.

In one embodiment, the health care analytics may provide a comprehensive patient care view. For example, the health care analytics may apply supervised machine learning to available healthcare data to identify high-risk patients, through training a machine learning classifier with labeled cases (e.g., patients that were readmitted to a hospital) and prioritizing patients based on their similarity to past known high-risk patients. The health care analytics addresses both payer and provider pain-points in the healthcare industry, including hospital readmission, deviation from care management plan, and high healthcare spending for preventable or treatable conditions.

In one embodiment, the health care analytics measures, learns, and predicts patient-specific behavior, health trends, and healthcare costs. To enable healthcare payers and providers to identify risk patient risks specific to their internal benchmarks, health care analytics can be customized to each specific payer or provider key performance indicators, including rate plans, product and feature groups, and account characteristics.

For example, in one embodiment, an application may be trained to detect or predict events using a range of data sources, including healthcare monitoring data, diagnostic codes, claims and cost data at the individual patient and aggregate portfolio level, medical plan usage data, and hospital admissions data, such as reason for visit, visit duration, recommended post-operations stay.

Supply Network Risk

In one embodiment, supply network risk analytics provide managers of enterprise supply chain organizations with comprehensive information and visibility into the risks and impacts of disruption throughout their sourcing, manufacturing, and distribution operations. Supply network risk analytics may identify vulnerable sources of raw materials and components and highlight weakness in hubs and aggregation points, manufacturing facilities, distribution centers, and transportation modes. Based on data-driven analytics that predict the potential for disruption to parts, labor, and shipments, the supply network risk analytics generate recommendations and options for management teams to mitigate high risk areas of the supply chain and improve supplier planning and supplier portfolio management to create appropriate redundancy, backup, and recovery options where precisely needed.

Supply network risk analytics leverages and integrates historical supply chain performance data with current internal supply chain-related information, including: contract negotiation time by product, material-specific design and build lead time, supplier redundancy and geographic location, inventory levels and turnover, current and historical orders, manufacturing and production delays, transportation or logistics delays for similar products/transport modes/ports and/or locations, GPS-derived fleet movements, delivery-on-time rates, and return rates. To identify and correlate the effect of historical and current factors influencing procurement, manufacturing, and transportation, supply network risk analytics also integrates externally-gathered data pertaining to weather and associated transport disruption risks, as well as news events and alerts on labor, transport, and raw materials or product sourcing disruptions that are beyond an enterprise's control.

Having correlated all of these data inputs, supply network risk analytics employs machine learning algorithms to identify the most significant, potential production delays and delivery risks associated with each unique product and production line, at any current point in time. The algorithms calculate the associated impacts to customer delivery on a product-byproduct basis, allowing supply chain professionals to identify the granular and geographically-specific effects of forecasted delays, and resulting cost to customers and their own internal operations.

By increasing the consistency and availability of comprehensive information on potential disruptions to the entire supply chain, supply network risk analytics helps managers to improve their long-term planning accuracy and to create a stable, predictable, and resilient production chain. Supply network risk analytics helps supply chain organizations achieve lower costs of procurement and supply, increased reliability of delivery, optimized quality of procured products, and improved overall revenues and customer satisfaction.

The supply network risk analytics may provide benefits including: increased resilience and redundancy of supplier portfolios through predictive identification of specific components, locations, suppliers, transportation modes, and facilities at risk of disruption; improved production reliability and quality through earlier advance notification and preparation of backup supply options, specific to individual product lines and geographic supply and delivery chains; enhanced long-term supply chain planning visibility through consistent, comprehensive data aggregation and multiple scenario analysis of the historic likelihood of internal and external disruptions, with associated impacts and costs of potentially incurred disruptions; reduced costs of implementing a resilient supply network through data-driven sourcing options, appropriately sized and appropriately located based on accurate risk-adjusted supply forecasts; and/or increased flexibility of the supply chain through predictive identification of specific portions of the supply chain with extra capacity or available redundancy.

In one embodiment, the supply network risk analytics may display or generate managerial dashboards providing comprehensive enterprise-level visibility into overall supply chain state and highlight individual supplier risk factors, with potential impact summaries on sourcing, production, distribution, and transport. The supply network risk analytics may perform supplier risk detailed analysis to enable supply chain sourcing managers to view individual risk factors and performance and delay history for specific suppliers, associated data on delivery reliability by product, inventory levels, current events impacting delivery risk, and predictions for current performance, per product or service.. In one embodiment, the supply network risk analytics performs geospatial and node-level analyses to provide holistic views of supply chain risk by individual raw materials or component, with easily navigable links and visualizations of associated transit hubs and aggregation points, manufacturing facilities, distribution centers, and transportation modes. The supply network risk analytics may provide supplier risk recommendations and gap analyses to enable users to quickly identify and characterize unmitigated high risk areas within a supply chain, offering potential redundancy options to speed the assembly of backup option portfolios. The supply network risk analytics may provide dynamic user feedback and live data integration continuously update and improve accuracy of the machine learning risk predictions, by requesting and incorporating user knowledge on specific supplier performance history, known supply bottlenecks, specialized geographical limitations, external events.

Vehicle Fleets

In one embodiment, vehicle fleet analytics provides fleet operators with a comprehensive management tool for monitoring vehicle health and improving vehicle fleet maintenance decisions. Based on detailed, data-driven analysis to predict vehicle equipment risk, failure likelihood, and required maintenance actions, vehicle fleet analytics increases the effectiveness of maintenance decision making and enhances the capabilities of fleet managers to monitor, identify, and plan for vehicle maintenance requirements, and reduce the operational impact of vehicle failures.

In one embodiment, the vehicle fleet analytics leverages data from an operator's existing investments in performance monitoring systems: vehicle telematics sensors, maintenance logs, equipment/asset performance parameters, vehicle operational history, and environmental conditions. The vehicle fleet analytics uses advanced analytics and machine learning algorithms to learn from historic instances of vehicle failure in order to predict and help prevent future failures. The vehicle fleet analytics detects emerging and anomalous vehicle conditions, flagging potentially unusual situations that may merit maintenance inspections.

Typically, fleet maintenance practices are solely schedule-based or vehicle-usage-based, which often leads both to over-maintenance as well as to unexpected failure and vehicle downtime. Using vehicle fleet analytics, operators are equipped with real-time information on vehicle equipment condition, enabling accurate identification of repair and replacement needs and the matching of maintenance procedures to actual equipment condition.

In one embodiment, vehicle fleet analytics assists fleet operators in scheduling preventive maintenance, reducing the incidence of unplanned breakdowns, avoiding emergency maintenance, and increasing the uptime and reliability of the vehicle fleet. Using vehicle fleet analytics, operators are able proactively to schedule maintenance and manage both labor and equipment/parts resources with increased accuracy and predictability, on the timescale of days to weeks in advance of repair requirements.

Some benefits of the vehicle fleet analytics includes: reduced time and cost to identify, inspect, and diagnose impending failure of vehicles through the accurate prediction of vehicles requiring repair; improved planning of parts, labor, and vehicle availability through accurate predictions of vehicle maintenance requirements, based on machine learning-driven analytics on equipment failure; reduced cost of emergency maintenance by the avoidance and minimization of unplanned or emergency work orders or repair jobs; increased fleet flexibility, reliability, and uptime due to improved visibility into vehicle operational conditions, schedule constraints, backup options, and impending maintenance needs.

In one embodiment, the vehicle fleet analytics are configured to display vehicle performance data and operating conditions (e.g., engine performance, temperatures, vibration, system parameters, ambient conditions, drive conditions) from each vehicle unit at near real-time intervals. The vehicle fleet analytics may analyze vehicle health trends from minutes to years: view operational efficiency, breakdown incidence, maintenance history, and repair requirements—individually or aggregated as a fleet over an entire territory. In one embodiment, the vehicle fleet analytics may prioritize high-risk vehicles for maintenance based on operational targets (e.g., higher utilization, critical vehicles, routes) and generate work orders directly to be completed. The vehicle fleet analytics may diagnose and aggregate vehicle equipment failures using machine learning pattern recognition and data visualization, to assist in root cause identification of equipment faults, manufacturer defects, or driver behavior or route patterns. In one embodiment, the vehicle fleet analytics measures the impact of high-risk vehicles on business metrics including dispatch reliability, personnel time and labor, maintenance operations, service uptime, and driver allocation.

Telecom

Globally, telecommunications operators annually spend an estimated $400B on marketing, advertising, and customer service, to acquire new customers and retain and maximize value from existing customers. For each target-or at-risk connection ("line"), research estimates suggest that over $200 of customer lifetime value could be at stake. With telecommunications services and analytics built on or in systems disclosed herein, operators can capture this value by measuring customer churn risk, identifying upsell and cross-sell opportunities, and quantifying cost-to-serve expenses, relying on recommended, targeted actions that are optimized for each individual customer.

In one embodiment, telecommunications services and analytics may provide a next-generation customer relationship management (CRM) solution. Rather than relying on manual inputs of data and rule-based recommendation engines, telecommunications services and analytics integrates real time sensor, geolocation, infrastructure, and customer interaction data and applies advanced machine learning algorithms in order to develop continuously learning, predictive models. By analyzing comprehensive data from a wide range of sources and systems including CIS, third-party demographics, billing, usage, call center, interaction logs from web and mobile devices, call data records, network activity logs, and network quality logs, telecommunications services and analytics enables operators to discover candidates to acquire, identify current customers with high probability to churn, receive recommendations on the products and services an individual customer is most likely to purchase, and pro-actively intercept customers likely to contact customer service. By generating and prioritizing the key actions to take for each customer, telecommunications services and analytics enables operators to cost-effectively and efficiently improve customer satisfaction and lifetime customer value.

In one embodiment, telecommunications services and analytics may perform predictive analytics by using machine learning-based analytics like churn likelihood, purchase likelihood, and self-service adoption likelihood to identify high-value and high-risk customers and prioritize pro-active outreach. The telecommunications services and analytics may provide a comprehensive view of any single customer, including customer-specific usage and sensor data, interactions with the telecommunications operator, predicted actions, and recommended offers. The telecommunications services and analytics may incorporate sensor and network features to strengthen predictive models with network related factors impacting customer behavior such as network strength, quality, and speed by location. In one embodiment, the telecommunications services and analytics may provide workflow management, reporting, and ad-hoc analyses. For example, the telecommunications services and analytics may push operational recommendations and decisions to workflow management systems, and feed operational information back from these systems to enhance machine learning performance. The system may perform ad-hoc analyses on all available data.

The telecommunications services and analytics in the present disclosure may provide benefits including: reduced customer churn due to predictive insights and recommended preemptive actions; increased revenue from upsell and cross-sell, by predicting likelihood to buy and increasing relevance of offers; improved tracking and management of actions and offers made to individual customers; reduced cost to serve by identifying and intercepting customers likely to contact customer service; reduced customer acquisition costs based on targeting outreach to most-likely-to-convert candidates; improved customer satisfaction and loyalty from more meaningful communication with customers, based on personalized product and service offers; consistent insights about customers available seamlessly across all channels and customer interactions; and/or consistent comparison and benchmarking of customers and sales and service channels.

The telecommunications services and analytics may draw on and unify all available data about individual customers. Sophisticated machine learning algorithms are applied to these data to create actionable insights and recommended actions for each customer. These recommendations are able to help operators cost-effectively and efficiently target new customers, and increase the lifetime value and customer satisfaction of existing customers. The data sources and types used by the telecommunications services and analytics may include: customer, account, and line characteristics; prior purchase history by customer of products and services from the operator; detailed call and usage records including caller graphs, call quality, and geo-location information; customer service and marketing interactions from call center logs, website logs, and marketing activity; network quality data by geolocation station; and/or third-party demographic data.

In one embodiment, the telecommunications services and analytics employs sophisticated machine learning algorithms on all available data in order to discover insights about critical customer-facing opportunities and challenges, including the customer acquisition, churn detection prediction, upsell propensity and need, cross-sell/next best offer, service likelihood, and/or self-service action responsiveness.

In one embodiment, the telecommunications services and analytics measures, learns, and predicts customer-specific behavior and can be customized by operators to include variances in rate plans, featured products and services, and unique account characteristics. The application can be trained to detect or predict events using a range of attributes for each individual customer, a comparison of that customer to other customers with similar profiles, and the network performance characteristics that would have affected the customer's experience, and can include the following: specific point of customer acquisition; device and plan purchase history; transaction and offer history; web, call center, and mobile app usage history and resulting actions; prior disconnect and payment delinquency scores from similar customers; revenue-related actions taken by similar customers; and/or network quality in a customer's most frequented locations.

Figure 30:
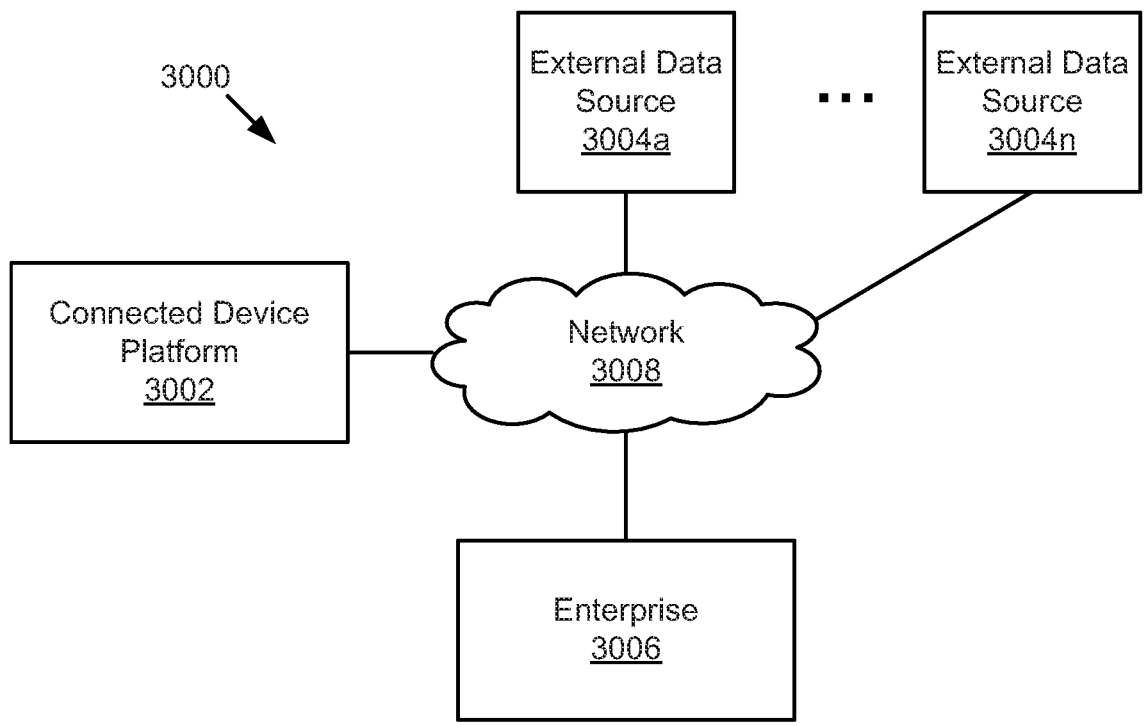
FIG. 30 illustrates an example environment of an enterprise Internet-of-Things application development platform, according to one embodiment.

FIG. 30 illustrates an example environment 3000 for data management in accordance with an embodiment of the present technology. The environment 3000 includes an enterprise Internet-of-Things application development platform 3002, external data sources 3004*a-n*, an enterprise 3006, and a network 3008. The enterprise Internet-of-Things application development platform 3002 may represent any of the systems 200 or 1900 of FIG. 2 or FIG. 19 and may implement any of the functionality, hardware, sensor networks, or methods discussed herein. Similarly, any of the features, devices, or methods discussed in relation to FIGS. 30-36 may be included or combined with the embodiments of FIGS. 2-29. The enterprise Internet-of-Things application development platform 3002 may allow the enterprise 3006 to track, analyze, and optimize data and operations of the enterprise 3006. The enterprise Internet-of-Things application development platform 3002 may constitute an analytics platform. The analytics platform may handle data management, multi-layered analysis, and data visualization capabilities for all applications of the enterprise Internet-of-Things application development platform 3002. The analytics platform may be specifically designed to process and analyze significant volumes of frequently updated data while maintaining high performance levels.

The enterprise Internet-of-Things application development platform 3002 may communicate with the enterprise 3006 through UIs presented by the enterprise Internet-of-Things application development platform 3002 for the enterprise 3006. The UIs may provide information to the enterprise 3006 and receive information from the enterprise 3006. The enterprise Internet-of-Things application development platform 3002 may communicate with the external data sources 3004a-n through APIs and other communication interfaces. Communications involving the enterprise Internet-of-Things application development platform 3002, the external data sources 3004a-b, and the enterprise 3006 are discussed in more detail herein.

The enterprise Internet-of-Things application development platform 3002 may be implemented as a computer system, such as a server or series of servers and other hardware (e.g., applications servers, analytic computational servers, database servers, data integrator servers, network infrastructure (e.g., firewalls, routers, and communication nodes)). The servers may be arranged as a server farm or cluster. Embodiments of the present technology may be implemented on the server side, on the client side, or a combination of both. For example, embodiments of the present technology may be implemented by one or more servers of the enterprise Internet-of-Things application development platform 3002. As another example, embodiments of the present technology may be implemented by a combination of servers of the enterprise Internet-of-Things application development platform 3002 and a computer system of the enterprise 3006.

In some embodiments, the enterprise Internet-of-Things application development platform 3002 may be implemented, owned, maintained, and/or controlled by a single entity. The entity may be a company or other type of organization. In some embodiments, all of the components of the enterprise Internet-of-Things application development platform 3002, as discussed in more detail herein, may be implemented, owned, maintained, and/or controlled by a single entity. In other embodiments, some of the components of the enterprise Internet-of-Things application development platform 3002 may be implemented, owned, maintained, or controlled by one entity while other of the components may be provided to the one entity by another entity.

The external data sources 3004a-n may represent a multitude of possible sources of data relevant to industry analysis (such as the data sources 208 discussed in relation to the previous figures). In general, the external data sources 3004a-n may include smart, connected devices (or products) related to an enterprise. A smart, connected device may include physical components that, for example, can constitute or provide the mechanical and electrical utility of the device. A smart, connected device also may include sensors or meters, microprocessors, data storage, controls, software, an embedded operating system, and/or a user interface. The sensors or meters can be any type of sensor or meter capable of detecting, measuring, sensing, recording, or otherwise observing any type of phenomenon or activity. A smart, connected device also may include communication components that allow the device to share data relating to operations of an enterprise with one or more entities, such as the enterprise Internet-of-Things application development platform 3002, a manufacturer of the device, other smart, connected devices, other entities, etc. Such communication can allow the enterprise Internet-of-Things application development platform 3002 to perform, for example, rigorous predictive analytics, data exploration, machine learning, and complex data visualization requiring responsive design. The external data sources 3004a-n also may include other types of data sources.

The enterprise 3006 may represent a user (e.g., customer) of the enterprise Internet-of-Things application development platform 3002. The enterprise 3006 may include any private or public concern, such as large companies, small and medium businesses, households, individuals, governing bodies, government agencies, non-governmental organizations, nonprofits, etc. As just one example, with respect to the energy industry and the utilities sector in particular, the enterprise 3006 may include energy suppliers (e.g., utilities), energy service companies (ESCOs), and energy consumers. The enterprise 3006 may be associated with one or many facilities or distributed over many geographic locations. The enterprise 3006 may be associated with any purpose, industry, or other type of profile.

The network 3008 may use standard communications technologies and protocols. Thus, the network 3008 may include links using technologies such as Ethernet, 802.11, worldwide interoperability for microwave access (WiMAX), 3G, 4G, CDMA, GSM, LTE, digital subscriber line (DSL), power line communication (PLC), etc. Similarly, the networking protocols used on the network 3008 may include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 3008 may be represented using technologies and/or formats including hypertext markup language (HTML) and extensible markup language (XML). In addition, all or some links may be encrypted using conventional encryption technologies such as secure sockets layer (SSL), transport layer security (TLS), and Internet Protocol security (IPsec).

In an embodiment, each of the enterprise Internet-of-Things application development platform 3002, the external data sources 3004a-n, and the enterprise 3006 may be implemented as a computer system. The computer system may include one or more machines, each of which may be implemented as machine 3600 of FIG. 36, which is described in further detail herein.

Figure 31:
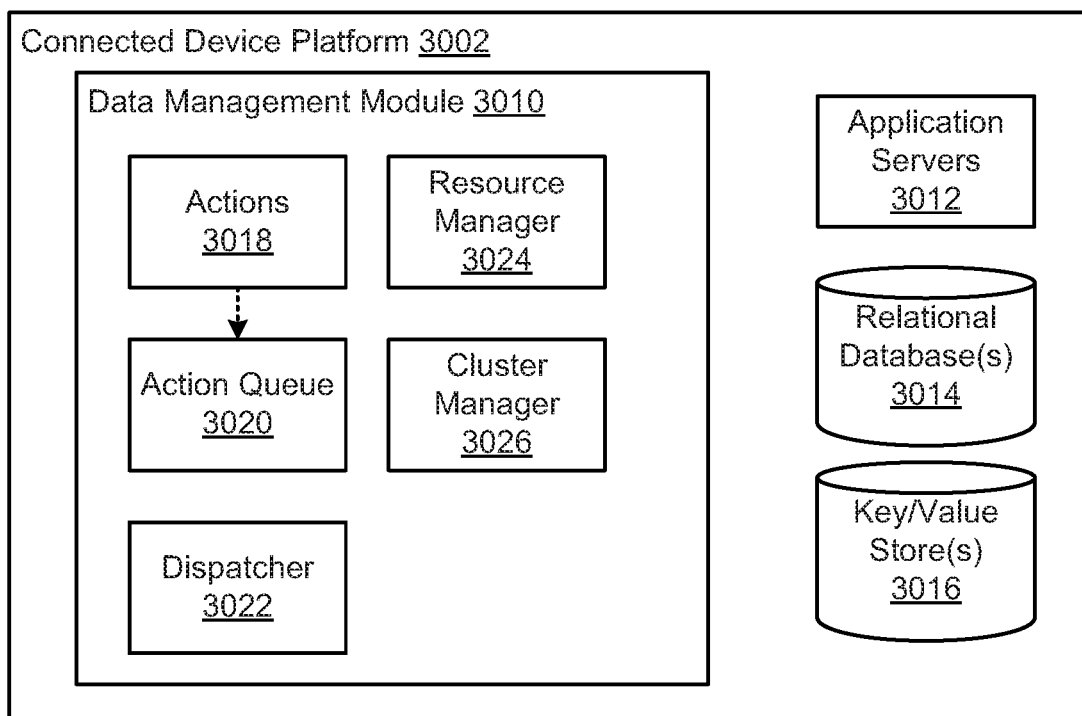
FIG. 31 illustrates an example enterprise Internet-of-Things application development platform, according to one embodiment.

FIG. 31 illustrates an example enterprise Internet-of-Things application development platform 3002 in accordance with an embodiment of the present technology. In an embodiment, the enterprise Internet-of-Things application development platform 3002 may include a data management module 3010, applications servers 3012, relational databases 3014, and key/value stores 3016.

The data management module 3010 may support the capability to automatically and dynamically scale a network of computing resources for the enterprise Internet-of-Things application development platform 3002 according to demand on the enterprise Internet-of-Things application development platform 3002. The dynamic scaling supported by the data management module 3010 may include the capability to provision additional computing resources (or nodes) to accommodate increasing computing demand. Likewise, the data management module 3010 may include the capability to release computing resources to accommodate decreasing computing demand. The data management module 3010 may include one or more action(s) 3018, a queue 3020, a dispatcher 3022, a resource manager 3024, and a cluster manager 3026.

The actions 3018 may represent the tasks that are to be performed in response to requests that are provided to the enterprise Internet-of-Things application development platform 3002. Each of the actions 3018 may represent a unit of work to be performed by the applications servers 3012. The actions 3018 may be associated with data types and bound to engines (or modules). The requests may relate to any task supported by the enterprise Internet-of-Things application development platform 3002. For example, the request may relate to, for example, analytic processing, loading industry-related data, retrieving a sensor or meter reading, retrieving benchmark data, etc. The actions 3018 are provided to the action queue 3020.

The action queue 3020 may receive each of the actions 3018. The action queue 3020 may be a distributed task queue and represents work that is to be routed to an appropriate computing resource and then performed.

The dispatcher 3022 may associate and hand-off a queued action to an engine that will execute the action. The dispatcher 3022 may control routing of each queued action to a particular one of the applications servers 3012 based on load balancing and other optimization considerations. The dispatcher 3022 may receive an instruction from the resource manager 3024 to provision new nodes when the current computing resources are at or above a threshold capacity. The dispatcher 3022 also may receive an instruction from the resource manager to release nodes when the current computing resources are at or below a threshold capacity. The dispatcher 3022 accordingly may instruct the cluster manager 3026 to dynamically provision new nodes or release existing nodes based on demand for computing resources. The nodes may be computing nodes or storage nodes in connection with the applications servers 3012, the relational databases 3014, and the key/value stores 3016.

The resource manager 3024 may monitor the action queue 3020. The resource manager 3024 also may monitor the current load on the applications servers 3012 to determine the availability of resources to execute the queued actions. Based on the monitoring, the resource manager may communicate, through the dispatcher 3022, with the cluster manager 3026 to request dynamic allocation and de-allocation of nodes.

The cluster manager 3026 may be a distributed entity that manages all of the nodes of the applications servers 3012. The cluster manager 3026 may dynamically provision new nodes or release existing nodes based on demand for computing resources. The cluster manager 3026 may implement a group membership services protocol. The cluster manager 3026 also may perform a task monitoring function. The task monitoring function may involve tracking resource usage, such as CPU utilization, the amount of data read/written, storage size, etc.

The applications servers 3012 may perform processes that manage or host analytic server execution, data requests, etc. The engines provided by the enterprise Internet-of-Things application development platform 3002, such as the engines that perform data services, batch processing, stream services, may be hosted within the applications servers 3012. The engines are discussed in more detail herein.

In an embodiment, the applications servers 3012 may be part of a computer cluster of a plurality of loosely or tightly connected computers that are coordinated to work as a system in performing the services and applications of the enterprise Internet-of-Things application development platform 3002. The nodes (e.g., servers) of the cluster may be connected to each other through fast local area networks ("LAN"), with each node running its own instance of an operating system. The applications servers 3012 may be implemented as a computer cluster to improve performance and availability over that of a single computer, while typically being more cost-effective than single computers of comparable speed or availability. The applications servers 3012 may be software, hardware, or a combination of both.

The relational databases 3014 may maintain various data supporting the enterprise Internet-of-Things application development platform 3002. In an embodiment, non-time-series data may be stored in the relational databases 3014, as discussed in more detail herein.

The key/value stores 3016 may maintain various data supporting the enterprise Internet-of-Things application development platform 3002. In an embodiment, time-series data (e.g., sensor or meter readings, sensor or meter events, etc.) may be stored in the key/value store, as discussed in more detail herein. In an embodiment, the key/value stores 3016 may be implemented with Apache Cassandra, an open source distributed database management system designed to handle large amounts of data across a multitude of commodity servers. In an embodiment, other database management systems for key/value stores may be used.

In an embodiment, one or more of the applications servers 3012, the relational databases 3014, and the key/value stores 3016 may be implemented by the entity that owns, maintains, or controls the enterprise Internet-of-Things application development platform 3002.

In an embodiment, one or more of the applications servers 3012, the relational databases 3014, and the key/value stores 3016 may be implemented by a third party that may provide a computing environment for lease to the entity that owns, maintains, or controls the enterprise Internet-of-Things application development platform 3002. In an embodiment, the applications servers 3012, the relational databases 3014, and the key/value stores 3016 implemented by the third party may communicate with the enterprise Internet-of-Things application development platform 3002 through a network, such as the network 3008.

The computing environment provided by the third party for the entity that owns, maintains, or controls the enterprise Internet-of-Things application development platform 3002 may be a cloud computing platform that allows the entity that owns, maintains, or controls the enterprise Internet-of-Things application development platform 3002 to rent virtual computers on which to run its own computer applications. Such applications may include, for example, the applications performed by the applications server 3200, as discussed in more detail herein. In an embodiment, the computing environment may allow a scalable deployment of applications by providing a web service through which the entity that owns, maintains, or controls the enterprise Internet-of-Things application development platform 3002 can boot a virtual appliance used to create a virtual machine containing any software desired. In an embodiment, the entity that owns, maintains, or controls the enterprise Internet-of-Things application development platform 3002 may create, launch, and terminate server instances as needed, paying based on time usage time, data usage, or any combination of these or other factors. The ability to provision and release computing resources in this manner supports the ability of the enterprise Internet-of-Things application development platform 3002 to dynamically scale according to the demand on the enterprise Internet-of-Things application development 3002.

Figure 32:
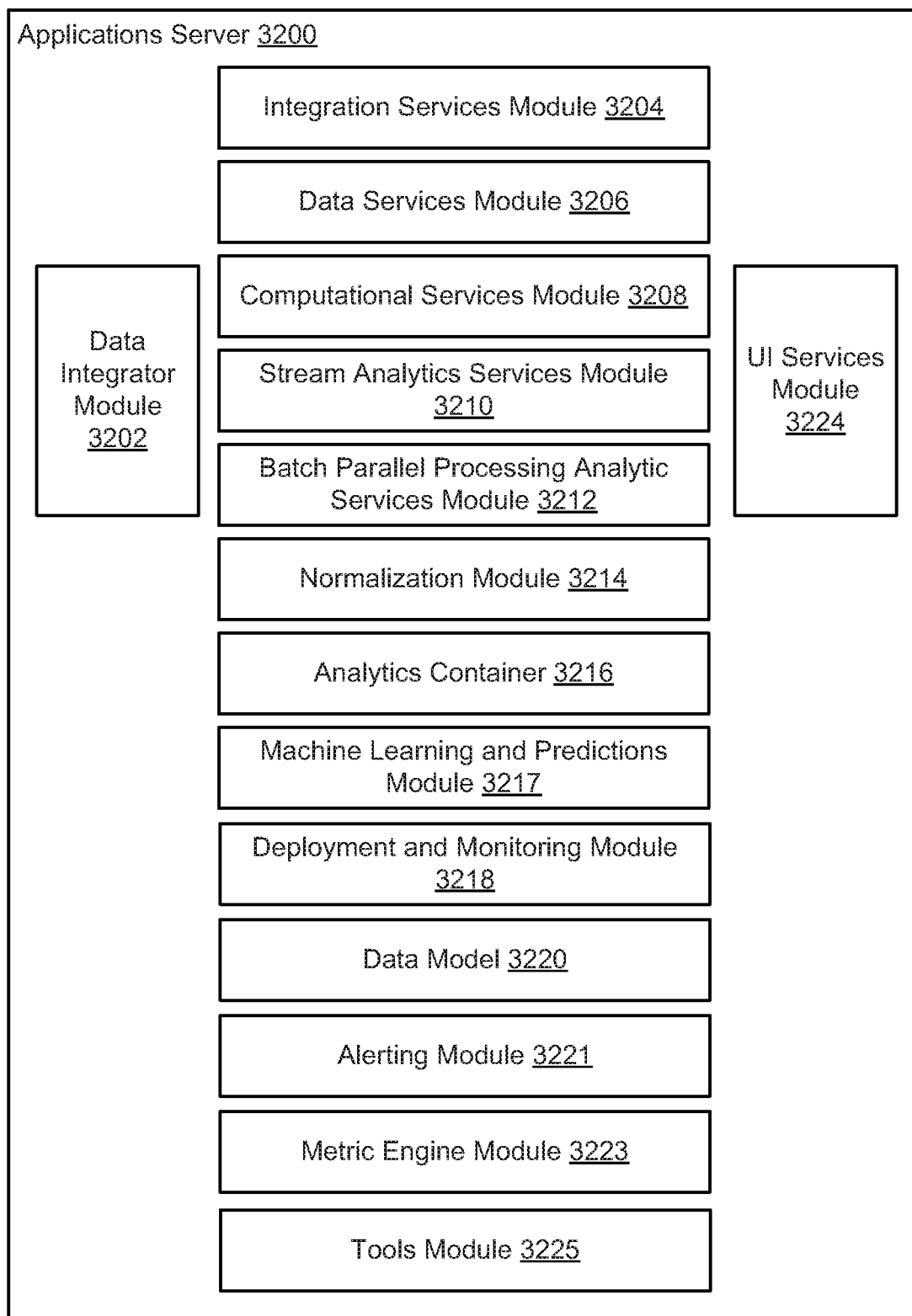
FIG. 32 illustrates an example applications server of an enterprise Internet-of-Things application development platform, according to one embodiment.

FIG. 32 illustrates an example applications server 3200 of an enterprise Internet-of-Things application development platform Internet-of-Things in accordance with an embodiment of the present technology. In an embodiment, one or more of the applications servers 3012 may be implemented with applications server 3200. The enterprise Internet-of-Things application development platform 3002 includes a data integrator (data loading) module 3202, an integration services module 3204, a data services module 3206, a computational services module 3208, a stream analytic services module 3210, a batch parallel processing analytic services module 3212, a normalization module 3214, an analytics container 3216, a machine learning and predictions module 3217, a deployment and monitoring module 3218, a data model 3220, an alerting module 3221, a metric engine module 3223, a user interface (UI) services module 3224, and a tools module 3225.

The analytics platform supported by the applications server 3200 includes multiple services that each handles a specific data management or analysis capability. The services include the data integrator module 3202, the integration services module 3204, the data services module 3206, the computational services module 3208, the stream analytic services module 3210, batch parallel processing analytic services module 3212, the normalization module 3214, the analytics container 3216, the metric engine module 3223, the tools module 3225, and the UI services module 3224. All or some services within the analytics platform may be modular and accordingly architected specifically to execute their respective capabilities for large data volumes and at high speed. The services may be optimized in software for high performance distributed computing over a computer cluster including the applications servers 3012.

The modules and components of the applications server 3200 in FIG. 32 and the modules and components (e.g., elements, steps, blocks, etc.) in all of the figures herein are merely exemplary, and may be variously combined into fewer modules and components, or separated into additional modules and components. Other implementations or embodiments may include additional, fewer, integrated, or different modules and components. Some modules and components may not be shown so as not to obscure relevant details. The described functionality of the modules and components may be performed by other modules and components.

The data integrator module 3202 is a tool for automatically importing data maintained in software systems or databases of the external data sources 3004a-n into the enterprise Internet-of-Things application development platform 3002. The imported data may be used for various applications of the enterprise Internet-of-Things application development platform 3002 or the application server 3200. The data integrator module 3202 accepts data from a broad range of data sources, including but not limited smart, connected devices including sensors and meters. As just one example, with respect to the energy industry and the utilities sector in particular, the data sources can include grid and operational systems such as MDM, CIS, and billing systems, as well as third-party data sources such as weather databases, building databases (e.g., Urban Planning Council database), third-party property management systems, and external benchmark databases. In this example relating to the utilities sector, the imported data may include, for example, meter data (e.g., electricity consumption, water consumption, natural gas consumption) provided at minimum daily or other time intervals (e.g., 255-minute intervals), weather data (e.g., temperature, humidity) at daily or other time intervals (e.g., hourly intervals), building data (e.g., square footage, occupancy, age, building type, number of floors, air conditioned square footage), aggregation definitions (hierarchy) (e.g., meters to building, buildings to city block, building's regional identification), and asset data (e.g., number and type of HVAC assets, number and type of production units (for plants)).

The data integrator module 3202 also has the ability to import information from flat files, such as Excel spreadsheets, and has the ability to capture information entered directly into an application of the enterprise Internet-of-Things application development platform 3002. By incorporating data from a broad array of sources, the application server 3200 is capable of performing complex and detailed analyses, enabling greater business insights.

The data integrator module 3202 provides a set of standardized canonical type definitions (standardized interface definitions) that can be used to load data into applications of the application server 3200. The canonical types of the data integrator module 3202 may be based on current or emerging industry standards, such as the Common Information Model (CIM), industry focused standards (e.g., with respect to the energy industry and the utility sector, Green Button and Open Automatic Data Exchange), or on the specifications of the application server 3200. The application server 3200 may support these and other standards to ensure that a broad range of data sources will be able to connect easily to the enterprise Internet-of-Things application development platform 3002.

As just one example, with respect to the energy industry, canonical types may include, for example:

TABLE 3

| CANNONICAL TYPE | DEFINITION AND DESCRIPTION |
| --- | --- |
| Organization | An individual entity or sub entity involved in the consumption of energy. Example data source: Customer Information System (CIS). Associated data includes: name, organizational hierarchy, organizational identification number, primary contact, contact information. |
| Facility | A facility such as an office, data center, hospital, etc. A facility is placed at a location and is owned or leased by an organization. |

TABLE 3-continued

| CANNONICAL TYPE | DEFINITION AND DESCRIPTION |
|---|---|
| | Example data sources: CIS, billing system, data warehouse. Associated data includes: facility name, mailing address, ownership, facility identification number, service address, building characteristics such as floor area, longitude/latitude, date of construction. |
| Service | Agreements an organization has with a utility. Example data sources: billing system, data warehouse. Associated data includes: service account number, billing account number, bill-to accounts, types of services provided (electricity, natural gas, water), associated meters and facilities. |
| Billing | Vendor data as presented on utility bills. Example data source: billing system. Associated data includes: start date, end date, billed consumption, billed demand, peak demand, reactive demand, taxes and fees, bill number. |
| UsagePoint | The resource-consuming entity for which interval data is provided. Example data sources: meter data management system (MDM). Associated data includes: asset associated with meter, type of resource measured (electricity, natural gas), measurement methodology, unit of measure. |
| MeterReading | A unique type of measurement - for example, power (kW), consumption (kWh), voltage, temperature, etc. A MeterReading contains both measurement values and timestamps. Example data sources: MDM. Associated data includes: resource consumption data, resource demand data, time period. |
| Energy Conservation Measure | An action undertaken to reduce the energy consumption and spend. Example data sources: data warehouse, spreadsheets. Associated data includes: project name, project type, estimated cost, estimated resource savings, estimated financial savings, simple payback, return on investment, measure lifetime, facility. |
| External Benchmark | Industry standard benchmark data. External Benchmarks can apply for a whole facility or can apply to an end-use category. Example data sources: third party databases. Associated data includes: facility type, building size, climate region, building vintage, end use, end use energy intensity, whole building energy intensity, energy cost intensity, whole building energy cost intensity. |
| Region | User-defined geographic area where an organization does business. Hierarchy of subsections that allows the creation of aggregated analyses. Data source: CIS, data warehouse. Associated data includes: region definitions, parent/child relationship definitions. |

Other canonical types relating to other industries can be used by the enterprise Internet-of-Things application development platform 3002. Once the data in canonical form is received, the data integrator module 3202 may transform the data into individual data entities in accordance with the data model 3220 so that the data can be loaded into a database schema to be stored, processed, and analyzed.

The data integrator module 3202 is capable of handling very high volumes of data (e.g., "big data"). For example, the data integrator module 3202 may frequently process interval data from millions or more of sensors and meters (e.g., digital sensors and meters). To receive data, the application server 3200 may provide a consistent secured web service API (e.g., REST). Integration can be carried out in an asynchronous batch or real-time mode. The data integrator module 3202 may incorporate real-time and batch data. As just one example, with respect to the energy industry and the utilities sector in particular, such real-time and batch data can come from, for example, utility customer systems, building characteristic systems, industry-standard benchmark systems, utility energy conservation measures and rebate databases, utility enterprise systems, MDM, and utility operational systems. When an external data source does not possess an API or computerized means by which to extract data, the application server 3200 can pull data directly from a web page associated with the external data source (e.g., by using web scraping).

The data integrator module 3202 also may perform initial data validation. The data integrator module 3202 may examine the structure of the incoming data to ensure that required fields are present and that the data is of the right data type. For example, the data integrator module 3202 may recognize when the format of the provided data does not match the expected format (e.g., a number value is erroneously provided as text), prevents the mismatched data from being loaded, and logs the issue for review and investigation. In this way, the data integrator module 3202 may serve as a first line of defense in ensuring that incoming data meets the requirements for accurate analysis.

The integration services module 3204 serves as a second layer of data validation or proofing, ensuring that data is error-free before it is loaded into a database or store. The integration services module 3204 receives data from the data integrator module 3202, monitors the data as it flows in, performs a second round of data checks, and passes data to the data services module 3206 to be stored.

The integration services module 3204 may provide various data management functions. The integration services module 3204 may perform duplicate handling. The integration services module 3204 may identify instances of data duplication to ensure that analysis is accurately conducted on a singular data set. The integration services module 3204 can be configured to process duplicates according to business requirements specified by a user (e.g., treating two duplicate records as the same or averaging duplicate records). This flexibility allows the application server 3200 to conform to customer standards for data handling.

The integration services module 3204 may perform data validation. The integration services module 3204 may determine whether there are data gaps and data anomalies (e.g., statistical anomalies), identify outliers, and conduct referential integrity checks. Referential integrity checking ensures that data has the correct network of associations to enable analysis and aggregation, such as ensuring that loaded sensor or meter data is associated with a smart, connected device or, conversely, that smart, connected devices have associated sensors or meters. The integration services module 3204 resolves data validation issues according to the business requirements specified by a user.

The integration services module 3204 may perform data monitoring. The integration services module 3204 can provide end-to-end visibility throughout the entire data loading process. Users can monitor a data integration process as it progresses from duplicate detection through to data storage. Such monitoring helps to ensure that data is loaded properly and is free of duplication and validation errors.

The data services module 3206 is responsible for persisting (storing) large and increasing volumes of data, while also making data readily available for analytical calculations. The data services module 3206 partitions data in various ways, including into relational and non-relational (key/value store) databases and also performs operations on stored data. These operations include creating, reading, updating, and deleting data. A data engine of the data services module 3206 may persist data for stream processing. The data engine of the data services module 3206 also may identify a data set to be processed in connection with a batch job for batch parallel processing.

The data services module 3206 may perform data partitioning. The data services module 3206 takes advantage of various data stores, including relational and non-relational data stores, such as the relational database 3014 and the key/value store 3016. By "partitioning" the data into two separate data stores, the relational database 3014 and the key/value store 3016, the application server 3200 ensures that its applications can efficiently process and analyze the large volumes of data, such as interval data originating from sensors and meters. The data in the relational database 3014 and the key/value store 3016 is stored in accordance with the data model 3220 of the enterprise Internet-of-Things application development platform 3002.

The relational database 3014 is designed to manage structured and slow-changing data. Examples of such data include organization (e.g., customer) and facility data. Relational databases, like the relational database 3014, are designed for random access updates.

The key/value store 3016 is designed to manage very large volumes of interval (time-series) data, such as sensor and meter data. Key/value stores, like the key/value store 3016, are designed for large streams of "append only" data that are read in a particular order. "Append only" refers to new data that is simply added to the end of an associated file. By using the dedicated key/value store 3016 for interval data, the application server 3200 ensures that this type of data is stored efficiently and can be accessed quickly.

The data services module 3206 may perform distributed data management. The data services module 3206 may include an event queue that schedules provision of notifications to perform stream processing and batch parallel processing. With respect to batch parallel processing, the scheduling may be based on rules that account for the availability of processing resources in an associated cluster in the enterprise Internet-of-Things application development platform 3002. As data volumes grow, the data services module 3206 automatically adds nodes to the cluster to accommodate (e.g., store and process) the new data. As nodes are added, the data services module 3206 automatically rebalances and partitions the data across all nodes, ensuring continued high performance and reliability.

The computational services module 3208 is a library of analytical functions that are invoked by the stream analytic services module 3210 and the batch parallel processing analytic services module 3212 to perform business analyses. The functions can be executed individually or combined to form complex analyses. The services provided by the computational services module 3208 may be modular (i.e., dedicated to a single task) so that the computational services module 3208 can parallel process a large number of computations simultaneously and quickly, which allows for significant computational scalability.

The computational services module 3208 also may leverage distributed processing to create even greater scalability. As just one example, with respect to the energy industry and the utilities sector in particular, if a user is interested in calculating the average annual electricity use for hundreds of thousands of meters, the enterprise Internet-of-Things application development platform 3002 is capable of rapidly responding by distributing the request across multiple servers.

The stream analytic services module 3210 performs sophisticated analyses on real-time and near-real-time streams of data. A stream may represent, for example, a feed of high volume data from a sensor or meter, or sub-meter. In an embodiment, the stream may be a SCADA feed of data or other suitable data feed. The stream analytic services module 3210 may be invoked to analyze this data when the analysis needs to be conducted soon after the data is generated.

The stream analytic services module 3210 may include a stream processor to convert the stream into data that is in accordance with the data model 3220. The stream analytic services module 3210 also may include stream processing logic, which can be provided by a user of the enterprise Internet-of-Things application development platform 3002. The stream processing logic may provide a calculated result that can be persisted and used for subsequent analysis. The stream processing logic also may provide an alert based on a calculated result. As just one example, with respect to the energy industry and the utilities sector in particular, a utility may want to receive alerts and on-the-fly analysis when there is an unexpected and significant drop or spike in load. In this example, the load variation could be caused by a malfunctioning piece of equipment or sudden damage to equipment, and could possibly represent great risk to the distribution system or an end customer. In this example, data about the unexpected load change can be rapidly recognized, analyzed, and used to send the necessary alert. The stream processing logic also may provide, after processing the original stream, a new stream based on the processed original stream for another purpose or application of the enterprise Internet-of-Things application development platform 3002.

The stream analytic services module 3210 may perform near real-time, continuous processing. Because processing by the stream analytic services module 3210 occurs very quickly after the data arrives, time-sensitive, high priority analyses provided by the enterprise Internet-of-Things application development platform 3002 are relevant and actionable.

The stream analytic services module 3210 may provide horizontal scalability. In order to manage large volumes of data simultaneously, processing by the stream analytic services module 3210 can be distributed throughout a server cluster, a set of computers working together.

The stream analytic services module 3210 may provide fault tolerance. Streams may be persisted. If a processing failure occurs on one node (e.g., a computer in a cluster), the workload will be distributed to other nodes within the cluster with no loss of data. A stream may be discarded after the processing performed on the stream is completed.

A non-limiting example is provided to illustrate performance of the stream analytic services module 3210. Assume streams of recently generated industry data. As just one example, with respect to the energy industry and the utilities sector in particular, the streams of recently generated industry data can include electricity consumption and demand data. In other examples, the streams of recently generated industry data can relate to other industries. The streams may be provided to an event queue associated with the data services module 3206. When the data arrives into the event queue, automatic analytic processes are triggered. Multiple analytic processes, or analyses, can be run upon the same data set. The analytic processes may be performed in parallel. Parallel processing on the same data set enables faster processing of multiple analyses. The outputs of these analytic processes may be alerts and calculations that are then stored in a database and made available to designated end users as analysis results. The analytic processes and processing tasks may be distributed across multiple servers that support the stream analytic services module 3210. In this way, large data volumes can be rapidly processed by the stream analytic services module 3210.

The batch parallel processing analytic services module 3212 may perform a substantial portion of analysis required by users of the enterprise Internet-of-Things application development platform 3002.

The batch parallel processing analytic services module 3212 may analyze large data sets comprised of current and historical data to create reports and analyses. As just one example, with respect to the energy industry and the utilities sector in particular, such reports and analyses can include periodic Key Performance Indicator (KPI) reporting, historical electricity use analysis, forecasts, outlier analysis, energy efficiency project financial impact analysis, etc. In an embodiment, the batch parallel processing analytic services module 3212 may be based on MapReduce, a programming model for processing large data sets and distributing computations on one or more clusters of computers. The batch parallel processing analytic services module 3212 automatically performs the tasks of parallelization, fault-tolerance, and load balancing, thereby improving the performance and reliability of processing-intensive tasks.

A non-limiting example is provided to illustrate performance of the batch parallel processing analytic services module 3212. As just one example, with respect to the energy industry and the utilities sector in particular, a benchmark analysis of energy intensity, a summary of performance against key performance indicators, and an analysis of unbilled energy due to nontechnical losses can be jobs handled by the batch parallel processing analytic services module 3212. In other examples, other jobs relevant to other industries can be handled by the batch parallel processing analytic services module 3212. When a batch processing job is invoked in the enterprise Internet-of-Things application development platform 3002, an input reader associated with the batch parallel processing analytic services module 3212 breaks down the processing job into multiple smaller batches. This break down reduces the complexity and processing time of the job. Each batch is then handed to a worker process to perform its assigned task (e.g., a calculation or evaluation). The results are then "shuffled," which refers to rearrangement of the data set so that the next set of worker processes can efficiently complete the calculation (or evaluation) and quickly write results to a database through an output writer.

The batch parallel processing analytic services module 3212 can distribute worker processes across multiple servers. Such distributed processing is employed to fully utilize the computational power of the cluster and to ensure that calculations are completed quickly and efficiently. In this way, the batch parallel processing analytic services module 3212 provides scalability and high performance.

The normalization module 3214 may normalize sensor or meter data that is to be maintained in the key/value store 3016. For example, normalization of sensor or meter data may involve filling in gaps in the data and addressing outliers in the data. For example, if sensor or meter data is expected at consistent intervals but data actually provided to the enterprise Internet-of-Things application development platform 3002 does not have sensor or meter data at certain intervals, the normalization module 3214 may apply certain algorithms (e.g., interpolation) to provide the missing data. As another example, aberrational values of data can be detected and addressed by the normalization module 3214. In an embodiment, normalization performed by the normalization module 3214 may be configurable. For example, the algorithms (e.g., linear, non-linear) used by the normalization module 3214 may be specified by an administrator or a user of the enterprise Internet-of-Things application development platform 3002. Normalized data may be provided to the key/value store 3016.

The machine learning and predictions module 3217 can implement one or more varieties of machine learning algorithms to enhance analytics on industry data. The machine learning and predictions module 3217 can perform a variety of functions, such as processing basic statistics, such as summary statistics, correlations, stratified sampling, hypothesis testing, and random data generation; classification and regression using linear models (e.g., SVMs, logistic regression, linear regression, generalized linear models), decision trees, naïve Bayes; collaborative filtering, such as alternating least squares (ALS); clustering, such as k-means; dimensionality reduction, such as singular value decomposition (SVD), principal component analysis (PCA); feature extraction and transformation; feature selection, such as orthogonal matching pursuit and greedy forward selection; and optimization (developer), such as stochastic gradient descent, limited-memory BFGS (L-BFGS), and Newton's method.

The machine learning and predictions module 3217 can integrate back with the source systems to learn and update automatically. In some embodiments, the machine learning and predictions module 3217 can receive information, such as a feed, from the analytics container 3216 to enable predictions and learning. As just one example, with respect to revenue protection, the results of analytics processing on batch data and stream data can be provided to the a machine learning model of the machine learning and predictions module 3217 to score where revenue theft might be occurring. The machine learning and predictions module 3217 can rank various cases of potential revenue theft for a user of the enterprise Internet-of-Things application development platform 3002, such as a utility, to investigate. The user can prepare and send a work order to a work order system to investigate some (e.g., cases satisfying a threshold value) (or all) of the cases to determine whether any of the cases involve actual revenue theft. In some embodiments, the enterprise Internet-of-Things application development platform 3002 can provide a work order system for the user, or can be integrated with a work order system utilized by the user. The machine learning and predictions module 3217 can receive information relating to results of the investigation of the cases to determine whether each case is a true positive case involving actual revenue theft or a false positive. The information can be used to train and retrain the machine learning model of the machine learning and predictions module 3217.

The machine learning and predictions module 3217 can include feature extraction, classification, and ranking. With respect to extraction, analytic processing may be performed on sensor and meter datasets, event datasets, or other datasets. As just one example, with respect to the energy industry and the utilities sector in particular, the data sets may include information from grid and operational systems, such as sensor, SCADA, MDM, CIS, and other types of data identified herein. In this example, the datasets may be used to identify signatures to predict asset failures, theft, consumption, demand, or other features such as consumption on inactive meter, tamper events, drop in consumption, electric vehicle charging, solar production at night, etc. The datasets may be based on data maintained in the relational databases 3014 and the key/value stores 3016. With respect to classification, different features may be selectively merged or weighted, and elements may be grouped to generate a set of follow-up opportunities. With respect to ranking, resulting opportunities may be prioritized based on the preferences and business operations of the enterprise 3006. In an embodiment, prediction may be performed by the enterprise Internet-of-Things application development platform 3002.

In an embodiment, feedback may involve investigation by the enterprise 3006 (e.g., utility) resulting in empirical data regarding operation or conditions (e.g., energy usage). The results of investigation may allow for the provision by the enterprise 3006 of feedback to the machine learning and predictions module 3217 to adjust learned detection parameters. The design and operation of the machine learning and predictions module 3217 is further discussed elsewhere herein.

The alerting module 3221 can transmit a warning, notification, or other informational content generated by one or more modules of the enterprise Internet-of-Things application development platform 3002 to users and/or systems or devices when predefined conditions are met. After analyses are completed by the stream analytics services module 3210, the batch parallel processing analytic services module 3212, or the machine learning and prediction module 3217, the alerting module 3221 can deliver the analytic results to the appropriate users or systems via SMS, email, instant message, or other communications system.

The UI services module 3224 provides the graphical framework for all applications of the enterprise Internet-of-Things application development platform 3002. The UI services module provides visualization of analytical results so that end users may receive insights that are clear and actionable. After analyses are completed by the stream analytic services module 3210 or the batch parallel processing analytic services module 3212, they may be graphically rendered by the UI services module 3224, provided to the appropriate application of the enterprise Internet-of-Things application development platform 3002, and ultimately presented on a computer system (e.g., machine) of the user. This delivers data insights to users in an intuitive and easy-to-understand format.

The UI services module 3224 provides many features. The UI services module 3224 may provide a library of chart types and a library of page layouts. All variations in chart types and page layouts are maintained by the UI services module 3224. The UI services module 3224 also may provide page layout customization. Users, such as administrators, can add, rename, and group fields. As just one example, with respect to the energy industry and the utilities sector in particular, the enterprise Internet-of-Things application development platform 3002 allows a utility administrator to group energy intensity, energy consumption, and energy demand together on a page for easier viewing. The UI services module 3224 may provide role-based access controls. Administrators can determine which parts of the application will be visible to certain types of users. Using these features, the UI services module 3224 ensures that end users enjoy a consistent visual experience, have access to capabilities and data relevant to their roles, and can interact with charts and reports delivering clear business insights.

Figure 33:
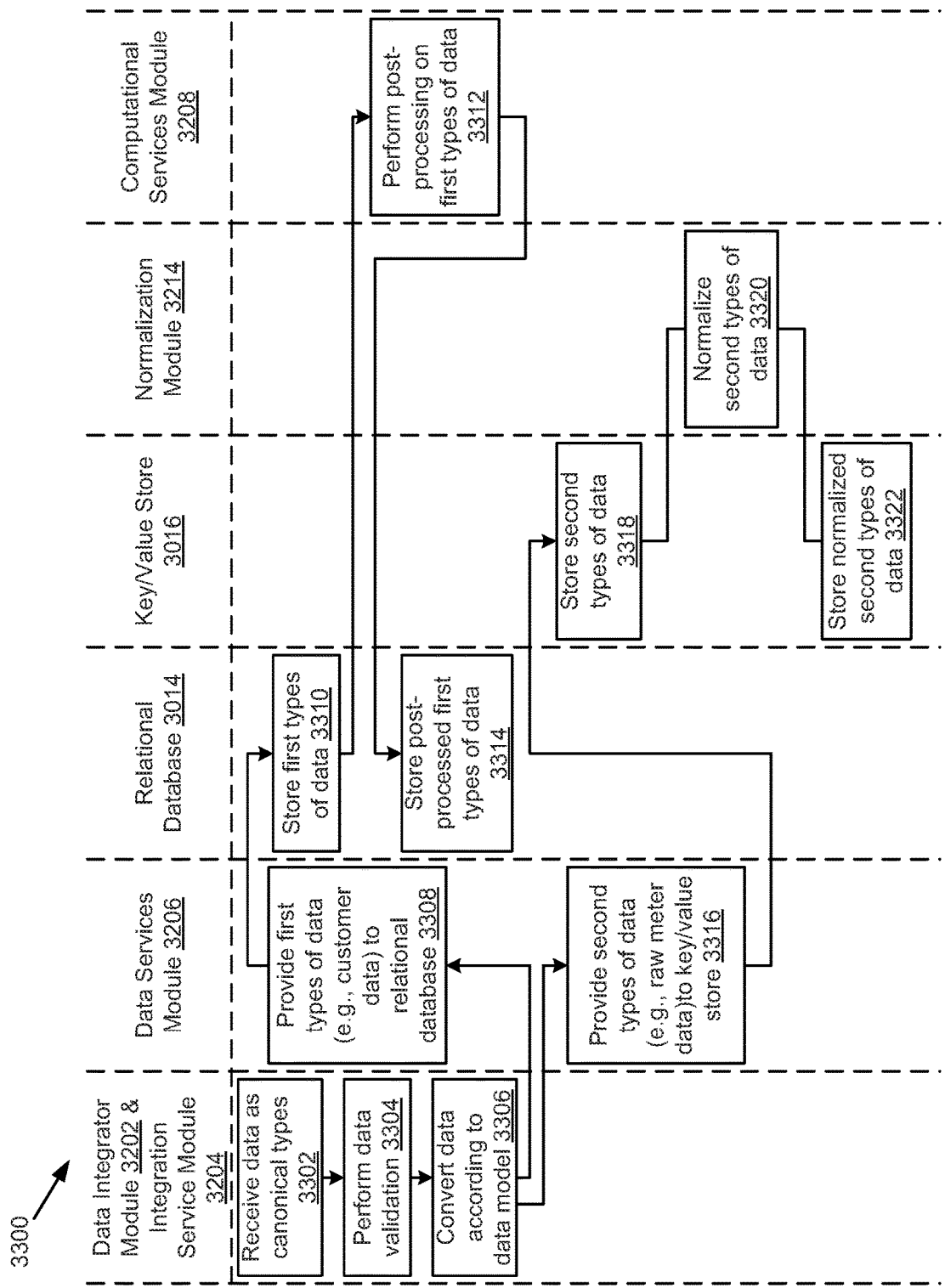
FIG. 33 illustrates an example data loading process, according to one embodiment.

FIG. 33 illustrates an example process 3300 for data loading in accordance with an embodiment of the present technology. At block 3302, the data integrator module 3202 and the integration services module 3204 receive data relating to energy usage as canonical types. The canonical types may be consistent with industry standards or specifications unique to the enterprise Internet-of-Things application development platform 3002. At block 3304, the data integrator module 3202 and the integration services module 3204 perform different tasks, such as initial data validation, duplicate handling, and subsequent data validation on the received data. At block 3306, the data integrator module 3202 converts the data according to the data model 3220. For first types of data, the process 3300 proceeds from block 3306 to block 3308. At block 3308, the data services module 3206 provides the first types of data to the relational database 3014. As just one example, with respect to the energy industry and the utilities sector in particular, one type of the first types of data can be customer data relating to an energy usage account. In other examples relating to the utilities sector, other examples of data stored in the relational database 3014 may include information concerning organizations and organization hierarchies, grid assets and grid asset hierarchies, service agreements, billing accounts, and meter characteristics. At block 3310, the relational database 3014 stores the first types of data.

At block 3312, the computational services module 3208 performs post-processing on the first types of data. The stored first types of data may be post-processed to derive any kind of information that may be requested by an application of the enterprise Internet-of-Things application development platform 3002. Post-processing may include, for example, aggregate calculations and performance denormalization performed on the stored first types of data. As just one example, with respect to the energy industry and the utilities sector in particular, aggregate calculations may include, for example, summing periodic energy expenditures (e.g., monthly bills) into a total figure (e.g., annual amounts). Performance denormalization may include, for example, processing of the stored first types of data to optimize query performance. Other types of post-processing are possible. At block 3314, the relational database 3014 stores the post-processed first types of data.

For second types of data, the process 3300 proceeds from block 3306 to block 3316. At block 3316, the data services module 3206 provides the second types of data to the key/value store 3016. As just one example, with respect to the energy industry and the utilities sector in particular, one example type of the second types of data is "raw" meter data relating to energy usage. With respect to the utilities sector, other examples of data stored in the key/value store 3016 may include meter readings, meter events, weather measurements such as temperature, relative humidity, dew point, downward infrared irradiance, and asset state changes. At block 3318, the key/value store 3016 stores the second types of data. At block 3320, the normalization module 3214 normalizes the second types of data. Normalization may involve, for example, filling in gaps or addressing outliers in the data. The normalization algorithms may be provided by the enterprise Internet-of-Things application development platform 3002 or the user. At block 3322, the key/value store 3016 stores the normalized second types of data.

The process 3300 can be used in various circumstances. For example, the data provided by the external data sources 3004a-n, as appropriate, can be received and processed by the enterprise Internet-of-Things application development platform 3002 in accordance with the process 3300. Further, suitable portions of the process 3300 can apply to data derived from other data processing techniques of the enterprise Internet-of-Things application development platform 3002, such as stream processing and batch parallel processing. Many other uses of the process 3300 are possible in addition to the examples discussed herein. As just one example, with respect to the energy industry and the utilities sector in particular, other uses of the process 3300 may include weather measurements, meter events, energy efficiency measures, grid assets, phasor management unit measurements, and customer information.

Figure 34:
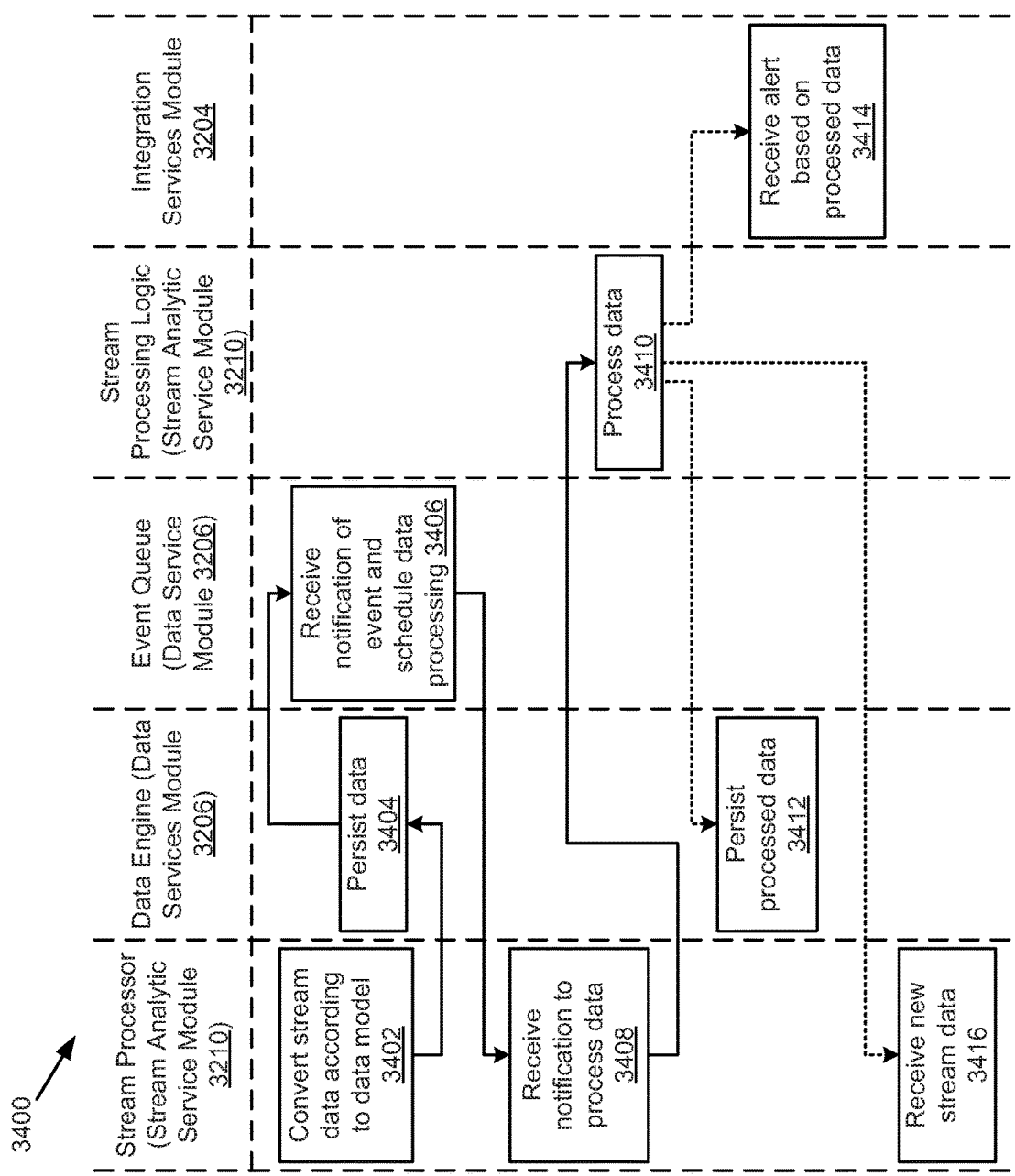
FIG. 34 illustrates an example stream process, according to one embodiment.

FIG. 34 illustrates an example process 3400 for stream processing in accordance with an embodiment of the present technology. A stream, such as a SCADA feed, is provided to the stream processor of the stream analytic services module 3210. At block 3402, the stream processor of the stream analytic services module 3210 converts the stream according to the data model 3220. At block 3404, the data engine of the data services module 3206 persists the data in the event queue. The data is persisted in the event queue until the processing of the stream is complete, at which time the data may be discarded. At block 3406, the event queue of the data services module 3206 receives notification of an event, such as completed persistence of the data, and schedules data processing. According to the schedule, the event queue provides to the stream processor of the stream analytic services module 3210 a notification to process the data.

At block 3408, the stream processor of the stream analytic services module 3210 receives the notification to process the data. The notification provided to the stream processor may be based on scheduling logic of the event queue that accounts for load balancing for and availability of computing resources to process the data. The stream processor of the stream analytic services module 3210 provides an instruction to the stream processing logic of the stream analytic services module 3210 to process the data. At block 3410, the stream processing logic of the stream analytic services module 3210 processes the data. The stream processing logic may be based on any specifications of the user or an administrator of the enterprise Internet-of-Things application development platform 3002.

The process 3400 proceeds to one or more of block 3412, block 3414, and block 3416, which represent examples of different actions that can be taken by the stream processing logic. At block 3412, the data engine of the data services module 3206 persists the processed data. The processed data may be persisted in the relational database 3014 or the key/value store 3016. At block 3414, the integration services module 3204 receives from the stream processing logic an indication of an event, such as an alert, based on the processed data. The alert, in turn, may trigger the integration services module 3204 to take action, such as notifying an application or resource, internal or external to the enterprise Internet-of-Things application development platform 3002, about a real-time or near real-time condition. At block 3416, the stream processor of the stream analytic services module 3210 receives a new stream of data based on the processed data. In response to receipt of the new stream of data, the process 3400 may proceed to block 3402 to initiate another cycle of the process 3400.

The process 3400 can be used in various situations. As just one example, with respect to the energy industry and the utilities sector in particular, energy loss may be evidenced or caused by myriad occurrences, such as energy usage readings on inactive meters or sensors (e.g., AMR, AMI), tampered or bypassed meters or sensors, and malfunctioning meters or sensors. Stream processing in accordance with the process 3400 can allow for rapid identification of meters or sensors potentially associated with energy loss. With respect to persisting data, a table could be created that stores the identification of the meters or sensors associated with energy loss and their related meter or sensor data. The table then could be persisted for use by an application of the enterprise Internet-of-Things application development platform 3002. With respect to provision of alerts, once meters or sensors associated with energy loss are identified, the process 3400 may generate alerts that prompt communications to appropriate field personnel to be dispatched to investigate such meters or sensors. In another example situation relating to the utilities sector, a stream of meter or sensor data may need to be converted for use as a new stream. With respect to generating a new stream, meter or sensor data provided at, for example, 255-minute intervals can be converted to a new stream of aggregated meter or sensor data reflecting, for example, one hour intervals. The new stream, in turn, may be processed in accordance with the process 3400 and the stream processing logic associated with the new stream. Many other uses of the process 3400 are possible in addition to the examples discussed herein. For example, other uses relating to the energy industry and the utilities sector of the process 3400 may include: identification and quantification of unbilled energy due to theft and malfunction; identification of opportunities to reduce operational and capital expense by right-sizing system voltage and power factor; estimation of load predication and potential load reduction at multiple aggregation levels; computation of outage metrics by region within the grid distribution system; and examination of dynamic load patterns, voltage abnormalities, and optimal equipment capacities to create a profile of the health of grid assets.

Figure 35:
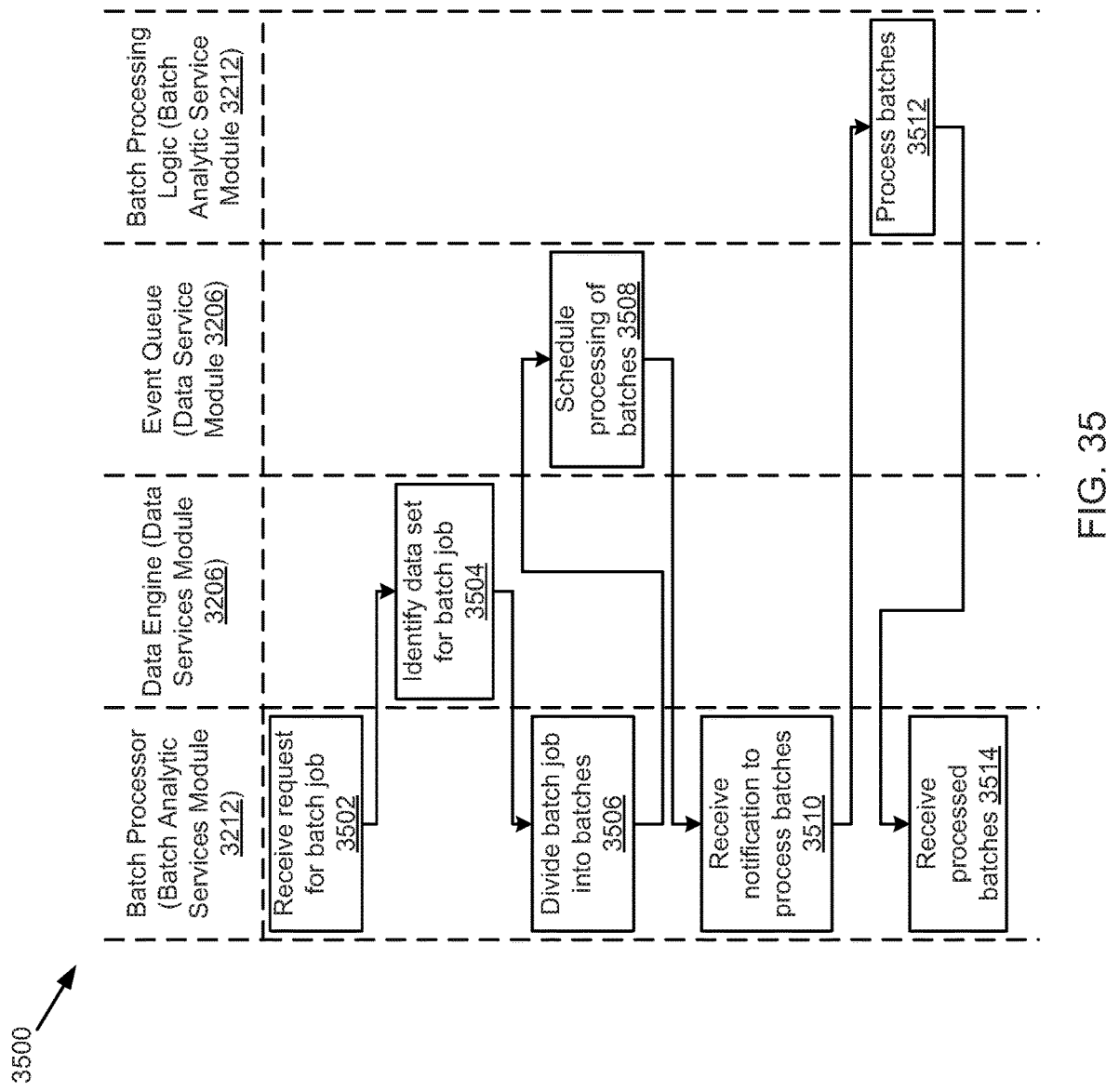
FIG. 35 illustrates an example batch parallel process, according to one embodiment.

FIG. 35 illustrates an example process 3500 for batch parallel processing in accordance with an embodiment of the present technology. The process 3500 may be invoked in any manner, such as through a command from a user interface, a scheduler (e.g., cron), or an API. At block 3502, the batch processor of the batch parallel processing analytic services module 3212 receives a request for a batch job. At block 3504, the data engine of the data services module 3206 identifies a data set for the batch job. At block 3506, the batch processor of the batch parallel processing analytic services module 3212 divides the batch job into batches. At block 3508, the event queue of the data services module 3206 schedules processing of the batches. According to the schedule, the event queue provides to the batch processor of the batch parallel processing analytic services module 3212 a notification to process the batches.

At block 3510, the batch processor of the batch parallel processing analytic services module 3212 receives the notification to process the batches. The notification provided to the batch processor may be based on scheduling logic of the event queue that accounts for load balancing for and availability of computing resources to process the data. The batch processor of the batch parallel processing analytic services module 3212 provides an instruction to the batch processing logic of the batch parallel processing analytic services module 3212 to process the batches. At block 3512, the batch processing logic of the batch parallel processing analytic services module 3212 processes the batches. The batch processing logic may be based on any specifications of the user or an administrator of the enterprise Internet-of-Things application development platform 3002. At block 3514, the batch processor of the batch parallel processing analytic services module 3212 receives the processed batches. The processed batches may be used in accordance with an application of the enterprise Internet-of-Things application development platform 3002.

The process 3500 can be used in various situations in connection with different industries. As just one example, with respect to the energy industry and the utilities sector in particular, reports relating energy usage can be generated on, for example, a daily, monthly, or yearly basis using batch parallel processing. In this example, the reports generated by batch parallel processing may aggregate, analyze, and compare data across any number of KPIs, such as periodic (e.g., yearly) energy cost, periodic (e.g., yearly) energy consumption, periodic (e.g., year over year) change in energy cost, periodic (e.g., year over year) change in consumption, energy cost per square area, and energy consumption per square area. Many other uses of the process 3500 in connection with different industries are possible in addition to the examples discussed herein. As another example with respect to the utilities sector, other uses of the process 3500 may include generation of energy efficiency recommendations across a portfolio of facilities; evaluation of load forecasting statistical models across a portfolio of meters to determine load shedding opportunities; and customer segmentation identification and evaluation.

Figure 36:
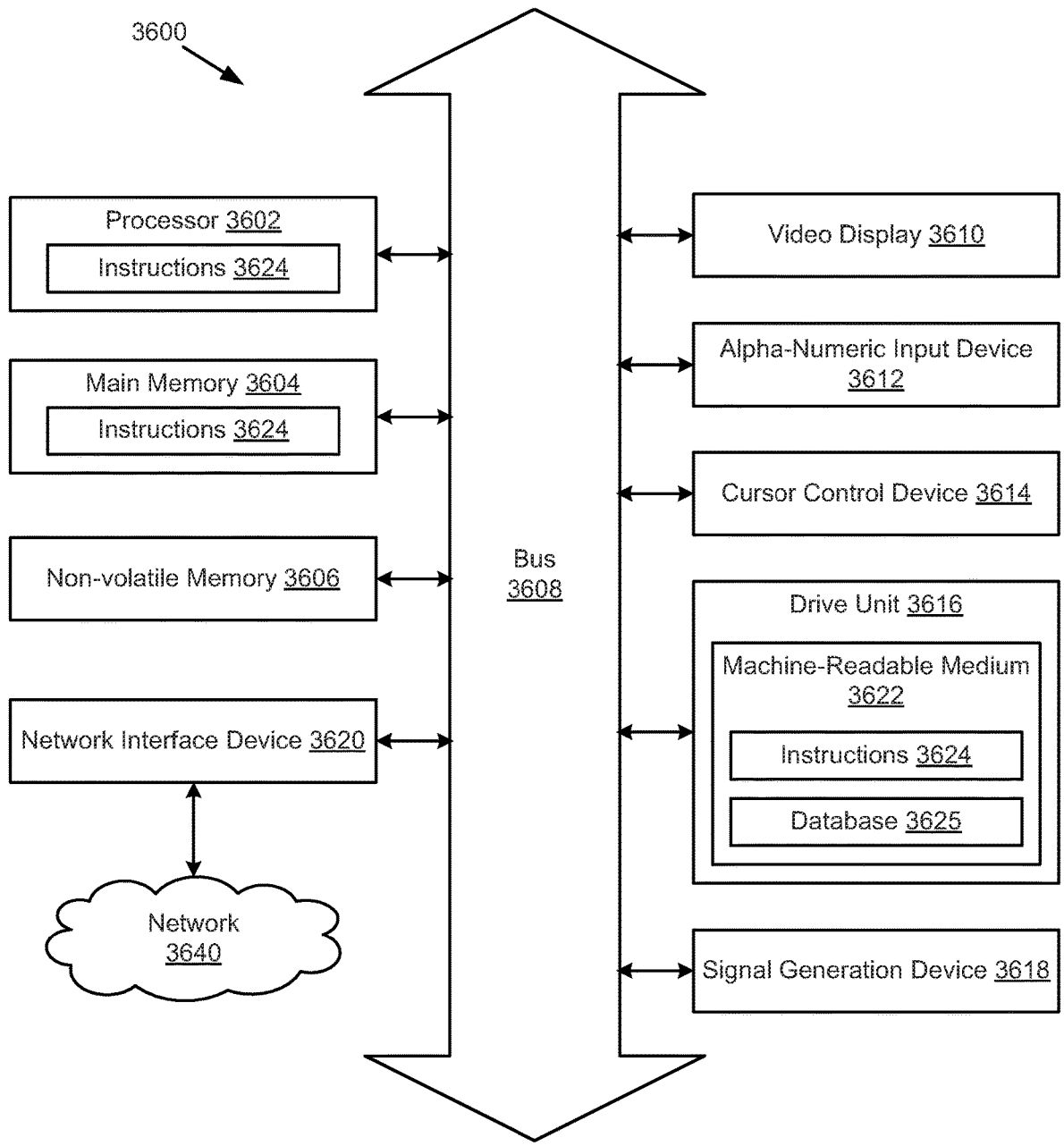
FIG. 36 illustrates an example machine within which a set of instructions for causing the machine to perform one or more of the embodiments described herein can be executed, according to one embodiment.

FIG. 36 is a diagrammatic representation of an embodiment of the machine 3400, within which a set of instructions for causing the machine to perform one or more of the embodiments described herein can be executed. The machine may be connected (e.g., networked) to other machines. In a networked deployment, the machine may operate in the capacity of a server or a client machine in a client-server network environment, or as a peer machine in a peer-to-peer (or distributed) network environment.

The machine 3600 includes a processor 3602 (e.g., a central processing unit (CPU), a graphics processing unit (GPU), or both), a main memory 3604, and a nonvolatile memory 3606 (e.g., volatile RAM and non-volatile RAM), which communicate with each other via a bus 3608. In some embodiments, the machine 3400 can be a desktop computer, a laptop computer, personal digital assistant (PDA), or mobile phone, for example. In one embodiment, the machine 3400 also includes a video display 3610, an alphanumeric input device 3612 (e.g., a keyboard), a cursor control device 3614 (e.g., a mouse), a drive unit 3616, a signal generation device 3618 (e.g., a speaker) and a network interface device 3620.

In one embodiment, the video display 3610 includes a touch sensitive screen for user input. In one embodiment, the touch sensitive screen is used instead of a keyboard and mouse. The disk drive unit 3616 includes a machine-readable medium 3622 on which is stored one or more sets of instructions 3624 (e.g., software) embodying any one or more of the methodologies or functions described herein. The instructions 3624 can also reside, completely or at least partially, within the main memory 3604 and/or within the processor 3602 during execution thereof by the computer system 3400. The instructions 3624 can further be transmitted or received over a network 3640 via the network interface device 3620. In some embodiments, the machine-readable medium 3622 also includes a database 3625.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory may also be a random access memory. The non-volatile memory can be a local device coupled directly to the rest of the components in the data processing system. A non-volatile memory that is remote from the system, such as a network storage device coupled to any of the computer systems described herein through a network interface such as a modem or Ethernet interface, can also be used.

While the machine-readable medium 3622 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals. The term "storage module" as used herein may be implemented using a machine-readable medium.

EXAMPLES

Figure 37:
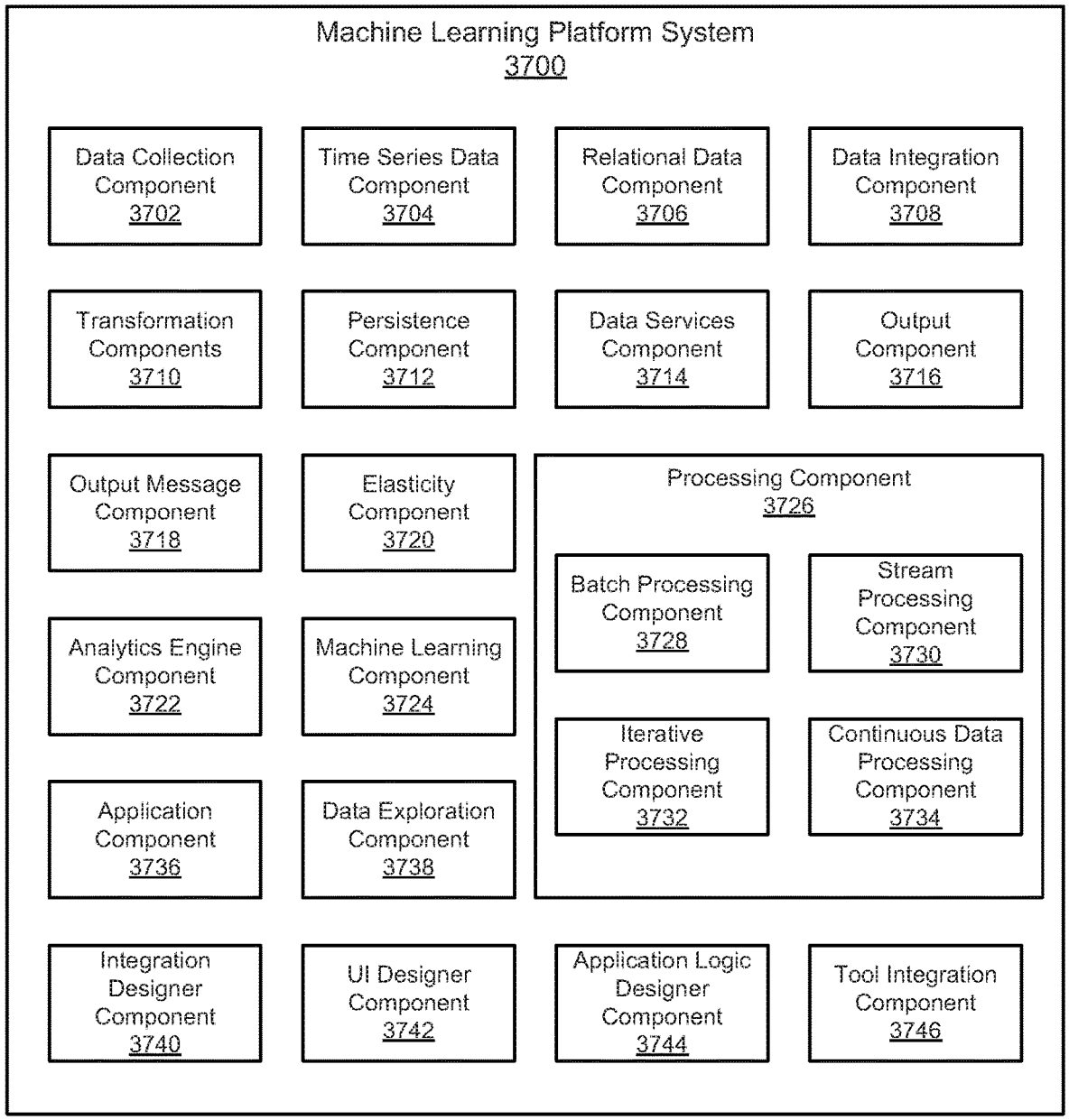
FIG. 37 is a schematic block diagram illustrating one embodiment of an application development platform system.

The following examples pertain to further embodiments.
FIG. 37 is a schematic block diagram illustrating one embodiment of an application development platform system 3700. In one embodiment, the application development platform system 3700 may be used as part of a cyberphysical system. In one embodiment, the application development platform system 3700 may implement a model driven architecture for a distributed system. The application development platform system 3700 may perform any of the functionality discussed in the present disclosure, without limitation.

The application development platform system 3700 includes a data collection component 3702, a time-series data component 3704, a relational data component 3706, a data integration component 3708, transformation components 3710, a persistence component 3712, a data services component 3714, an output component 3716, an output message component 3718, an elasticity component 3720, an analytics engine component 3722, a machine learning component 3724, a processing component 3726 (which includes a batch processing component 3728, a stream processing component 3730, an iterative processing component 3732, and a continuous data processing component 3734), an application component 3736, a data exploration component 3738, an integration designer component 3740, a UI designer component 3742, an application logic component 3744, and a tool integration component 3746.

The components 3702-3746 are given by way of illustration only and may not all be included in all embodiments. In fact, some embodiments may include only one or any combination of two or more of the components 3702-3746. Furthermore, some of the components 3702-3746 may be located outside the application development platform system 3700, such as in other servers or devices in communication with the application development platform system 3700.

Figure 38:
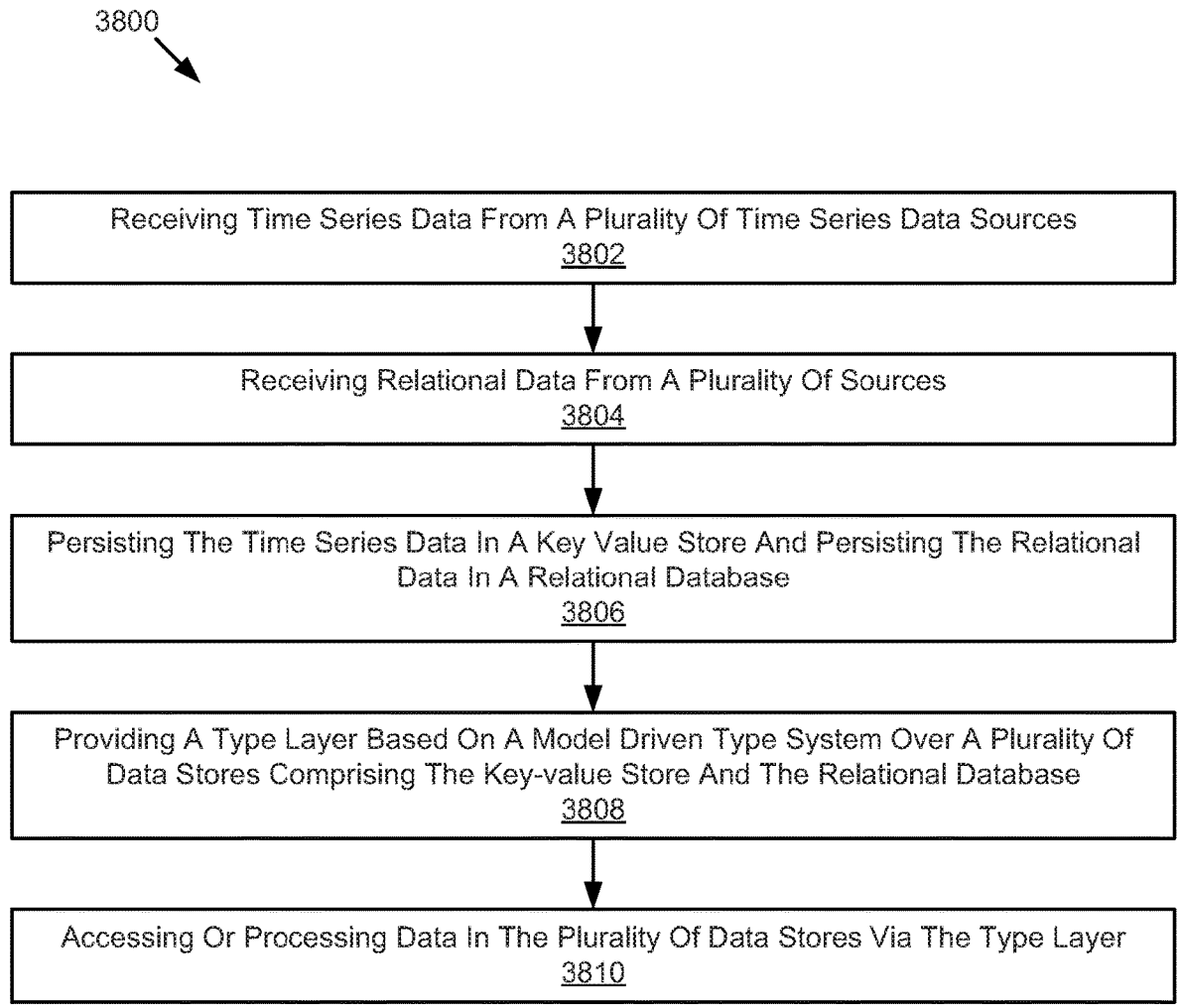
FIG. 38 illustrates an example method for providing or processing data based on a type system.

Example 1 is a method 3800, as shown in FIG. 38, for providing or processing data based on a type system. The method 3800 may be performed by a system, such as the systems 200, 1600, 1900, and/or 3700 of FIGS. 2, 16, 19, and 37. The method 3800 includes receiving 3802 (for example, by a time-series data component 3704) time-series data from a plurality of time-series data sources. The method 3800 includes receiving 3804 (for example, by a relational data component 3706) relational data from a plurality of sources. The method 3800 includes persisting 3806 (for example, by the persistence component 3712) the time-series data in a key-value store and persisting the relational data in a relational database. The method 3800 includes providing 3808 (for example, by the data services component 3714) a type layer based on a type system over a plurality of data stores comprising the key-value store and the relational database, wherein providing the type layer comprises storing definitions for a plurality of types based on the plurality of data stores, and, in response to a request for data, providing a type of the plurality of types comprising information in accordance with a definition corresponding to the type. The method 3800 includes accessing or processing data 3810 (for example, by a component of the system 3700) in the plurality of data stores via the type layer.

In Example 2, the types in Example 1 include type definitions indicating one or more properties, relationships, and functions relative to the plurality of data stores.

In Example 3, the method 3800 in any of Examples 1-3 further includes automatically adding storage nodes for storing data in the key-value store (for example, by a persistence component 3712 or elasticity component 3720).

In Example 4, the method 3800 in any of Examples 1-4 further includes partitioning data into the plurality of data stores based on a data type (for example, by a persistence component 3712).

In Example 5, the method 3800 in any of Examples 1-5 further includes transforming (for example, by one or more of transformation components 3710, data integration component 3708, or other component) at least a portion of the time-series data or the relational data into a common format, wherein persisting the data in the key-value store or relational database in the common format comprises persisting in response to transforming.

In Example 6, transforming as in Example 5 includes transforming based on a plurality of transformation rules configured to convert data from a source from a first type to a second type.

In Example 7, the transformation rules in any Examples 6 are extensible by a user for additional or alternate data sources.

In Example 8, the method 3800 in any of Examples 1-7 further includes generating (for example, by an integration designer component 3740) rules for acquiring data from additional data sources based on input from a user.

In Example 9, the method 3800 in any of Examples 1-8 further includes adding or modifying type definitions (for example, by an integration designer component 3740) for the plurality of types in the type layer based on input from a user.

In Example 10, the method 3800 in any of Examples 1-9 further includes adjusting (for example, by an elasticity component 3720) available resources based on a current load, wherein adjusting comprising adjusting one or more of: a number of storage nodes; a number of processing nodes; and a number of message nodes.

In Example 11, the method 3800 in any of Examples 1-10 further includes sending (for example, by an output message component 3718) output messages to acknowledge receipt of messages comprising time-series data or relational data using durable subscription to ensure delivery.

In Example 12, the method 3800 in any of Examples 1-11 further includes updating (for example, by an output component 3716) a time-series data source, relational data source, or other data source based on one or more of application logic, machine learning, or data processing performed above the type layer.

In Example 13, the time-series data in any of Examples 1-12 includes data from one or more of a smart meter, a smart appliance, a smart device, a monitoring system, a telemetry device, and a sensor.

In Example 14, the time-series data in any of Examples 1-13 includes sensor data from one or more of utility meter or sensor.

In Example 15, the time-series data in any of Examples 1-14 includes data from the plurality of sources comprises data from a plurality of different source types.

In Example 16, the relational data in any of Examples 1-15 includes data from one or more of a customer system, an enterprise system, and an operational system.

In Example 17, the relational data in any of Examples 1-16 includes data from one or more of a website or web accessible API.

Figure 39:
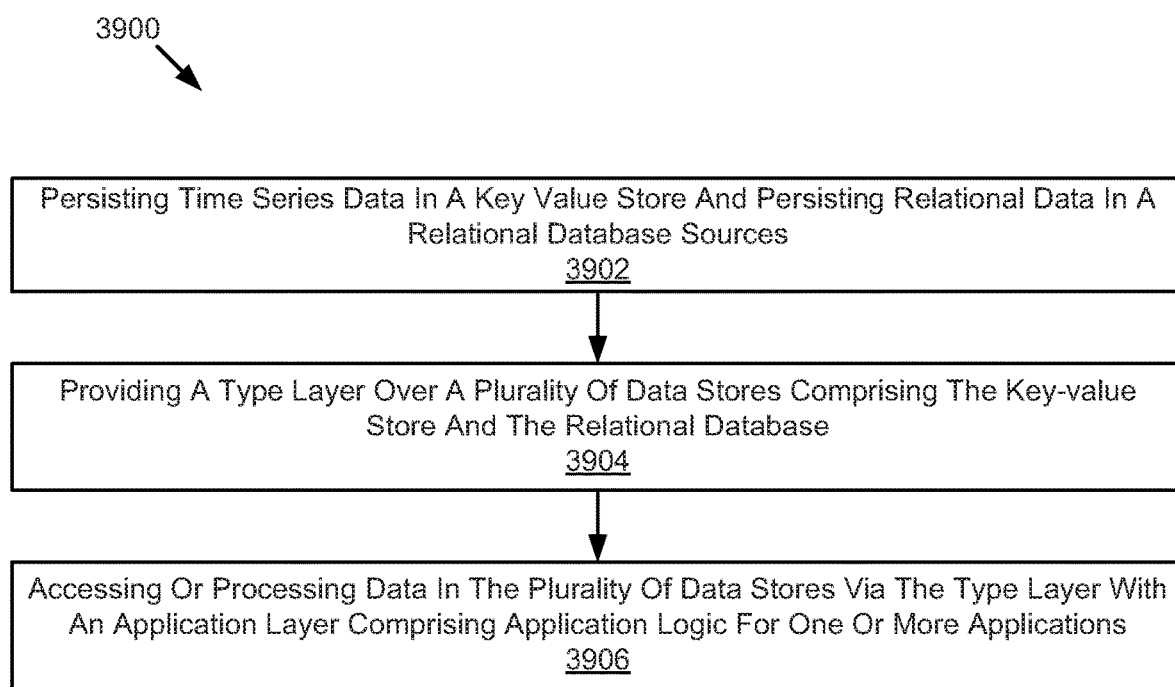
FIG. 39 illustrates an example method for providing or processing data.

Example 18 is a method 3900, as shown in FIG. 39, for providing or processing data. The method 3900 may be performed by a system, such as the systems 200, 1600, 1900, and/or 3700 of FIGS. 2, 16, 19, and 37. The method 3900 includes persisting 3902 (for example, using a persistence component 3712) time-series data in a key-value store and persisting relational data in a relational database. The method 3900 includes providing 3904 (for example, by the data services component 3714) a type layer over a plurality of data stores comprising the key-value store and the relational database, wherein providing the type layer comprises storing definitions for a plurality of types based on the plurality of data stores, and, in response to a request for data, providing an type of the plurality of types comprising information in accordance with a definition corresponding to the type. The method 3900 includes accessing or processing 3906 (for example, using an application component 3736) data in the plurality of data stores via the type layer with an application layer comprising application logic for one or more applications.

In Example 19, the method 3900 in Example 18 further includes transforming data (for example, using transformation components 3710 or an application component 3736) stored in the type into a format or value for processing by a corresponding application.

In Example 20, the method 3900 in any of Examples 18-19, further includes transforming (for example, using transformation components 3710, data integration component 3708, or an application component 3736) at least a portion of the time-series data or the relational data into a common format, wherein persisting comprises persisting the data in the key-value store or relational database in the common format.

In Example 21, the method 3900 in any of Examples 18-20 further includes converting (for example, using transformation components 3710, data integration component 3708, or an application component 3736) data from a source from a first type to a second type using a plurality of transformation rules.

In Example 22, the transformation rules in Example 21 are extensible by a user for additional or alternate data sources.

In Example 23, the method 3900 in any of Examples 21-22 further includes transforming the data from the common format into a first application format based on first transformation logic for processing by a first application, and transforming the data from the common format into a second application format based on second transformation logic for processing by a second application. For example, the transformations may be performed by transformation components 3710, a data integration component 3708, or an application component 3736.

In Example 24, in order to share data between the first application and the second application as in Example 23, the method 3900 includes transforming (for example, using transformation components 3710, data integration component 3708, or an application component 3736) the data from the first application to the common format and transforming the data from the common format into a second application format.

In Example 25, the method 3900 in any of Examples 18-24 further include creating (for example, using an integration designer component 3740) rules for acquiring data from additional data sources based on input from a user.

In Example 26, the method 3900 in any of Examples 18-25 further includes adding or modifying type definitions (for example, using an integration designer component 3740) for the plurality of types in the type layer based on input from a user.

In Example 27, the method 3900 in any of Examples 18-26 further includes generating (for example, using an application logic designer component 3744) application logic for a custom application based on input from a user.

In Examples 28, the method 3900 in any of Examples 18-27 further includes creating (for example, using a UI designer component 3742) code for an application UI based on input received from a user, presenting a plurality of UI components to the user and receiving a selection of one or more of the plurality of UI components for inclusion in the application UI.

In Example 29, the method 3900 in any of Examples 18-28 further includes receiving (for example, using a time-series data component 3704) time-series data from a plurality of time-series data sources.

In Example 30, the method 3900 in any of Examples 18-29 further includes receiving (for example, using a relational data component 3706) relational data from a plurality of relational data sources.

Figure 40:
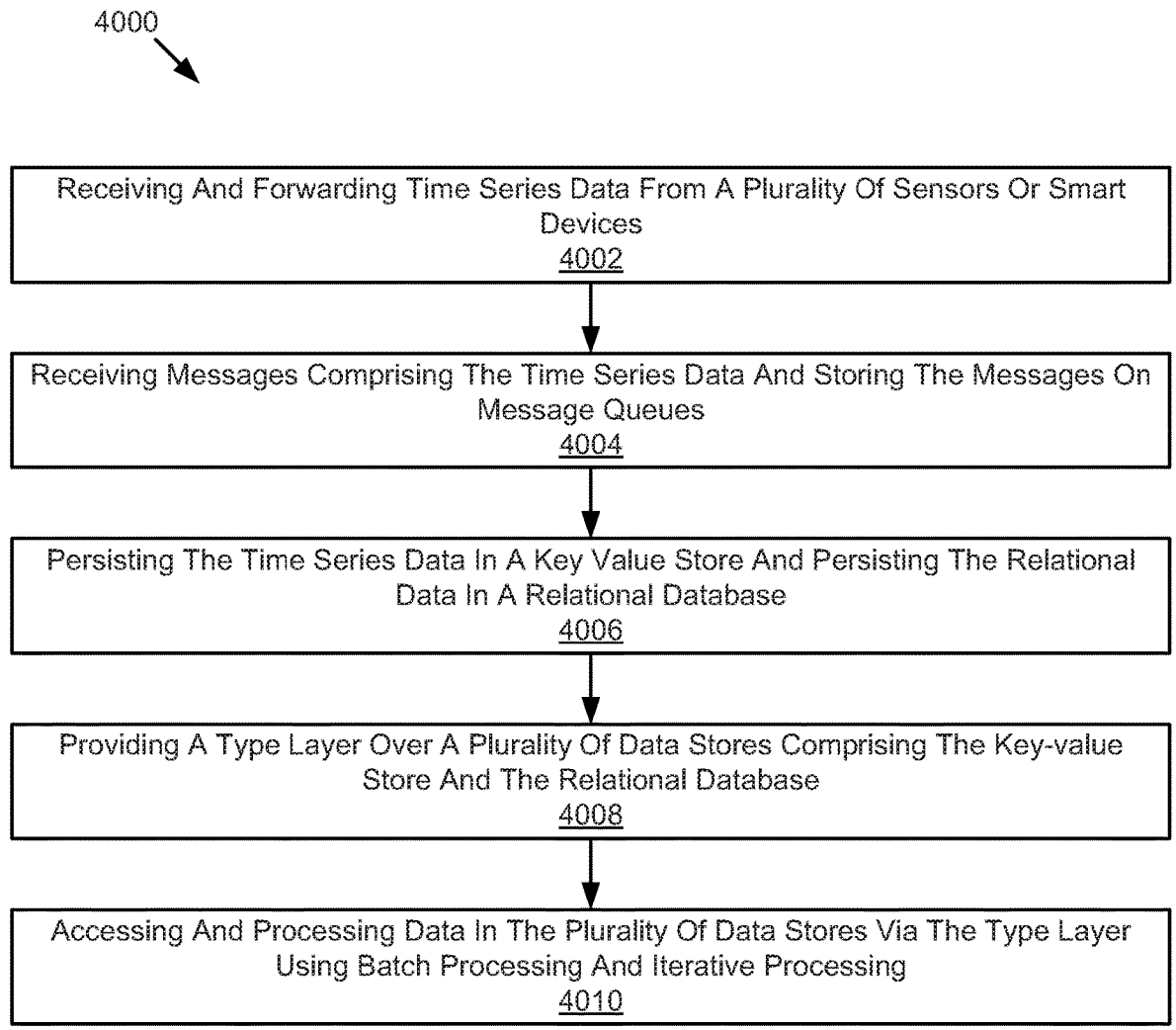
FIG. 40 illustrates an example method for providing or processing data.

Example 31 is a method 4000, as shown in FIG. 40, for providing or processing data. The method 4000 may be performed by a system, such as the systems 200, 1600, 1900, and/or 3700 of FIGS. 2, 16, 19, and 37. The method 4000 includes receiving 4002 (for example, using a plurality of concentrators) and forwarding time-series data from a plurality of sensors or smart devices. The method 4000 includes receiving 4004 messages (for example, using a plurality of message decoders) including the time-series data and storing the messages on message queues. The method 4000 includes persisting 4006 (for example, using a persistence component 3712) the time-series data in a key-value store and persisting the relational data in a relational database. The method 4000 includes providing 4008 (for example, using a data service component 3714) a type layer over a plurality of data stores comprising the key-value store and the relational database, wherein providing the type layer comprises storing definitions for a plurality of types based on the plurality of data stores, and, in response to a request for data, providing a type of the plurality of types comprising information in accordance with a definition corresponding to the type. The method 4000 includes accessing and processing 4010 data (for example using, a processing component 3726, batch processing component 3728, and/or iterative processing component 3732) in the plurality of data stores via the type layer using batch processing and iterative processing.

In Example 32, batch processing in Example 31 batch processes (for example, using the batch processing component 3728) persisted data in the plurality of data stores based on the plurality of types in the type layer using a Map reduce operation using a plurality of processing nodes.

In Example 33, batch processing in Example 32 modifies a number of the processing nodes based on a current load.

In Example 34, iterative processing in any of Examples 31-33 includes iteratively processing (for example, using the iterative processing component 3732) the time-series data and the relational data in memory based on the plurality of types in the type layer.

In Example 35, the method 4000 in any of Examples 31-34 further includes stream processing (for example, using a stream processing component 3730) the time-series data in real-time or near real-time below the type layer.

In Example 36, stream processing in Example 35 transforms the data into a unified format, and wherein the method 4000 further includes persisting the data in the unified format in response to transforming the data.

In Example 37, stream processing in any of Examples 31-36 flags aberrations in data values.

In Examples 38, stream processing in any of Examples 31-37 processes the time-series data stored in the message queues.

In Example 39, stream processing in any of Examples 35-38 processes the time-series data to determine whether the time-series data falls within or outside a predefined range. In one embodiment, stream processing may include performing stream processing at or near a network edge by a sensor, smart device, access point, or concentrator.

In Example 40, stream processing in any of Examples 35-39 triggers an analytic or notification based on the time-series data falling within or outside the predefined range.

In Example 41, in response to changes or additions in one or more of the plurality of data stores in any of Examples 31-40, the method 4000 further includes processing data (for example, using the processing component 3726 or the analytics engine component 3722) in the plurality of data stores based on the plurality of types.

In Example 42, the method 4000 in any of Examples 31-41 further includes (for example, using the continuous data processing component 3734) determining that a data element corresponding to a specific analytic has changed and processing or reprocessing data corresponding to the specific analytic based on the data element that has changed.

In Example 43, the method 4000 in any of Examples 31-42 further includes performing machine learning algorithms (for example, using the machine learning component 3724) on persisted data based on the plurality of types in the type layer.

In Example 44, the method 4000 in any of Examples 31-43 further includes performing the machine learning algorithms using one or more of iterative processing, batch processing, and continuous processing (for example, using the machine learning component 3724, the iterative processing component 3732, the batch processing component 3728, and/or the continuous processing component 3734).

In Example 45, the method 4000 in any of Examples 31-44 further includes receiving and processing messages comprising the time-series data using one or more of stream processing and the distributed queues (for example, using the stream processing component 3730).

In Example 46, the method 4000 in any of Examples 31-45 further includes translating a message and placing the message in a distributed message queue using message decoders.

In Example 47, the method 4000 in any of Examples 31-46 further includes increasing or decreasing a number of nodes for decoding messages based on a load (for example, using an elasticity component 3720).

In Example 45, the method 4000 in any of Examples 31-44 further includes adjusting available resources based on a current load by adjusting one or more of a number of storage nodes, a number of processing nodes, and a number of message decoder nodes (for example, using an elasticity component 3720).

Figure 41:
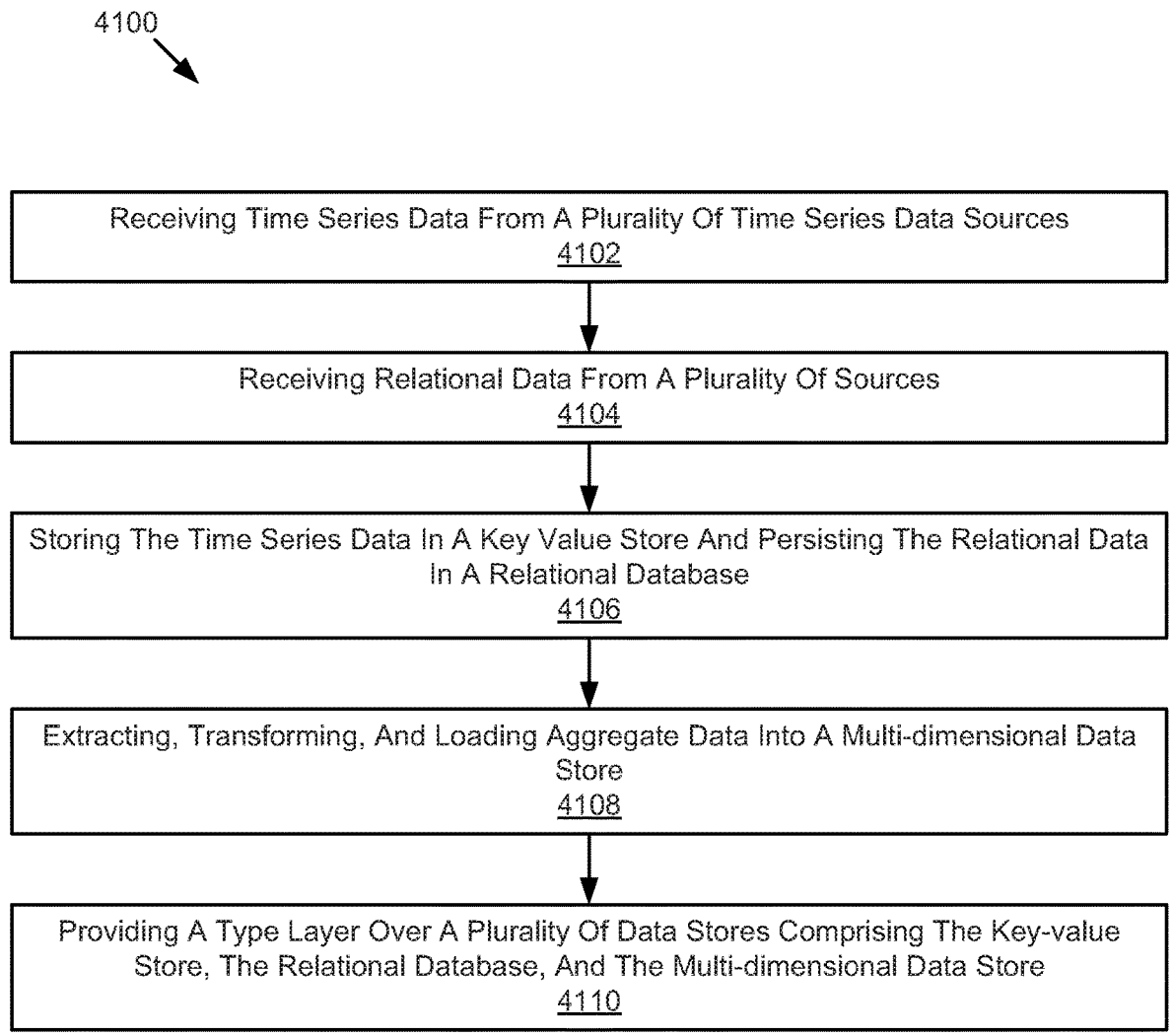
FIG. 41 illustrates an example method for storing data.

Example 46 is a method 4100, as shown in FIG. 41, for storing data. The method 4100 may be performed by a system, such as the systems 200, 1600, 1900, and/or 3700 of FIGS. 2, 16, 19, and 37. The method 4100 includes receiving 4102 (for example, using a time-series data component 3704) time-series data from a plurality of time-series data sources. The method 4100 includes receiving 4104 (for example, using a relational data component 3706) relational data from a plurality of relational data sources. The method 4100 includes storing 4106 (for example, using a persistence component 3712) the time-series data in a key-value store and storing the relational data in a relational database. The method 4100 includes extracting, transforming, and loading 4108 aggregate data into a multi-dimensional data store (for example, using a data services component 3714). The method 4100 includes providing 4110 (for example, using a data services component 3714) a type layer over a plurality of data stores comprising the key-value store, the relational database, and the multi-dimensional data store, wherein providing the type layer comprise storing definitions for a plurality of types based on the plurality of data stores.

In Example 47, the method 4100 in Example 46 further includes performing analytic calculations (for example, using an analytics engine component 3722) in real-time or near real-time comprising: receiving a request from a requesting service; fetching data from the key-value store; applying a specific analytic function to the fetched data; and returning a result of the analytic function to the requesting service.

In Example 48, the method 4100 in any of Examples 46-47 further includes storing one or more custom analytics (for example, using an analytics engine component 3722).

In Example 49, the method 4100 in any of Examples 46-48 further includes performing (for example, using an analytics engine component 3722) at least one of the one or more custom analytics in response to new or updated data.

In Example 50, the method 4100 in any of Examples 46-49 further includes determining (for example, using a data services component 3714) one or more data types or data sets that may be requested, and wherein extracting, transforming, and loading comprises extracting, transforming, and loading the aggregate data to create the one or more data types or data sets that may be requested.

In Example 51, the aggregate data in any of Examples 46-50 includes data for one or more of a report, a dashboard, and a type defined by the data services component 3714.

In Example 52 the aggregate data in any of Examples 46-51 is stored as a type within the multi-dimensional data store.

In Example 53, the method 4100 in any of Examples 46-52 further includes (for example, using a data services component 3714) detecting a change in data within one or more of the plurality of data stores and update the aggregate data in the multidimensional data store based on the change.

In Example 54, the method 4100 in any of Examples 46-53 further includes translating a read or update command to a plurality of forms corresponding to a plurality of data store types (for example, using the data services component 3714).

In Example 55, the method 4100 in Example 54 further includes receiving a command response from the plurality of data store types and returning to a requesting service or application (for example, using the data services component 3714).

In Example 56, the method 4100 in any of Examples 46-55 further includes receiving (for example, using a data exploration component 3738) a query from a user and providing a response in a visual or data format.

In Example 57, the method 4100 in any of Examples 46-56 further includes integrating (for example, using a tool integration component 3746) non-native components into a platform, wherein the non-native components comprise components implemented in code written in a language that is not native to the platform.

In Example 58, the method 4100 in any of Examples 46-57 further includes adjusting (for example, using an elasticity component 3720) available resources based on a current load one or more of: a number of storage nodes; a number of processing nodes; and a number of message decoder nodes.

In Example 59, the method 4100 in any of Examples 46-58 further includes performing machine learning algorithms (for example, using a machine learning component 3724) on persisted data based on the plurality of types in the type layer.

In Example 60, performing machine learning in Example 59 includes performing the machine learning algorithms using one or more of iterative processing, batch processing, and continuous processing (for example, using a machine learning component 3724, iterative processing component 3732, batch processing component 3728, and/or continuous processing component 3734).

Example 61 is an application development platform utilizing a model driven architecture for the design, development, provisioning, and operation of cyber-physical (IoT) computer software applications. The system of Example 61 may include any features discussed in relation to the systems discussed herein, such as the systems 200, 1600, 1900, and/or 3700 of FIGS. 2, 16, 19, and 37. The system is at least partially implemented on one or more of an Infrastructure-as-a-Service cloud-based computing and storage platform or on a premise computing and storage platform. The system includes sensor device data collection component (which may include the time-series data component 3704) to receive time-series data from a plurality of time-series data sources, wherein the time-series data sources comprise one or more smart devices or sensors. The system includes a relational data component to receive relational data from a plurality of relational data sources. The system includes a data aggregation and integration component (which may include one or more of the data integration component 3708 and transformation components 3710) to collect and aggregate relational data from a diversity of enterprise system software applications and a diversity of extraprise and Internet data sources. The system includes persistence component to store the time-series data in a key-value store and store the relational data in a relational database. The system includes an analytics system (which may include the analytics engine component 3722 and/or the processing component 3726) to provide map/reduce, batch, streaming, and iterative data analytics services. The system includes a machine learning component to enable advanced, predictive analytics against the above mentioned data. The system includes a data services component to implement a type system based on a model based architecture over a plurality of data stores comprising the key-value store and the relational database, wherein the data services component comprises definitions for a plurality of types for data stored in the plurality of data stores. In response to a request for data, the data services component provides a type of the plurality of types comprising information in accordance with a definition corresponding to the type.

Example 62 is an apparatus including means to perform a method or realize an apparatus or system as in any of Examples 1-61.

Example 66 is a machine readable storage including machine-readable instructions, when executed, to implement a method or realize an apparatus of any of Examples 1-62.

In some embodiments, the term type, as used herein, may be used to reference an instantiation of a defined type. In one embodiment, an instantiation of a type may also be referred to as an object.

Various techniques, or certain aspects or portions thereof, may take the form of program code (i.e., instructions) embodied in tangible media, such as floppy diskettes, CD-ROMs, hard drives, a non-transitory computer readable storage medium, or any other machine readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, systems, modules, or layers, which are terms used to more particularly emphasize their implementation independence. For example, a component, system, module, or layer may be implemented as a hardware circuit comprising custom very large scale integration (VLSI) circuits or gate arrays, off-the-shelf semiconductors such as logic chips, transistors, or other discrete components. A component, system, module, or layer may also be implemented in programmable hardware devices such as field programmable gate arrays, programmable array logic, programmable logic devices, or the like.

A component, system, module, or layer may also be implemented in software for execution by various types of processors. An identified component, system, module, or layer of executable code may, for instance, comprise one or more physical or logical blocks of computer instructions, which may, for instance, be organized as an object, a procedure, or a function. Nevertheless, the executables of an identified component, system, module, or layer need not be physically located together, but may comprise disparate instructions stored in different locations that, when joined logically together, comprise the component and achieve the stated purpose for the component, system, module, or layer.

Indeed, a component, system, module, or layer of executable code may be a single instruction, or many instructions, and may even be distributed over several different code segments, among different programs, and across several memory devices. Similarly, operational data may be identified and illustrated herein within component, system, module, or layer, and may be embodied in any suitable form and organized within any suitable type of data structure. The operational data may be collected as a single data set, or may be distributed over different locations including over different storage devices, and may exist, at least partially, merely as electronic signals on a system or network. The components, systems, modules, or layers may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

The invention claimed is:

1. A method, comprising:
providing a system comprising a plurality of types, wherein each type of the plurality of types comprises a respective data field definition and a respective method definition, and wherein at least one type of the plurality of types provides a configurable interface across disparate programming languages, protocols, and storage elements,
wherein a first type of the plurality of types defines a subset of the plurality of types, and wherein the subset of the plurality of types excludes the first type,
wherein the subset of the plurality of types abstract storage elements and computing services from an application, wherein the storage elements include any of database structure, database language, or storage format,
wherein each respective type of the subset of the plurality of types identifies (i) respective data and (ii) at least one respective machine learning service for application to the respective data;
implementing the system on a remote computing service comprising a plurality of computing resources; and
executing, by a plurality of computing resources, the application using the subset of the plurality of types.

2. The method of claim 1, further comprising storing the storage elements of the respective data and the computing services in metadata in at least a second type of the subset of the plurality of types.

3. The method of claim 2, wherein the metadata of the second type of the subset of the plurality of types comprises the respective data field definition and the respective method definition of the respective type corresponding to the second type.

4. The method of claim 2, further comprising updating the second type of the subset of the plurality of types by updating the metadata of the second type.

5. The method of claim 4, wherein the metadata of the second type comprises validation rules.

6. The method of claim 1, wherein the subset of the plurality of types abstract one or more data stores in which the respective data is stored.

7. The method of claim 6, wherein the plurality of types abstract one or more methods for accessing the one or more data stores.

8. The method of claim 6, wherein the one or more data stores comprise a key-value store and a relational database.

9. The method of claim 8, wherein the key-value store is configured to store time-series data and the relational database is configured to store non-time-series data.

10. The method of claim 8, further comprising implementing the key-value store and the relational database on one or more of the plurality of computing resources.

11. The method of claim 1, wherein a second type of the plurality of types is associated with a graphical element in a visual analytics designer.

12. The method of claim 1, wherein the plurality of computing resources comprises virtual machines.

13. The method of claim 1, further comprising provisioning additional computing resources to accommodate increasing computing demand or releasing a subset of the plurality of computing resources to accommodate decreasing computing demand.

14. The method of claim 1, wherein the subset of the plurality of types represent physical objects, and wherein the subset of the plurality of types abstract storage elements of the physical objects.

15. The method of claim 14, wherein the physical objects comprise one or more of a customer, a facility, a sensor, a computing system, or a mobile communication device.

16. The method of claim 1, wherein the machine learning services include machine learning classifiers for the respective data.

17. The method of claim 1, wherein the machine learning services include a K-means clustering service for the respective data, and wherein the respective data includes sensor data.

18. The method of claim 1, wherein the executing the application using the subset of the plurality of types utilizes the configurable interface to integrate disparate data from natively incompatible storage elements.

19. The method of claim 18, wherein utilizing the configurable interface further integrates disparate data from natively incompatible programming languages.

20. The method of claim 1, wherein the types enable the application to process data from disparate data sources independent of knowledge of the database structure, database language, or storage format.

21. The method of claim 20, wherein the disparate data sources are natively incompatible.

22. A system comprising:
one or more processors; and
memory storing instructions that, when executed by the one or more processors, cause the system to perform:
providing a system comprising a plurality of types, wherein each type of the plurality of types comprises a respective data field definition and a respective method definition, and wherein at least one type of the plurality of types provides an interface across different programming languages,
wherein a first type of the plurality of types defines a subset of the plurality of types, and wherein the subset of the plurality of types excludes the first type,
wherein the subset of the plurality of types abstract storage elements of data and computing services from an application, wherein the storage elements include any of database structure, database language, or storage format, wherein each respective type of the subset of the plurality of types identifies (i) respective data and (ii) at least one respective machine learning service for application to the respective data;

storing the storage elements of the data and the computing services in metadata in at least a second type of the subset of the plurality of types, wherein the metadata of the second type of the subset of the plurality of types comprises the respective data field definition and the respective method definition of the second type;

providing access to the subset of the plurality of types to a remote computing service comprising a plurality of computing resources;

executing, by the plurality of computing resources, the application using the subset of the plurality of types; and updating, subsequent to executing the application, the second type of the subset of the plurality of types.

23. The system of claim 22, wherein the updating the second type of the subset of the plurality of types comprises updating the metadata of the second type.

24. The system of claim 23, wherein updating the metadata of the second type comprises updating the respective data field definition and the respective method definition of the respective type corresponding to the second type.

* * * * *

UNITED STATES PATENT AND TRADEMARK OFFICE
CERTIFICATE OF CORRECTION

PATENT NO. : 11,954,112 B2
APPLICATION NO. : 17/062445
DATED : April 9, 2024
INVENTOR(S) : Thomas M. Siebel et al.

It is certified that error appears in the above-identified patent and that said Letters Patent is hereby corrected as shown below:

In the Specification

Column 30, Line number 40, delete "two s" and replace with --two types--.

Signed and Sealed this
Twenty-eighth Day of May, 2024

Katherine Kelly Vidal
*Director of the United States Patent and Trademark Office*